United States Patent
Walker

(10) Patent No.: US 7,259,357 B2
(45) Date of Patent: Aug. 21, 2007

(54) ELECTRONICALLY CONTROLLED SEALING, UNSEALING AND/OR BONDING WITH METAL STRIP OR WIRE COATED WITH LIQUEFIABLE SUBSTANCE FOR REDUNDANT APPLICATION AND TAMPER DETECTION

(75) Inventor: Richard C. Walker, Waldorf, MD (US)

(73) Assignee: Kline and Walker LLC, Potomac, MD (US)

( * ) Notice: Subject to any disclaimer, the term of this patent is extended or adjusted under 35 U.S.C. 154(b) by 0 days.

(21) Appl. No.: 10/654,992

(22) Filed: Sep. 5, 2003

(65) Prior Publication Data

US 2004/0049324 A1    Mar. 11, 2004

Related U.S. Application Data

(60) Division of application No. 09/738,901, filed on Dec. 18, 2000, now Pat. No. 6,647,328, which is a continuation of application No. PCT/US99/13668, filed on Jun. 18, 1999.

(60) Provisional application No. 60/089,783, filed on Jun. 18, 1998, provisional application No. 60/122,108, filed on Feb. 26, 1999, provisional application No. 60/139,759, filed on Jun. 15, 1999, provisional application No. 60/149,029, filed on Aug. 13, 1999.

(30) Foreign Application Priority Data

Jan. 15, 1999    (WO) .................... PCT/US99/00919

(51) Int. Cl.
*H05B 1/00* (2006.01)
*B29C 65/00* (2006.01)
*C04B 37/00* (2006.01)

(52) U.S. Cl. ............... 219/243; 219/544; 219/535; 156/308.4; 156/325; 156/499

(58) Field of Classification Search ............ 219/243, 219/544, 535; 156/308.4, 325, 499
See application file for complete search history.

(56) References Cited

U.S. PATENT DOCUMENTS 2,647,072 A * 7/1953 Smith .................. 156/215

(Continued)

FOREIGN PATENT DOCUMENTS

DE    32 26 575    3/1984

(Continued)

OTHER PUBLICATIONS

Feb. 11, 2004. Supplementary European Search Report from European Application No. 99930355.5.

*Primary Examiner*—Robin Evans
*Assistant Examiner*—Stephen J. Ralis
(74) *Attorney, Agent, or Firm*—Irah H. Donner; Wilmer Cutler Pickering Hale and Dorr LLP

(57) ABSTRACT

The invention seals, unseals and/or bonds plastics, waxes and resins via a thermal metal strip or wire coated with liquefiable substances that melt to open or separate and cool to congeal, seal, vulcanize or bond together when the wire or strip is energized in a shorted state (to heat) or not energized (to cool). Electronic switch modalities and sealing applications are optionally taught for security and tamper detection. In one modality, a unique signal is sent to the gate leg of a micro-processing chip (e.g. an SCR switch) where firmware recognizes the signal and permits current through a thermal wire. This innovation is optionally employed for Homeland Security.

7 Claims, 48 Drawing Sheets

Electronic Security Seal

U.S. PATENT DOCUMENTS

| | | | |
|---|---|---|---|
| 2,662,045 A * | 12/1953 | Baggott | 156/183 |
| 3,049,465 A * | 8/1962 | Wilkins | 156/274.2 |
| 3,268,846 A * | 8/1966 | Morey | 338/212 |
| 3,468,747 A * | 9/1969 | Tatnall | 442/10 |
| 3,506,519 A * | 4/1970 | Blumenkranz | 156/274.2 |
| 3,954,541 A | 5/1976 | Landgraf | |
| 4,067,411 A | 1/1978 | Conley et al. | |
| 4,416,713 A * | 11/1983 | Brooks | 156/64 |
| 4,676,025 A | 6/1987 | Mattscheck et al. | |
| 4,702,291 A | 10/1987 | Engle | |
| 4,747,301 A | 5/1988 | Bellanger | |
| 4,878,050 A | 10/1989 | Kelley | |
| 4,897,640 A | 1/1990 | Rapoen | |
| 5,092,294 A | 3/1992 | Jackson | |
| 5,218,367 A | 6/1993 | Sheffer et al. | |
| 5,223,844 A | 6/1993 | Mansell et al. | |
| 5,276,728 A | 1/1994 | Pagliaroli et al. | |
| 5,311,197 A | 5/1994 | Sorden et al. | |
| 5,407,514 A | 4/1995 | Butts et al. | |
| 5,435,505 A | 7/1995 | Martin | |
| 5,513,244 A | 4/1996 | Joao et al. | |
| 5,586,050 A | 12/1996 | Makel et al. | |
| 5,586,457 A | 12/1996 | Keener | |
| 5,718,260 A | 2/1998 | Leonardi | |
| 5,819,189 A | 10/1998 | Kramer et al. | |
| 5,832,394 A | 11/1998 | Wortham | |
| 5,835,868 A | 11/1998 | McElroy et al. | |
| 5,917,405 A | 6/1999 | Joao | |
| 6,028,537 A | 2/2000 | Suman et al. | |

FOREIGN PATENT DOCUMENTS

| | | | |
|---|---|---|---|
| DE | 93 07 890 | | 7/1993 |
| EP | 0 652 542 | | 5/1995 |
| GB | 1239579 | * | 7/1971 |
| GB | 2 305 216 | | 4/1997 |
| WO | WO95/22131 | | 8/1995 |

* cited by examiner

```
init:
x var word
tflag var bit
relay var bit
solenoid var bit
switch var bit
tflag=0
relay=0
switch=0
solenoid=0
input 12
input 14
input 15
output 4
outout 1
output 2
output 3
output 5
output 6
output 7
output 8
output 9
output 10
output 11
output 13
out1=0
out2=0
out3=0
out4=0
out5=0
out6=0
out7=0
out8=1
out9=0
out10=1
out11=0
out13=0
start:
if in15=1 then init reset ID sys.
if in14-1 then checkt
check1:
if tflag=1 and in 12=0 then relayc
check2:
if in12=1 and solenoid=0 then carrun
check3:

if in 12=1 and solenoid=1 and tflag=1 then slowdown
check4:  go to start checkt:
for x=1 to 35
pause 100
if in 14=0 then nogo
next
goto go
nogo:
goto check1
go:
tflag=1
debug "go condition",cn
goto check1 noactivity:
debug "Beeper is Inactive", cr
return relayc:
debug "relay control"
debug ? relay
if relay=0 then first
if relay=1 then second
first:
debug "first"
out4=1
out2=1
out3=Pause 2,300 RS out4=0
relay=1
goto relend
second:
debug "second"
out2=0
out5=1
pause 3000
out5=0
relay=0
tflag=0
hold: if in 14=1 then hold
stuck1: if in 15=0 then stuck 1
goto init
relend:
```

```
tflag=0
hold1: if in 14=1 then hold 1
goto check 2 carrun:
out1=0
out2=0
out3=0
solenoid=1
goto check 3 slowdown:
if switch=0 then fir
if switch=1 then sec
fir:
out1=1 accelerator diseng.
siren-flasher
out8=0 play message
out9=1 amp on for play
pause 15000
out8=1 off record chip
out 10=0 reset recorder chip
pause 1000
out10=1 reset ready
pause 21000
out2=1 progressive brake application
switch=1
goto swend
sec:
out3=1 energize kill
out5=1
pause 3000
out5=0
pause 45000
out9=0
switch=0
tflag=0
hold3: if in14=1 then hold 3
stuck2: if in 15=0 then stuck 2
goto init
swend:
```

FIG. 3

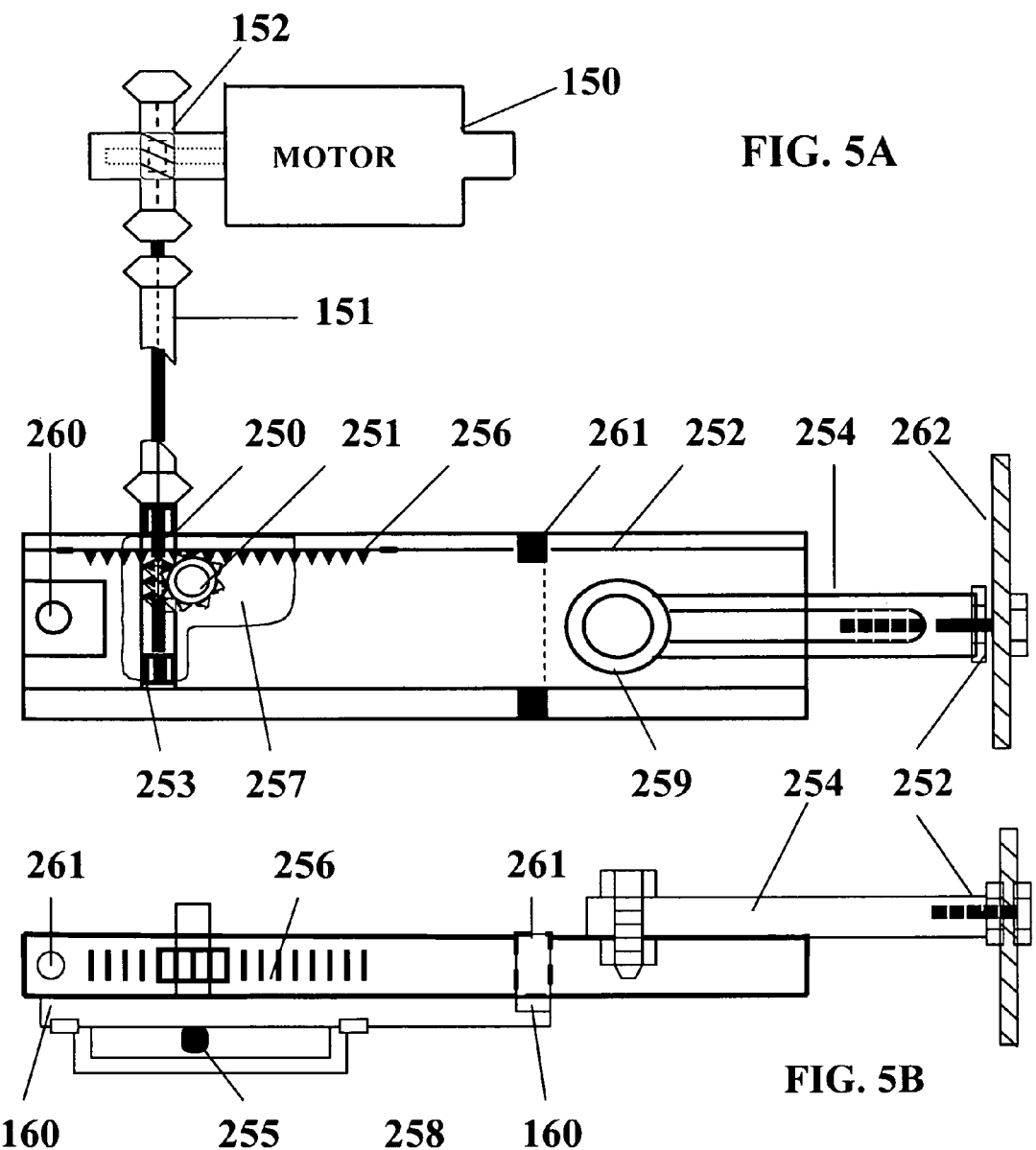

I-200

I-205

I-201

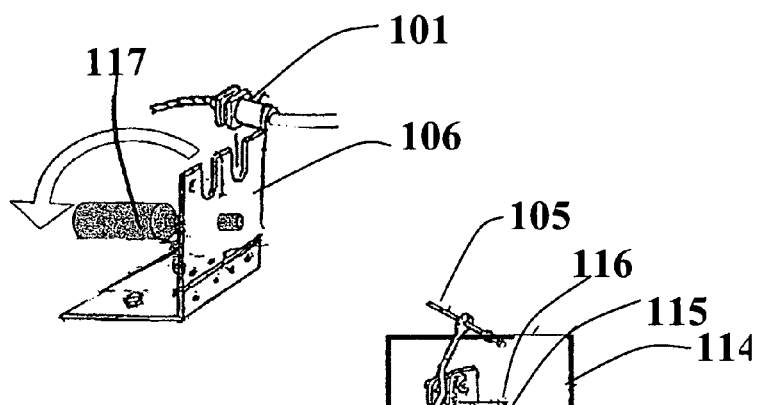
FIG. 8A
FIG 8B
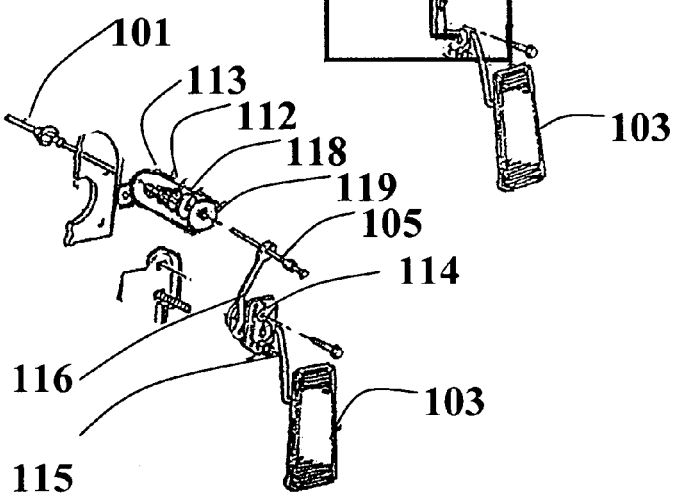
FIG. 8C

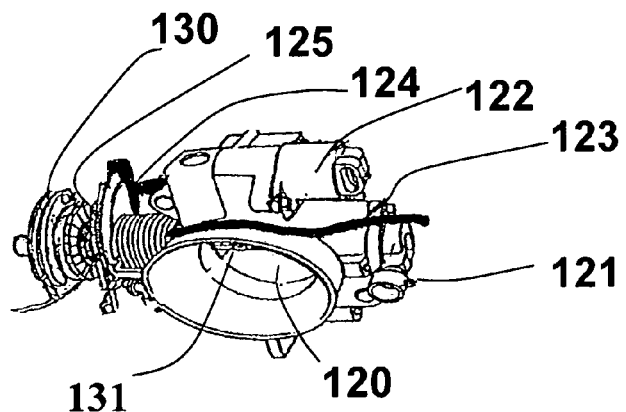
FIG. 9A
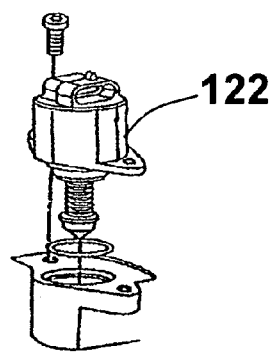
FIG. 9B
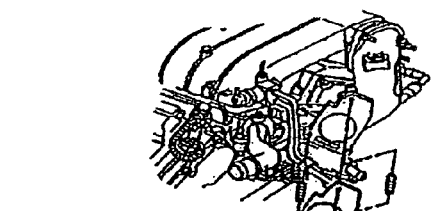
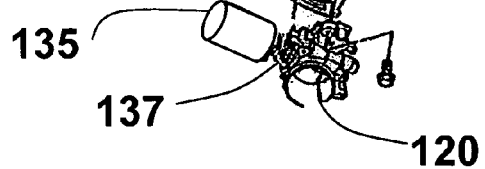
FIG. 9C

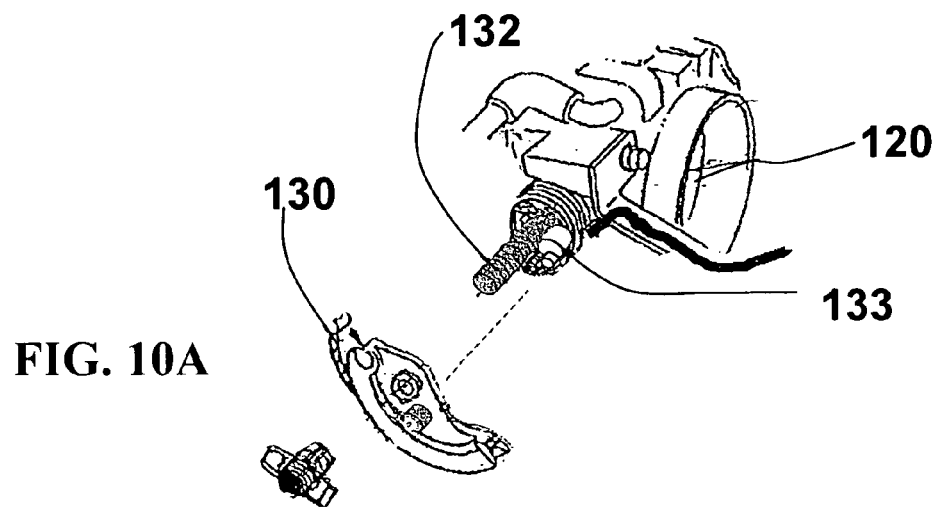
FIG. 10A
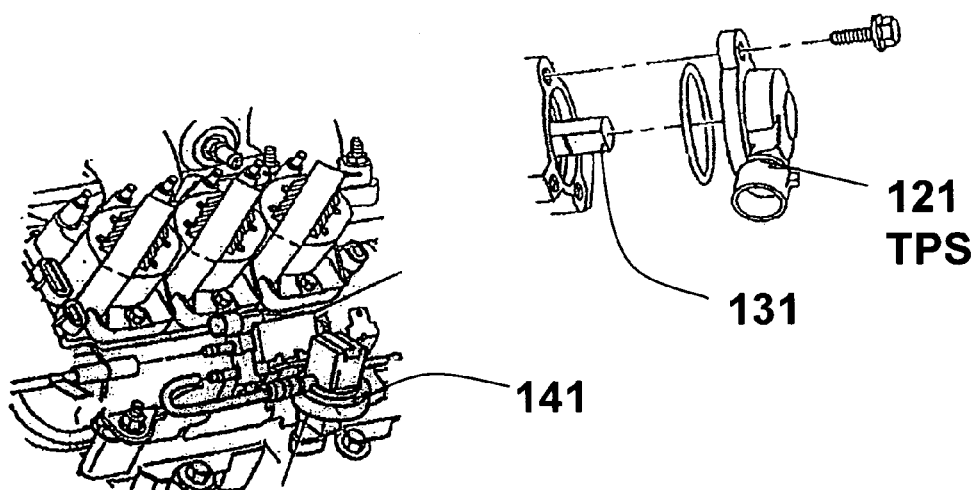
FIG. 10B
FIG. 10C

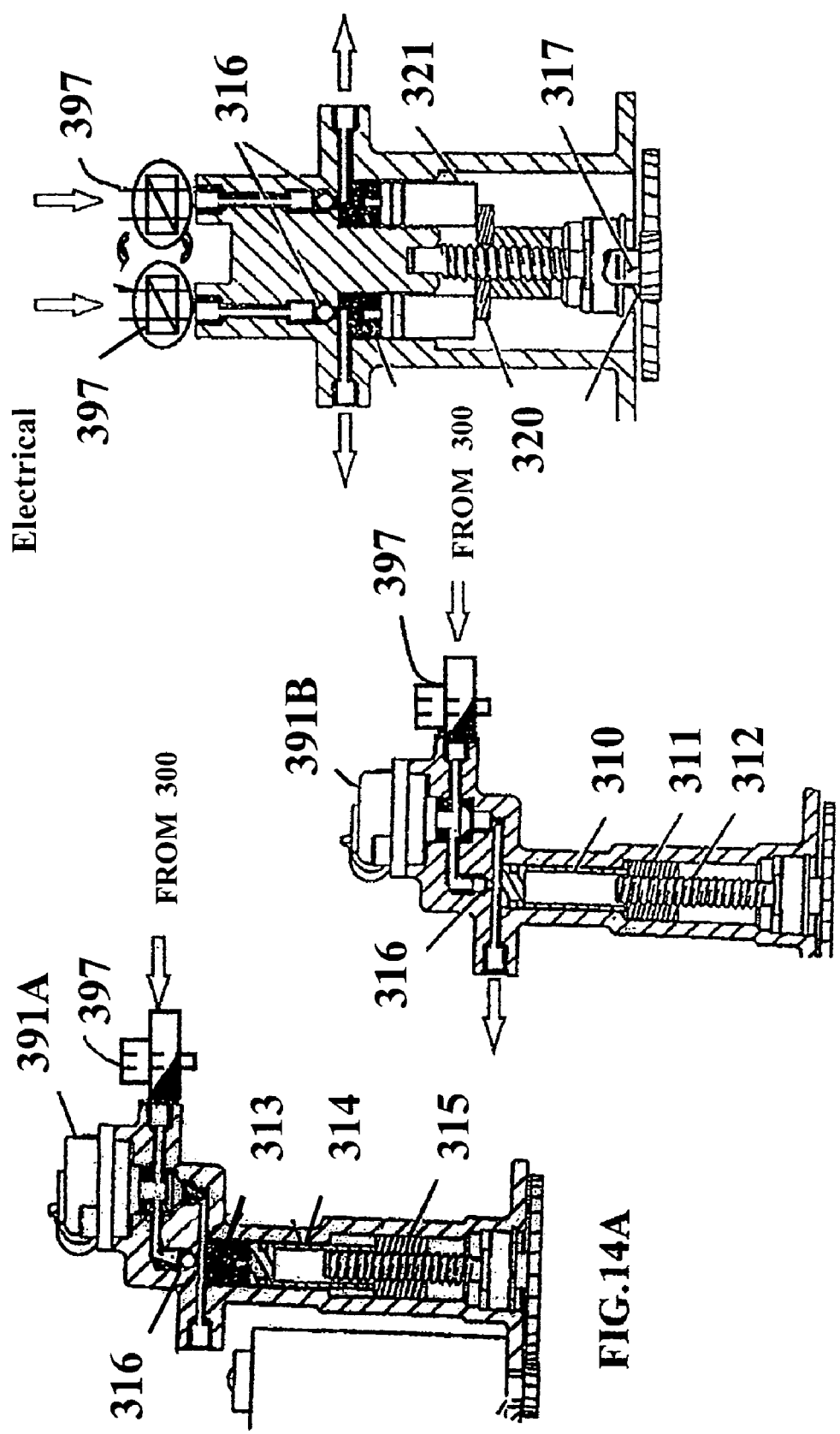

FIG. 18A
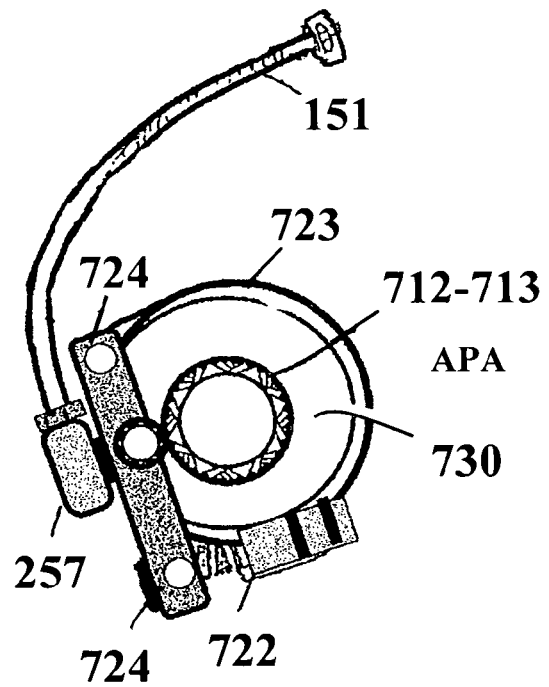
FIG. 18B
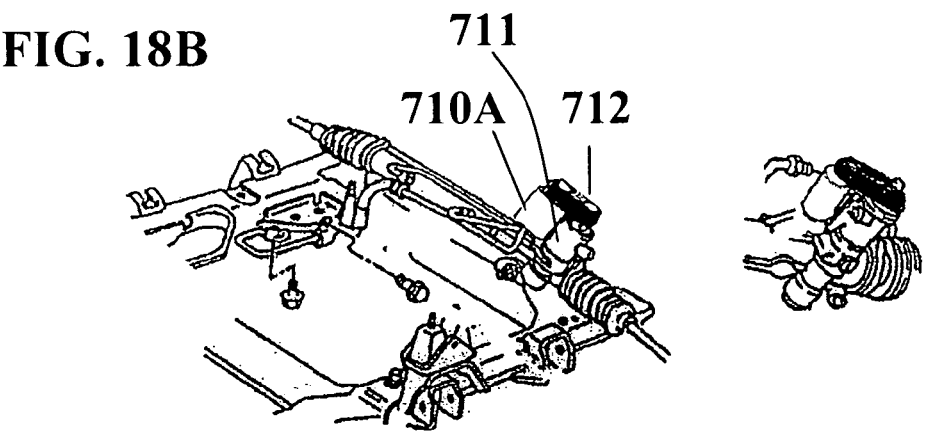
FIG. 18C

FIG. 18E  FIG. 18F

ASP700C

ASP700Bc

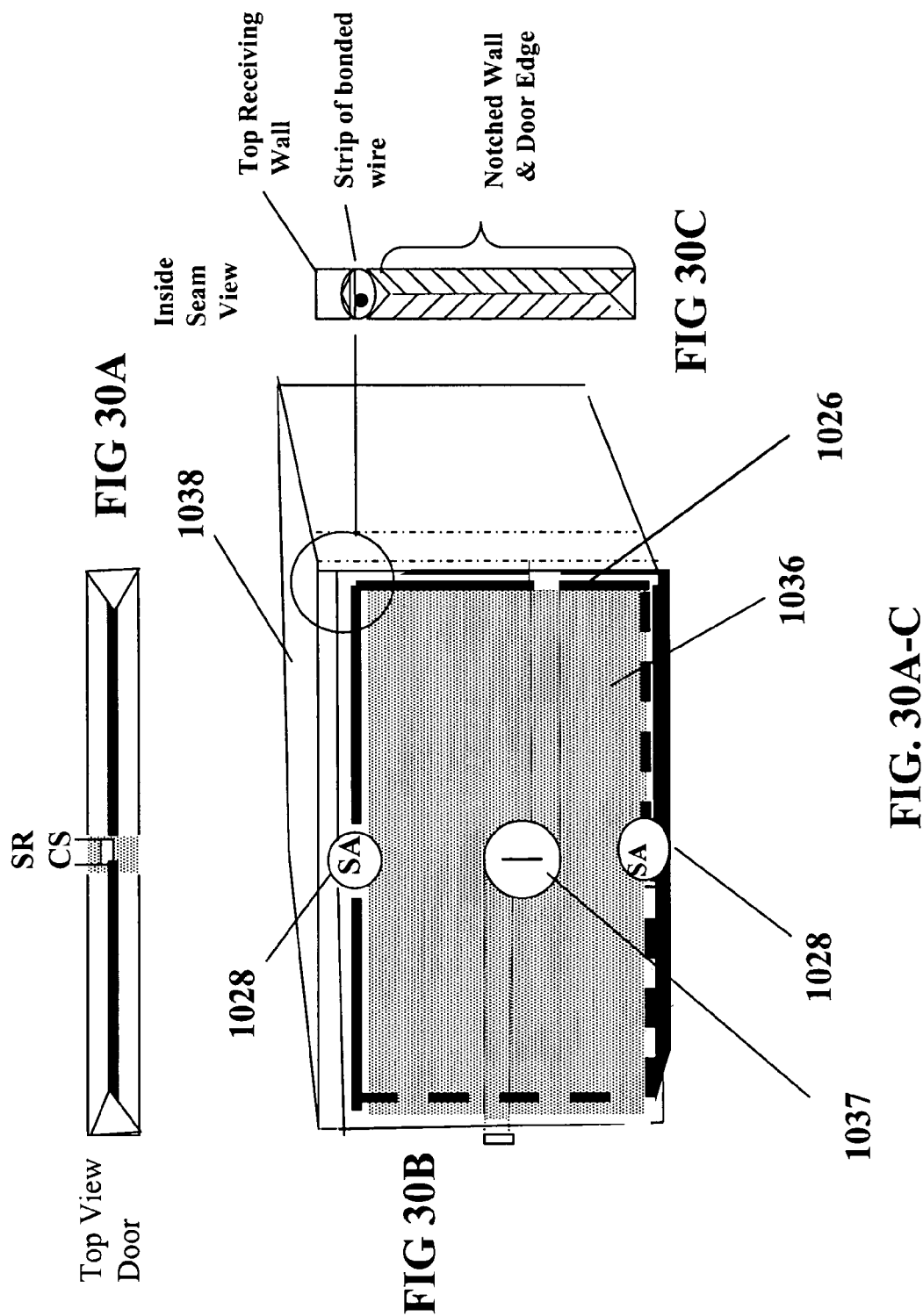
FIG. 30A-C

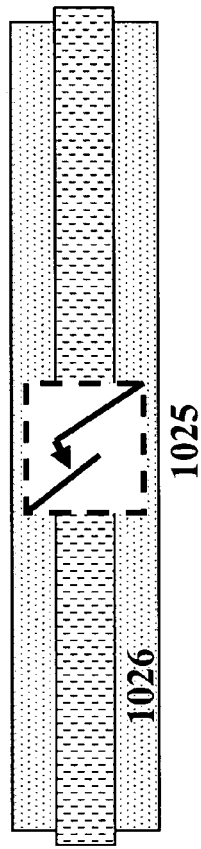
FIG 30D
End & Cross Section View
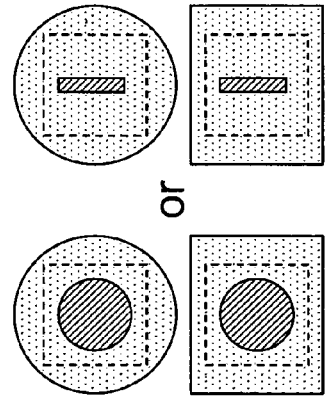
FIG 30F
FIG 30E
Cross Sectional Drawing
Round or Square Rod For Door Seam Seal
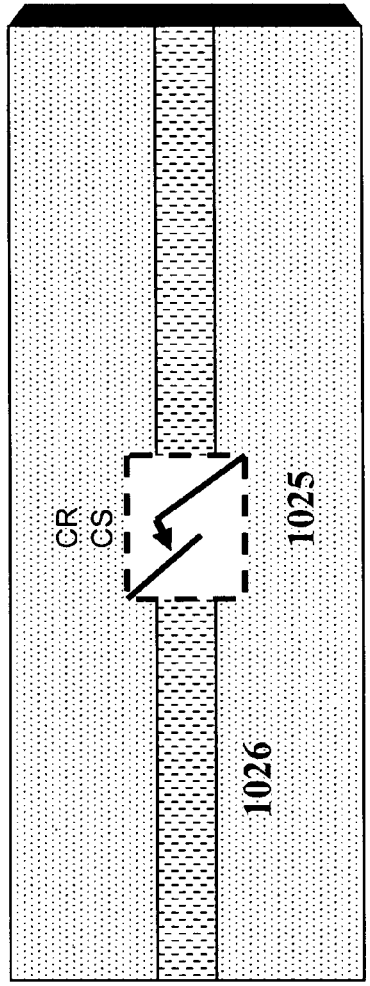
FIG 30G
This modality displays the seal embedded in a plastic package.
FIG. 30D-G

ELECTRONICALLY CONTROLLED SEALING, UNSEALING AND/OR BONDING WITH METAL STRIP OR WIRE COATED WITH LIQUEFIABLE SUBSTANCE FOR REDUNDANT APPLICATION AND TAMPER DETECTION

RELATED APPLICATIONS

This application is a Divisional of U.S. patent application Ser. No. 09/738,901, filed Dec. 18, 2000 now U.S. Pat. No. 6,647,328, which is a Continuation of International Application number PCT/US99/13668, filed Jun. 18, 1999 and published in the English language under PCT Article 21(2), which claims priority from U.S. Provisional Application Nos. 60/089,783, filed Jun. 18, 1998, 60/122,108, filed Feb. 26, 1999, 60/139,759, filed Jun. 15, 1999, and 60/149,029, filed Aug. 13, 1999, and from International Application number PCT/US99/00919, filed Jan. 15, 1999, all of which are incorporated herein by reference.

This application is related to U.S. Provisional Patent Applications Nos. 60/071,392, filed Jan. 15, 1998, incorporated herein by reference. This application is related to U.S. patent application Ser. No. 08/975,140, filed Nov. 20, 1997 and PCT Application No. PCT/US97/21516, filed on Nov. 24, 1997, both of which claim priority to U.S. Provisional Patent Application No. 60/032,217, filed on Dec. 2, 1996, all of which are hereby incorporated by reference.

BACKGROUND OF THE INVENTION

1. Field of the Invention

These innovations and technology have been designed to improve the public's safe use of vehicles, equipment and machinery. They have been first designed to improve on the already deadly and destructive situations of out of control vehicles due to operator incapacity, and/or car theft and carjackings. The objective has been to help limit and/or restrict as many fatalities, personal injuries and property damage as possible. This will basically be accomplished by reducing the amount of time and space these horribly uncontrolled and irrational events exist for and/or take place in. These innovative systems and devices are not a panacea. The invention is simply designed to improve on an already poor public safety situation by limiting the time and involved area of these irrational events (e.g., out of control machinery).

It is the full intention of this technology to ultimately support and help provide fully automated robotics systems that can remotely control vehicles and equipment in a responsible and accountable manner in the future through the best and most optimum progression of commercial developments, first, from uniquely combined Commercial Off The Shelf C.O.T.S. products, and secondarily, as a condensed, consolidated set of hardware, firmware, and coordinated software programs in accountable, protected system of products that will become multi-industry standards and insurance requirements and rate qualifying devices for remote control and robotics.

In an effort to initiate a collaborative process and be a part of any dialogue along these lines either already in progress or planned for in the future, this technology will develop and continually augment, its preprogrammed controls, communication systems, and functional peripheral devices, sensors and systems to be a part of the diverse equipment and systems already merging, communications with programmable control circuits and electrically controlled devices, like those detailed in this application. It will also continue to offer the most needed solutions for a progressive accountable process of remote control and device deployment as well as increase and enhance computers and software to ultimately run, safe, accountable robotics vehicles and highways as has been discussed earlier in all the related patent applications.

The programs of the present invention will first structure acceptable accountable remote control protocols in a progressive layer of commercial enhancements to best marry their social, economic, environmental, and technical presence through commercial markets. This is a necessity because, there actions will be governed by the individual systems capabilities. Triage control will be programmed for the best option at any given time to control a vehicle and responsive systems in the safest manner through any available equipment on the market at a given time and/or outfitted on any particular host piece of equipment. Because, there will be such a wide variation of individual equipment capabilities, a great deal of effort has been taken to backward engineer, as well as, accommodate present engineering and future engineering in this process to develop acceptable modalities and standards for accountable aggressive remote control at various levels. There will be many versions of "Triage" that will first have as a goal to slow, stop and secure a vehicle stationary position.

The next progressive development detailed in this application will control the steering in degrees. And finally the speed control either using OEM cruise controls modified for this purpose or any of the acceleration controls detailed in this application and/or related patent innovations that will be responsive to the interface data commands given by any onboard control circuitry. A protected Primary Focal Node a (PFN) will house this control circuitry and communication circuits to receive transmissions and/or directions supplied by GPS signals and interactive highway transmitters, RF signals, or infrared beacons and/or any cell phone locating technology, along with distant sensors to remotely guide and control speed and direction remotely in robotics scenarios. Ultimately this inventions Primary Focal Node a (PFN) will manage preprogram travel plans for long and even short travel, as well as, handle completed vehicle operations, if so desired.

This invention will first commercialize these devices for specific use with law enforcement stressing the need for responsible supervised optimally physically visible scenarios first. So any technical bugs can be worked out and the learning curve for the rest of humanity can be plotted and develop with proper progressive guide lines and instructions for the safest public use. This also needs to be done progressively to equip the individual vehicles with these devices. Either for the new vehicles and/or for any after market or retrofitting of old ones. This will be initially accomplished through Commercial Off The Shelf parts or C.O.T.S. innovations, a process already described in earlier related applications. Secondly, this invention will strive to commercialize these devices along with its electronic control systems to be as much a part as possible in developing the interactive highway systems in any collaborative effort that presents itself. As this process progresses, the original third modality, described in PCT/US97/21516, a private, public and/or commercial monitoring and control system of any size will be created and combined to fulfill the scope of this invention for not only the automobile industry but also, for many community public safety programs, which, are termed Green Eyes and Spider Eyes program and detailed in this and related patents and involve machinery and equipment. This commercialization will interface its technology and any other associated technologies through the 1000 series devices along with the 1100 controller systems and the 1200 network to ultimately create fully automated and robotics public transportation systems that will produce more individual freedom for all the public, increase its safety, security and develop accountably for society to transact its mechanized business responsibly and with fair exchange to each other individually. (The time question is: when and how long?) And this question finds its answer in how well all work with one another in any joint ventures, with real genuine cooperation from the individuals, businesses, and governments involved. Time estimate, circa 2015, for fairly extensive and sophisticated social transportation and environmental control systems. This is a modest estimate for full robotics in an acceptable, accountable and/or societal form for personalized transportation. But there will be a vast amount of changes in any personal transport vehicles.

2. Background of the Related Art

Humanity is already married to its technology, and like all other marriages it will only be as functional as those in the relationship. The vehicles, machines and equipment are here in this human existence. This technical automation, communication, and control of machinery has already been proven to be a real present day need for humanity as it strives for its own individual social emotional development. So all that remains is to make this technology available, affordable, and perfect it, to be as secure, reliable, responsible, respectful of and as accountable to the individual, to any business and to the government it will be serving. This is the goal of this technology for remote control of humanity's equipment and the responsible development of robotics.

The invention has been designed to work with all willing technologies to develop a secure and accountable communication and control systems for every piece of Machinery through a Machine Messaging Network (MMN), detailed in PCT/US99/00919.

There are many other commercial interest in this area, as well as different technologies. These technologies have very specific and finite focuses with their remote control and/or automated vehicle systems in which they do not address aggressive remote control and accountability. While there is a great deal of similar developments, this technology and the innovations detailed here and in the related applications are unique and were created to achieve real time aggressive and accountable remote control though as versatile means in communications, control circuitry, and peripheral devices and systems and to provide these qualities as part of any standard developed for automated and remote control.

One other already issued U.S. patent, incorporated herein by reference, to Prince Corporation, now merged with Johnson, controls claims after a car's ignition has been turned off and the fuel pump has been deactivated.

The experimentation on this invention's technology to restrict fuel to the power plant to create an effective slow down was an unknown parallel development of similar concepts but without question resulting in uniquely different modalities and vision of purpose. There is no intention of this invention to compete with any already existing business, manufacture, government agency, and/or public interest at this time. Only a genuine and very real desire to be cooperative, supportive, informative and a real worthy partner to do good and fair business jointly for the betterment of humanity and its responsible machine use whenever and wherever possible.

With that stated, similar parts of this technology already exists in piecemeal (i.e., C.O.T.S.) products. But it is abundantly clear and obvious that the invention has its own unique devices, modalities, systems and C.O.T.S. innovations developed into protocols to complete the total task of automating for accountable remote control every piece of equipment in the world. However, it is also abundantly clear that this technology has been specifically designed to couple and interface with all existing technology in all stages of remote control development to enhance their systems and complete a far greater remote control system product then ever imagined before. This application and related applications detail clearly the most unique development for accountable controls over humanities equipment and its social, economic and environmental impact and functions.

This invention develops the monitoring and control system (i.e., this application's 1000-1100-1200 series devices and systems, Coyote Tricksters, interactive highway Helping Hand, and Spider Eyes as well as Green Eyes Programs), either as isolated monitoring, control and/or management systems or as part of a massive reporting system that incorporate the World Wide Web (WWW). This is created by merging data collected by PFN boxes on the equipment, through their data transmissions to servers that post this data on public web pages, or on any level home web pages, or e-mail boxes, through either cooperating government agencies, commercial corporations, social organizations, and individually set up and/or owned and operated web sites. These phone node gateways and/or RF signal gateway terminals can be interfaced to any computer network system of any size for monitoring, analyzing and/or remotely controlling equipment. This creates the real-time link for the machine messaging network by utilizing the world wide web to make some of the larger and longer connections (MMN-WWW) and RF equipment and telephony technology to send the control signals.

To continue the early development of these most sensitive law enforcement protocols this technology will try to seek out companies already doing responsible business, such as Lojack, who use special police radio frequencies in tracking stolen vehicles for law enforcement in a limited but responsible manner presently. This invention will also seek out telecommunication companies (i.e., pager and cell phone companies) as well as any radio equipment manufactures and make a strong attempt to combine this technology's accountable and protective features with the efforts of existing products and programs like the GM AOn Star product. Most definitely this technology will seek out all the automobile manufactures and their supply line manufactures to coordinate the development of peripheral controls accessories and sensors to interface with this technology's protected primary focal node as part of any industry standard for automotive electrical systems.

This technology recognized early on the absolute need to coordinate and create standards for accountability in any automotive altercations involving machine messaging from remote locations with insurance and governmental regulations and approval, which greatly enforces the need for a standard. This is very much needed for risk management insurance with the 911 system and law enforcement today, and most necessary to continue with this technology's purpose to provide accountable aggressive remote control, analytical data acquisition, and robotics, to more adequately serve all of the public's needs. This is being done to more rapidly fulfill the public's needs with responsible remote control devices in all of the industries and not run into the same growth problems AOL experienced. The plan has always been to create this technology, first as a combined effort with existing C.O.T.S. products and systems as has been detailed within all of the related applications, and then secondly to coordinate and consolidate these combined products and services into new safe service products for the public good, ease of use, safety, and an improved quality of life.

The OnStar program has already made important passive, but responsible inroads in reporting and/or contacting 911 in possible automobile emergencies when there is an SIR deployment, through their control centers. This invention welcomes any possible collaborative arrangement and/or interface links with OnStar in the development of this technology (MMNWWW), or in any interactive highway projects, and in this technology's unique accountable, and aggressive remote control, management and/or security systems at any level of willing involvement.

In developing these security protocols, this technology provides all the appropriate encrypted codes needed to provide secure transmission of sensitive data from any equipment's PFN if that might be needed or a requirement for personal, monetary transactions or sensitive data.

The invention is designed to combine and coordinate all vehicle machine and equipment technologies. And it is designed to be a natural and good commercial consolidation for space and cost to jointly interface and finally locate all hardware and control circuitry along with the software into a safe and protected area, legally and physically on each piece of equipment, which will be termed a (PFN) for protected primary focal node. This has always been the stated purpose and goal of the invention to help make humanity's equipment safer, more accountable, more efficient and economical with responsible remote control for the public, for the individual, and for commerce. As always maintained with any and/or all of the devices or components concealed and/or protected to maintain data that is or are stored on location in as pristine a state as possible, and also to maintain a capability to report this same data to at least one remote location for application specific management and redundant storage. Which is the basic nature and scope claim of this technology in this application and all the related applications. This is accomplished with the PFN and this technoloy's Trust Remote Activity Controller Software (TRAC).

It has also been a conscious intention to create these innovations from the first as C.O.T.S. parts to bring about their deployment in the most easy, rapid and efficient manner as commercially possible by cutting manufacture time and cost in developing them and to make available safer vehicles and equipment in a timely and affordable fashion for the public, and thirdly to make available these systems to more easily retrofit older vehicles, and other machines and equipment. There is no need to reinvent the wheel when it is not a necessity, just make the wheel better by adding new innovative technical spokes and uses. In all of these innovations, C.O.T.S. applications are addressed first to bring all influenced technologies, their products, the varied industries and people to an interactive commercial setting. So that involvement and incorporation of these technologies can best be severed while the public is serviced appropriately with good commercial offerings. This means coordinated good and real services and products that will be good business for all.

The major reasons this technology is first developed from C.O.T.S. products are for better public familiarity and market acceptance by the consumer, the small investor, and the sophisticated investor, and because of the natural collating and combining effect for all the different manufactures in these merging industries, and also to provide some backward and forward engineering capability to the process of developing a standard for responsible remote control devices and systems, and finally to point the way to the most logical and acceptable use of this technology's consolidated and integrated circuitry choices. This process also helps the software production to be interfaced into the most concise and efficient PFN's for every application and for every piece of equipment, as product evolutions either as circuit and device products or as other C.O.T.S. evolved products used in these unique ways for new purposes.

As the automation of controls for equipment, vehicles and machinery continue to advance to robotics from present day remote control and machine messaging though artificial intelligence, the need for accountable machine activity is as important as the development of the actuating devices that complete these remote and automated actions. Therefore, much time and detail has already been devoted to this in this invention's related applications, and to the creation of redundant data record memories and a secure protected interface structure to preserve an accurate record, while protecting electrical control circuits simultaneously.

Even though this application extensively describes the controlling actuators to perform remote and automated control functions for most any manufacturer of vehicles, equipment and/or machinery, it will also describe and detail an extensive sensory and data acquisition feedback system to the protected primary focal nodes (PFN), to account and confirm all essential command communications and responses, both on location and/or redundantly sent to at least one remote location or gateway terminal for any desired network options. This is managed by this technology's TRAC software and any system monitoring PFN's TRAC software.

As has been extensively described in all the related applications, the use of C.O.T.S. products will first be employed for a number of reasons. Obviously, it is the quickest most efficient, inexpensive way to rapidly merge existing technologies, their manufactures, and components to achieve an accountable remote control for aggressive situations in machine use presently. Also, the invention has been designed to accommodate future development for accountable sophisticated remote and automated control scenarios for everyday pieces of equipment and machinery as well as, help meet the social, science needs for these merged technologies to best perform these robotics functions. The invention is capable of providing a record to appraise, value and judge any equipment action and/or its components for societies organizations, the public, insurance concerns etc. (e.g., for manufacturer's risk management, completed operations, product liability, etc.). This application will concentrate on the devices to affect remote and automated control and their monitoring system.

BRIEF DESCRIPTION OF THE DRAWINGS

FIG. 3 is an exemplary list of the software control commands for the standard pager remote.

FIG. 5A–F illustrate, in detail, all the C.O.T.S. parts and their components, as well as the variation and augmentation that the invention does to the seat parts to utilize this mechanism to tension the brake system.

FIGS. 8A–C show accelerator cable release systems.

FIG. 9A displays a standard GM throttle assembly for fuel injection with a electromagnetic clutch disk system.

FIG. 9B shows an air mixture solenoid in another isometric drawing that is controlled electrically by the invention during some slow down modalities.

FIG. 9C is an isometric of the throttle assembly having a servo motor attached to its through shaft.

FIG. 10A shows other modalities to release the cam from the through shaft to throttle down a power plant electromechanically and allow it to free wheel leaving the butterfly valve in the idle.

FIG. 10B shows the latest throttle position sensor and this is one sensor that is interrupted by the unique trickster circuits to deceive the power train control module PCM if need be in certain circumstances.

FIG. 10C shows a vacuum switch which can also serve to disconnect the cranking current in the remote start function.

FIG. 14A shows cross section another front wheel control with the piston all the way in the up position.

FIG. 14C shows a dual assembly that controls both the rear brakes together.

FIGS. 18A–F show the standard rack and pinion GM steering with the innovate changes to automate the racks gear box by motorizing its rotation which is done through automated controls.

FIG. 25 illustrates a circuit used to activate the automated brake systems when the doors are opened.

FIGS. 30A–C are drawings of the electronic security sealed containment.

FIGS. 30D–G are drawings of the cross section round or square rod for door seam security.

SUMMARY OF THE INVENTION

Figure 1:
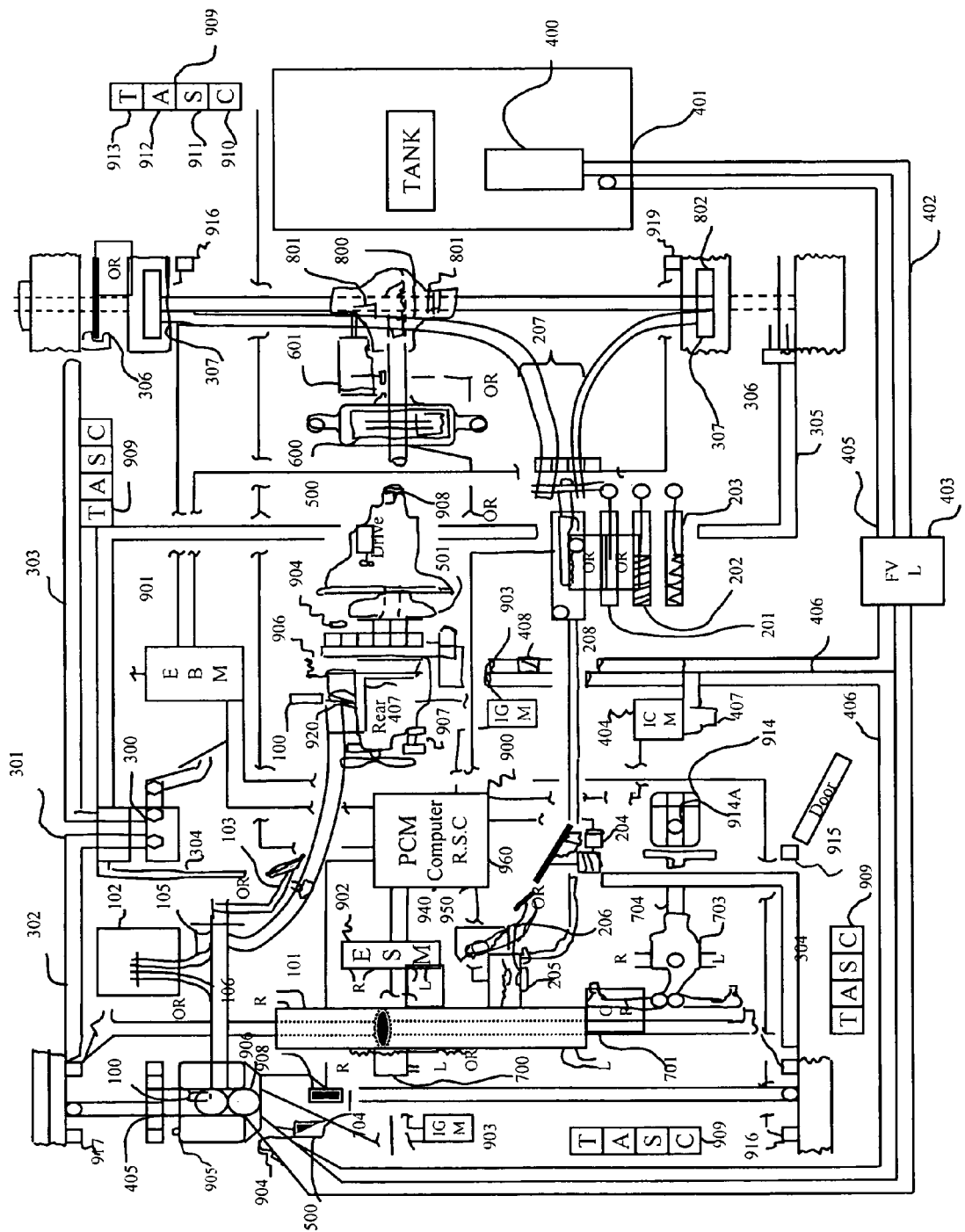
FIG. 1 is a drawing to basically give location to all the innovative devices on standard internal combustion equipment with a high emphasis on the automotive fields.

In this application the invention details automated devices for, equipment, vehicles, machines and their systems to complete, preprogrammed and remote control functions. Initially for vehicles, and specifically cars and light trucks are the focus to start developing the mobile management innovations of this remote control technology. The first aggressive remote control is used to slow, stop and secure vehicles that are being used in an unauthorized manner, either intentionally or unintentionally. This software program is termed PASSS. This stands for Proprietary Automated Slow Stop and Secure vehicle software. The next evolution of this aggressive software for TRAC is Proprietary Automated Guidance Slow Stop and Secure (PAGSSS) vehicle program. Secondly, guidance is aided to the mobile management systems for vehicles to increase remote control capability and help provide more physical devices to make more robotics for the smart cars and interactive highways. Finally, in this application other types of control devices are detailed for industrial, commercial and home machine and equipment management. In this application many systems are described and their hardware detailed extensively. The basic goal of this application is to provide all the hardware devices and circuitry to remotely control every piece of equipment worldwide.

Slow Down Systems are designed and detailed to restrict throttling, first to slow down any vehicle made by most every major manufacture of vehicles worldwide. Most of the systems have been designed from every manufactures own commercial off the shelf products C.O.T.S., or their supply line manufacture to help for a responsible but economic commercialization of remote control, and the future robotics, of the smart cars and interactive highways.

This first sequential remote controlled shut down leaves the vehicle engine running for driver steering and braking control. Initially, only acceleration is eliminated from the driver's control. Then there is a timed brake application, which performs a controlled-stop, with the vehicle finally resulting in a secured stop in a stationary spot, with the engine left idling. Then the engine has its electrical ignition killed of fuel supply interrupted in a number of modalities. In fact, there is a number of modalities for all these sequential functions (i.e., to slow, stop, secure motionless, and finally turn off the power plant). This is the first remote control protocol that the invention features to counter the unauthorized use of a vehicle (first it eliminates acceleration only, second it slowly applies the emergency, service and/or regular brakes, third it maintains a brake application with the vehicle held in a stationary position, and then it finally kills the power plant). The first prototypes merely complete this task to slow, stop and secure the vehicle in a stopped position, then kill the power plant. These functions can be performed in a number of ways. Either timed preprogrammed responses initiated and controlled by programmable control circuits solely and/or control circuits coupled to communication devices and systems for remote machine messaging and control. These variations will accommodate less sophistication in either the communication device and/or processors employed to complete these tasks. This first system has had much experimentation and has set up optimum times for each phase to take place in a vehicle slow down scenario, but any sequence that performs the same functions are all considered to be within the nature and scope claim of the invention. Also, upon the activation of this emergency shutdown sequence warning lights (Flashers) and taped messages or information devices are activated to inform any surrounding vehicles and the driver of the shut down event. Additionally activated are recording devices that can store all forms of data recovered during the event. While, these systems are designed to be activated by any communication system and the average citizen, they are recommended and, intentionally, designed to be used and/or coupled with the proper protocols and/or law enforcement personnel. This is PASSS, this technology's Proprietary Automated Slow Stop and Secure shutdown protocol.

The second automated vehicular remote control enhancement detailed in this application will add guidance through automating steering components like (motors, valves, and cylinders, etc.). And they will be controlled by interactive environmentally conscious software monitoring the vehicle operation, through vehicle sensors and operator sensors, e.g., distance sensors, cameras and road edge detectors, along with in the cabin, the nose, breathalysers, head tilt, pulse rate, pupil response sensors and software, etc. This second variation will be termed PAGSSS, and this automated protocol will also, be able to be initiated through simple remote control communications for the emergency take over situation and/or for the unauthorized use of a vehicle scenarios. The same protocols that control larger land based wheel outfitted platforms, trucks, semis, buses, etc., will be detailed as to the devices and systems necessary to automate these same unique functions to slow, guide, brake and secure them in a stopped position in this application. However, this application documents this technology in great detail to initiate and accomplish, while progressively commercializing for society accountable remote control. These progressive steps and developments for responsible remote control and robotics in mobile management are considered unique as commercial product protocols that address acceptable modalities for legal and insurance rules, regulations and concerns for man and machine accountability and liability. The mobile management application will further advance the systems to detail all the devices for a vast variety of transport equipment that will be remotely monitored, controlled and provided robotics systems.

The truck and car industry has recently been plagued with car and truck jacking and these minimal control scenarios are a very needed improvement in public safety and they will only be the first step in acceptable accountable remote and automated vehicle control. As the programming and tracking of vehicle movement utilizes the most sophisticated and accurate GPS, digital cell phone technology and computer highway management and smart car software programs and systems the amount of collaborative human and machine driving control will develop to where full accountable systems will be a social necessity. This application will detail many of the actuating devices that will be used to perform these functions on the vehicle and how they will be monitored and made accountable for these remote, robotics, and automated control scenarios.

As stated earlier, the invention will develop its technology and commercialize it with other technologies to completely automate accountable controls for vehicles, equipment, and machines through C.O.T.S. products and cooperative commercial agreements that utilize designs and/or technology to complete this goal, all of which is detailed within this application and all of this technology's related patent applications, incorporated herein by reference.

An Electronic Steering Control Module ESCM module will be constructed and/or dedicated as a steering control interface circuit which will have some burned in software (firmware) to complete automation and provide basic remote control steering protocols for an improved controlled shut-down (PAGSSS). This function may also be completed by the inventions computers entirely as detailed in the related patent applications and/or accomplished through the vehicle OEM PCM or any programmable control circuitry if so developed in the future as a consolidated development of this technology's continual effort to combine control functions and circuits or the above mentioned ESCM module physical circuit can be controlled through the Primary Focal Node or (PFN) software, TRAC, and circuitry interface (the inventions computers) or (the OEM's PCM or comparable control circuits) to involve complete robotics as a system development. Any and all of these circuits may also, enjoy a protected status inside the PFN or in another suitable location; either, provided total or partial physical protection or not. However, the ESCM control system as well as, any computerized steering controls designed to safely guide a vehicle in an emergency shutdown are considered to be within the scope of the present invention, when used for and combined with remote and automated control and/or part of any accountable system or protocol requiring this kind of protected integrity for any of the named reasons in the related applications (interactive highways, and smart cars, etc.), this technology's PFN with TRAC and PAGSSS. These circuits and programs will be described in the series 1000 innovations. This will also be accompanied with the complete description of C.O.T.S. parts and innovative components that make up the 4 part sensor array 909 in FIG. 1, which also contains a target for receiving specialized law enforcement remote control signals (913 variations). 912 is a combined antenna that will pick up a wide band of different radio signals that will be part of a combined communication network in the securely contained control center, termed the PFN. These antennas may be separate as part of functional C.O.T.S. products presently, even though the products are combined in only one secure and/or secluded location and finally these variations will be integrated (with a few exceptions) and be serviced by a universal antenna system or bus.

Part 911 is the distance sensors that will send and receive signals, compare them to a known rate of speed, process the amount of time of travel in relation to the distance, thereby calculating the distance traveled by the signal between the vehicle and another object and assign an electronic signal to value that distance and time so that the onboard software can equate speed, time and distance of the vehicle in relation to other environmental objects. First, through the inventions computer in the present prototypes, but ultimately combined with OEM controllers, other distance and environmental data will be provided, as well as augmented, by the video and digital, cameras part 910 (i.e., Nanny Camera, etc.) that will be directed, through on-board programming, to impending impact and/or recognize road surfaces and/or conditions to give data back to the control systems. Also, the PFN's will be in contact with any highway information systems that will be alerting and setting off program flags for altered operational instructions. These instructions to the automated host vehicles control systems will direct the ESCM for automated controlled steering. And any number of already described automated steer controls and brake system, either, C.O.T.S. interfaced or specially designed to first take control of a out of control vehicle and deactivate it as rapidly as possible by PASSS or PAGSSS. Of course, ultimately these sophisticated TRAC systems and innovations will operate the vehicle through a fully robotics set of on-board and off-board devices interfaced through these extensively described systems for automated accountable interactive highway and smart car scenarios, which are all TRAC-based. Much of these systems and innovations is detailed in this application. These systems will also allow individual personal transport vehicles to be totally accessible to most all impaired persons, the aged, and the young, as well as, be drivable by those, who are capable, enjoy and/or freely choose this option. This will improve the individual's personal freedom of travel to any place a vehicle can go as well as, make these travels safer for all.

This is the progressive commercial development of remote control to more complete robotics systems to include the smart cars and interactive highways for the car and truck industries. While, this application specifically details the hardware to perform these remote control functions for all equipment, it will also, describe all the protected accountable systems PFN/TRAC, detailed in all the other related applications, that are needed to marry up to society's laws, rules, and regulations, as well as, society's institutions, organizations and capital economy to best commercialize acceptable remote control and/or future full robotics systems.

This summary has concentrated on land vehicles with wheels. This will also be the case throughout this application in giving examples of remote control capability, but in no way are the related systems and innovations confined only to the auto industry. The innovations contained in this application will provide remote control capability for every piece of equipment and machinery anywhere, as well as, provide systems to monitor control and provide accountability. Most all physical actuating components that will perform remote control functions on any piece of equipment will be described, illustrated and/or detailed with their part numbers if applicable along with their altered innovations in illustrations.

Since the future is destined to have people living longer it is going to be necessary for robotics systems to provide needed services to keep individual freedom at a maximum for all. With the use and development of these innovations there are many decisions and provisions that have to be accounted for by society. In this application, these issues are addressed as pertinent statements along with much consideration as to the necessary elements to provide responsible remote control and accountable systems. However, the use and control of these innovations will always be decided by the ones that employ them and this will always be their responsibility.

BEST MODES OF CARRYING OUT THE INVENTION

Controlled Automobile Shut Downs

This initial goal, as stated earlier, is to first slow a vehicle down, then stop it, and most importantly secure it, in the stopped state. To accomplish this, this technology incorporates and combines presently manufactured commercial off the shelf (C.O.T.S.) parts in innovative ways to allow for the most rapid development and inexpensive deployment of these new remote control systems to increase public safety. These first named parts are all General Motors (GM) and are presently used for the automation of a standard automobile seat. However, most every vehicle and equipment manufacturer will be detailed with a commercial off the shelf configuration or supply line set up to easily support these automated and/or remote control functions.

The GM application will primarily use seat controls. Some others will use automated seat belt restraint motors, as well as, other varied automobile servo motors and varied powered actuators either motors diaphragm canisters, and/or cylinders powered by vacuum, air and/or hydraulic fluids, etc. to complete remote controlled functions. In the event suitable C.O.T.S. parts can not be configured for a particular piece of equipment from its own manufacture product line a innovative configuration from other available C.O.T.S. products or this technology will probability provide an inexpensive alternative to automate and/or remote control any such particular function.

These presently detailed parts were chosen for their universal supply line manufactures and commercial connections to most all the major automobile manufactures around the world. They were also chosen, because some of them have flexible cables, and/or flat or strip gear drives of different length and applications, which allows their motors to be installed in another place from where the actuator device and/or physical structure and action is needed. Another important consideration for some of the GM configurations was their high torque capability.

These first GM parts are a 12 volt motor PN (listed in FIGS. 6A–B), which has a gear reduction right angle worm drive as part of its assembly. There is also varied length cable drives, PN (listed in FIGS. 6A–B) that give some flexibility to the drive, which allows for the placement of the motor in another location from where the work that is to done by the next two parts. They are 2 drive actuators, one is a Ball nut device PN (listed in FIGS. 6A–B) attached to the cable drive that normally is responsible for raising and lowering the seat through electrical switches on the door panel which reverse the polarity of the motor. The motor is attached to the other end of the cable. This motorized ball nut device has been designed with some physical reconfigurations, electrical circuitry and has been re-deployed on and through the floor board and under the carpet to serve as a secluded accelerator pedal stop (in the prototype). This will be incorporated and protected in the floor for final products. When the circuit is energized, the accelerator pedal cannot be held down and is raised all the way up so the car can only idle which slows the vehicle down gently while still providing power for operator steering and braking. This only removes the operator's ability to accelerate a vehicle. This can be done incrementally, however, in the present prototype it has been designed to completely eliminate any acceleration by depressing the pedal when this innovative device is activated. In this first phase to restrict acceleration many different modalities are detailed in this application to complete the slowdown in the PASSS shutdown program. All the different manufactures parts are named, identified and detailed as to how they have been altered to make available versatile devices to complete this acceleration block function as well as, for all the following remote and automated control functions. However, most of the prototypes have been created from GM parts and vehicle to date.

The second actuator drive is also taken from these same seat controls. It is the horizontal right angle gear drive PN (in FIGS. 6A–B), which is responsible for the forward and backward movement of the seat. It is connected to the opposite end of the same kind of cable and motor system already named, however, here the gear drive is fix mounted to an outer channel so that its drive gear meshes with a strip gear that is attached to an inner channel. So when the motor is activated the entire seat also mounted to the outer channel move together either forward and/or backwards as the polarity of the motor is changed through seat control switches. It is this dual sliding motorized channel system that has been employed in the timed and controlled deployment of the standard mechanical emergency brake pedal system for the prototype. However, the inner rail is outfitted with a slide bar hook bracket that allows for the normal usage of the emergency brake in the slide area. The slide bar also acts like a hook that applies the foot pedal when it is activated to completely stop the vehicle and secure it in a stationary position. For this slide bar hook attached to the inner rail to have something to pull against the outer channel, it has a turn buckle bolt system that has one end fix mounted to it. On the other end the adjustment bolt passes through either the wheel well and/or floor board so it can be properly adjusted for the throw of the pedal to apply the emergency brake and then it is locked down in that position.

Once again, there are many modalities for this Slow to Stop and Secure function of braking the vehicle with new parts and innovations to C.O.T.S. parts and combinations. It is the explicit purpose of this application to completely detail every possible modality for every variation of vehicle to provide these remote and automated control functions. While this system in the prototype is activating the foot pedal lever, these systems are also deployed in other locations to activate the emergency or manual brake system to initiate the second phase of this technology's PASSS shutdown protocol with the vehicle secured in a stationary position. Also, in this application are various other motorized and powered automated brake application and accelerator stop or elimination modalities So, in no way should any different combination or variation of the same or similar devices and/or systems used to slow, stop and secure the vehicle in a stationary position (this technology's protocol) be considered different and/or unique. They are all a form of PASSS.

For the automation of the steering, the motors, gear reduction and cable drives are the same for the GM prototypes, these same drives, or similar ones, are proposed for the Chrysler, and Ford, vehicle prototypes, as well as, for their brake and accelerator functions. The innovated device for the prototype will incorporate a similar cable hook up to its own jack-shaft drive system that can be mounted parallel to the normal steering parts and rotating shaft or surfaces so that it can drive a ¼ inch belt around two pulleys in this steering modality. One pulley is on the jack shaft and the other on an accessible area of the rotating steer shaft linkage, so that when the motor and cable system is activated it will rotate the steer shaft in the appropriate direction to turn left or right. This belt system is accompanied with a standard solenoid activated tensing system to allow for an operator to defeat it under appropriate circumstances. The prototype example system are GM Delco parts, that can be utilized even on other vehicles if so desired, but in no-means are they the only parts that can be utilized in this innovative manner. This Guidance System is the physical guidance system to create the second generation of PASSS and PAGSSS.

Once again, it is the primary purpose of this application to provide all the major vehicle, truck, industrial trucks, track vehicles, ATVs, and other land based vehicle manufactures with innovative designs and simple solutions using their C.O.T.S. parts, where ever possible to complete all the remote control functions described through out these patent applications. So any reducing of engine RPMs and/or Controlling Powertrain Components and/or their functions as well as controlling any Braking and/or steering systems in a controlled fashion for the purpose of restricting a vehicles speed and controlling guidance and/or its use through remote control, and/or preprogrammed means (i.e., electronically through any electronic control system, programmable controller, computer and/or control circuits either IC or relay switching or series switching that can interface either with any RF signal) at any frequency and/or utilize any type of cell phone technology (i.e., digital or analog, pagers, paging chips, and/or any components that can either transmit and/or receive information) and data either alphanumeric or voice commands or any data stream (i.e., analog or digital including infrared, laser or light wave transmission) or any modulation of these types of signals for the purpose of electrically activating from a remote location any solenoids, servo motors and/or electric pistons or controls for fluid air or vacuum driven motors, valves, and/or any pistons and strip gears (i.e, hydraulic and/or motorized ball screw type of power transfer mechanisms) as well as, hydraulic or air driven either on-board an OEM host vehicle or added to the vehicle machine equipment for the purpose to control the following standard mechanical components (i.e., cables, linkages, air flow gates, and/or valves, i.e., butterfly valves and/or valves that control gasoline, propane, and/or natural gas or diesel fluid flow lines) as well as any, hydraulic (i.e., power steering, transmission, pressurized plumb) circuitry either OEM or redirected that can serve as a controlled energy source, and/or any add on bottled pressurized gaseous systems or compressed pumped air systems either OEM and/or added on that are used for the express use to energize and/or de-energize any and/or all the above mentioned and application devices parts and/or components for the expressed purposes of either to slow down, guide, and/or stop completely in a secure stationary position a mobile vehicle, as well as, limit and/or control any functions from any remote control devices as have been described herein, and/or effecting any components by gating or regulating and/or redirecting or reducing and/or stopping the flow and varying any flow and/or pressure in any fuel components, braking mechanisms or systems and/or steering components and/or functions or any of their component mechanisms fall within a PASSS and PAGSSS scope. Also, any enabling and/or disabling of any of the standard manual components (i.e., pedals for acceleration, and/or braking systems, either service and/or emergency systems and steering systems as well as any levers handles catches, latches and latch releases) that can be made to effect the engine and/or motor RPMs, or vehicle speed and/or stopping and steering activities and/or effect any general usability of a vehicle machine or a piece of equipment affected by preprogrammed functions and/or from a remote location through any of the above mentioned transmitting and/or receiving devices that can be interfaced with a host vehicle for these purposes no matter what the range and type of RF signal phone or communication technology, light transmissions or pager transmissions.

These complete descriptions of the mechanical design and configuration are being given to make clear that this invention and any and all of its configurations existing as C.O.T.S. parts presently are considered unique, when used to control vehicle speed, braking and/or steering in these automated PASSS and PAGSSS shutdowns or in any other automated function described within this referenced application in any vehicle, machine, or equipment applications if it is done for remote control applications and/or any preprogrammed and/or for any safety consideration described herein with and/or with out accountability and/or security protocols and/or in any protective encasements. Even though the invention seeks to meet the public's immediate needs economically with these readily achievable C.O.T.S. products in as quick and safe a manner as is possible, it also, maintains and claims completely that any automation or remote control of any of these aggressive functions stated herein, that are performed by present or future remote control, and/or preprogrammed controls be they interfaced C.O.T.S. circuits or devices and/or any integration of circuitry to be still part of this technology, when the same mechanisms and systems, e.g., for: speed control, steering, braking and power plant disablements perform the same:

| I | II | III |
|---|---|---|
| Warn\Guide\Slow, | Stop and Secure in one position, | Kill the Engine |

This three-phase shutdown protocol for an automated and/or remote control deactivation of automobiles or vehicles is a major part of this technology's nature and scope claim for all the applications involving remote control vehicles, this technology's Mobile Application Specific Management Program (MASMP).

Of course, at this point it is important that any device that can increase the speed of a vehicle whether mechanical or through any electrical means if only a electrical transdusive device, i.e., potentiometers, field weakening systems, silicon circuit relays SCR systems and/or any controlled chemical and/or molecular interaction that yields and controls the provision of energy to a power train and/or controls that power trains delivery of power to propel and/or restrict and/or detain a vehicle or any stationary equipment control for any and all the above purposes, reasons and the scope of all the related patents and/or any controlled device to control a vehicles speed function falls within the nature and scope of the invention when it has been automated for any of the already described reasons and most especially if it is done with memory storage for accountability and/or is enhanced by a secure and/or secluded encasements, like this technology's PFN and TRAC software systems. (Note: Because the nature of these inventions is to combine and universalize the use of all associated technologies; any and all compatible and/or unique designs by others that either parallel these inventions and/or add some versatility and/or uniqueness will be given every opportunity to commercialize their product and/or incorporate and/or merge their business as might be possible to full fill the public's best interest if there can be a reasonable and mutual commercial and financial venture agreements.)

Presently, in this application, complete descriptions of all these developments will be given by the mechanical systems they involve as described and depicted by the following drawings. These diverse remote control and automated claims of interface is being done to help commercialize responsible remote control and to give value to all of this invention's devices.

These are the present systems and parts that are being used in the prototypes and demonstration units to automate slowing, guidance, stopping and securing functions for the automotive industry as part of the PFN invention. Presently the slowing, stopping and securing functions are coupled to the remote control pager system already disclosed in U.S. patent application Ser. No. 08/975,140. In that application there was also described a fuel control valve system and the invention has developed a prototype of this unit as well; along with many other prototype systems and shut down protocols through experimentation. All have different qualities and properties and mechanisms, that will serve to automate control systems as they can be applied to all kinds of equipment and machinery not just the automotive industry.

FIG. 1

(THIS FIRST DRAWING IS DONE TO COMPLETELY ILLUSTRATE WHERE THESE AUTOMOTIVE DEVICES WILL BE LOCATED AND THE SYSTEMS THEY WILL BE COUPLED TO AND THE MANNER IN WHICH THEY ARE CONNECTED). The following number system will be used throughout this application of drawings to be consistent with the systems these devices effect. Throttle control components will be numbered in the 100 series, the emergency brake system will be coded with the 200 series numbers, the service brake will be represented by the 300 series, the fuel system will be 400, and the transmission and transaxle will be 500 numbers, additional and accessory brake systems will be 600, the steering and guidance components will be numbered in the 700's, the rear axle will be 800 numbers and on-board electrical components sensors and control circuits will have 900 numbers, also the electrical components will have a lighting bolt indicator line in this figure while all other devices will be indicated by a standard curved indicating line to the number. And finally the reason there is duplicated numbers in this drawing is because this drawing represents the two most popular standard drive train systems, which are the front wheel drive and the rear wheel drive. This was done to give the most complete and exact description of these innovative device deployments 100 which is a throttle servo motor and/or a solenoid that can be energized to create a specific aperture or orifice opening of the throttle throat to directly effect the cubic feet of air allowed into the power plant, i.e., gasoline or diesel motors.

101 is the accelerator and/or throttle control cable that connects the pedal to the throttle valve, i.e., butterfly (This gating or blocking process) of the air flow can be accomplished by a number of devices and any such devices, e.g., even expandable bladders are considered within the scope of the invention, when any such device is used to control the engine rpm or are a part of any automated control system or shut down. 102 is a standard cable with a junction box that interrupts the cable from actuating the throttle valve. This is done by a solenoid releasing a seesaw lever, or a set of interlocked double discs or cam devices that is completely described in additional drawings FIGS. 7A–F. Also, in this drawing there is a standard cam system housed in a similar cable junction containment which accomplishes the same lever action result.

103 shows a pedal stop mechanism that restricts the driver from depressing the accelerator pedal and/or activating any linkage to increase engine RPMs, i.e., gear-nut drive, worm gear, ball screw or screw drive, angle or right angle gear drive, piston mechanism, i.e., hydraulic, air either from a compressed gas bottle and/or accumulated bottle system or energized by any such on-board pumps and/or compressors and/or any electric memory metal device, servo motors and/or solenoids that can activate any blocking mechanism and/or catch and latch devices to hold or make stationary any moving parts that control the throttle by restricting movement. All these same devices also could be used as part 100 to control throttle position by anyone skilled in the art with very little to have these devices activate the throttle linkage or through shaft to control air flow or any earlier mentioned means that can restrict air flow to the power plant.

The activation of any of these above mentioned parts will completely eliminate a driver from accelerating the vehicle by the regular accelerator controls. And also if cruise control is present it would be either electrically de-energized through the brake switch circuit with a series circuit relay or by using the same kind of series circuit relay to interrupt the main power supply to shut down the cruise control entirely. Also, the power train control module PCM could be directed to de-energize the cruise control on most all vehicles and/or simply be mechanically disengaged from the cruise control's capacity to accelerate the vehicle though interfering with any of the physical control mechanisms, i.e., linkages, cables cams, valves with the same modalities described for the standard acceleration and throttle system interruptions. This is the FIRST modality sequence to slow a vehicle down for either remote control or preprogrammed automated controls and it will be completely described and illustrated in this application, along with all the ways to SLOW and STOP a vehicle, as well as, secure a vehicle by either of the brake systems which are automated to be applied through an electrical current or signal from being sent from above referenced control systems termed as a PFN. There will also be other locking systems that keep the vehicle in a stationary position and/or also slow and stop the vehicle by engaging or disengaging drive train components electrically. And, of course, all these functions can be performed in real time with accountability through this technology's TRAC software.

The 200 series parts and/or innovative devices, in FIG. 1 comprise the standard emergency and/or parking brake system, which when coupled to the 100 series parts will comprise a complete detainment and securing system—first slowing the vehicle by eliminating any acceleration through the (100 series parts) and then implementing and applying the brake through the (200 series parts), bringing the slowing vehicle to a complete stop with the brake secured and applied so that the vehicle can not even coast or roll while unattended and/or under any improper control and/or unauthorized control. There will be additional drawings showing the circuitry and mechanical parts of all the 200 series parts and innovative devices.

However, at this time it is important to point out another uniqueness to this automated braking system and protocol, which will be incorporated in this automated series circuitry described for this brake application if so desired. It is that the brake will automatically be applied if the drivers seat switch reports no person present by opening a circuit and/or the driver's door and/or any door is opened while the wheel sensors and/or any motion sensing device is reporting vehicle movement and/or if the engine is running. A driver warning will also be given as is standard in many vehicles today, however, this technology is capable of providing this driver notification in verbal warnings, as well as, IP lights, LCD displays, buzzers and bells. It is also possible to activate these braking systems by the seat belt switch but it is possible a driver might just be readjusting the harness an falsely activate the warnings and brake slow down. The proper protocol or safe program for these and additional uses will take into consideration specific vehicle configurations and real life circumstances. Experimentation thus far for this protocol has demonstrated greater safety for the Off loading of passengers in the rear seat of the standard sedan, by preventing movement of the vehicle, while any door is open. Also, the car is immediately sent into emergency brake application mode if the driver or occupants are bailing out of the vehicle. This was designed to for the unsafe unattended auto theft scenario when the irresponsible thieves generally leave the stolen car running in drive as a mobile distraction to tie up police pursuit while they make a getaway on foot. With this technology's shut down protocol, when the thief bails the car stops, allowing the officers to mindfully pursue the culprits only. Once again, this protocol is accompanied with audio warnings and verbal warnings and hazard lights and information signs as well to inform law enforcement of the process. In most cases law enforcement will be knowledgeable of this protocol and be responsible for the activation of this shut down protocol command, whether it be initiated by the police or some cooperating commercial monitoring and remote control service.

The emergency Brake (200 series parts) are: part 200 displayed as a cable tension mechanism comprised of an inner and outer channel where the inner channel has a strip gear attached to it and meshes with a rotating gear either attached directly to a motor shaft or a gear transfer box as the systems mentioned earlier that is attached to the outer channel. With the rotation of the gear attached to the outer channel the inner channel will move back and forth as the rotating gear travels across the strip gear that is connected to the inner channel. When one of these channels is attached to part 207 the rear wheel parking bake cables and the other channel is attached in a fixed mount to the car chassis—when this mechanism is activated in this scenario it can either tense the cables applying the brake and/or relax the cables releasing the brake (for a motor application this would be accomplished by reversing the polarity on the motor and the same seat controls are used for this prototype).

For a solenoid application with just sliding guide channels this would be accomplished by energizing and/or de-energizing the solenoid and having spring tension to accomplish the reverse function. Of course, methods and parts to be decided by the specific vehicle and any leverage consideration to achieve this electrically energized mechanical activity. 201 is representative of either a hydraulic or an air and/or compressed gas driven piston system. Its ram and the cylinder base would be attached to the same attachments points as the part 200 strip gear channel tensing system which is also true for part 202 and 203 which all share piston configurations, but rely on different mechanisms and power sources to complete this task. That is why these parts are displayed in parallel in FIG. 1. Only one of these parts would be necessary to complete this tension function of both rear brake cables in a simultaneous manner. This is a push/pull action.

It is to be noted that all these parts 200–203 could be designed to work in the 100 series part functions and to alter and/or effect changes to the cars throttling system as well. Presently, some air piston throttling is done in car racing sports with a compressed gas bottle to energize a piston that effects the throttle. It is conceivable to use these mechanisms reconfigured for these functions to control a vehicle and to restrict its use and/or remotely control its speed using these devices as actuators; and solenoid valve to electrically energize desired flow. It is equally important to remember that most all types of vehicles can utilize either this modality and/or one of the other modalities detailed in this application to apply any of the cable brake systems on a vehicle and throughout all these application specific effected parts and their numbers will be named whereever readily known. However, the detailed modalities described herein and used are the uniqueness even without any detail with specific affected OEM parts and their numbers accompanying the drawings.

First, the 100 series systems will slow the vehicle and the 200 series will stop and secure the vehicle in a stationary position. Part 201 could receive its energy to function from either an emergency canister of a safe compressed gas as already mentioned, e.g., $CO_2$ or dry air or its energy source could be provided by a small air compressor system like the ones used on cars that have air ride suspension systems for a softer and/or more responsive suspension, e.g., Olds Ninety-eight from the year circa 1987 to present. This is only meant as an example, any standard on-board compressor system could easily be regulated and electrically directed through 12 volt solenoid valves, i.e., Bellows corp style and Air equip. to complete these desired tasks. In fact, specific parts and part lines are only mentioned here to demonstrate the easy commercialization of these needed advancements through the readily available C.O.T.S. parts that can be easily obtained and reconfigured and combined to complete these unique functions, but this should in no way be considered the only way to complete these functions. These all can be reconfigured to work with remote control systems and/or be electrically controlled.

Part 201 if energized hydraulically could be served by the power steering pressure and/or an automatic transmission hydraulic pressure and, of course, regulated with pressure relief valves and electrically controlled valves, e.g., Vickers products, and/or the Waterman valves used in the industrial truck of fork lift industries which have 12 volt solenoids for the auto and applicable industries as well as many of the solenoid valves already in use in the auto industry for many of the transmission applications, etc. 201 could also be energized by the standard service brake system where through normal applications of the brakes an accumulator or blatter is pressurized to an adequate pressure to work the piston with specialized seals for brake systems and regulated by relief valves and controlled solenoid valves, i.e., Micro lock company line, also there are a lot of specialized racing companies that manufacture electric wheel locks energized on brake pressure.

201 could receive its service brake fluid pressure from a modified ball screw piston modulator valve like the ones used in the new GM cars to control brake fluid pressure to each wheel in their antilock brake system. This modulator valve is referenced in FIG. 1 as part #301 and the modification and all other uses as they apply to these innovations of this ball screw piston valve system will be described completely when part 301 is described. However, to develop the pressure to work the 201 piston and any other automated pressure needs that have not been created by the master cylinder an electronic micro lock would be placed between the valve and master cylinder so that when energized will block the return of brake fluid back to the master cylinders reserve as illustrated in FIGS. 14A–F as part 397 which will allow the motor pack when energized to raise it respective pistons to compress the fluid in their cylinders. This is a fairly simple manufacturing change to an already existing part to achieve automated pressurization of the service brake system. There are other manufactures using brake modulators that can be converted to an electrically controlled automated brake pressure system to apply the brakes in a remote control scenario.

Another simplistic way to achieve this pressurization of the service brake is to install an automated master cylinder either incorporated through the power brake system and use either vacuum or hydraulic assist, i.e., power steering or transmission as is often done in the fork lift industry for power assisted braking and activate any of the actuator devices already described in the manner in which they are described, i.e., pistons, etc. The activation of the master cylinder and/or any additional automated parallel master cylinder installed in the circuit, specifically for any of these automated purposes, can also be achieved electrically, i.e., solenoids, electric cylinder, i.e., memory metal pistons, motor driven ball nuts, ball screws gear drives or gear transfers, as well as, any worm drive affixed to the master cylinders piston plunger directly and/or through activating any of the pedal linkages and/or cables to compress the fluid in the cylinder chamber. All of these devices have been and will be completely described but are being referenced here as varied applications that can be employed to achieve electrically controlled push pull functions and later rotation functions for the automated steering and other rotation functions.

Part #202 represents a motorized mechanical ball screw-nut-worm gear piston application for this cable tensing function there is many such devices and manufactures of these devices and systems. Many of these product lines can be found through companies like Invetech American Bearing corporation along with complete literature to there specifications and functions. Part 203 illustrates some new electric pistons sold through Tech magazine and Digit Key Corp.; both are large mail order houses for electronic components. These are memory metal pistons which are not practical at this point for the brake tensing function, but might be in the future. They are mentioned at this point for their pulling action and piston configuration. And they are mentioned here because they have other functions involving this invention, primarily to electronically controlled catches, locks, and/or latch releases for the PFN and secure containments where these pistons will operate access panels and doors electrically through command codes given and received by the inventions communication and/or control circuits. Part 204 pictures a gear nut drive mounted under a hand pull parking brake lever which pulls part #208 which has a cable that is connected normally to the two rear wheel emergency brake cables where part #200 through 203 are positioned and illustrated in FIG. 1. Any of the other devices displayed earlier, i.e, pistons, worm gears, ball screws, solenoids gear drives and motors can also be configured and ultimately displayed and described to complete this function as well as activate this lever from different angles and/or attachment locations and chassis or frame mounts making any such device that automates the manual function of the hand held lever parking brake lever within the nature and scope of the invention. The pedal stop gear nut numbered 103 in figure one and is completely detailed in FIGS. 6A–B which is also the one used in the first prototypes for the hand lever.

Part 205 is shown to also connect to part #208 and it is an illustration of the standard foot applied emergency brake that assembly that has been modified with the same strip gear tensing device depicted as part #200. 205's function would be to pull the pedal down to apply the brake and also to return the pull down arm to release the brake so that when a responsible operator releases the brake cable it will relax releasing the rear brakes, another push/pull function. It is this mechanism that has been chosen and will be used in the prototype and demonstration units to commercialize these technologies. Once again all other earlier described systems can be most easily configured to achieve the automation of this standard foot pedal parking brake assembly. Also, the regular emergency brake ratch assemblies can be motorized with a gear drive and controlled electrically in the same manner. Note that in most vehicles only one of these innovations would be used with respect to how the OEM has set up their parking brake system. The OEM's set up would dictate the appropriate modality for the least expensive and most ideal configuration for these innovations to be employed.

The 200 series parts and innovations are responsible for continuing and controlling the slow down process and ultimately securing the vehicle in a stationary position. The 100 series parts and innovations eliminates any acceleration of the vehicle and begins the controlled slow down. It is the use of these two combined systems that the first prototypes and demo units will be constructed from. This will employ the 100 series device of the pedal stop ref # part 103 in FIG. 1 by using a typical seat control motor, drive a gear nut cable which in turn drives the gear nut to elevate a stop on a shaft off the floor board which is concealed under the carpet to stop the accelerator pedal in its highest position to keep the engine at an idle state. The elevation could be controlled to allow a specified certain capability to accelerate through the earlier mentioned control systems 900 series and onboard sensors on the vehicle, i.e., speed sensors 900 series parts, i.e., wheel and/or transmission. As referred to above the second stage 200 series will continue the slow down to a complete stop and secure state of the vehicle. This will be accomplished in the prototype and first demo units by applying the foot brake with a strip gear and inner and outer set of channels driven by another seat control motor and drive cable connected to a power transfer worm gear drive, i.e., like the one used in GM cars as a horizontal adjuster drive, in fact this whole mechanism, channels, slide buck bushings, cable drives, horizontal adjuster drive gear, are the C.O.T.S. parts for the first prototype. This and the nut drive that is the pedal stop for the accelerator are all C.O.T.S. parts and are used through out the auto industry as automated seat controls. However, when used for these unique uses to slow, guide and/or detain a vehicle either remotely, preprogrammed and/or by any series circuit relays activated by on-board switches and/or sensors to increase any safer operational level for vehicles machines and equipment as well as, control any of their use for any financial economic and/or environmental reasons, are all considered unique as thoroughly detailed and made to all fall within the nature and scope of these innovative patent applications for accountable remote control and robotics. All these already existing C.O.T.S. parts and devices will be described, illustrated, identified and named in these applications. The C.O.T.S. approach has been done deliberately to more quickly deploy these systems to save lives today.

The 300 series parts and components involve the service brake system and how it could be used in a similar manner as the emergency brake to complete a controlled slow down to a stop and secure the vehicle in a brake applied stationary position. The advantages and disadvantages will be described and illustrated completely as well as, all the parts and innovative mechanisms in FIG. 1 and subsequent drawings. Part #300 illustrates the master cylinder and brake pedal location. This part and assembly has already been described in the automated state by using some of the 100 and 200 components and will subsequently be described in greater detail with drawings to illustrate and name the specific parts and innovations for each of those systems in this formal application. 301 was also mentioned earlier and is the brake modulator valve body that has 3 motors in a motor pack and is currently being installed on late model GM cars form 1997. This system will be modified in accompanying drawings to activate the service brake system without using the master brake cylinder pressure which is not the case in the present version of this ball screw 3 piston assembly.

Presently the valve only can utilize whatever pressure the master cylinder creates and will go into bypass mode at any pressures greater than what is generated by the pedal being applied. As for normal service situations this would remain the same, but in the event that the vehicle needed to be slowed down through the service brake's system the return bypass relief would be blocked as the ball screw pistons were activated and a regulated flow controlled through either a preprogrammed EBCM electronic brake control module for the current anti-lock system and/or channeled through another valve body and controlled by other control circuitry either on-board or added on as the devices described throughout these applications for the invention. After 301 the modulator valve, parts 302, 303, 304 and 305 illustrate the brake fluid lines going to each wheel, respectively. 302 is the right front wheel brake line. 303 is the right rear wheel brake line. 304 is the left front wheel brake line, and 305 is the left rear wheel brake line. In reference to these brake lines if an add-on system was to be employed that created brake pressure either by accumulating pressure and storing that pressure in an accumulator or bladder or canister controlled by electric solenoid hydro-locks or if an additional automated master cylinder was employed and activated as described earlier the equalized pressurization of brake line part 303 and brake line part 305 would be the best mode for completing a safer controlled brake system application.

306 shows rear disk brakes. These disk brakes could be outfitted with an electrified magnet with an abrasive wear surface disk or plate that is supported from the caliper anchors and rides close to the disk and works by trying to hold the wheel disk fast and stop the wheel rotation. A C.O.T.S. substitute for this would be the electric trailer brakes set up made by Bendix, which would be configured to be equally effective on the rear two wheels rotation through matching the wheel rotation and individually energizing the braking magnets. Once again speed sensing devices on the car along with the OEM control and the invention's control circuits will be interfaced for the least expensive most effective modality for any specific vehicle and will be continually describe throughout these applications as specifically as possible. 307 the standard drum and brake shoe set up. These drum and shoe brakes could be modified to accept any of the earlier described mechanism to activate and expand the shoes out to the drum surface by, i.e., cams attached to gear drives, pistons, solenoids, as is done with electric trailer brakes and pulsed through a preprogrammed circuit that receives vehicle speed data and equates the on/off time or amount of current to be applied. These will also be completely described in subsequent drawings. They would be fix mounted on the backing plate dust cove on the stationary end and the actuator portion of any of these devices would be fixed to the emergency cam lever free to travel normally when not in the active state.

Electrical Vehicles and Machines

In this 300 series section, the invention foresees a use for different kinds of braking systems as a possibility to conserve weight in the emerging electric car industry. The use of a wheel generator attached to each wheel could accomplish a number of functions as its fields would be energized for a braking mode. First the inertia of the car would be slowed by the load it will take to generate electricity which would also charge any electrical power storage system, i.e., battery. As a result the distance an electrical vehicle can travel will be lengthened in an efficient use of the inertia from the car to generate and store additional electrical power. To take this one step further, it is well understood that DC electric motors can be electrically configured to generate electricity as well in a reverse function. So the advantage here is that the same drive motor could be configured to be part of a generating braking system through switching fields thereby creating a complete electrical drive train and braking system, which saves parts and weight with the switching controlled by the accelerator and brake pedals. This will allow for an easy conversion to automated and remote control scenarios electrically.

In an all-wheel-drive, four, two, three motors and the like could be employed. Four motors if each wheel is to be outfitted separately for some all-terrain applications with their own final drive gearing. It is also possible to use a three motor configuration if just the front two steer wheels are outfitted with motors to give drive traction and the rear two wheels would have posi-traction or a limited shift drive axle with both wheels powered through a standard differentials with a single motor attached to the input shaft of the differential. Just two motors could be employed if the motor drives were on the input shafts of the final differentials for the front and rear drives. For standard two-wheel-drive, just one motor that either drives through a differential for the front or rear set of wheels, but in this case and the last one mentioned. The two motor four-wheel-drive for the braking function properly the differential would have to be either a limited slip and/or fixed differential. For front wheel drive at least a limited slip to allow for tuning and in this case probably other braking systems described in the invention will be incorporated cost effectively to assure a smooth control in the braking process to accomplish the stop and secure scenario and sophisticated remote control. Of course, any number of motors may be used, depending on how many wheel systems and power/torque is desired.

These standard final drives are detailed in this technology with electrical motors, and controls because, this is the evolution of the auto industry to utilize a drive by wire technology. So the control of these circuits and components was foreseen early on that will control speed, braking and steering will all fall with in the nature and scope of this technology to provide responsible and accountable remote control through any electrical and/or mechanical means. Also, with the electronic OEM wheel sensor controls and modules, e.g., electronic brake control module anti-lock system of today only the voltage considerations should be reconfigured and instead of activating any modulator valve it would just send its directions to an EVC module. An electric vehicle control module mini computer or controller that through silicon relays diode thyristor field weakening systems and field switching system would through its preprogrammed soft ware would direct the sending and retrieving of power discharged from the battery and generated from the vehicles inertia. This will save parts and conserve energy by the EVC1070 ability to direct current and the polarity from the motor generator switching circuit through readily available current sensing IC circuits available today. This EVC1070 control module will have this technology's PFN/TRAC system.

Many of the familiar standard driver controls of today, i.e., accelerator and brake pedals and steering wheel will be apart of the electric cars of tomorrow and other energy alternative vehicles. These innovations completely and fully describe and detailed in this application and the preceding ones can also be used on these new vehicles.

This next section, the 400 series, will presently be completely given extensive description and illustrations. Part 400 is the standard fuel pump assembly for today's vehicles. It comprises an electric fuel pump with a strainer and fuel level float sensor and in some cases a bypass valve. The control of the fuel pump is performed by controlling the power train control module circuit to the pump and not either though the interruption of the fuel pump relay and/or any other direct interruption of electrical power sources to the pump. There is in most cases two circuits that can supply power to the pump. While it has not been the intent to utilize the pump as a primary slow down mechanism and/or the direction for the experimentation and development of this invention technologies, the invention does discuss in detail certain technology unique to controlling the fuel pump and pressure related devices and timing control devices in a fuel injection system and throttle body injection system in a safe manner and presently claims them as. This filing of the invention's technology concerning the control of the fuel pump that was developed through the testing of other unique circuits and devices that interface with an OEM's electric pump and the vehicles onboard control systems and which are effectively used to slow and stop the engine are going to be described completely. These will be shown to do so in a unique way to anyone skilled in the art. These unique innovative methods are completely described and will be forthcoming.

This invention's unique process allows the interruption of the fuel pump and/or injectors without running any specific separate engine timing software program that times the injectors to achieve the smooth slow down of the vehicle. In one modality it employs the above-mentioned 1000 series trickster circuits to control the fuel and spark timing through simple inexpensive relay controlled pre-adjusted resistors and/or preset pulse generating IC chips to send the desired electrical signal from an interrupted sensor to trick the OEM electronic module system. But makes no changes to its hardware and software, i.e., power train control module, injector control module theft deterrent module, and the ignition module. The desired signal is determined by taking a reading of a sensor in the RPM and RUN state desired. Then adjust the variable resistors to a multi-meter readings for analog voltage and/or tune the pulse and/or width of the signal with an oscilloscope for any digital data streams to the desired respective frequency or voltage level. The resistor or chip is wired most generally to a double pole double throw relay, that either gives the OEM sensors signal for normal operation or disconnects the OEM sensor and sends the trickster signal that makes the module software adjust to a predetermined desired level.

The sensor circuits interrupted most generally for this slow down process and specifically in this modality are shown in FIG. 1 as 900 series part locations and are normally OEM sensors. These sensors will be detailed later along with circuit designs displayed so presently they will only be named and referenced to FIG. 1 for locating their function and purpose. 920 is the throttle position sensor that gives a electrical signal data as to the aperture of the throttle valve to the power train control module and ignition module for the purpose to adjust the mixture of fuel. 921 is MAF mass Air Flow sensor most time located in the air horn and not appearing in FIG. 1, but in subsequent drawing #11A–B part 142 it also provides information to the PCM for fuel and emissions controls. 905 represents the camshaft sensor and also sends its signal to the ignition module and the injection control module. 906 is a distributor induction pick up and also is used to control engine timing function ignition and fuel. 904 is a standard fly wheel sensing design used frequently on Jeeps 907 is a harmonic balancer sensor once again both of these sensors are used for engine timing. In most cases, only two of these sensors would require the 1000 series trickster circuits to achieve the correct electrical setting to achieve the slow down. This has been coupled to the earlier fuel valve system 403 or any of the unique ways to interrupt fuel flow by tricking the ICM and the PCM to send less fuel by the 1000 series trickster signals. As an augmentation to this system there can be an automated gate valve controlled by solenoid or servo motors and/or any of the actuating devices already referenced either mounted as an addition to the front of the air horn or anywhere in the air horns intake passage to gate and thereby restrict the cubic feet of air to a preprogram level that is electrically controlled by the invention and activated in conjunction with the 1000 series trickster circuits to control the spark and/or fuel to keep a balance mixture with the restricted air flow. Alternatively, any of the above described air flow controls effecting the OEM throttle could be employed.

In continuing to describe FIG. 1, 401 is the fuel tank, 402 the fuel supply line, 403 depicts an in-house innovative accessory an earlier design of a valve which has already been explained and described, and therefore, will only be referred to as it pertains to interface with other new innovations or as might be necessary to clarify its uniqueness from any other related patents granted and/or any pending applications making claims involving fuel system parts. 404 is the injector control module and will be discussed and how this invention if employed uniquely alters the modules functions and injection system. 405 in the front wheel drive motor location is the injector rail. 407 in the rear drive motor configuration is an injector of which there is usually 4, 6 or 8 to equal the number of cylinders. 408 is the fuel regulator on the return line to the tank to maintain adequate fuel pressure. Another unique device that has been developed in the testing and experimentation of the fuel valve part 403 is an automated fuel regulator that, through an electronic solenoid or motor or pressure activated, can be a variable relief valve that when it is activated and deactivated can dump or increase the fuel rail pressure that result in slowing the vehicle down. Experimental units have been used with the earlier discussed add-on air horn gate valve to better balance air fuel mixture for yet another smooth slow down, and/or in other device couplings used with the 1000 series circuit to augment timing irregularities for yet another smooth slow down. This automated and/or variable regulator will be illustrated and described in further detail as a possible augmentation for some vehicles to achieve a smooth slow down.

The 500 series innovations will be parts and devices that control transmission and/or transaxle (i.e., front wheel drive vehicles) functions that can first slow a vehicle down and ultimately engage the park pin through solenoids and hydraulic dump valves for hydromatic/hydraulic/fluid drive and/or hydrostatic and/or automatic transmission. Also, this section will describe how a standard or manual transmission with a hydraulic clutch, and/or a mechanical clutch assembly with cables and/or linkage can be disengaged and engaged to first slow a vehicle and stop its motion if detected by any vehicle wheel and/or transmission speed sensor. The complete slow down and stationary stop protocol of this technology will be completed with the motor shut down and the clutch will be engaged to use the motor to brake the vehicle. The transmission is locked in gear from a solenoid latch which is activated, when the clutch was disengaged to slow the vehicle. So now when the clutch is re-engaged after the motor has been disabled at a creep speed it will hold the vehicle in a stationary position. With the automated engaging of the clutch in most all manual transmissions, today cars will be prevent from re-cranking their starter motor, because of the safety switch on the clutch which will be operated in the appropriate manner physically or simulated with a trickster circuit from this technologies of trickster circuits 1000 series.

These devices and innovations are the same design as those used for the 300 series service brake system to activate and/or create brake pressure as these hydraulic clutch mechanisms usually use brake fluid. However, if they are hydraulically assisted as is the case in some instances the earlier hydraulic device actuators and electronic controls would be employed. If the clutch is a mechanical either cable or linkage controlled device the 100 and 200 seat controls and other earlier described actuator devices would be employed. For other vehicles already using electronic signals to control shifting and/or transmission functions through OEM solenoids and/or servo motors. These signals would be interrupted and/or augmented through either any on-board control module PCM and/or any add-on control circuitry and preprogrammed software already discussed extensively but will be further illustrated and explained as to the transmission function to slow and to stop a vehicle.

Slip Disk Drive Train Interrupter

Part 500 represents a solenoid or servo motor to automate the functions on a transmission in FIG. 1. 501 depicts another innovation that will for the most part be comprised of C.O.T.S. parts. It is an electromagnetic surface magnet grooved clutch disc that is attached to the fly wheel which is bolted to the crank shaft of the motor. The motor flange housing that mates with the bell housing has brush paws that make two circular rotation contacts on an separated circuit insulated disc that is attached to flywheel with the magnetic clutch device so positioned so that it can easily be repaired through standard access ports for a part failure and/or bolts can be installed to return the vehicle to an attached flywheel to torque converter configurations for any reason. The torque converter has bolted to it a flexplate and/or an acceptor plate with a matching grooved surface to accept the electromagnetic clutch disc and engage the torque converter transmission hydraulic pump, and input shaft to the transmission. The earlier mentioned brush paws would be connected to ground on one brush paw and an interruptible 12 volt service from this inventions control circuitry would be supplied to the other brush paw which would energize the electromagnet clutch disk and drive it with the rest of the above-mentioned powertrain. Other applications are for fly wheel inertia vehicles and the electric wheel technology not just for remote control function but to better control the transfer of energy to the wheels and/or other industrial applications. Racing applications for quicker starts and definitely in engine repair as to easing the extraction and installation labor in removing all the standard torque convert bolts from the flex plate, for this system. There will be complete drawings and descriptions of parts and innovative design modifications. This also is a unique device for other machinery and equipment to disengage any power transfer system.

Part 600 is an illustration of add-on brake system to slow and lock up the drive shaft. This configuration balances the internal drum to function well at the RPMs that the automobile requires. However, this drawing is another ideal place to show the position of such a standard braking device which is extensively used in industrial settings such as heavy equipment fork lifts, and even stationary machinery that have shaft to gear and cam drives, i.e., presses, paper cutters HI Die's and metal stamp machinery. Part 601 is a more practical application of an add-on drive shaft brake system and is used by some truck manufacturer and especially in the past. It is a disc that is attached to the drive shaft which is much easier to balance for high revolutions with the caliper mounted to the frame or more preferably the differential to ride more consistently with the suspension and stay more true to the disk and the shaft it is mounted on. However, the best location on an automobile and/or truck would be close to a center shaft and bearing and/or fixed rear mount transmission. Once again this braking device gains most of its uses in the heavy equipment, material handling and industrial settings. Because these brake devices share many of the mechanical and hydraulic components as the service and parking brake systems already described they too would use the 100 and 200 series actuating mechanism with the control circuitry that has been explained.

The 700 series involves a detailed description and development of remote control steering that will be commercialized in a specific manner and over a period of time. These device innovations to be automated for remote and preprogrammed controlled steering will be discussed in the progression that they are to be commercialized in the safest manner possible especially in the automobile industry, first PASSS, then PAGSSS, then robotics driving. There is a great need to control vehicles that are operating in a dangerous manner and along with slowing and stopping them an automated guidance system can increased some margin of safety to these already destructive situations in a lot of circumstances.

Along with the automotive applications some of the other types of power steering used industrially that will be automated will be describe in figure one briefly and covered in more detail with illustrations in the formal application. Presently in figure one these elements will be named and described clearly enough that anyone skilled in the art can easily visualize and create these innovations for the most part from the C.O.T.S. parts already in service in different applications today as described presently in the following modalities.

700 Series Steering Systems

Because of the many different steering systems, manual and power steering for vehicles and equipment, a little time is going to be taken presently in this introduction (FIG. 1) to detail the steering systems that will be in this formal application. And all the provisional and experimental devices and prototypes will be given some detail.

Part 700 represents a standard pinion, or a steering gear. It also could be a standard orbital valve that guides the hydraulic fluid to one side of the cylinder to dive a ram with a center mounted piston in a desired direction to steer the wheels, i.e., forklift industry and highlifts. Or, once again, as a pinion steer gear would drive the rack in the cylinder mechanically, while directing the fluid flow to power assist the piston rack in moving the tie rod ends to steer the wheels. In the industrial truck and forklift industry the orbital valve or the hydraulic control flow assist valve could be part of a steering wheel gear box assembly like 703 a power steering gear box, i.e., Saginaw ball screw steer gear box with a directional valve and is hosed to an assist cylinder to aid in a mechanical steering system. 701 represents a piston. Also, 703 is a power steering box that is assisted hydraulically.

However, in the normal automotive rack and pinion steering the steering gear will be all one piece with the rack within the cylinder and it is this system that will be most extensively be detailed and illustrated to show how automated steering can most easily be achieved not so much by altering the OEM's systems but by adding the automated controls to them. This is why some detail is given to describe the operation of the systems they are connected to. So, throughout this application extensive descriptions on how all the other steering systems will be automated will be described in as much detail as possible.

These 700 parts and locations named and illustrated are where the innovative prototypes are designed to be attached. The prototypes will provide remote and preprogram sensor control of the rack and pinion, steering gear, steer shaft, any linkage, steering wheel, and/or steer column assembly with some or all of the following parts, as they are present, altered or modified and/or innovatively provided for any and all the vehicles and equipment for remote guidance through this technology. These areas for automation will be described in detail. The first modality chosen by the invention involves the use of the 100–200 series seat controls cable drive motor electrically connected to a controlled reversing circuit as displayed in this application similar to the ones employed for the accelerator stop and the emergency brake actuator mechanisms. Which in turn is controlled by either a 900 series onboard controller (ESCM) through any controller, computer system, or comparable similar control technology, which can either be interfaced with this invention's processor circuits, computers, their sensors arrays, i.e, distance and camera communications, i.e., and control relays.

Figure 4:
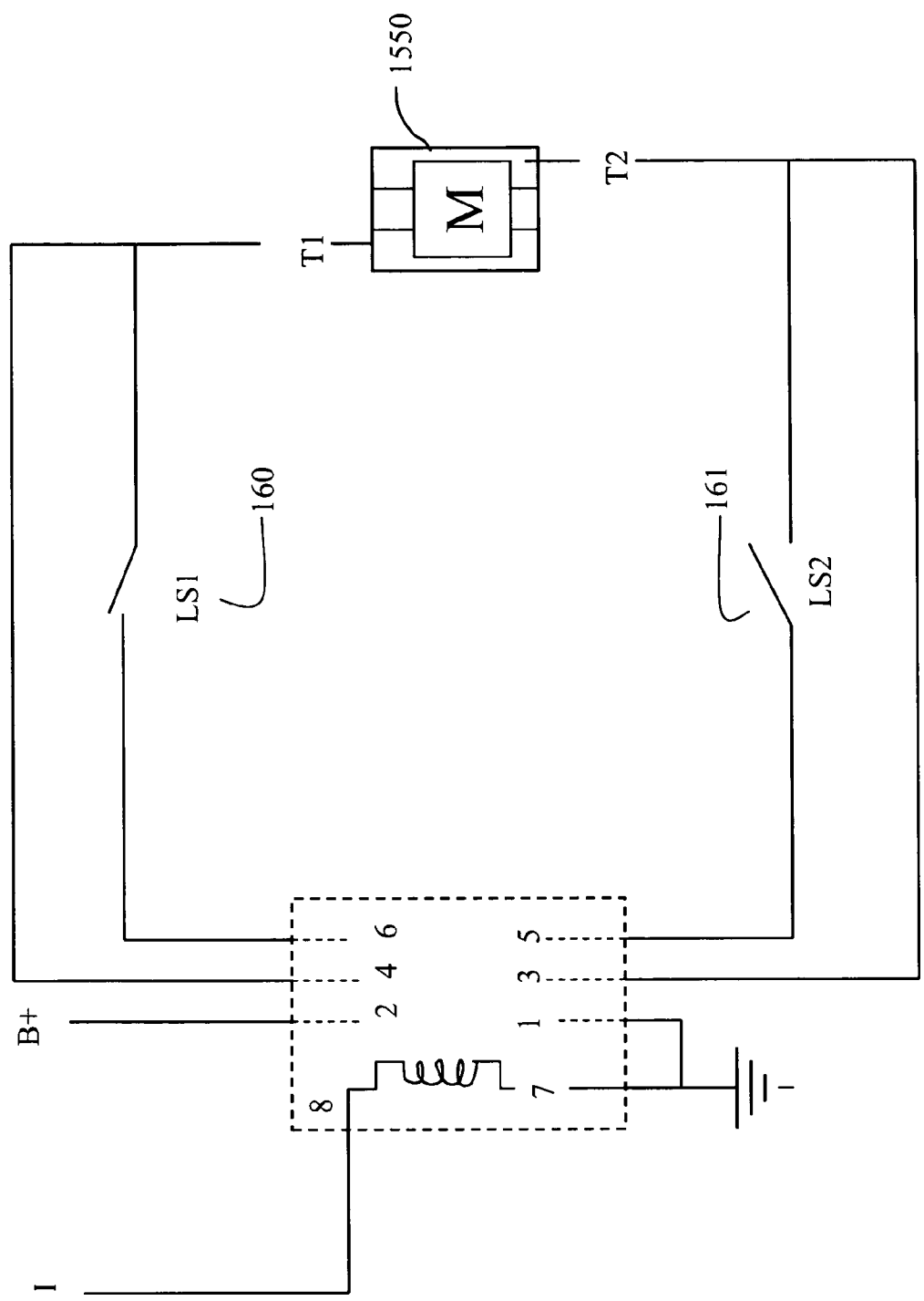
FIG. 4 displays a typical motor revising relay circuit that is used in the prototypes to change motor polarity and direction.
Figure 5C:
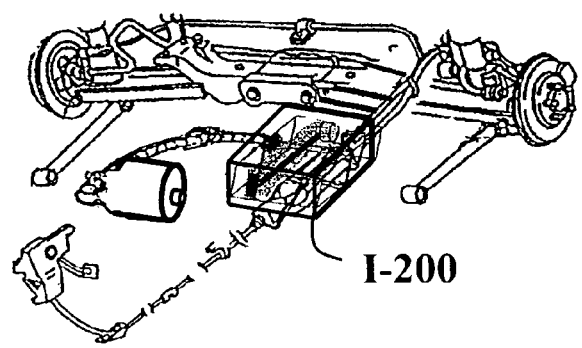
Figure 5D:
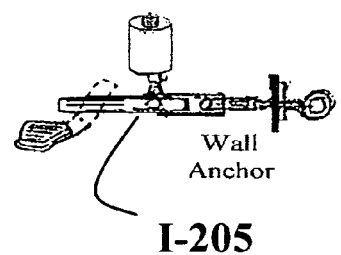
Figure 5E:
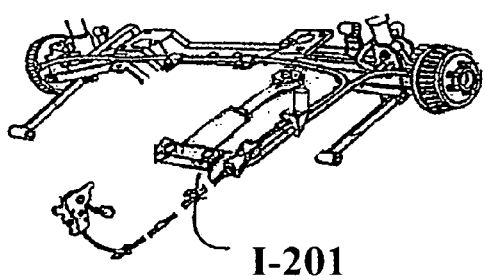
Figure 5F:
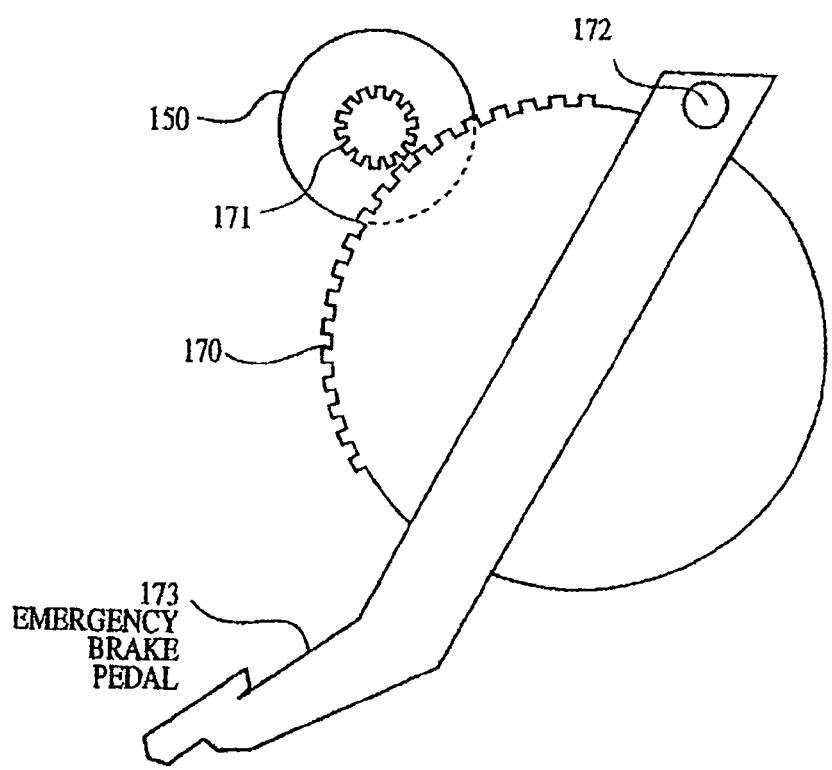
Figure 23A:
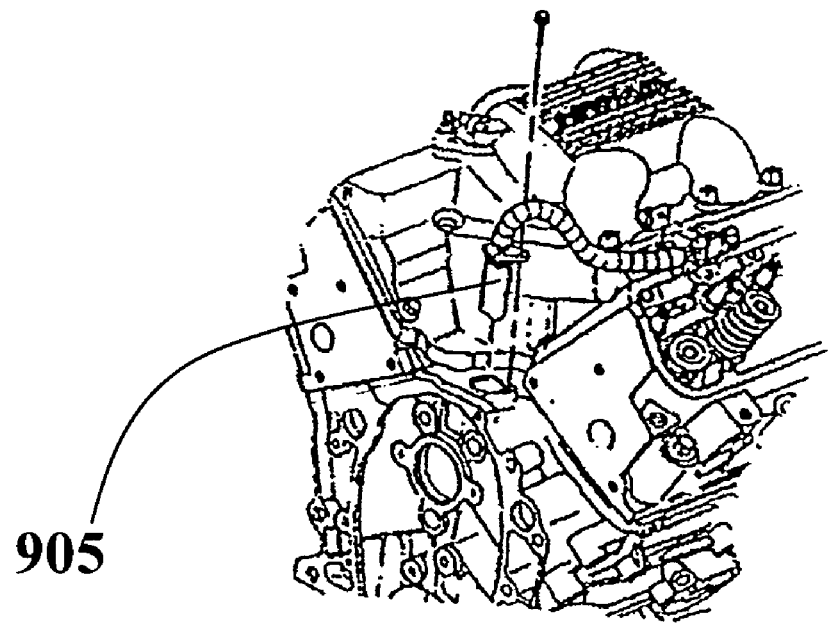
FIGS. 23A–B show the cam shaft sensor location, and a crankshaft sensor.
Figure 23B:
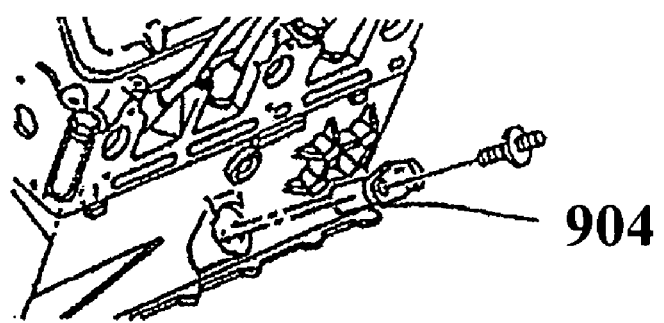

The 1000 series through 1200 series interface of these innovations will all energize the motor in either direction, with varying degrees of sophistication and responsibility. The 900–1000–1100–1200 series parts and systems will be discussed in full and in sequence later in this application. Only the vehicle steering automation will be discussed presently. However, all of these series will ultimately become a part of an intricate automated steering system. With the reversing of the motor being addressed completely in FIG. 4 and the motor assembly and the cable drive changing direction through electrical control circuits it is necessary to discuss an experimental innovation that has shown some promise for automated steering applications. It utilizes the same seat control device the emergency brake pedal uses the right angle horizontal adjuster drive. This drive has been mounted on the steering gear housing and/or supported on a bracket from the steering gear rack mount bolt so that it is in alignment with an add on gear 712 FIGS. 23A–B on the stub shaft of the pinion gear. There also is a pivot end mount on the horizontal gear activated by a solenoid to tilt the gear down and mesh it with 712. Otherwise, the stub shaft will free wheel, i.e., normal steering There also is some experimental work with small Air Condition system of electromagnetic clutches attached to a stub shaft with the inventions gear a variation of 712 that meshes with the horizontal drive being held in contact with the electric clutch surface, so when energized and pulled away from the inventions splined slip sleeve or collar which is connected to the steer shaft column linkage with a special column mount. All variations of the 712 part will be fully detailed and drawn in the formal application. Both these systems will work in automated steering applications.

A second modality to automate the standard rack and pinion power steering is to access any section of the steering wheel shaft and mount a gear or a sprocket or a pulley around its circumference and connected to a drive that would either mesh or be chain linked or even belt driven to the same or similar type of drive motor assembly, i.e., seat controls/horizontal adjuster drive with electric clutch, as described above and controlled in the same manner, and/or instead of a chain a cogged belt or v-belt with a shive mechanism or a locking cogged hub that is solenoid activated or electromagnetically locked in, e.g., electric clutch which gives control of the engagement as described and employed above already. There is another completely different steering modality.

This third modality for automated steering involves the hydraulic piston system of steering, and in this case the hydraulic delivery lines that activate the directional throw of the center attached piston to the ram would have their fluid flow controlled through a electronic solenoid shuttle valve circuit that is energized only for remote functions through a series of Waterman solenoid control valves first to activate the remote control circuit and also to control the directions. The shuttle valve could be a dual-sided spindle type valve that would control the flow through the orifice by degrees, this function could also be activated by a ball screw piston drive that would pass thorough the center of the double pointed piston to control the flow to each side of the piston. Also these types of control valve systems will work to turn directionally any hydraulic motor system to drive a strip gear in either direction. Most of these hydraulic systems are used in industrial slow speed applications like, e.g., lift trucks, hi lifts articulating loaders. All these parts and components will be detailed itemized and completely described and for the most part are comprised of C.O.T.S. parts for the initial offerings and prototypes.

The 800 series parts are various modalities to disengage rear ends and/or differentials, transaxle final drives, and rear axles to deactivate an automobile from accelerating through the final transfer of power to the wheels. And, then, secondly lock up the differential and/or final drive systems after the vehicle has been stopped and the motor has been disabled so as to secure the vehicle in a stationary state. 900 series parts—916-17-18-19 and/or 908 would serve as the monitoring devices, i.e., these standard speed sensors will report on the stopped and/or slowing condition so that the stopped state could be achieved and secured. The first modality for this altered differential would be to have a internally splined slip collar that is circumferential grooved to accept a fork lever arm that is either connected to an internal solenoid or servo motor or has a sealed shaft to an outside actuator mounted to the housing like the high low differential shifters on many trucks today. Another embodiment of this modality would be to have an engaging disc that normally road with the Bull gear and was connected to the planetary assembly which transferred the energy to the axles either by a solenoid that shifted out of the splined center hub of the receiving bull gear or servo motor and/or electromagnetic clutch, or in this case interlock. 801 displays the solenoid and/or servo motor external placements. As for the internal placements and types they will be fully describe and detailed as will these shown in figure one. The final modality 802 involves a slip sleeve either to an axle and/or in any wheel hub that will allow one wheel to free wheel as if a axle has been broken and can not torque against the other to propel the car in either direction. Once again these devices would be controlled electrically but could also be actuated hydraulically or any of the ways described extensively throughout this invention.

Introduction to the control devices, on and off the vehicle, include some which are already existing prototypes with their accompanying drawings and others will be described in their experimental and present design state. Also as they are described they will be explained as to how they are planned to be commercialized to maintain the safest and efficient marketing of these innovative devices to automate vehicle control. These devices described within this application or ones very close to them will most probably be the automated devices that remote control and computer systems will be governing to some degree everyday from the present long into the future. That is why this technology's product developments have been designed and developed first from this primary remote control device application and will be expanded to encompass every needed remote actuator to accountably control humanities equipment worldwide, from the PFN through TRAC software, a programmable and modular software system.

Those functions by onboard robotic systems and interactive highways, commercial and, governmental and/or industrial system, computers will complete the ultimate robotic interface of artificial intelligence for societies machine use through controllable machine messaging as has been detailed throughout all the related patents. This will involve all the series devices from 900–1200 electrically and electronically hardware, hardware imbedded software firmware a, software and encrypted systems. For this reason it is necessary to discuss the remote control devices and systems that will be utilized by law enforcement to control most especially the steering function but will also allow them to detain a vehicle through the slow, shut down, stop and secure device; protocols PASSS and PAGSSS, through all the specialized communication and control systems that will direct these automated controls of a vehicle, i.e., laser guided modulate signals, microwaves, receivers and transmitters set to respond to specific police controlled frequencies and provide instant vehicle identity (ESN), so that a vehicle can be singled out specifically, that is speeding or more importantly requiring immediate remote deactivation for public safety concerns.

In FIG. 1, 902 is a new innovation the electronic control steering module (ECSM), part of PAGSSS program. This module will receive its data from the computer which relies on the video systems and distance sensors on-board to give eyes to the vehicles guidance system. The electronic steering module will receive some of its sensor data from the EBCM the electronic brake module as to the coordination of controlled braking and the effortless control steering in GM cars. A Pintle valve in the power steering pump and controlled by the OEM EBCM relying on the steering wheel sensor data retrieved and processed to control ease of steering vs road sensitivity at higher speeds will be interfaced with the new innovative ESCM which will control the pindel for pressure and a second control valve system, e.g., electro solenoid Waterman valve will, control the hydraulic flow and direct it through electrical circuitry to energize either the oil flow to energize either a piston direction or hydraulic motors. ESCM (electronic steering control module) also can serve as a two way switch to direct the seat control type motors to rotate the steer shift linkage and stub shaft parts to steer left and right for the rack and pinion steering, modality, etc.

The 909 sensor array multi-antenna and target system is coupled to long and short range transceivers or crystals in the 900 control center. These transceivers will be completely described in the 1000 series devices. It is these devices coupled with police operated transmitters with special security measures that will allow an officer to point and stop a specific vehicle and/or control its automated systems. The law enforcement officer using this device will have his badge number or Social Security Number encrypted as part of the signal given to detain and/or control a citizens vehicle, which will be recorded in the inventions permanent record device as well as any accumulated sensor data from 909 and in the cabin audio video recorded data regarding the incident. The hand held device probably later consolidated as part of a radar device will be able to verify the officers identity before a chip inside the device will allow the device to work in stopping a vehicle, i.e., Lockheed Martin fingerprint system or the new system that can identify a gun owner and only let that person discharge the weapon with the needed accompanying identity wrist band, etc. All the possible identifying systems that prove good C.O.T.S. candidates for this purpose; and the stated purposes of the invention, i.e., earlier filings and driver identity systems, will be named and described as to how they can be utilized. Also earlier in prior applications interactive highway systems and commercial servers can be used to confirm logged on officers in a particular patrol area to authenticate an officer for the worried motorist through the various communication devices on-board their vehicle and these interfaced systems.

The 900 series is all the OEM's electrical components and others manufacture's add-ons along with this technology's peripheral sensing and control circuits to interface everything into accountable remote control systems. They are the primary electrical components and major computer controls, including the communications and GPS components, record keeping devices and sensors, all initially as C.O.T.S. innovations, which have always been a claim of this technology as well as, any type of physical secure interfacing for these devices and components on either a host vehicle or any piece of machinery or equipment. These initial 900 series C.O.T.S. products are thoroughly interfaced through many innovative 1000 series circuits and control systems, which are uniquely evolved to consolidated and integrate into a multitasking solid state system that will also benefit from this technology's claim of physical and legal protection with a secure environmental encasement to meet society's need and requirements to provide accountable data storage in the remote control scenarios and to protect other vital and expensive electrical components in a PFN containment. This claim for accountability and protected circuits including any and all of the necessary types of record keeping devices/ systems and identification equipment/systems detailed is considered to be of a great and unique societal importance and value for the responsible development of automated remote control systems and robotics, along with the TRAC system, to authorize and authenticate commands and activities. And has been so stated as one of three most important and unique properties of this technology, with special emphasis and recognition here on any protected record keeping, locally and remotely, for society's accountability as unique to this technology. However, any and all attempts to protect any circuits to provide accountable and/or responsible remote control no matter what the specific circuit design and/or application and/or function should all be considered to fall with in the nature and scope claim of this technology.

It is immediately apparent that this technology has been expressly and inclusively designed to easily couple and provide technical interfaces and cooperative commercial settings to quickly and efficiently support any existing manufacture efforts in all of the effected industries with valuable commercial technology, plus a real responsible direction and insight to achieve accountable and acceptable automation and remote control for mans machines around the world. While, these control, communication and record keeping innovations are discussed and detailed at some length in this application the real focus of this filling is to detail the actuating devices on the host machinery. And also, to detail the on-board accountable sensing devices and systems that will report back to these above mentioned control, communication and data storage circuits and devices with data about the responsive actions from any of the remote and/or automated monitored activities that are a result of commands given and/or received from these same circuits and devices contained within a PFN as the most ideal setting.

Part 900 is on the vehicle command center or Protected Primary Focal Node a (PFN) which will ultimately be a protected and secured in, for example, a single location housing, but presently will also take the form of a series of equipment interfaces possibly housed in a number of locations on the vehicle to best combine all the present OEM, and C.O.T.S. devices, (some of these are protected and shielded and some are not, however, the accountable recording devices will all be protected from environmental damage, and tampering, as well as the accomanying TRAC software). All the OEM control systems, communication systems, geographic location systems, and trouble code data storage systems, will be interfaced with this technology's control devices, communication systems and sophisticated data storage to provide and fulfill the inventions stated purpose and capabilities, which is to be a sophisticated and accountable record keeping system capable of recording and reporting back on all vehicle operation, operator activities, and environmental data recovered, as well as, directly control the vehicle functions through these presently described automated devices, innovations and adaptive modalities of C.O.T.S. and products and OEM equipment.

920 is the powertrain control module. 940 through 959 is this technology's computers, programmable controllers and/ or simple control circuits (also detailed in patent applications PCT/US97/21516, U.S. Provisional 60/122,108 and PCT/US99/00919) to control all the desired automated functions in this application. The reason the invention has 19 numbers allotted to its own control circuits is because it will have many various designs for all the specific vehicles and/or equipment as all these systems interface, and merge with. However, basically there is only 2 levels of computers. The 940 series and the advanced 950 series. 940 is the first inexpensive (Parallax) Stamp I, Stamp II and the 188 euro-board 100 programmable controller and/or computers for the present prototypes of this accountable remote-control invention. These have been planned and configured to evolve as either a series of stamp computers to complete all the necessary functions for most any vehicle automation and communication routing, as well as, data storage routing desired. Of course, other computers may be used.

Most likely, the invention will seek to consolidate as much as possible through 949 into a more sophisticated mini computer like the 188 mentioned earlier, that can be tailored for the desired functions through a limited amount of hardware connections and software programs, so as to consolidated all the functions more efficiently. 950 is the advanced total equipment computer and/or programmable controller (with 386, 486 and/or Pentium processors on 100 euro-cards with plug in edge connectors that can run all the robotics and accessory functions driven by other plug in cards that function also function as communication modems and that can incorporate all the crucial OEM control software or can even replace the OEM circuits as well as, handle all radio and cellular phone interfaces and modems (with the appropriate firmware and software to even function as a mobile work station PC for the automated commuter). All will run TRACT software to be made part of any accountable process, as determined by application specific standards.

With respect to 920, Philips Corporation in Europe is one of many companies developing sophisticated automotive electronic controls to handle a lot of these accessory duties. There are many other manufacturers in the electronics and automotive industry that are doing the same. However, this technology has been designed to do all these functions in different and unique inexpensive ways to drive this development with real responsible commercial direction and to combine any and all existing manufacture efforts, as well as, enhance any and all of them through this technology's vast versatility. This has been done to insure the most complete and accountable development in all the remote control fields for all types of equipment including all forms of machine messaging, communications, control circuits and computer networks as well as all the detailed peripheral devices. 951 personal computers (laptops, organizers and notebooks) 952 and 953 voice recording devices 954 equipment data record device. 954 video record log inside cabin 955 outside video record log 956, i.e., with all records burned into condensed or compressed on Disks or comparable storage system or held in RAM chips and/or a hard drive device.

Either and/or all the systems will be able to preserve and protect software determined relevant as application specific data for authorized retrieval from a physical and legally protected area. Even though the functions are given different numbers here for easier understanding; the data will be stored primarily in two forms on any vehicle and/or piece of equipment. (a temporary real time limited storage and a application specific permanent storage that will have a redundant off-board storage by being reported to at least one remote location in any of the two way communication systems. All these devices to 955 will ultimately be part of the 950 series vehicle computer with the capability to support keyboard operations, along with this technology's steering wheel mouse control device. Also, all systems will be voice recognition and command capable with basic learned operator commands (in any appropriate language). The system will also provide dash displays and other cabin displays including being capable to support the electrical and computer service for a hologram wind shield or screen display, i.e., like the Pontiac Grand Prix for partially and fully automated travel and to provide a work station if so desired. Drag, point and speak and other programs are detailed in the PCT/US99/00919, however, all these systems will be detailed more in this application and in all the other related applications. 960 has been reserved as an interim area to cover C.O.T.S. record storage and communication systems. GPS is included here as a data receiving communication system and the computer systems will ultimately run the software right on-board through programs like Delorme's "Street Atlas" rather than rely on a gateway control computer link like that used by many of the car manufactures monitoring and service programs (e.g., GM's OnStar program). However, this technology can marry well with any of these monitoring systems and still offer more accountable aggressive remote control enhancements to their existing systems. All these systems will ultimately be consolidated into this technology's 950 Equipment Computer Control Communication and Records unit. This 950 "ECCCR", sophisticated unit will contain the electrical guts for the most desirable protected PFN components and will have universally compatible hardware and TRAC software to create the brains of the invention in one location on each piece of automated equipment. It will be accompanied with all the described sensors and communications systems, as well as, a sensing system for these described automated motorized innovations.

With the 950 control circuits combined together with this patent application's electrical actuators a system, similar to the neuro-muscular functions in humans, can be created for most all of machine use, and it will be made completely accountable for robotics through a machine messaging network that can perform and review performance responsibly for any and all desired remote and automated functions, through TRAC system software. It is a primary goal of this technology to provide a secure electrical interface platform and containment for accountable remote-control and to established it and certify it as a standard for all the industries. So that all of its designs and uses can be regulated and written to by the appropriate governing agencies, institutions, industry associations and/organizations when they are developing their rules, laws and regulations that will control remote control and robotics activities for humanity. This is the purpose of the PFN and a major goal of this technology.

The 960 numbers have also been issued to more easily describe the 1000 series trickster circuits and specifically designed connectors and fasteners to interface these computers and all the other systems till they evolve into one hardware device and one system with more consolidated and compatible TRAC software for the 950 ECCCR. The earlier 900 numbers will be kept for all sensors and the normal auto electric devices generally in use on most all of the equipment or vehicles today. 920, the powertrain control module and/or vehicle PC or computer, ideally and ultimately be protected in the secure box or PFN and so legislated as a standard by congress with regulations from DOT, DOD, Highway Safety Commission, Law Enforcement (justice department and insurance concerns and companies, as well as, to maintain fair trade and commerce for equipment and vehicles for the life and use of these machines in society). And every effort by this technology will be made to coordinate with any standards effort for these merging technologies (i.e. control circuits, communication, data storage, environmental monitoring, remote control device for vehicles and machinery etc.) with their manufactures to commercialize the best product offerings for the public, while helping to structure their safe and legal use.

The 900 thru the 1200 series starts with the 900 series onboard devices and control systems to achieve a full interface with the off-board 1100 and 1200 control, monitoring and service systems, as referred to in U.S. Provisional patent application No. 60/032,217. The 100–900 on-board automated systems and the OEM's electrical components interfaced with all the inventions, sensors, recorders control systems and communication links will form this most ideal focal node and mobile interface platform for this technology to perform its function. This PFN function was described at some length to show the full scope of these innovations as needed elements to automate humanities machinery for responsible remote control and robotics.

The 909 sensor array assembly that is responsible for gathering a lot of video data, for recording and also responsible for retrieving distance data and receiving communication data is going to serve as an introduction to the 1000–1200 series devices and systems. This introduction is meant to accomplish two things: first, to show how these automated devices in this application will evolve in their usage with this total technology invention, and second, to give a collage description of how the devices will all interface to achieve the stated purposes of the invention and the full potential of these new innovations. This is by no means a minimal effort. It will be very descriptive and easy for one skilled in the various arts to see that the interfacing of these C.O.T.S. systems are well with in the grasp of the invention's technology and its capability and design to develop these systems commercially.

The 909 has an inexpensive camera, 910 which will be continually running, while the car is in motion. There is also auto run software to operate the camera when the vehicle is in a parked mode which will be detailed later ("Spider Eyes"). However, normal monitoring software in the invention's computer will pick up input from the distance sensors part #911 and direct external cameras to snap picture of impending contact and record data that is valued by the inventions software (application specific for a crash or traffic altercation, etc.). The computer will have certain powers to discriminate on the storage of records to save space as defined by application specific software. It will also imprint on any valued record the video camera ID location F_R_B_L_ which will identify the recorded view from the front, right side, back, and left side respectively thereby displaying on the video record the moment of impact and any other vehicle image as well as the angle of impact. There is also another video or digital camera system detailed in earlier related applications with only one roof mounted camera location. This drawing shows four locations for the 909 sensor array system, however not this many cameras are necessary at first or ever. FIG. 1 is descriptive of the views not the specific camera locations, however, permanent distance sensors, and the short range communication link or police targets 913 and interactive highway communication or combined antenna systems 912 also have fixed mounted locations.

For example, one modality needs only one standard (monitor or Cp) camera to be mounted on the roof (mentioned earlier). This camera is placed in an aerodynamic one-way transparent but stealthfully concealed dome, which allows it to rotate invisibly on a position plate outfitted with a contact arm that rides on an accessible variable resistor coil's windings to sense different current levels or on a sensing disk that will send a different digital electric signal that the control computer can delineate as a specific camera position. The first design is analog but the second is a digital system that can do this function as well. The computer then correlates the signal sent as a set degree of vehicle view where the camera is pointed to by comparing the distance sensors electrical signals showing the closest object and fastest moving object approaching the vehicle, which are optionally prioritized by a compare list in the application specific computer software for, e.g., auto altercations, etc.

The computer then electrically operates by servo motors the camera to view this incident while recording the degree angle of impending contact. 0 angle being relative to the vehicle which will always be dead ahead or pointing to the front, perpendicular right 90 degrees, directly behind 180, and directly left 270 degrees as reference. Other reference angles may also be used.

As mentioned earlier, this data is processed through a compare list function in the TRAC and MASMP software from the position disks electrical signal as it correlates to increments of a full 360 degree circle sending different electrical signals (levels of voltage or digital pulses) as it is guided by the distance sensor signal and compared by the computer software. The more sophisticated the computer, the longer the software compare list and the more discriminatory and efficient the camera angle views and the speed they are run. The computer will record, optionally, in snapshot mode to save storage space or record in real time video movement with the computer's software determining which mode is required for the record and/or by the capability of the system on-board. Of course, recorded impacts will be prioritized by any software as reported by crash deployed protection devices or specific sensors for surveillance for the purpose to best record as long as possible all the contacts and preserve them in the inventions protected storage area, all managed by TRAC software.

The invention will employ the C.O.T.S. devices presently available, i.e., the many automated camera systems, and computer monitoring programs used for surveillance and seek to incorporate and interface with them and then consolidate and sophisticate these systems as this inventions unique use and function for these devices are developed into the most efficient and inexpensive system for the public. Also the invention will seek to combine the emergency 911 system through its telecommunications and police radio frequency companies like LoJack, On Star, and all the other supply line law enforcement suppliers with their electronic components into using the protected containment and unique interfaces to organize and combine, as well as create a mobile vehicle platform that can fully service the public without over duplicating functions and creating more unnecessary equipment cost for the providers, servers, and the individual public.

These records will be maintained until they are removed or downloaded by the proper authorization (part of TRAC protocol) and will trip a trouble code to show their presence in the PCM module or in any other appropriate control circuitry onboard and energize a light on the drivers instrument panel as well as either energize a small colored light in the exterior license plate areas and/or ultimately send a short range RF signal that is received by area police receiving nodes or interactive highway systems that might be called to respond by sending services to an accident scene or provide law enforcement. The RF signal (possibly a Lojack device or cell modem dialer) to a 911 node or non emergency police phone node a function determined by the invention software determining impact or reason for the transmission. Any communication will also give the vehicles electronic serial number modulated with it, i.e., same as a VIN # all vehicles are given through government guidelines and correlates to any specific vehicle storing possibly related records. This signal could also be retrieved by any interactive highway system or off-board monitoring service that can store for the authorities in a buffer for later review if more information is required to analyze an incident, then clear the vehicle TC (trouble code) with the information saved either in a remote location or physically recovered in a portable data storage system, all managed by the TRAC software, programs and protocols. The 1000 series on-board communications and interfaces will have a section that completely describes the racking or stacking of transmitting and receiving devices along with the refined PFN product development that combines a universal amplifying system, as well as, a combined antenna system to consolidate, conceal and save space. However once again the C.O.T.S. systems will also be described and how they will be interface and connected at varying degrees and diversity which is an advantage in the C.O.T.S. modalities, but normally means a trade off for space and time of use for these assorted devices. C.O.T.S. systems are also good for building a vehicle or machine system incrementally for specialty needs, which in some cases might be the correct choice economically and especially for retrofitting older equipment.

1100 series is basically the combination of the smart car devices for automated and remote control of a vehicle to interface with and communicate with other vehicles and the interactive highway's. The vehicles will be able to communicate with the Interactive highway control center through the specially protected and regulated PFN's or areas which will house at least some form of recording equipment and monitoring equipment to make all these automated devices and control devices as accountable as any driver must be for any control actions, when either any onboard and off-board control devices perform, automated vehicular control. Because this is ever so important as humanity computerizes its vehicular traffic patterns and controls that movement through these computer systems and remote control devices to achieve fully automated robotics travel as detailed in FIGS. 27 and 28 of this application as well as all the related patent applications.

With the introduction for the 1100 transportation and 1200 Public service Net or Web system to describe the 910 on-board camera system and its alternative public functions and uses, the present invention can call 911 automatically, when the vehicle has been in an accident and notify the 911 system of its location and the vehicle speed that the car was going, when it had the accident. The invention has this capability as well and it has always maintained it is capable of reporting and recording vehicle function in the event of an accident as well as preserve an on the vehicle record or report this data to preserve a record off-board though any provider and/or server system desired or authorized as a solo system or as a gateway to larger networks. This has always been an integral part of the earlier Black box system as has been described in U.S. Provisional application No. 60/032, 217. Where the 911 system has been discussed as part of the public net work that would be involved in the black box and billing box vehicle units that were designed to interface and network with these commercial public servers and government provider systems. In PCT/US99/00919 and U.S. Provisional application No. 60/122,108, these companies and agencies are detailed as part of the worldwide web to handle the accountable PFN data as servers and providers for remote-control and monitoring purposes, both for individual and private applications and also for gross commercial and mass or public monitoring and control by consensus through the public provided web pages as detailed in all the related applications. All of these functions will be managed by TRAC software.

A moment will be taken presently to describe more fully the law enforcement section of the 1200 series systems, which is a network this technology calls (SPIDER EYES). This is one of the areas that will be termed a provider area, because it will be providing services for and to the public directly controlled by the government with duly appointed and/or elected agents to work collaboratively with the public to improve public safety. Throughout this technology an effort has been made to define the term "provider" as more than just a commercial service. It may well be a commercial server that provides a public service link up or interface or acts as a server for a public safety service, however, when this is done as a public safety service it should be recognized as such by society and exempt from tax and even remunerated for any operational cost by the community. This opens the door for these presently expensive communications system and commercial companies to provide highly specialized and regulated contract monitoring systems to defray the total consumer and citizen cost to provide greater public safety and remote control services. All these commercial support provider services should be commercialized at the very least like utility companies so they have to answer to the public's concerns, through periodic reviews and public board meetings or forums. These contract providers would have to be bonded licensed, and be able to meet any needs to track communications and machine messaging to maintain accountability in reporting and recording any and all transmissions (like through TRAC system software), and there would be bidding for any specific area that limits or has limits on how it can process its emergency communications (e.g., 911, etc.) so that the qualified commercial providers would have a fair and equal chance at the business. The TRAC software provides for a federal standard, which is termed FACT, Federal Authorization Control Technology.

There can be coordinated and licensed commercial servers that can supplement and expedite many services for the populous and aid in keeping government cost down and developing and improving the technologies. However, when they are handling legally sensitive and/or personal data they have to do it according to the laws of the country and any prescribed rules or regulation of the jurisdiction and/or combined jurisdictions they are being operated in. (This is a given, but an important public accountability issue.) The invention seeks to make accountable these technical developments by addressing science, technology and society as the invention's full scope and nature, as well as, deliver invented and innovative devices that can achieve this automation responsibly and accountably for humanity and be equally responsible to the earth's environment that supports humanity.

These on-board recordings and redundant reporting start in the vehicle along with the devices to communicate the data, whether they are in the vehicle as a transceiving device or transmitter and/or part of a physical or close in scanning tool invented especially for this purpose to recover the record, e.g., the invention seeks to construct with other C.O.T.S. technologies already commercially available in this field a hand held device for the police that combines radar, a close range vehicle remote control communication device, and a record scan device, that will send its data back to the vehicle cruiser computer via corn port or protected transmission. These could be infrared corn ports for quick transfer and all these system options are detailed in PCT/US97/21516 and PCT/US99/00919. Also, the information could be gathered as described initially when a vehicle has an activated record ready to be reported and/or retrieved it would energize the record trip light and flag the trouble code mentioned above. This record along with the video recording will also have audio recordings inside and outside the cabin on separate tracks that are dated and give the time as well as the geographic location of their tripped state in a statement message. There will be many convenient data retrieval devices as part of the invention ability to develop new commercial enterprises and services. One such new enterprise will be certified retrieval and data transfer stations or receptacles that will be able to transfer the data to law enforcement, whereever law enforcement is unable to retrieve it or adequately store it. This will also be wirelessly reported to authorized service providers through TRAC and FACT, to be stored in mass data facilities.

1100–1200 Spider Eyes and Green Eyes programs are to be responsible and respectable public safety programs that will have great data collection capability and remote control in most all life situations. So it will be governed with the strictest rules and regulations that respect individual's right to privacy. (The highest standards of professionalism a necessity at the very least). In fact, this technology will work very diligently to help insure that the strictest penalties are in place and readily applied for those who abuse these systems and the personal rights of the individual. This is an absolute necessity for this great data collection technology to serve humanity in a democratic fashion and to maintain the most important elements of life in America, which is maximum human freedom, liberty and dignity, while providing the greatest individual public safety ever known to man. This can be done with respect, responsibility and a mature understanding of real freedom. Then this technology and all the other great data collecting technologies could truly serve humanity and possibly reduce the chance for misuse for selfish reasons. So much time is given here not only to how the technology can be built but also how it can be responsibly used.

Now, to return to the retrieval of Traffic Data or Incident crime recorded data as determined by application specific PFN software detailed in all the other related applications. To make the recovery of this data convenient for the public there will be responsibly licensed persons or commercial business, i.e., notary of the public. Most dealerships, banks, or law offices have such people in there employ. And these devices should be in there charge for this purpose or under their direction and responsibility as they have to take an oath to perform their functions in a legal manner as prescribed and licensed by the state. Other such professions that are charged by the public such as the judicial system also take oaths and could offer this commercial service, i.e., law offices can set up retrieval scan devices and forward them on to the proper law enforcement data storage centers through standard telephone data nodes in their area. Licensed insurance agents and companies could also review them. This could be done to serve a dual purpose for the insurance companies. One for adjusting rates for driver performance all within the scope of commercial accountability for the invention. And two to help lower government cost in reviewing these records for other criminal activities. So it can be earmarked for further consideration by law enforcement. These records could be filed in the same manner that the electronic tax filing is done today, where they are stored on mass data cassette like Sony Peta Systems which are described in PCT/US99/00919, and further detailed as Incident base reporting for the Justice Department.

More ways to achieve easy retrieval of such information including automated retrieval scanning machines at service stations that are connected to standard telephone land lines which transfer it to law enforcement nodes (local police, state, or the UCR, FBI and/or any instantaneous retrieval of the record reporting through cellular phone systems and all similar technologies directly from the vehicle as has been continually referenced and completely described in all of the applications. Also commercial server industries like, i.e., banks and credit card companies that want to offer these services. When remotely transmitted by wire or wireless RF equipment or telephony technology TRAC software, FACT will encryp the data.

In direct retrieval modalities, the data would be prioritized by a screening process in the TRAC vehicle software as to if it required an emergency response or if it was to be transferred over the non emergency telephone node for law enforcement review where the off-board TRAC system would process it through its automated comparing soft ware which will look for, three significant components, location, time, and the numerical characters that will comprise earth coordinates from any onboard locating device, i.e., GPS System. These latitude and longitude and date and time coordinates will be easy to run in a quick mathematical compare list algorithm software program in a gateway, or central computer or from any network data running or stored for computer access. Computers sharing this specific police report data base and/or DMV data base will be able to readily respond with warrants not only on tags and vin numbers but also give a registry of electrical serial numbers of equipment operating on-board any piece of equipment listing its command path. This will provide greater indentity information and less chance for undetected unauthorized use of vehicle and equipment. These other alpha-numeric number will be the electronic SN's and/or vehicle Fed VIN ID number of the recording vehicle. Ultimately the computers on-board a piece of equipment will synchronize its on-board clock to the time zone it is in geographically if this proves advantageous in a legal setting where a vehicle has recorded an incident in question and it has crossed a time zone in that process. The Clock updates are easily provided by any of the GPS systems on-board as well as any of the other cell phone and locating programs. Another option is the Zulu time system for all around the world. However, at this time it is important to point out that this new system HAS TO BE 2000 YEAR COMPLIANT—MILLENNIUM AT LEAST.

In summary, this application specific software would search for a recorded location that coincides with a reported crime and/or traffic altercations under investigation. The second search would be to match the date and time to the first location match from the stored law enforcement reports in the database. All this matching data would be stored somewhere in a law enforcement file or buffer or readily available mass data phone node connection which is automatically dialed if there is a high correlation flag on these factors for a prescribed period of time or forever if it witnessed or evidenced any place that was considered significant to any reported unsolved crime or capital offense. Or till the responsibly charged law enforcement individuals deemed there is no further need to preserve a record.

Once again, the recovery of this information for the law enforcement officer could be immediate and ultimately would be combined in one set of devices, i.e, the short range transmitters, remote control device combined with a radar system. Then this innovation could stop and detain a suspect vehicle while retrieving any tripped records on that vehicle and with the speed of electricity send all this data to the officers cruiser computer screen and communicate the same data back to law enforcement's data base monitoring the stop. The officer could also store this data in the cruiser's computer recording storage file system to aid in filing reports taken from the cruiser's RAM or hard drive when the shift was over. By downloading on a daily event disk along with the officers comments, this data would be downloaded at the end of the vehicles daily use or as its daily fluid checks and safety equipment checks were being performed. The officer can also bring up the file on the law enforcement's data base as it was sent instantaneously. However, to do any of these transfers or processing or to even view any record on file in any stage and/or location of this system a badge number or special ID number must be given and software approved which will be recorded as to who processed it or accessed it or simply viewed the file and from what organization along with when and at what terminal during any move or copy transfer process. This will be logged as part of its electronic paths and held in a header or footer statement. This TRAC and FACT software technology is a necessity for these records. This will be done in part to secure data in as pristine and accountable state for legal use and also for accountability for individual privacy. The goal is total accountability and quick authorized access with individual privacy maximally respected and protected. This system could either be a part of the ever growing computer system that already exists in many computerized cruisers. And this will be the first deliberate commercialization of the invention to marry these law enforcement innovative tools to the commercial companies offering technology in the law enforcement area presently.

The 1100 and 1200 series systems are not dealt with in this application because they involve the processing of data with off-board systems, and are covered in PCT/US99/00919. However, the invention has as a goal throughout all these technology applications and innovations to look for companies like Lojack, OnStar and any of the cellular phone and land based telecommunication companies, e.g., security monitoring companies, as well as, any computer companies that can work well in these areas to develop this technology in the most efficient manner to limit any needless duplication for the 1100 and 1200 systems while fulfilling and creating an integrated machine messaging set of networks with varied levels of data. The law enforcement system coupled locally and nationally will have access to the highest levels of gathered data to evaluate. They will include the UCR, IBRS, FBI, Justice Dept., etc., and local police agencies. Then this same data will be minimally screened and disseminated to provide public safety information in the public media and web pages on the WWW. The crime event databases will be interfaced with the emergency 911 phone system along with all the police band RF systems, i.e., Lojack OnStar and any others. TRAC and FACT software encryptions, protocols and interfaces will be determined by all of the above in a standard effort.

These innovative law enforcement tools provide real-time data through secure accountable devices, termed PFNs, to better organize the physical electrical components and specific technology to accomplish these specific and appropriate tasks, i.e, communication systems, or special RF frequencies needed, and all other necessary equipment onboard to provide the services for all the commercial markets available and detailed in these applications for this level of communication, monitoring and aggressive remote and automated control. The inventions focus in the vehicle is to create PFN, an individual consolidated data gathering and primary processing center as a mobile platform with the added ability to receive short range transmitted data and serve as a repeater station to report through the telecommunications systems on-board in real time, managed by TRAC software. This will be part the interactive highway and the 1200 spider eyes web. The individual driver with this primary communication and data processing system on-board their vehicle will be unencumbered and if deemed desirable even unaware of any particular automated social functions being performed by the SPIDER EYES program. This capability will be easily provided because all the devices will be utilized to create a workable and operate the interactive highways planned for, and the accountable PFN with its sensors and cameras is ideal to complete the "Spider Eyes program". This recovered PFN data at the highest levels is to be considered high and medium security protocols, when it is recovered by governing agencies, etc., through FACT, for discrimination and dissemination. But when the data is sanctioned for public use and/or when it is sold for presentation on public media devices such as, TV, Cable, the WEB, etc., then it is considered regular everyday security and management data and information and a functions of public news, gathering, which can conceivably be individually negotiated by the owner of the vehicle\machine with the PFN and the a news agency, etc., with any and all the profits and liabilities thereby contained. However, due to the real time coverage capability the driver will be able to provide for TV news coverage, editing protocols will have to be in place for high and medium security reasons, either a time delay system or stop and divert software program and/or editing staff for any data for immediate public presentation will have to be provided prior too utilizing this technology's PFN data. This technology recognizes the need for F.C.C. and other federal regulations on these practices to develop guidelines and FACT, as well as the citizen's right to free speech and their free access to information, along with the driving forces of free enterprise to fuel this technology and economy as the latest Milieu for humanity.

There also will be a logged access path and time records for this use by the public and government on each individual vehicle and thereby there can be an accounting to the private owners when their unit and/or vehicle is serviced or sold by prorating sale tax for example for government use, etc. This way the invention can run software in the vehicle that will prioritize the data and save needless transmission time and storage space. Also recently the 911 system land based lines are being used to notify local residents of a crime incident in their locality by automated dialing to their homes and giving public information as to specific criminal activities in their area or neighborhood, i.e., Fairfax, Va. The invention will seek to create a public service system with cell phone servers and police agencies as detailed through out the related applications. Part of this technology will be to provide reception for these same bulletins through cellular geographic announcements as part of the roam announcement functions in most cellular phones systems today. This will allow the citizen driving to be alert while triggering a preprogrammed response for the camera system to be searching for specific characteristics like an erratic speeding car in the area color and identity characteristics and the receiver section of the PFN to pick up a specific distress radio signal transmissions, etc. And with the most sophisticated equipment, in the PFN computer center to spot a suspect on foot from electronic data received from law enforcement on the individuals physical characteristics (digital snap shot picture by zoom focus with high probability and compare soft ware down loaded and sent to the PFN computer). This will be especially effective through the onboard in the cabin cameras for stolen or unauthorized vehicles, or an electronic signature either artificially sent by RF broadcast attached to the individual as in the case of an escaped or guarded or person, e.g., criminal, child or mentally disoriented individual, etc. Alternatively, the use of sophisticated sensors like the nose that can transduce odors to electrical signal and sense these odors 2000 times greater than that of the human nose may be used. The nose sensor will be on-board all vehicles through this technology at some time in the future for environmental sensing anyway, so it is conceivable that with the proper download software specific odor markers the PFN would be able to add this data to increase the correlation that the correct individual is being identified through all the other PFN sensors and cameras, etc.

All of this data will be sent back in real-time, accompanied with the spotting vehicle location and time so the monitoring system can activate other PFN units in the geographic area to maintain surveillance till the appropriate officials advised and arrive on location if so needed. Also, the system could do the standard function of tracking a vehicle that is jeopardizing public safety so that the automated 911 could alert a geographic area while shutting it down.

Another device innovation, involves the microchip used in Europe to track vehicles that have had their frame or serial numbers removed physically. These chips could be installed by the manufacturer in a number of places on the vehicle and the police scanning tool or device for records would have the proper circuitry to ID the vehicle through these electronic VIN s/n number chips that are factory installed to be confirm by computer stored data as to the identity of the vehicle in an instant. These chips are used to track stolen items in Europe already. This rapid integrity check of VIN numbers can be run through a comparing encrypted software local program to see if the tags, electronic serial number and Vin numbers all match the ones displayed. This would be a guide to further investigate a suspect vehicle. However readily available would be the last known owner as all states record by the vehicle VIN number and tag, and/or assign a chip and VIN for specific circumstances (custom vehicles or off the road equipment) as this is something the states could charge to install for tax, automated tolls, or vehicle and equipment verification and tracking purposes, and check while they monitor the road worthiness of the vehicles they are registering, especially if any contact has been detected and/or any accident safety equipment has been deployed which might have tripped a trouble code to retrieve PFN data as evidence of authorized information.

SPIDER EYES crime watch will be described with another modality of onboard video systems in the experimental state but spider eyes can be used with the earlier described camera system. This function involves using the vehicle as a viewing station, and a repeater device for monitoring. When in a parked state, the vehicle sensors responsible for tampering if they are triggered by an accident contact and/or from any anti theft sensor set off; the cameras will pass through a surveillance mode and record any object and/or activate motion detected by the sensors. The computer will fix the cameras to the moving object first and second the closest objects. Most all the devices exist today as C.O.T.S. including the digital recording devices that will work in the laptop. The 1000 series devices will describe the software and hardware to combine these devices and the varied computers, i.e, 945 series and 950 series that will be on-board and interfaced, and how these easy to connect C.O.T.S. systems will in a very short time be at a level that much of the monitoring and control devices today have taken years to get to. 956 is a global positioning device, there are many different types with scores of different capabilities and in the detailing of theses C.O.T.S. products the 956–957 series of numbers will be assigned as to whether they have accompanying OEM soft ware that can be run through any of the onboard computers 945 and up or any personal computers, or future OEM consolidated equipment. Alternatively, they require report back transmission and off-board computers and software to process there satellite received coordinates and provide information back to the vehicle and/or to track the vehicle. Once again the connections and interfacing for these completed operations will be fully described and detailed in the 1000 series section.

Software comparison priority system. This is a simple basic verbal outlined description of the logic that the system would operate off of for a law enforcement retrieval and comparison investigation tool. This is covered in greater detail in PCT/US99/00919.

The first flag a high correlation rating geographically for an incident area under investigation. Go to list I=unlawful incidents locator block of coordinates—then check t=the software would compare the time factor the vehicle record triggered at. Go to list tip=tip would first check time to the time frame of the location flag and, then flag in sequence other known time and location coordinates that might have investigation importance. If the appropriate conditions to review a record were met regarding an ongoing investigation, the file would be downloaded and reviewed. All files would be stored for a reasonable time to allow review for missing persons and/or crimes that are not always reported in a timely fashion. Also for the benefit of insurance companies all impact triggered recordings would be reviewable to lower and/or increase rates as to obvious driver handling. This process could allow for closer review of the recordings to report any other criminal activity that has been recorded and gone unreported to the proper authorities. This will help from overtaxing the law enforcement agencies. However, for this to happen the reviewers should be sworn in prior to taking this job not to relate any information at anytime unless in the proper legal setting and done through the advisement of their legal department. Big insurance companies should have a legal staff to oversee this process and the stiffest of penalties should be in place for any unlawful invasion of privacy, with all unrelated and inconsequential activities erased and/or destroyed immediately.

The above-mentioned software could be run in the insurance companies as they are already linked with most DMV departments in most states and with the municipalities that are sharing data bases between departments. This data exchange with law enforcement would be relatively easy to arrange.

This has been a good law enforcement practice the sharing of information so long as it is done in an accountable manner by responsible and socially mature individuals. This is all considered part of the 1200 spider eyes innovation and will develop servers and providers in a commercial business that serve with accountability for all of societies actions and interactions with its machines vehicles and equipment. This invention develops telecommunication services, insurance services, law enforcement communications and computers into an accountable network database that can report and control events in real time to better protect and serve the public.

This has only been a brief description of the 1200 series network for recording and reporting and accounting for the use of equipment, machines, and vehicles and that impact on humanity and the environment. The 1200 network systems: Green eyes, Spider Eyes, Helping Hand, and Fair Play are all described in PCT/US99/00919 and related applications.

The other camera modality that can be used with the 1200 spider eyes system and requires a little more description. There is a special mobile mount system that allows the 909 camera and sensor array system to roam to different locations to view the side wall of the wheel and wheel well areas and also to wide focus out at road surfaces and edge. This is controlled through monitoring application specific guidance software for this system. Along with all of the video or visual camera systems running on-board to pick up and record physical data (which is transduced to an analog and/or digital signal for software comparisons and/or algorithms) with other additional guidance information. Also, the off-board transmissions or data links to alert the PFN or control center computer of specific upcoming environmental and/or road conditions or hazards so that the vehicle's performance may be altered to make the appropriate guidance and speed option adjustment for the interactive highway. These will include GPS, travel advisories automated bulletins and warning systems. The control center in the PFN might be OEM computer circuits or they may be run by the inventions own preprogrammed guidance software, PAGSSS and MASMP, and hardware. GM, Lockheed Martin, other large corporations and Department of Defense (D.O.D.) in San Diego were working on a seven mile stretch of interactive highway. It is another goal of this technology to join this effort, by providing social accountability, through the TRAC software programs, to this automated personal travel as well as, physical tramming or training of vehicles (later described) to failsafe some of the existing systems and also offer many other automated enhancements to achieve responsible and aggressive remote and automated control. This is a major reason for the development of these systems.

The 909 roaming system has two modalities. The first is a pre-formed track system with a flat slotted flexible tape and motorized gear inside it that drives a trolley or truck mounted 909 through the reversing of polarity of the electric motor in either direction. As the camera sensor array is in motion the camera is angled in a protected cleaning wiper strip that accompanies the guide track so that the camera will always be deployed with a clean clear view and in the proper position. This flat belt drive system is the same as the C.O.T.S. automatic seat belt application used in some Japanese cars and domestic cars like the 93 ford Tempo today, when the door is closed and the belt is drawn up the door frame to be in the appropriate shoulder restraint position. For example, Toyota cars of the late 80's have employed such a system. Of course, there are many ways this mobility can be achieve for the roaming of the camera, e.g., another such modality for this will also be described. Still using a track system, a truck or trolley has its own motor and is energized through the flex tension wire input that will either be a part of, or impregnated in, the plastic guided flat flex tape drive thus timing the two to travel without having wire and drive entanglements jamming up their mobility. Also, the pre-formed track could be outfitted with segregated contact strips that a brush paw system could make contact with, or the electrical wires needed to service would be pre-tensed in the form of a molded coiled much like a flexible phone cord which would expand and contract with the movement of the 909 truck on the tape drive. Another service line modality will be timed reels on the drive motor side of the flex tape and guide fasteners on the tape drive will also work. Returning to the focus of this application to deal only with the automated personal, public, and commercial vehicle and machine devices, but keeping in mind in doing so it has proven necessary to describe their responsible use and potential goals.

908 in FIG. 1 is a transmission speed sensor and already mentioned 903 the Ignition control module and an important OEM component that the PCM circuitry will be interfaced with to either secure the ignition system when the automobile is stopped or to augment the timing to effect the smoothest shutdown to reduce any improper detonation of the cylinders of the traditional internal combustion power plant. This may be necessary in some engines to balance the fuel to air mixture in some of these innovative systems to slow stop and secure the vehicle as well as to ultimately kill any ignition. Also, the ignition module can alternatively be controlled though any of the engine timing sensors and/or pickups, i.e., 905, 906, 907, 904 and/or the PCM power train control module 920 as is described in these applications. All of this is accomplished through the 1000 series trickster circuits or by one of PFN computers and software programs designed to deceive the OEM circuits if so desired and as is detailed. 915 is the door switch. 14A is a seat switch that can tell if it is occupied. 914 is the seat belt switch that will indicate electrically the belt is home in the secured coupled position.

All or some of these in a series circuit this invention will use to create a dead man seat switch system first simply to determine if a driver is present in a seat behind the wheel. This is done, because, carjackers try to leave an unmanned running vehicle to make an escape. This unmanned state will be a software condition or the simple series safety switch signal for the emergency stop and secure function for the vehicle. It will set the emergency brake when a driver leaves the car and kill the cars ability to crank or run in a number of ways. This will help remedy the accidents from the unsecured vehicle of today where children can release a brake and/or shift a gear lever when the vehicle is left unattended and/or in an idling state. The inventions secured state for a no driver situation. And ultimately this system will be combined with diagnostic driver sensors and software to determine the capability of a driver.

The 1000 series circuits purpose is to create the most inexpensive universal linking of unrelated processor units and microprocessors, IC circuits and computer circuits and/or any logic circuits and not only with one another, but also with traditional electrical circuitry. And/or any and all analog circuits along with any confining soft ware and/or digital considerations even for any support circuitry to allow for the quick combining, cohabitation, and interfacing of all these C.O.T.S. systems and/or any manufactured systems and devices that have been specifically designed and/or by accident of incidence made to be and/or deliberately designed to be. The universal combining of machine technology and communication technology in an accountable way is another major goal of this innovative technology. To be a standard and a cohesive link in this automated robotics development is the prime reason for the creation of the 1000 series interface systems and circuits.

To complete this purpose the 1000 series parts and devices will comprise, e.g., connectors of all types as detailed in PCTUS99/00919, and all of the other applications innovatively configured interfaces and different devices. Communication links and/or comports not requiring hardwiring like infrared technology, simple electric circuits that can be instructed to send a specific signal to another software controlled device to allow for a quick interfacing where there is a software incompatibility and/or none commercially available, i.e., the trickster circuits 1001-1002-1002A-1003. Also in the 1000 series circuits is the many innovative sensing circuit devices, like the one used in the first embodiment and prototype for the first application to sense the vibrators activation in the pager.

FIG. 2A

The 940 "CHAT BOX" (COMPUTER HARDWARE AND TELECOMMUNICATIONS)

This system is disclosed in PCT/US97/21516's prototype control circuit system to activate a vehicle's peripheral control devices through one-way remote control paging. This circuit displays the 940 single Stamp II computer to accompany drawing three software commands and that is why it is the second drawing and not back in the other 900 series drawings. This technology is the first control circuits from the first patent application and is still part of the one-way remote and combined automated preprogrammed systems that can perform inexpensive remote control commands.

Figure 2A:
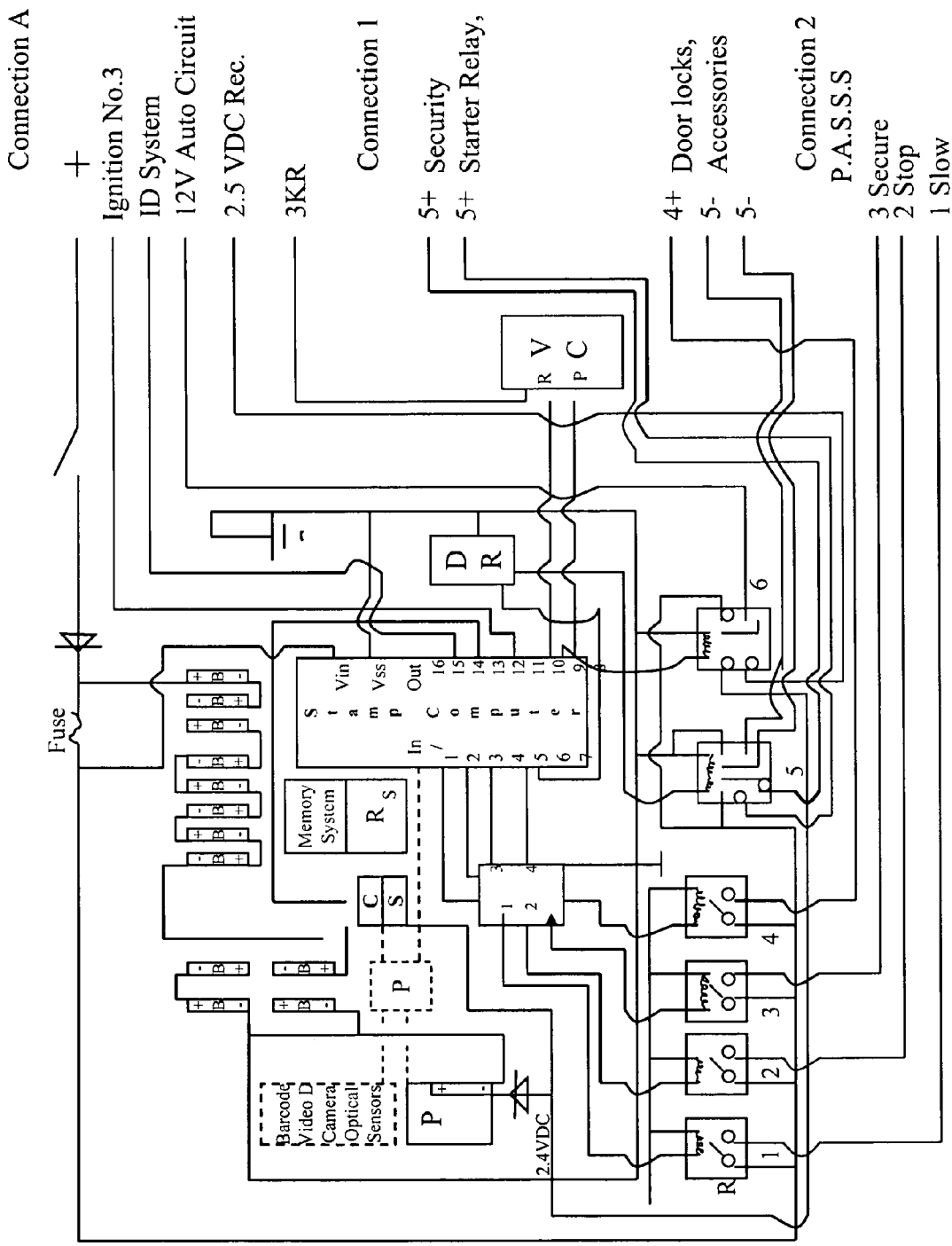
FIG. 2A is an electrical description for the first prototype of the standard pager activated remote control system. Control Hardware And Telecommunications (CHAT) box system.

Presently displayed and described as FIG. 2A is a complete illustration of a one-way communication and control system with prerecorded voice announcement and recording capability showing the non invasive current sensing of the vibrator circuit of the standard pager as described in PCT/US97/21516 and an accompanying description for the prototype and/or demo unit. Also, in dotted lines are shown for the optical sensing and non-invasive system detailed as the second option and embodiment to read the alpha numeric message data displayed by the pager. The parts to read the LCD displays are produced by Texas instruments and they are liner pixel sensing arrays, that transduce the specific application messaging into an electrical signal (some analog but mostly digital). Then this data signal is routed by hardwire to an input pin on a mini computer of the PFN where a compare command is accomplished by a preprogrammed software list compiled of application specific signals that will determine if a signal match is appropriate and correct enough and then perform the preprogrammed task assigned to the specific signal. There has been a great deal of improvement in the pixel sensing arrays and even better reading devices for bar code reading. Many of these devices are and will be suitable with the only limiting requirements being space and some power support circuits. The 125 pixel array sensor by Texas Instrument has been the one being experimented with presently.

Because the numbering of the drawing is so difficult to do with all the lines in the schematic, only the initial devices will be described and referenced as to their commercial part numbers and description. The schematic lines and electronic symbols are already self explanatory to anyone skilled in the art and has already been referenced and described thoroughly in the related applications. At the top of the page the 12 little squares labeled B with a + and – at either end are 1.20 volt AA Nicad batteries with 8 in series for a total of 9.6 volts and the remaining 4 to the left are 2 sets of 2 AA Nicads in series of 2.40 volts that are in a parallel circuit which in turn has the first 8 batteries added to its 2.40 volts to make 12 volts for standard automobile voltage functions. This is an emergency power for the PFN or the secure stop box prototypes if the vehicle power source is compromised on the host piece of equipment. This emergency power source would be different but appropriate for whatever piece of equipment the PFN was placed on as well as be able to support any internal PFN current requirements. So it could even provide AC current and in this case the circuit might well contain an inverter for the power source to energize AC peripherals and/or any necessary transformers as needed and/or a rectifying bridge for charging of any DC emergency storage batteries.

However, the 2 sets of 2 in parallel equaling 2.4 volts have a diode that reduces their voltage when it is tapped off the battery packs to 1.6–1.9 vdc, which goes to a standard current sensing 8 pin chip made by Analog Devices PN/AD626 and is illustrated as CS in FIG. 2A. From here power is served to the battery peg system to allow for the non-invasive immediate coupling of the standard pager to the chat box control circuitry for sensing pager activation, as well as, supply continual power to the pager from this emergency power supply that is continually recharged as has been described in the first application. Also, there are 3 voltage regulators one is employed to stabilize power to the computer and protect it from vehicle power surges. The other two are used to convert the 12 volts of the system down to 5 volts to support TTL logic functions and to interface with the computer. The 12 vdc regulator Radio Shack number is 276-1771A and the two 5 vdc regulator # is Radio Shack 276-1770A.

The following will be a verbal description of the software command string in FIG. 3, as well as how the electronic parts that work in the program. For this reason only, the software command string will be displayed for FIG. 3 with this verbal description serving both figures. So when the current sensing chip detects the pagers activated vibrator motor (by current draw) for the first time it sends a logic high signal to, for example, the 14th pin on the Parallax Stamp II computer that reads this pin to see if it stays high for at least 3.5 seconds, for example. 3.5 seconds constitutes a page received and not just a reminder activation which is only 2 seconds. If pin 14 is energized for 3.5 seconds one of two preprogrammed sets of responses will takes place. If the car is on it goes into shutdown mode. It detects the car on condition by the presence of the ignition voltage of 12 volts on input pin 12 on the stamp computer. If there is no power on pin 12 it will first remotely start the car and apply all stop and secure devices.

On the second vibration (new incoming call) the motor is turned off, and the doors are unlocked. At this point in this preprogrammed response the proper pin code or other such security check must be completed or the vehicle will not start run or release any of its stop secure lock down devices (this would logic high input pin 15). Now if pin 12 is hot with ignition current the preprogram run sequence will be: First vibration (incoming call) will initiate all slow down functions, e.g., to disengage all acceleration capacity through any of the modalities described through out these related applications, turn on hazard lights and parking lights with any special flasher, e.g. white strobe, and information bar, as well as, any alarms buzzers and sirens. A cabin recorder is started to record the voices in the car and a prerecorded audio chip device message is given to the driver, notifying them that: "The car is in an emergency shutdown mode and that they are to pull to the side of the road immediately." They are also informed that this event is being recorded. Any number and/or types of recording devices with any predetermined function or purpose, e.g., audio video, vehicle data, i.e. speed, throttle position, etc. can be activated at this point. If an authorized driver has had this activated through some error they can punch in their correct pin code and the invention will reset to stay to the ready run state and monitor for an incoming signal (first call in this scenario). For accountability purposes in these simple prototypes a Sony Memory stick or flash memory will record any pertinent vehicle and snapshot video and when used will also record audio incident input.

At the first vibration or page, a countdown is started that lasts for 37 seconds and the braking system is applied in a gradual manner (there are also other parallel systems described with in these applications that would and/or could be activated at this point and are detailed in their separate descriptions. The last phase of turning off the ignition or deactivating the power plant in any of the numerous modalities described in the applications could be another timed deactivation from preprogrammed software in the computer or it could wait for a second page to complete the stop and secure detainment. Once again the program would leave the car in this detained and deactivated state till the proper secrete signal was given either on location or remotely as is described in other embodiments and modalities. The modality chosen for the prototypes and demos thus far involve the emergency brake application controlled and powered by the seat control devices, e.g., motors, direct square key shaft and/or cable drives and strip gear channel and horizontal gear drives. And for the acceleration eliminator the same motor and cable drive system with a gear nut seat elevator adjuster as an accelerator pedal stop. It should be noted that it is very easy to motorize the emergency brake pedal ratchet system itself and this modality of applying the emergency brake is the chosen present modality.

The parallax Stamp II computer was chosen and not merely a micro controller and EPROM because of its mathematical capability and easy to adjust p-basic programming which can support a multitude of applications. While this is not going to be the ultimate computer performing onboard vehicle functions in the sophisticated PFNs for one and two-way communication capabilities, it is a worthy C.O.T.S. product to support the first and second embodiments through this type of development, for the first application and all but the steering programs and complex video devices and preprogrammed functions in this application. The stamp II can support the keypad functions, as well as, generate telephone dial out tones to more easy interface with some less capable cellular and land based phone technologies for stationary machinery by only having to turn on, and initiate the transmit and/or send function to be externally commanded through the preprogrammed software placed into the Stamp II. This allows this simple one-way PFN's to generate the dial tone command strings for remote reporting, while inexpensively and simultaneously controlling simple relays to send preprogrammed digital and/or any data signals back to a remote location through the regular existing phone technology that is on-board the host piece of equipment ideally protected secured and interfaced in the PFN or stop and secure box system. This would support an interface with a cellular or regular phone system and/or data modem to activate their send command. This is essential and the first chosen modality to report back in real time to support any locating function performed by, i.e., either hand held GPS like Magellan, etc. and/or any locating devices, or GPS chips set systems like Phillips, and Motorola and/or a whole device and software systems like Delorme's Street Atlas. Some of these systems have their own software to attach and interface them with computers. These GPS systems that will be interfaced with the inventions second embodiment can also read the GPS display in the same manner as described for optically retrieving data from the pager display in the first application and subsequent filings and/or interfaced through already existing C.O.T.S. software that work with and through any personal computer (laptop, organizer, etc.) and either hook up to a mobile modem and/or hookup through any of the inventions modem interfaces to transmit this interfaced data to provide the geographic coordinates through predetermined electronic data stream, to an already established remote location or gateway, i.e., as have been already described in the first application and further detailed in the related applications. The GPS systems are described and detailed in PCT/US99/00919.

In FIG. 2A, when the software runs it will send a logic high to the 2–4 channel Toshiba Darlington drivers PN/TD62064P/AP from the stamps out put pins 1, 2, 3, 4, 5, 9. The first 4 pins go to the driver chip lettered DR to the left of the stamp computer which activate the relays 1 through 4 by delivering a 12 v ground to the relays that are already energized and wired to the 12 volt+bus lead. When the computer sends a logic high to the DR chip. All these relays are standard C.O.T.S. off the shelf automotive relays SPST either 20 Amp Siemen's PN/A1001-a 303 and/or 30 Amp Radio Shack PN/275-226 and in some cases other 12 vdc computer double pole double throw mini relays sold by Radio Shack Pn\275-249 and/or machine control relays 12 volt DC manufactured by Potter Brumfield Radio Shack PN/275-206 and 275-218. The relay employed is considered for the load it must carry and its physical size as to this purpose. Space is always a second consideration when interfacing C.O.T.S. products as is the electrical capability of each part. The other 2 output pins 5 and 9 that activate relays 5 and 6 go through the DR chip to the right of the stamp II computer and function the same way. Pin 8 output supplies a ground through the right DR chip to the voice chip which activates the in cabin message for this prototype. This can be done directly to the voice chip as shown in the drawing. The voice chip is another standard C.O.T.S. device. These all have all been experimented within the Prototype: Radio Shack PN\276-1325 and 276-1324 but the one presently being used to deliver the cabin announcement is the circuit from a Voice Memo Key Chain Cat. #63-945 which is amplified by a Mark II portable toy music Amplifier #M.A.-55 that also supplies the speaker and the speaker enclosure. The Radio Shack voice activated pocket recorder is Cat #14-1061 and this constitutes the simple RAP box system of the present prototype and proves feasibility of function. All of these voice ICs and amplifier parts are either sold as components at Radio Shack in a number of formats or are already incorporated as the mini memory key ring recorder and the toy Amplifier. Experimentation with all these devices have been used effectively in the prototypes. The Voice Chip Recording chip, also, receives output pin 10 signal from the stamp computer, which recycles the message by giving a momentary ground for this purpose as has been described for #10.

Connection 1, shown to the extreme right center of FIG. 2A, is the output connections for relays 5 and 4 and a negative ground. The activation of relay 5 gives one set of 12 volt lines positive and negative and the deactivation of relay 5 gives another set of positive and negative line, e.g., for different door lock systems and the option to operate a host of automotive ground switch braking circuits, e.g., horn relay and many others. Number 4 relay is a 12 volt line that supplies current to the starter motor solenoid circuit for nine tenths of a second that can crank the motor till the vacuum switch signals the engine is running and opens this circuit. There are many different vacuum switches that are C.O.T.S. that have been employed to do this function but for the prototype, i.e., EGR valve, MAF sensor, etc. This is accomplished by the stamps software merely timing the activation of relay 4 for the nine tenths of a second till the engine is running in the prototype. This is altered to get the proper cranking time in different vehicles in the software program. Also any number of other engine sensors, i.e., oil pressure, i.e., ignition firing etc., can supply data to the invention's control circuits to signify a running engine. All of these systems and/or parts have been described as to how the invention interfaces with them and it is clear and easy for anyone skilled in the art to see that sensing a running engine in all the ways possible are already with in the scope of the invention and to recount all those possibilities would be redundant and unnecessary. Connection 1 also has a ground lead.

Connection 2, represented in FIG. 1, shows relays 1, 2, 3, and a ground. These have already been described and referred to in the program that runs in the computer and will be referred to through out the innovative device circuitry to follow and the program software to follow on the following drawing FIG. 3. However, in short these are the slow down, stop, and secure the vehicle relays, responsible for controlling the automated devices and systems detailed in this application. There is also a ground in this connector and in most cases these connectors have been outfitted with a ground for three reasons, one to bond all device to the same ground and two to cut the noise and or interference. In some cases the ground will be a coaxial configuration for this purpose and thirdly, because, many of the vehicles today are made of non conducting materials. The prototype or first demo unit has used standard phone connectors with 6 contact wires as they were small and readily available C.O.T.S. products. However, many different multi pin connectors would work effectively. Any of these connections along with there wiring should be completely protected and will be when manufactured as detailed in all the related patent applications.

The third connector would normally only have 2 speaker wires, an input battery positive wire, a ground and that's it for the simple prototypes. These protected wires would service a hidden speaker to give the emergency advisement to the cabin, the run tape system to record the audio video equipment functions and actions along with all the external recorded data which would be stored in either the secured secluded and protected confinement of the control center of the black box, secure box, and/or accountability box or billing box, (PFN), i.e., as referenced from the first related application because as mentioned earlier the protection is one of the most important claims of this invention. However, it has always been pointed out that this is the ultimate optimal goal for the invention and more easily achievable through the obvious consolidation of hardware and software systems interfaced for the invention protective encasements (PFN's). However, but for this prototype, the cabin recording as already described is a C.O.T.S. standard pocket recorder that can be voice activated which saves recording space and has been placed in a child's toy guitar amplifier and speaker box to more easy display the varied functions, of the innovations, and devices to create this present C.O.T.S. version of the invention. Also, to make it easy for those investors not skilled in the arts to see its commercial reality in their every day used devices. This will help to commercialize and market the invention, because instead of a lot of up front designing cost it allows manufactures to be brought together through combining their technologies to assemble the invention's new innovative technology which opens more developmental cooperation in these new markets for everyone quickly.

Finally, because the prototype was divided this way for demonstration purposes, there is also a 2.40+voltage that is optionally supplied through connection #3 which is activated when relay 6 a mini 12 volt double pole double throw mini P.C. relay is activated (Radio Shack #275-249A) which turns on this standard pocket recorder to tape all the conversations and sounds during the incident including the activation of the warning message given from the voice chip. The consolidation of these 2 recording devices is an obvious evolution of the invention. Also, a 12 volt service is activated simultaneously when the number 6 relay is activated which amplifies the waning message in the cabin. And once again a ground service accompanies these other wires to the speaker and/or recording box, which has been given the name RAP box for Record And Play System, which is also a popular word as in rapping for commercialization. However the 940s 950s computer controller series rap systems will be evolved into a complete record storage system as has already been stated and consolidated in a protected containment either in the PFN location or in another secluded area. The sole protection of the recording system and/or data storage system even as the only secured and/or secluded and/or protected device on-board is still considered within the nature and scope claim of this invention and technology. Even if it is only a special access area inside the PFN.

Hardware and Telecommunication

System prototype 1st embodiment is adequately described to explain all the circuits connections, innovation and interfaces involved in this application and the one preceding it and to leave no question as to the intent or the capability of the inventions total technology to remotely control peripheral devices and accessories o vehicles or any other piece of equipment. Also, any variation of the basic design of these C.O.T.S. innovation to do the same things is still considered within the nature and scope of the invention especially if it provides accountable memory storage and/or protected encasements. In addition to the circuitry in FIG. 2A is the software program designed for this first prototype of the CHAT box or PFN System. CHAT is a name for control hardware and telecommunication equipment but all PFNs don't utilize telecommunication technology.

The software has been written in this prototype and demo configurations and designed to make quick and easy changes and/or augmentations for the optimal deployment and safe performance of the invention as ongoing continual adjustment have to be made for testing to determine the optimal protocols. All of the functions performed by the PFN stamp II for these embodiments could easily be accomplished by simple truth table switching or transistor to transistor logic or IC processor's and/or electromechanical switching for the most part and just as inexpensively. However, the stamp II was chosen for other reasons that addressed the smooth evolution to the PFN's to more sophisticated control systems. With the PFN incorporating more sophisticated computers systems detailed in PCT/US99/00919 that can and will be more easily interfaced with host machines electrical and/or electronic systems, as well as, any and all already mentioned devices it can interface with first as hardware C.O.T.S. components, e.g., personal computers organizers palmtops minicomputer and of course any and all of the electronic storage devices hard drives, disk drives and flash memory devices, that can be utilized to manage and store application specific data and/or perform versatile computing functions that can network and give more state of the art capability to the vehicle and its occupant in universal plug and play modalities, as well as, support more environmental, commercial and public functions as it is operated Ultimately as OEMs seek for special commercial value savings to serve the public. The OEM manufacturers will want to consolidate hardware and reduce the unnecessary duplication of circuits, components and/or mechanical devices when ever possible and it is the claim of this invention that this is the desired goal of the PFN invention and to be an active part in creating a protected electrical universal interface to support a wide variety of electrical components and devices with simple plug and play interfacing while supporting accountable automated and remote control of vehicles and machines.

FIG. 2B

This figure displays the two main types of PFN's. This drawing has been added in at this point because it gives a better understanding to the reader how the remote control capabilities of this technology are achieved for its automated devices, and how they have been specifically planned for, designed for and how the PFN systems are structured to include any and all other remote control devices by this technology.

Figure 2B:
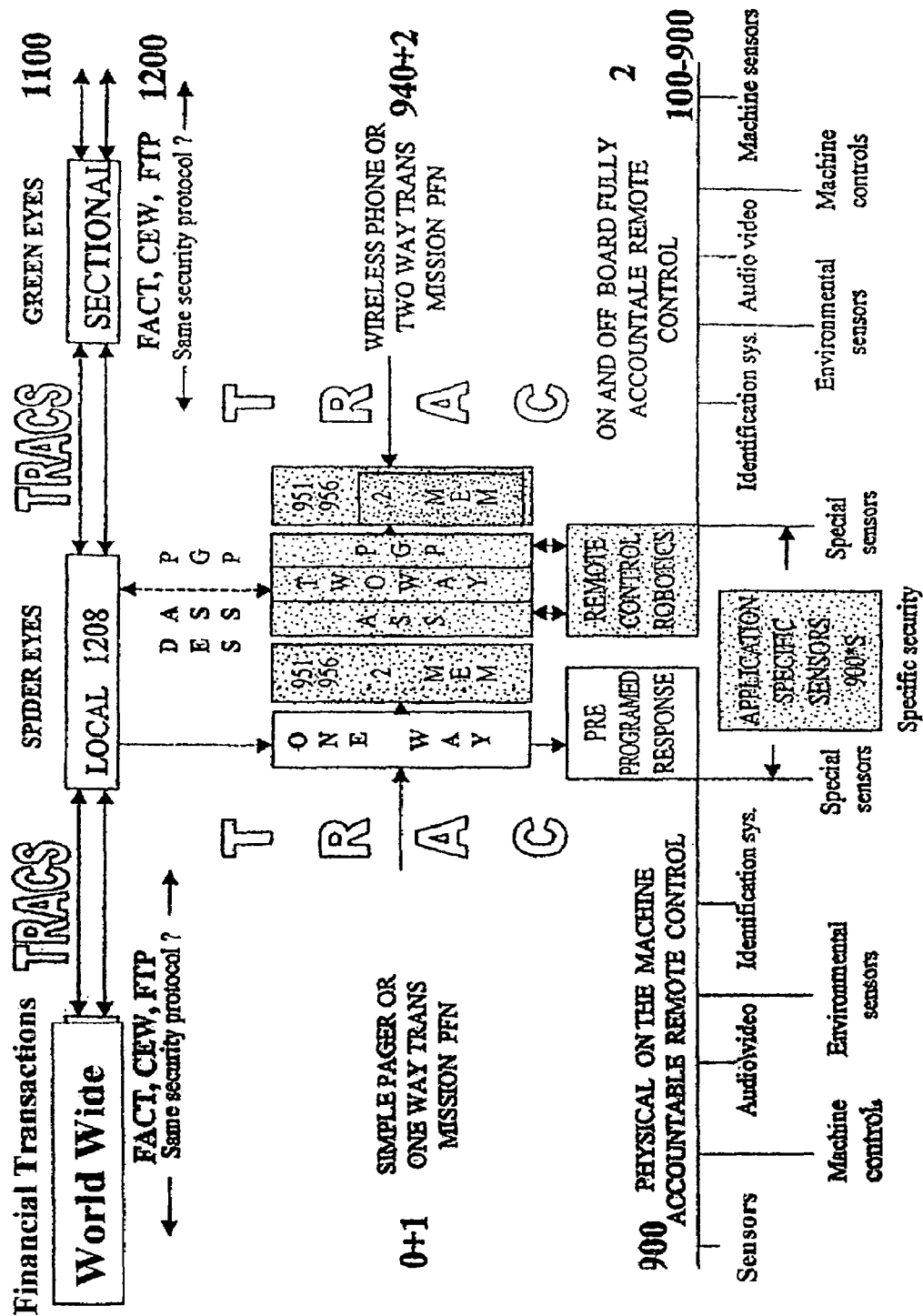
FIG. 2B shows the one-way and two-way PFN prototype categories.

FIG. 2B shows the two basic PFN communication categories which are being developed as prototype. There will be one-way transmission devices and there will be two way transceiver devices with varied peripheral capabilities and protective containments. The drawing also illustrates the monitoring and remote control system and network from the local level to the global level. The figure also shows all the management of peripherals as well as moderate security systems for conditionalizing any two way transmissions.

11–1200 is the monitoring and remote control system network that can be part of any interactive highway or government gateway land line node, commercial server to phone node for a private system or for web access, and any number of servers or providers could be contacted by the PFN to transfer data for remote control, management OD data and the reporting of data for memory storage in at least one remote location. Number 108 representing the off-board PFN data storage. Directly below that is the two dotted lines representing wireless transmissions. The two directional dotted line on the right has the letters ASS on the left side which is an acronym for application specific security and PGP on the right which is an acronym for Pretty Good Protection. PGP is the C.O.T.S. products out today to encrypt a signal so that only the one with the appropriate key would be able to decipher the data. This technology recognizes that for its billing box function to be able to card swipe credit cards special banking encryption systems and verification protocols might well be required and that is the meaning of the ASS application specific security. It is possible that other high security encryption might be required as well (e.g. government and military which might well require hard ware as well as software change). These systems are not detailed in this application, but are considered.

Security system protocols would basically be reserved for the two way transmissions capable PFNs, and any of their remote computer terminals or gateways, including any and all network data storage and access to that data storage. Programs like this technology's spider eyes and green eyes or green watch would utilize protected data protocols to preserve individual privacy, track access and provide data to the public as prescribed by societies laws and via its institutions media, and the inter net and the (WWW). So standards will be set for the handling of sensitive PFN data transfers whether it was removed physically in the one-way capable PFN or the two way communication system that can transmit sensitive data streams in real time.

PGP is the commercial versions of encrypted data. And as explained earlier there is a great number of such systems that can afford reasonably good protection for many security programs. Some of these are just software down loads and can be part of the software in a PFN capable of running a encryption program as well as the software to delineate restricted data from unrestricted data if so desired. Chip sets with imbedded software are another possibility. With both ASS and PGP both ends of the transmission must be equipped to cipher and decipher the encryption key no mater which technology is used and in what form of hardware, hardware embedded software firmware, or solely software added to any existing hardware either in the processor or computer section, modem circuitry, and/or as part of any of the communication devices circuitry.

When security protocols are used effectively they must be in place in every retransmission through any connectable system including throughout any of the 11–1200 networks or web connections for wireless and land wired systems and this is why the phase "Same Security Protocols" (with arrows) parallels the horizontal 1100–1200 network labeled - - - world - - - local - - - and sectional blocks illustrating networking.

The basic reason the encryption protocols are only shown on the two way transmission PFNs is because they can be broadcasting personal and/or private owned information video and other sensitive telemetry data. It may not be as necessary to protect one-way directional remote control communications with additional security applications, because, there will be less signals transmitted to them and no return signal so it will be more difficult to figure out their purpose. However, in the higher security applications this encryption may be required as well for one-way command level remote control.

940+2 is the two way communication device with the ASS and the PGP systems on each side showing the options of encryption and the small arrow to the right of PGP points to the right block is the 2 stage memory on-board the two way PFN which are parts numbered 951–956 in FIG. 1. Number 2–100–900 is a line list of possible accountable functions for full remote control and remote monitored robotics. At least one variation of this two way PFN will completely support all of these functions including any special sensors, identification systems environmental sensors, audio video systems, all machine controls and will monitor all machine sensors.

940+1 points to the simple one-way receiver PFN. The dotted line coming down from the top depicts the one-way communication for one-way remote control of equipment. However, 940+1 also can support a 2 stage memory storage and can also, support and be constructed with any of the processor's capacity to do all the same functions as the more sophisticated two way PFN with one important exception; it by itself can not report back its data to the remote control and/or monitoring system by its own transmission. The 940+1 one-way system must have its data recovered physically through a secure download communication port. This interface communication port can also be in place on the two way PFNs if so desired. However, remote control functions can be specific preprogrammed responses and/or guided or warranted through other two way PFNs on location that are videoing a one-way PFN or reporting other telemetry data about the one-way PFN that warrants specific remote commands be sent to the one-way PFN thereby providing complete remote control of the one-way PFN. Total accountability is still provided in two levels in the one-way PFN (re-writable and permanent memory). Also, this technology provides a piston extendable\retractable connector either hydraulic, air and/or electrically activated and controlled which will connect the one-way PFN to any of the communication ports on same equipped two way PFN to report back any pertinent data that needs near real time consideration. In fact in a confined local setting only one two way PFN mobile device could recover data from all the inexpensive one-way PFNs and report it back to the remote monitoring and remote control system. This mobile two way PFN could also accompany any one-way PFN to give report back data for real-time remote control of the one-way PFN equipped machine whether it was a stationary or mobile one-way PFN.

However, any accountable aggressive remote control with one-way PFN's for the automotive applications will have specific preprogramming, protocols laws and standards for their shut down procedures and most always will involve law enforcement and accountable TRAC software.

1–100–900 illustrates all the same functions that are listed for the two way PFN and states that it has only a physical retrieval accountability for any data stored. 900\*s is a block at the bottom of the page and its functions can be performed by both the one and two-way PFNs. 900\*s is the special sensors section that will be gathering application specific data for any application specific requirement, e.g., hazardous materials, or anything that can be detected qualified and quanitized and transduced into an electronic signal for the processor'software to evaluate through compare lists programming in any application specific software running in a PFN or as burned in firmware on simple device where simple PFNs are set up as environmental specific sensors and are powered by solar cells and backed with batteries. 900\*s special sensors will be many different application specific sensors that send an electrical signal to applications specific software programs in the PFNs (e.g., like hydraulic weight sensors). Many of these peripheral devices and sensors exist as C.O.T.S. products and there are flexible software products that can be easily adapted to support these applications. Another 900\*s special sensor is the nose, which is a sensor that can identify odors 2000 times more accurately than the human nose and is capable of discriminating substances at a molecular and even atomic level. This sensor is already designed to deliver unique electronic signals for its application specific software compare list library of known substances will serve well in many applications to identify biological and chemical toxins explosives, e.g., potassium nitrates etc., and leaks in regular chemical containers in any commercial or governmental installations when coupled to a mobile PFN preferably a two way PFN. Also, the PFNs could be programmed to operate electrically controlled military devices in unmanned equipment that was damaged or unmanned either due to the loss of life or to prevent the loss of life by using the machinery and equipment through remote control and/or full robotics (based on the level of PFN computers and on-board programming). The options are vast and varied to improve security and safety for all facets to include high security protocols, more adequately covered in U.S. Provisional application No. 60/122,108.

The PFN and TRAC software systems could help world order and nation building by monitoring equipment and material movement while robotically controlling terrain and police it for aggression without risking personnel any more than is absolutely necessary. To help enforce treaties so that the assignees and their constituents are on the same dotted line with the non-emotional objective cold hard reality of equipment that stands fast to the terms that have been agreed upon. Of course, this technology's audio recordings in the native language would be remotely activated or sent as an automated message to precursor any automated physical intervention. First, more of a persuasive nature actions would be used (e.g., water cannon, safe but annoying gases, rubber bullets and as a final option lethal weapons activation) only as a last resort and to save lives. These PFN armored machines and/or equipment would be all terrain like tanks track vehicles, humVs wheeled vehicles, hover crafts. Even drone aircraft, etc. and basically the PFNs would be added to all equipment And of course the peripheral accessories could be all of the same and more military weapons could either be automated or their automated controls could be interfaced with the PFN systems. Eventually, special peacekeeping PFN controlled equipment would be created to help maintain order in an unstable area, but first the PFNs should be a part of every piece of equipment networked and remotely controlled and made accountable to the public the individual and government and commerce.

This alternative with the PFNs would allow the United Nations and NATO to take its nose and face out of troubled areas and those malcontents faces while restricting the amount of harm they can inflict on one another. To insure better tranquillity while reverberating there own commitments and better insuring fair play. The use of this device by the military that is trained for nation building might better keep respect for the military as a fair intermediary rather than just a brute face to face hand to hand combat force as has been the previous option for the military. In tremendously hostile areas where there is no agreement the automated weaponry can be deployed as part of any military maneuver and in place for any rocky social reconstruction time period. The 1200 Spider Eyes program is designed to be used in policing a normal at peace society with respect for individual privacy. The laws and standards and punishments for violating an individual's privacy have to be addressed by the public and its government before its implementation and any protocol of use, but ultimately it will improve life and the management of machinery, society its economy and the environment.

Recently, another new device has been developed, the "car plane" designed by Moller for future three dimensional transportation for the individual. The technology exists today to set up a guidance systems with the three coordinates delivered by the current GPS systems. There is latitude, longitude and elevation and when used with the military's accuracy achieved with an additional correction signal for the ionosphere distortion of satellite signals the GPS accuracy is within centimeters and instantaneous on a hot reading. So most probably this invention will see government use for a while before it is a general public individual transportation tool. In any case the FAA could more readily organize and develop the car-plane technology with this invention. And the PFN will be invaluable in consolidating the accountable black box, communication systems and locating equipment all in one concise system that is easily tailored for monitoring and controlling an ever increasing numbers of these car planes in the future.

Appendix 1 lists some of the present prototype C.O.T.S. components used in the one and two way PFN's. These components are more extensively covered in the related patents. However these prototypes parts also demonstrate the feasibility and capability of all the systems interfaced through a PFN. Items 1, 2, 3, 5, 7, 8, all camera systems and are being experimented with for the different industries to see what application they are best suited for.

When these cameras are utilized for automated guidance in the mobile management patent a system using a laser light beam will be targeted on a lane marker or the road edge. Once the laser light is locked on the line or road target a software algorithm will compare the electrical signal from any camera(s) viewing the roadway to detect the cars position by the relationship of the laser dot on the road and how far away from the lines the dot is as well as the direction the dot has moved from the line during movement. This is determined through the electrical signals digital pixel representation identifying the road target and the laser dot an activating the automated steering stepper motors to turn the steering linkage to maintain the correct lane position for the vehicle through an algorithm in the TRAC software program, PAGSSS and MASMP. This might require two camera angles and two reference laser spots. Of course the PFN will be receiving distance data as another electrical signal transduced from sound echoes and/or infrared systems to be compared in software protocols for proper travel spacing between vehicles which will adjust the speed of the vehicle through the many modalities detailed in this application for automated acceleration and braking processed through the PFN. 4, and 6 in this figure are a video card and converter for laptops to be used in a plug and play modality with personal laptops for sending images via the web and for any personal or business reasons. Web functions can also be performed by the PFN computers through TRAC software.

FIG. 2C

The PFN is a Protect primary focal node ideally housing communication technology with control circuitry and memory storage devices that can accurately locate and remotely control a piece of machinery in an accountable manner through TRAC software that authorizes and authenticates remote activities with local and remote memory storage. This is an important quality to make any STANDARD for any automated and remote control and robotics for any piece of equipment.

Figure 2C:
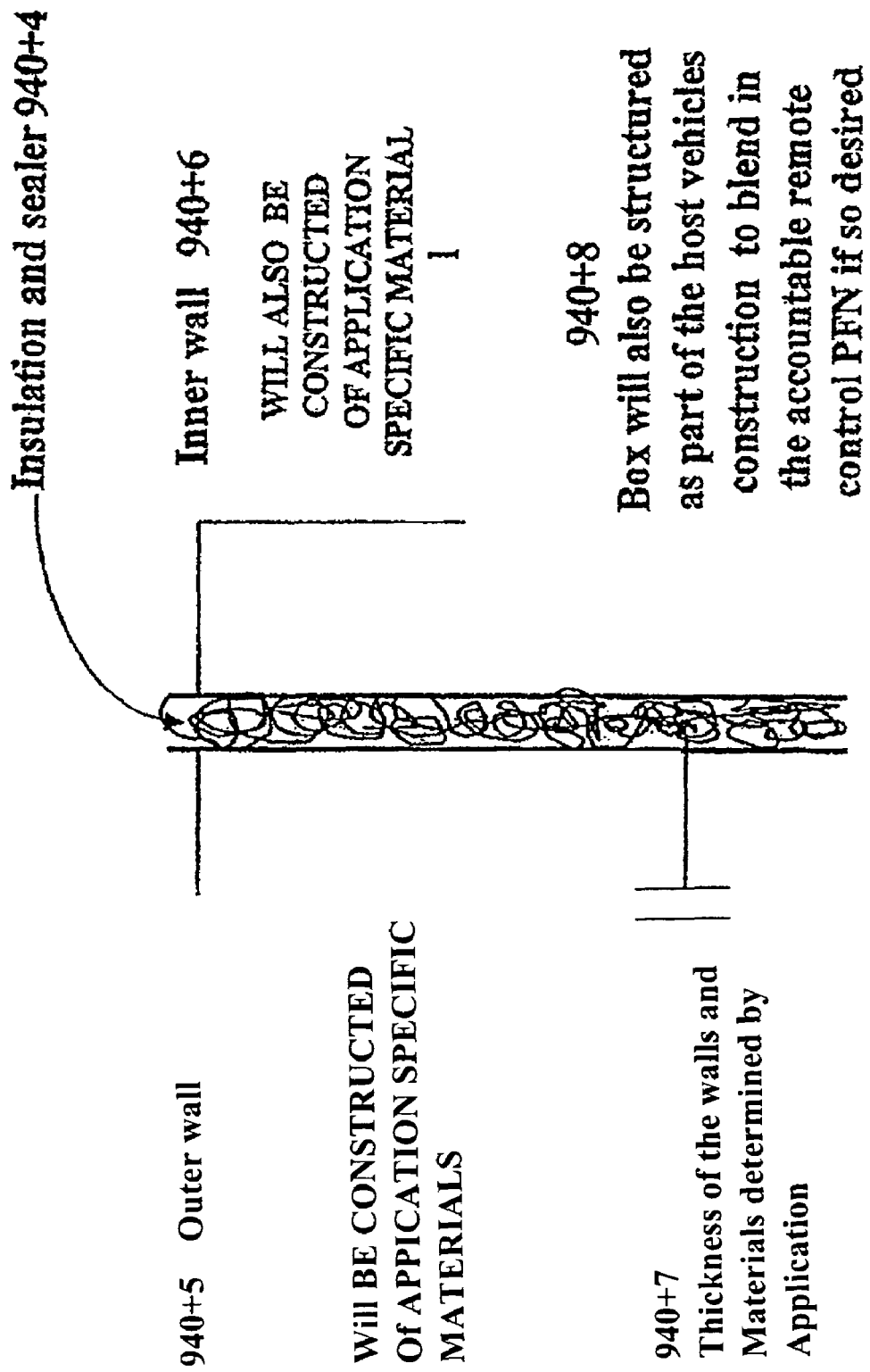
FIG. 2C is a general drawing showing the double wall construction of this technology.

FIG. 2C, taken from another related patent application, depicts a double wall structure with an insulated center to protect from heat, moisture, impact, etc. The outer wall 940+5 will most probably be constructed out of a difficult to penetrate metal AR plate at least with its 940+7 thickness being application specific and detailed greater in the individual related patent applications for industry markets and products, but they will all confirm to any industry standard. The 940+6 inner wall will also be application specific and be determined by the standard set for the PFN device as well as the components that must have these protected encasements and the persons that will be permitted access and at what level of access persons will be permitted. The specific encasements are detailed greater in the specific industries and other related patents, however, this technology claims all protective encasements for the stated purposes as part of this technology. Of course military applications and hazardous materials will demand special enclosures. As will curtail areas that will have laws written to protect their access from the general public even if it is a privately owned piece of equipment. For example, this technology calls for at least permanent memory storage for accident related records which will be inaccessible to the general public and a crime to willing tamper with the compartment and the data stored as a standard and as law for its accountable automated and remote control and robotics protocols.

While it is a necessity for the PFN protective structure to provide a protected memory, these same protective enclosures could be found to have application specific importance for any and all electronic parts and components including peripheral devices. In no way should it be limited in structure(s), size, composition, and/or components. 940+4 is in most cases a product called solid smoke which was developed for NASA the space tiles. As a solid vacuum they do not transfer thermal heat. There are many good non-volatile insulators and a suitable replacement that meets any standard will be acceptable. The general description of the PFN structure at this point is only done to be inclusive. For example, in related patent application PCT/US99/0919, an entire dash mount PFN structure is detailed to accommodate all the necessary components and other personal electrical components that are interfaced with the vehicle and also afforded protection. These PFN structures would be scaled back because they enjoy a protected cabin in regular automotive applications.

FIG. 2D

Figure 2D:
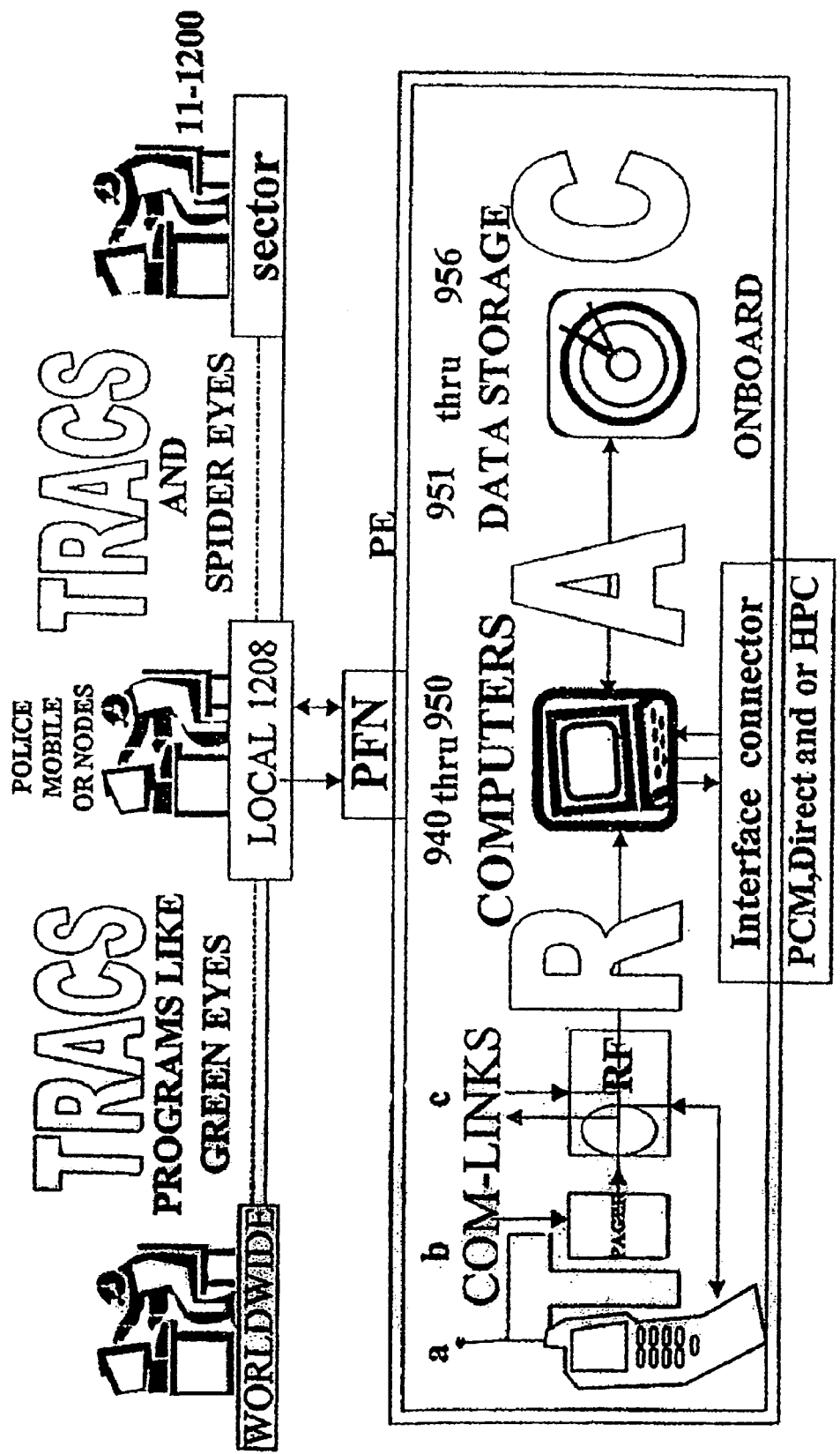
FIG. 2D is an illustration showing the remote monitoring and management of data functions.

FIG. 2D explains further the remote control relationship between the PFN/TRAC software and its off-board monitoring computer network possibilities through TRAC. The local 1208 box is a remote monitoring gateway computer capable of receiving data managing it and storing it either locally and/or transferring it to other locations the local or other parts of the net work are reached either through wire or wireless communication components housed in the protected PFN. PE is to indicate its double wall structure. The comlinks a, b, c, represents cellular phones one and two way pager systems and any long and short range radio signal equipment one and two way of any frequency. They are all responsively connected to the different computer systems detailed in PCT/US99/0919. The communication devices and technology including land line hookups for stationary equipment, all the varied computers 940 thru 950 series and all the euro board mini computers, and the rewritable hard drives writeable CD's flash memories and MO drives for on-board memory storage 951–956. Of course, these memory devices are likewise responsively connected to the 940–950 computers. Also the Mass storage is detailed for 1208 the off-board storage, as well as feasible protocols for government and industry to refine into standards. The networks linked to create the machine messaging network interfaced to the worldwide web though gateway phone node servers and providers makes this technology's MMN-WWW monitoring system for accountable remote control, and web access through TRAC's CEW and FACT encryption 128/64 bit software. The communication links in all systems, but most especially in the two-way systems, allows for the real time commands to the video and data received in the remote location virtually anywhere and everywhere around the globe. This makes a real need for protected memory and control and communication circuits and encrypted signals. All of which is part of this technology.

At the bottom of the page, the PFN connector provides signals on-board to the PCMs in cars or directly to peripheral devices and receive signals from microphones video and/or digital camera devices, and other sensor devices that send their data as an electrical signal, and/or the PFN will be connected to a stationary piece of equipment that has a programmable controller HPC host machine programmable controller or computer. Once again, the PFN can be connected directly to electric motor starts variable motor speed controls any solenoids, etc. through relays mechanical or silicon relays for any automated machine control with compatible control currents. The PFNs are application specific in their components and their interfaces and their connections, but are the basis for any accountable standard for remote control and automated functions. And this technology is dedicated to standardize and universalize its PFNs for easy to provide easy to understand inexpensive machine messaging systems and automated controllers that are completely accountable for every facet of machine use in the world. However, this technology will first seek to utilize all commercial software and hardware available for its 1200 onboard and off-board software requirements for the 1100 spider eyes program and interfaced computer network systems as detailed in other related patent applications. This use to combine C.O.T.S. and incorporate already existing commercial interest is traditional for this technology to make available as quickly and easily as possible for the mutual interest and benefit of the public and the commercial entities involved these needed accountable automated and remote control products. However, this record and report back system of audio and visual information, machine and operator data streams are considered the nature and scope of the invention, as well as any use to assign accountability for obligation and liability, legally and/or financially for any use or abuse incurred from any machine.

Although all of the following automated and remote controls have always been claimed to be done in a unique manner, they are only a part of the present technology's total system. The invention was not designed merely and/or only as a personally owned anti theft system, vehicles that can activate remote door locks or auto start a car or as a diagnostic tool, or as a tracking device to locate a vehicle by geographic position; it has been designed to be a responsible remote control management system, securely protected, legally approved and accountable to society and for any pay for use claim, with even varying degrees and levels of improper use by monetary fee, which is to be controlled monitored and assessed such as levels of environmental impact, conditional drivers use, etc. governed through the proper authorities and authorization with respect to any laws that govern any standard pay for use commercial enterprises. Rental companies, insurance companies leasing companies, loan companies, banks, regulating government agencies, automobile companies, equipment manufacturers, etc. any fee for use or operational time of any piece of equipment, machinery, and/or vehicle where remote control is employed to insure payment and make accountable. The PFN/TRAC system software Financial Transaction Program (FTP) will be web capable with 168/64 bit encryption for secure bank card transactions. Society lives by the laws and rules of government so if legal commercial contracts are violated and these innovative remote control devices are used to enforce financial obligation they fall with in this nature and scope claim of this technology and its PFNs. Also, if legal but unfair commercial, governmental or individual contracts are a practice they will be reported and recorded in the servers. Network and people will be made aware of these unfair practices.

Robotics in many other machine and equipment applications is anything but new, i.e., automated warehouses and/or order picking devices police bomb squad robots and automated hospital delivery carts. The list could go on and on. However, when they are linked or interfaced, for control and accountability either through these innovative devices and systems or in any other fashion they fall within the nature and scope of this invention as described in any of these related applications and the series 1000 through the 1200 devices and net system and/or any other systems that perform these functions with or for any accountability purpose.

Appendix 2

Is a set of three pages numbered A,B, C out of Grangers catalog 1996 No. 387 listing some typical programmable controllers that are available for preprogramming control functions on factory machinery or stationary equipment, etc., they are by no means the only ones and this technology can interface and protect any controllers on the market. These are examples of HPC's Host programmable controllers. The PFN will interface with these controllers like it would with the power train control module in automobiles or it would control all the machine functions from this technology's many varied processors and/or controllers, or the PFN could utilize one of these programmable controllers as its primary processor. Whatever is the case ultimately these processors should be afforded the protection of the PFN if possible. And of course application specific software programs would be written to process the data to and from the input out put pins for remote control and automated functions as well as activate any memory storage devices to trach the machine messaging or audio or video data.

Appendix 3

Is set of pages numbered lettered A,B,C,D,E,F,G,H,I,J,K, L,M,N,O straight out of the Grainger Catalog 1996 No. 387. These pages are used to provide all the varied gearmotors available to activate any machine and/or equipment controls and/or their functions with electrical energy. These pages provide to anyone skilled in the art all the specification and data to determine which gearmotr best meets the physical and mechanical requirements to perform any application specific control function on a host piece of equipment along with the operation currents they operate on for, e.g., automotive voltage, house current, industrial and/or commercial currents. Along with gear motors controlled by relays mechanical and electrical the PFN invention can be configured to operate any electrically energized devices, solenoids, electromagnets to control valves for hydraulics oil, water or fluid and/or gases, air, water, fuel flows, etc. and control other electrical device motor controllers. Pages I and J are only two DC motor pages for variable speed. These are some of the ones being experimented with for the automotive industry for steering. Page K is some of the straight DC motors for 12- and 24 VDC without gear reduction to drive fans, pumps and compressors. Page L and page M are DC variable speed controls that can be interfaced with the PFN processor or in many cases is already connected to a OEM programable controller.

Appendix 4

The first one hundred eighty six pages in the Grainger catalog 1996 No. 387 of ac motor selection information with all the motors and their specifications are included here. This data is for Dayton motors, however, there are other manufactures, GE, Baldwin, Westinghouse and many of the configurations are standardized (frames, shaft sizes, HP, and mounts, etc.,) This list is being provided so that anyone skilled in the art can determine the correct motor to use in any automated or remote control function as well as the necessary components to interface it with this technology's PFN systems whether it runs on house hold current, or if has to run on industrial and/or commercial currents. The mere fact that some countries have to have motors configured for different current (e.g., 50 hz.) that may not mentioned in this document does not exclude their being controlled by a PFN. This technology is meant to be utilized on a global level. The following 20 pages display more gear reductions and gear transfer cases these motors can be attached to slow the motors rotational speed and increase their torque for power.

The effort in providing as much data here is to prove the feasibility, reduce the cost for research and development by providing C.O.T.S. products and to create an organizational tool to automate and remotely control any and all machinery through the PFN by readily providing the products to fabricate an application specific actuator or automate a function for anything. Of course, the electrical interfaces will require the correct relay and hard wire component for the PFN control currents and the host machines electrical system.

Appendix 5

Is thirty five pages out of the Grainger catalog 1996 No. 387. These relay pages detail out a versatile group of electrical control relays that can be utilized to interface this technology's PFN control circuits with the motors detailed in Appendix 4 186 pages and also a way to control current to solenoid valves and other electrically controlled devices on a host piece of equipment. Also in this section are some push pull solenoids box type and other solenoids that can be configured to activate a control levers on a piece of equipment or control latch mechanism or to interrupt a function, so that anyone skilled in the art can readily pick the electrical components to activate and either fabricated a basic automated device function or to develop an isolated command function processed by a PFN to a pre-existing OEM accessory.

Appendix 6

Is another 25 pages out of the same Grainger catalog lettered A through Y because, of the different areas of hydraulics devices covered in this section which are used so diversely to work and control functions through out all the industries. A, B, and C are electrically controlled solenoid valves and only a sampling of many that control valve mechanisms to direct hydraulic flow and pressure to do work, either by pushing or pulling in piston applications, rotational functions as does a hydrostatic motor and/or hydraulic motors used in track machines like skid steers and some robots and/or automatic product feed applications, saws grinders vehicles etc. D and F are dc motors for hydraulic pumps F, G are AC power pack for hydraulic pumping. There, of course, are much larger systems, however, most hydraulic control functions can easily be achieved with the components detailed here.

Figure 28:
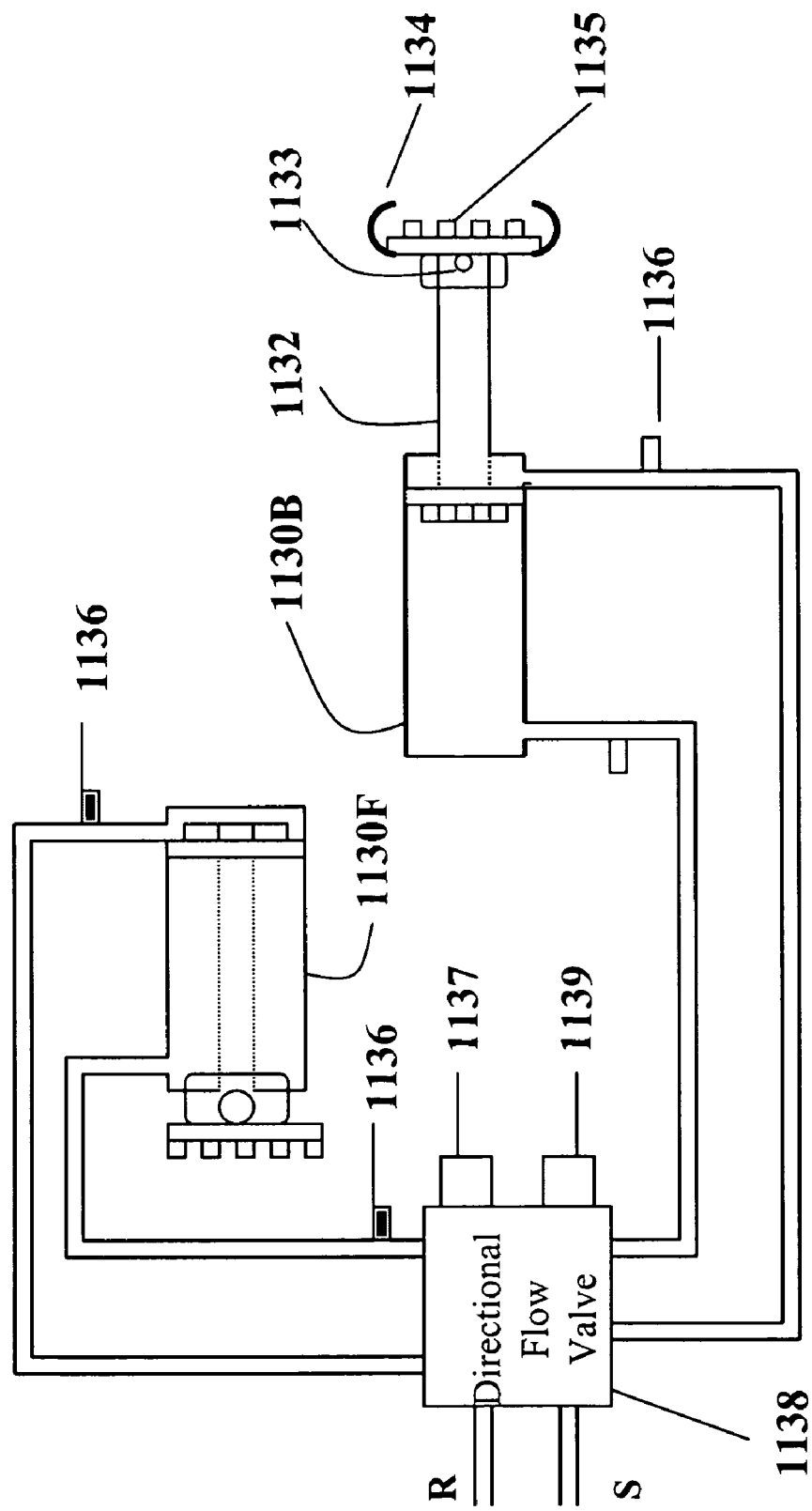
FIG. 28 is a drawing of the hydraulic circuit that will run the helping hand pistons.
Figure 29:
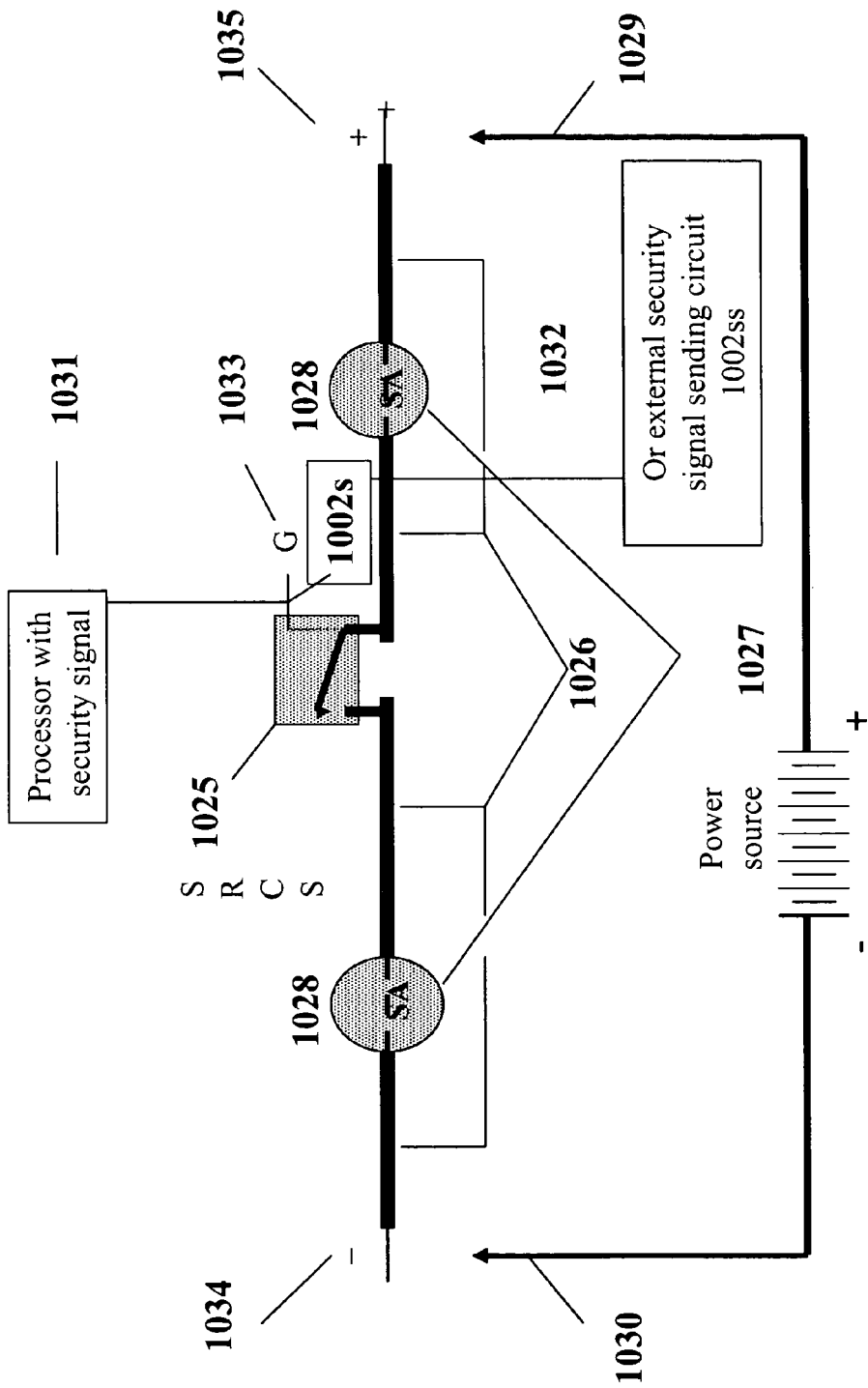
FIG. 29 is a drawing of the electronic security seal.

There electric hydraulic pump systems can also be controlled by the PFN utilizing the appropriate and previously listed relays, and the hydraulic pressures these systems develop will be diverted by the electrically activated sandwich valves. FIG. 28 depicts a DC application but the same can be achieved for an AC application. Parker and Vickers are two major manufactures of hydraulic control devices and Gates is a major hose supplier, however, there are many and the fact that all are not named should in no way exclude them from the use of the PFN or when these components provide automated and remote controls in any accountable process.

Appendix 7

Is another group of pages taken from the same Grainger catalog and put together so that anyone skilled in the art could utilize air or compressed gas to activate automated and remote control actuating devices electrically through the PFN processors. These same functions can be achieved for water, fuel flow and/or steam as has been stated, however, there would be application specific parts and sealing surfaces to handle the product's properties being governed, to energize a work function. The first twelve pages deal with the electrical solenoid diverting valves A through L. The next nine pages M through U give all the possible cylinders that can be used to physically activate functions for automated and remote control functions for more push pull applications. Pages V, and W shows the air motor devices that can perform rotational activities by air.

An effort has been made from Appendix 2–7 to provide all the different actuating devices by the medium and/or force that energizes them either to push and/or pull and with or without spring returns and also into rotational devices from a 2 a RPM to 3000+RPM to be utilized in any basic mechanism to automate controls by electrical signals processed in this technology's PFN. These electrical signals will be recorded in the system's memory devices and marked with a time, date, geographic location if need be and the command string record. While these descriptions and information is sufficient to produce any automated device needed to slow stop and/or secure any type of equipment, machinery, and/or vehicle through remote control for any reason, more devices will be detailed in the application specific patent applications. However this technology has provided more than enough detail for anyone skilled in the art to produce any necessary controls to automate any operator controls or to complete any interface with any onboard power control systems and devices to perform PFN functions in any automated and accountable manner. The primary goal here is to restrict equipment for any unlawful or unauthorized use and to provide accountability and the physical means to develop full remote control and robotics for every vehicle, machine and piece of equipment worldwide. This is to be done commercially to collect and receive any fee for use and to control equipment's use, while assessing risk and helping to establish fair insurance rates in every industry, provide evidence for legal settings and analyze the impact on the environment and the worlds infrastructures.

Appendix 8

Appendix 8 is another section out of the Grainger Catalog No. 387. This section has more DC motors Pulse generators, motor controllers, gear motors, modular drives AC and DC actuators, electric clutches and brakes, speed reducers, inline speed reducer, and more gear drives.

Appendix 9

Another section from the Grainger Catalog with wash down drive components, sprockets, chain and rollers, pulley and sheaves, belt drives, belts, gear belt pulleys, multi grooved pulleys or sheaves, roll pins and key ways.

FIG. 3

Is the software program for the first prototype chat box and demo unit and has already been described verbally earlier in FIG. 2A. This is the program Command string in P-basic for the slow, stop and secure in a stationary position functions (PASSS program), plus the activating commands to give the appropriate warning messages and start the recording devices which are controlled by the Parallax Stamp II computer. Then this mini computer drives through peripheral circuits the appropriate actuating devices on an automobile to perform the physical remote control functions with onboard monitoring and local data storage. This is not the only variation or software for this protected stop and control box invention or the only remote control purposes or functions performed by this simple one-way PFN prototype. Even this system can be configured to control most all machinery and equipment with the appropriate support circuits and peripheral actuating devices, that are detailed in this application and the related applications as innovative devices. So this software program is merely to display a first aggressive, but, responsible step in remote control. This prototype is a first example of what this technology is designed for; which is to perform protected and accountable remote control at every level of system in size, variation and sophistication.

This one-way system and all the systems (one and two way variations) are designed and have been chosen to inexpensively meet software needs generally and specifically so that they can be changed easily. The application specific software in most of the C.O.T.S. products will rely on commercial software programs and operating systems, e.g., basic, MS windows, etc., however, be individually application specific written. And the greatest detail and software components for this technology will be to provide accountability logs and systems to show access and entries to secure data files and use of the files. So even when the one and two way PFNs are outfitted and used in higher security applications, they will have special encrypted hardware and software command capability so that only the authorized contacts will be a possibility.

The specific command strings, like the one written for FIG. 3, will be verbally described and the specific command string software will be detailed. The software will vary in large degree by the different types of systems and devices used, how they are employed and interfaced together to create the present needs of this diverse network; and the tasks or functions they will perform. Whereever possible and when ever a working prototype software is in place it will be fully detailed in all the related pending patent applications. There will always be a maximal effort by this technology to universalize and standardize all the systems, simplify them, and consolidate them, while, expanding this technology commercially, technically, socially and environmentally to help create a sound economic market for accountable remote control.

Any software that is written to provide the accountability and signal protection for remote control along with the devices and systems detailed in the first three applications even if it includes worldwide use, application and impact and especially if they are operated within a secure encasement fall within the nature and scope claim for this technology. This is, and has always been, a major claim of this technology, protected memory storage of operator and vehicle temetry.

FIG. 4

Figure 6A:
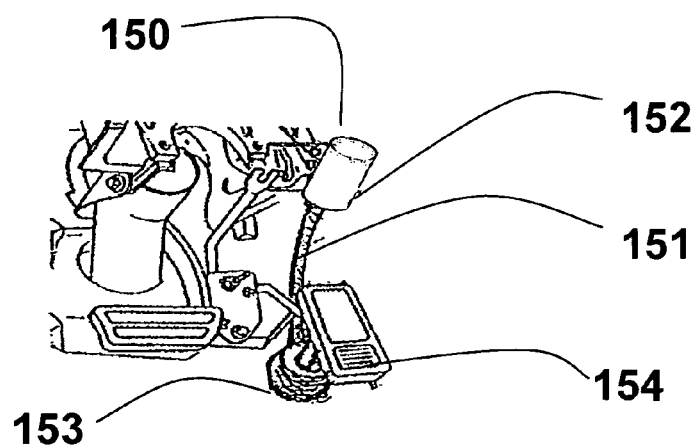
FIG. 6A–B are drawings of the pedal stop accelerator device mounted and concealed under the carpet.
Figure 6B:
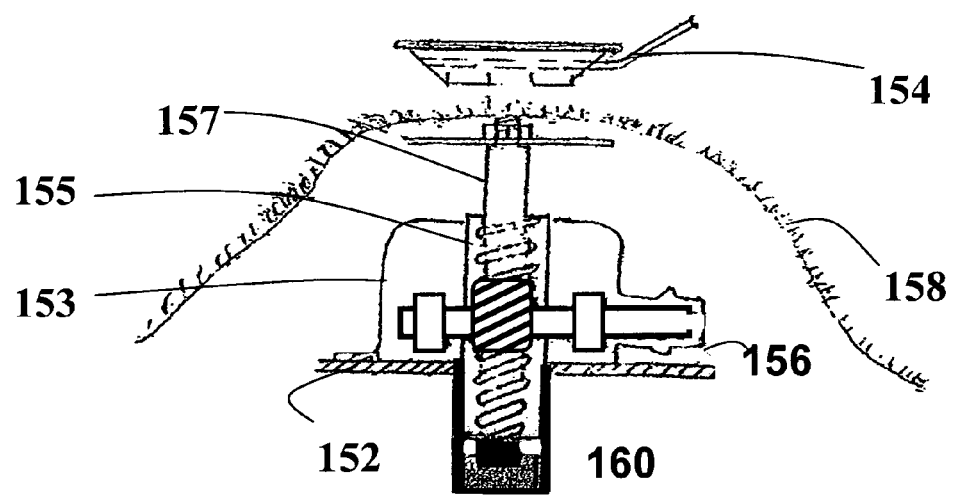
Figure 7A:
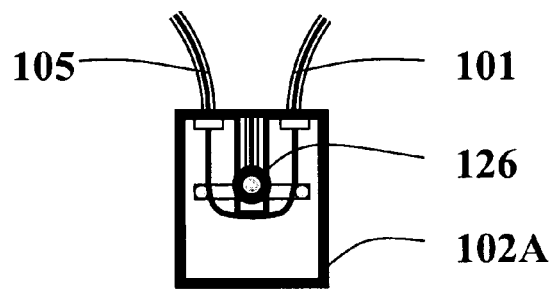
FIG. 7A–F are drawings that show the prototypes used to interrupt cable.
Figure 7B:
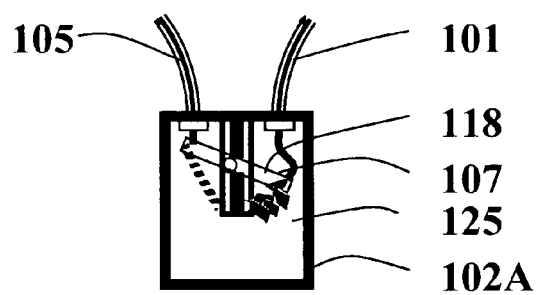
Figure 7C:
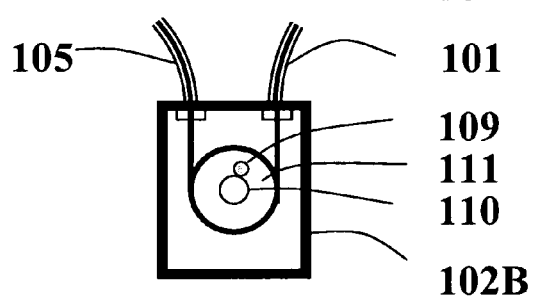
Figure 7D:
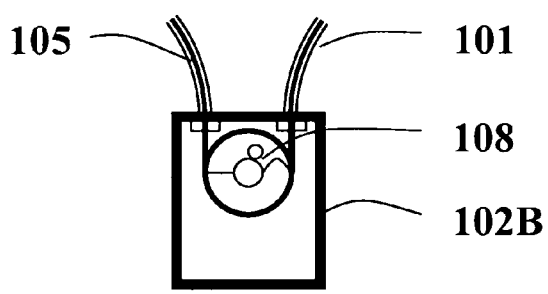
Figure 7E:
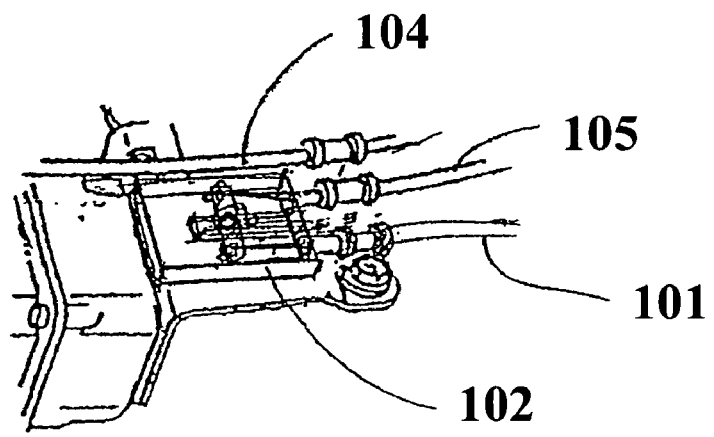
Figure 7F:
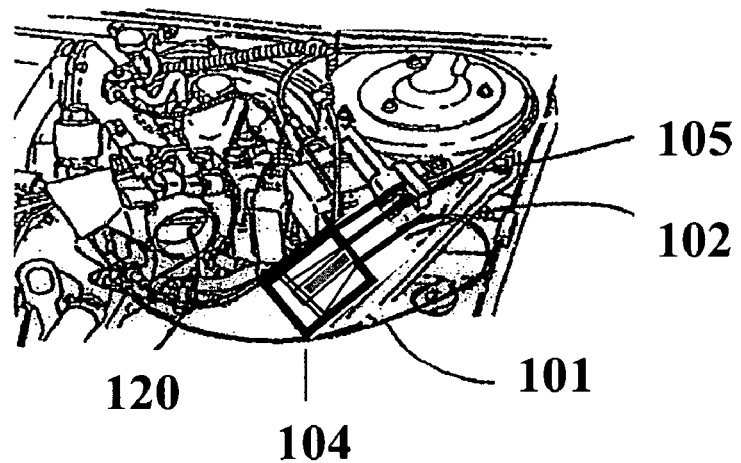

900—Is the electrical circuit that is used for the 100/200 series seat control drive mechanisms and actuators employed for the deactivation of the accelerator in a car which slows the vehicle initially, and continues the slow down to a stop of the vehicle in its final stationary state with the emergency brake system. This circuit is either attached, concealed and/or secured right to the protected device either the sliding channel device depicted in FIGS. 5A–F as the brake tensing system or the vertical adjusting seat nut drive as illustrated in FIGS. 6A–B. The line going from the letter I in the upper left hand side of FIG. 4 to the little number 8 on part 161 a Potter Brumfeld double throw double pole relay K1OP-10512 12VDC is the input voltage from the invention that activates the brake in FIGS. 5A–F by contracting of the channels and tensing the cable system through energizing the horizontal strip gear system in one direction by the polarity of the motor energized until a limit switch is forced open by the fully contracted channel to appropriately apply the emergency brake. This is the resting or stop and secure mode of the vehicle that can be activated through remote control directives preprogrammed directives, and/or a dead man safety seat or door switches to secure the vehicle if there is no one behind the wheel or if a door is open by activating the brakes for any or all of those 900 switches or sensors, i.e., 915-914-916 already discussed in FIG. 1.

Little number 7 in 161 is ground and one through six wired to the relay 161 complete a polarity switching function for the motor part 150. The parts 160 are the limit switches (for the brake system Radio shack PN\275-017A). Ls1 is adjusted to stop the motor when the proper position to tense the cable with the proper force without over taxing it has been achieved. And Ls2 is the limit stop in the drive mode direction when the shut down system has been deactivated and the invention is set to monitor. Different limit switches are used for the nut drive in FIGS. 6A–B, but the circuit is essentially the same. This switching circuit could have been performed in side of the control box or PFN, but this is the system that was chosen to best display the mechanical and electrical functions clearly to help influence the commercial interest and understanding and to demonstrate the ease at which the invention can be put into production.

The basic assembly, with the self contained relay system coupled with the braking system can easily be a safety mechanism with no more necessary control circuits than to be connected in series to the above-mentioned driver seat or door closed conformation sensors, i.e, 914, 914A, 915, etc., and would be able to apply the brakes automatically to insure emergency brake deployment every time the vehicle was without a driver and would require the driver to consciously release the brake before driving if connected to the pedal assembly or hand lever as is the modality used in the first prototype and demo. This also works for all the doors as well. Not quite as important, but, as part of any safety mode that is also using the accelerator pedal stop as described in FIGS. 6A–B, the pedal would be kept in the highest position to make sure acceleration can't take place till the person driving first puts his foot on the brake and then shift the car into drive. And when the car is in drive, the elevated nut drive is retracted to its lowest point on the floor board so that the engine can be accelerated. However, the present demo or prototype retracts the accelerator pedal block on a legitimate keyed ignition with all the doors closed. It is important to remember that any number of different circuit configurations and components can be designed to complete this task of motor control for these functions and any such variations all fall with in the nature and scope of this invention when so used for these stated purposes.

FIGS. 5A–F 152 displays a gear reduction drive that is a right angle transfer worm gear transmission for rotational force as is used through out many industries to day. It does not have to be 90 degrees and it can be configured to meet any angle and gearing specifications, i.e., pitch and ratio as well as be perfectly in line and/or directly attached, however 152 and 150—DIRECTLY REPRESENT THE EARLIER REFERRED TO C.O.T.S. SEAT CONTROL DRIVE MOTOR ASSEMBLIES AND—are used in the prototype. This is the already existing and previously described C.O.T.S. product made for GM DELCO as their product and/or part #20489380 motor drive part number and utilized in at least GM cars for seat control drive motors to power cable driven ball gear nuts and/or perpendicular, worm gear drive parts for horizontal seat motion of the car seat. Their specific part number identification will be listed and completely described with in this application as is all this inventions uses of these C.O.T.S. parts employed for theses unique purposes.

151 displays a quick connect cable that has a quick coupling mechanism to hold a square drive or any interlocking set of mating surfaces from one cable end to mate with the internal rotating receiving surface of part 152 and do likewise with part 257. This coupling and transfer of power can be accomplished either by direct shaft drive of compatible mating surfaces and housed in a sleeve that can easily be attached in a fixed manner to parts 152 and 250 the receiving worm or screw input surface in part 257 with compatible mating surface. 151 can also be a cable drive of any length necessary to position all these parts for their most favorable deployment in regards to the nature and scope of the invention, which will have and can employ any and all secure coupling technologies, e.g., screw sleeving mating, set screw points, detent ball interlock, any clamping system and the system used in the seat controls to quickly grasp and lock in on a double beveled receiving male surface on both parts 152, 150 assembly and 257 which when forced inside of 151 cable ends holds the cable in place by a pre-formed nylon or polyethylene plastic fitting that flattens and drops its outer rim created by slotted sections to secure and create an interlock holding system instantaneously, because the receiving bevels protruding through the slotted sections designed to receive them which sends home the square male drive and/or compatible male drive securely into the compatible receiving female rotating surface of part 152.

250 is a worm gear 251 mating perpendicular drive change to mating gear on the strip gear part 256. Part 250, 251, 253 bushing blocks and 256 are all included in part 257 the horizontal adjuster drive in the seat controls and is the part #16776157 in the prototype to apply the foot pedal for the emergency brake system. 252 is the outer rail or channel 258 is the inner channel that in the prototype is attached around the brake pedal arm, which allows the arm to slide freely in this part 255 as shown in part as a solid line and doted line as one variation for a mere cable tensing application. 254 is a reconfigured ⅜'s turn buckle that has had the left hand threaded bolt removed and the slotted travel section which has a bolt passed through it to attach it to 252 with part 259 the bolt and washer assembly the other end of the bolt is used to adjust the different throws necessary to achieve the effective pedal application range illustrated as part location 205 in FIG. 1, also shown as 206 is another adjusting screw and jam nut to further finely adjust the throw of the device for any specific vehicle if need be. This adjustment bolt not shown in FIGS. 5A–F would be in part 255 and go through 255 from left to right. And this same device can be used for cable tensing if it is used in other earlier described locations such as under the car as is the case for part 200 in FIG. 1.

255 referencing solid and short dotted line are indicative of the type configuration that would be used for this purpose in FIGS. 5A–F. 262 is a jam nut for the turn buckle and 252 is a cross section of the floorboard or wheel well wall that the adjusting bolt passes through to meet the turn buckle part 254. For the 200 location attachment the bolt would pass through an accessory bracket attach under the car a frame or floor pan component or have a bolt pass through the slotted turnbuckle area and attached underneath the car to allow movement to adjust the throw and then be tightened to create a fixed anchor mount for the part 252 and allow the necessary travel for part 258 to carry attached part 255 with it and tighten the two rear cables as referenced in the 200 part location and modality in FIG. 1. Optimally all these bolt and jam nut systems would either incorporate a special tool or have to be accessed through some protected covering to restrict any unauthorized adjustment in any easy manner. 261 is slide buck bushings that ride on 258 and keep true and provide smooth travel for part 258 inside of part 252. 160 is the limit switches Radio Shack 275-017A that have been described electrically in FIG. 4 that are mounted on brackets on 252 and are struck by 258 to open the circuit energized through the relay 161 in FIG. 4.

This innovated device has been chosen for many other automated applications where pulling and pushing by finely controlled but high torque applications are a real consideration. Most are detailed completely in the these related applications. Also, there are 3 isometric drawings showing the different applications and one I-200 with the tensing device under the car and the motor in the car cabin and the cable passing through the floor. I-205 which is the prototype configuration where the foot brake lever is depressed from the tensing channels- and another tensing device in the I-201 position which is a piston application for the pulling or pushing of the cables powered either by air, brake fluid, or hydraulic oil, i.e., power steering fluid, transmission fluid (pressure sides). Here the PFN control circuit would open and control solenoid valves to regulate cable tension pressure in the system in relation to sensors in the system that transduce a specific pressure to a recognizable electrical signal for the PFN compare software. Instead of activating a motor direction relay. The relay will open and close the valves and energize the piston or dump the pressure back to the reserve in what ever system is being utilized or allow the pressurizing agent to escape and/or be wasted if it is a one time application system such as a compressed air canister.

FIG. 5A

This is a drawing showing the emergency brake pedal assembly being motorized to combine the automated application of the emergency brake with the OEM's typical circumferential ratchet strip lock gear assembly or system. A similar system is designed for the center mount hand pull emergency brake system found in a number of cars to consolidate mechanisms and functions which are integral to the invention's nature and purpose.

150 is the motor in a simplistic side view of the assembly. It will be a gear reduction motor to slow its speed down and better control the application of the emergency brake system and its release. The release will be accomplished by a momentary push button after the doors have been closed and the car's motor is running or accomplished with the foot on the service brake and the transmission shifted into drive. The circuit will be basically the same as the one described in FIG. 4 for the motor reversing function or a solenoid activated raising of the drive gear assembly 171 to disengage it from the circular or arched strip gear 170 attached to or part of the pedal arm assembly used to place even tension on the cables to the rear brakes in most cases.

Another release modality will be a free wheel capability of the drive gear to just rotate with the arched strip gear when electrically (energized) or (de-energized application specific) (solenoid locking pin or magnetic interlocking meshing surfaces as detailed for the through shaft on the butterfly valve for the air control throttle in FIG. 9-A of this patent application), and/or mechanically disengaged as is the standard presently, but in many vehicle specific cases accomplished by releasing the above mentioned parts electrically controlled parts in a manual manner with spring returns to reset them for automated applications.

Of course, in an automated authorities controlled shut-down these manual functions would be locked out of the operator's control. 171 is the drive gear on the gear reduction that meshes on the beefed up arched strip gear. 170 is the arched strip gear that replaces the saw tooth catch surface of the ratchet catch system for the standard emergency brake pedal system in use today by many automotive and equipment manufactures. Similar arched ratchet and locking paw catch systems are also used to hold the emergency brake for the hand pull brake systems as well. So the motorizing of the hand pull will be in many vehicles accomplished similar and considered detailed here in an adequate manner so that any one skilled in the art would have no problem in constructing electrically controlled and driven hand pull brake system for automated and remote control. However, space in this application will most probably will require the use of the cable component of the seat drive systems as has already been described for a more convenient motor placement.

172 is the articulating bolt or point for the brake application bar. The cables would be attached to this lever in the traditional OEM manner employed by the individual vehicle manufactures for their ratchet devices, and/or, a generic or universal system which are product designs of this technology will be standardized by application specific vehicle type needs (e.g, minivans, regular sedans, pickups, etc.) and utilized to insure a vast amount of alternatives to deploy this safety enhancement and important automated and/or remote control device (slow, secure and stop component). And any OEM systems used in the manner and for the purposes described herein to accomplish responsible automated and/or remote control to slow stop and/or secure a vehicle in a stationary position fall within the nature and scope of this invention and technology. 173 which in this case is a pedal rather than a handle for a hand pull brake device. Because of the varied cable attachment and adjustments differ so from manufacture to manufacture they are not shown here. And the picture depicts the motor in a fixed location, however, the prototype designs are planned to lift the motor from the 170 gear as a quick release mechanism of the emergency brake. This will be accomplished in the same manner detailed for disengaging the motor drive for the steering and guidance 700 series systems. The motorized geared brake assembly will also be built with this solid motor mount configuration as depicted in this figure for a lot of experimental systems where this release time is rapid enough, because it is the least expensive, easiest to manufacture and efficient, and unless the release time is a real issue in any real life situations this system will be the one of choice. Any devices that are designed to automatically apply the emergency brake systems or any of these systems for remote control and/or for any standard safety concerns as described in these applications are all within the nature and scope claim of this invention.

FIGS. 6A–B 150 is the motor and the same kind of seat motor as described in FIGS. 5A–F, this is true for the cable 151 and 152 the drive transfer. 154 is the accelerator pedal and 158 illustrates the carpet covering up the nut drive and helping the aesthetic appearance while concealing its presence. 157 is a worm screw shaft with a broad flat washer or plate that is attached to the floor carpet and then blocks the pedal from being depressed when it is totally elevated. 155 is the nut drive section for this shaft and is powered by 156 which is perpendicular across the part 155 and both have geared surfaces to mesh with one another and transfer their rotational force which is supplied by a cable snapped into 156 in the manner described for FIGS. 5A–F. 252 is the floor board of the vehicle. Once again, this is the modality chosen for the prototype for its readily available C.O.T.S. However, the placement of these systems for the pedal stop when configured for installation at the time of manufacture would be more securely combined and concealed as part of the vehicle structure as is understood by anyone skilled in the art. However, these are the parts and quick commercial adaptation into this present market place that these experimental systems use to slow, stop, and secure the standard vehicles on today's highways. This has been the primary focus. So these systems are detailed here to provide understanding, real feasibility technically and collaborative commercial opportunities through this responsible remote and automated technology.

All part numbers are as follows for drawings 5A–F and 6A–B. Also, the motors and cables and some drives are the same for FIGS. 18A–21 the automated steering section. However, they will be configured slightly different for all the versatile uses as displayed in FIG. 1 and described for the individual drawings.

These GM part numbers are for the >97 Chevrolet Lumina, Monte Carlo and Cutlass Supreme, so the cables given may be specific for that year. Most of these motors, the gear nut drives and the horizontal drives are the same from the late 80's however, any use of these types of seat controls or any other C.O.T.S. motors and servo motors, cables and drives that can perform these same automated functions should all be considered within the nature and scope of the invention. The rails are the standard aluminum rails from the seat adjustment assembly for this automated seat. They are, however, cut and configured differently and have all their OEM brackets and mounts removed and/or replaced with innovative parts to do their stated functions. The strip gear is the same, but cut shorter for a some of the brake tensing applications. Essentially all parts are from the GM seat adjuster assembly for the experimental prototypes, but other manufacture servo motors will be named and identified in all the related applications for the industries they provide equipment in. However, the mere use of another motor or drive part (different part numbers, or supply line manufactures etc.) or any minimally reconfigured designs are not unique if they perform the same physical tasks.

| C.O.T.S. PART NAME | GM NUMBER |
| --- | --- |
| Front gear-nut drive | 1660 7860 |
| Rear gear-nut drive | 1660 7861 |
| Horizontal adjuster drive | 1677 6151 |
| Horizontal adjuster Motor | 2213 8353 |
| GM DELCO #20489380 product. From late 80s. | 296 85 |
| Front vertical gear-nut motor | 1660 7859 |
| Rear vertical gear-nut motor | 2213 8358 |
| Front vertical drive cable | 2065 1072 |
| Front vertical gear nut cable | 2048 9051 |
| Rear vertical drive cable | 2065 1135 |
| Horizontal drive cable | 2065 1135 |

Controlled Speed Limit Function for Accelerator Stop Modality

Before leaving this modality and even though the most effective shut down is the complete elimination of the accelerator function this technology has always recognized a limited driver acceleration capability might prove of value in certain situations where supervised shut downs are not immediately possible to provide visual control by responsible persons or automated video equipment.

For these situations, the invention can achieve a limited operational speed of say 40 mph (this speed could be any speed, and this is probably best left to DOT, law enforcement input, industry test organizations, governmental agencies and insurance testing for real life situations to determine any controlled speed levels for any specific protocols to set standards). The objective here is to limit the speed of a vehicle on the first page, phone of RF signal received by the invention's PFN to allow for law enforcement to locate the suspect vehicle and complete a controlled shut down with law enforcement present. However, initially remove any high speed capabilities as a first step to making a carjacking safer for the general public.

Until the police are in the appropriate position the suspect vehicle will be drivable at a reduce speed level. This would be the minimal speed for highway driving or a little less (probable about 40 to 35 mph max). This has already been claimed in earlier applications as an optimum way to control a slowdown until the ideal personnel and authorities were on location for the final deactivation of the vehicle. However, this procedure is achieved and described through many different modalities but is also possible through the adjustable pedal stop (Seat control systems being used in the prototype presently) to raise and lower the stop in accordance with vehicle speed sensor input provided via coyote 100 series circuits diverted to the PFN or direct connection to the sensor or the PCM of the vehicle, or wheel sensors. And responsively connectable to the pedal stop motor via PFN relays (electro mechanical and/or silicon).

There are three separate electronic ways this is being accomplished and all three are equally as good. First, the stamp computer and/or any (PFN) with one designated input pin will count the digital pulses form the PCM of the car and in the cars of GM cars will cut power to the relay for the pedal stop which energizes the pedal stop and eliminates the accelerator when the car goes over 40 miles per hour which=160,000 pulses (there are 4000 pulses per mile per hour with most of the new GM sedan cars. Of course, if this was found to vary from manufactures the pulse count would have to be changed accordingly in the Stamp II software or PFN computer configuration. Once again, if the count fell below 160,000 pulses the relay would once again be energized and the pedal stop lowered to allow for acceleration this maximum preprogrammed speed level can of course be changed remotely with additional remote or on-board authorized commands and it can be employed for many other speed control modalities and it is considered another modality to this technology.

The second way this is accomplished is by using any speed sensors analog AC voltage at a matched desired speedometer reading and when this voltage exceeds the desired speed level the PFN will open a silicon relay or relay circuit removing power to the relay which will energize the pedal stop motor to restrict acceleration. This program will energize this circuit on the first call through the inventions #1 relay. This adjusted speed level can also be achieved by a trickster circuit adjusted to accept a certain current level through a variable resister connected to the input pin of a darlinton Toshiba driver. The resister would be adjusted by elevating the cars drive wheels and accelerating the vehicle while watching the voltmeter connected to the driver out put and watching for when power was present to energize the pedal stop relay or any other accessory. This can be controlled through the PFN or used as an automated speed control. A silicon relay will function the same way with a resister to set gate voltage.

These first two ways employ the Trans axle or the transmission sensor to determine vehicle speed. The third way of determining vehicle speed data and cutting the accelerator capability of a vehicle is through the wheel sensors and their AC signal to the EBCM in the same way that is used in the second way for the transmission or to retrieve the digital signal as it is converted in the EBCM brake module and/or sent to the PCM.

As for the deployment of the in cabin warning and/or a dashboard signal to allow the driver to know that the vehicle is in a restricted mode, this will be left up to the manufactures and all the above commercial groups, and governmental agencies. However, flashers and outside info bar will be deployed to notify the surrounding vehicles as part of any phase one shut down and any outside megaphone or speaker system could be activated. It may prove beneficial to deploy the directional in cabin message with law enforcement present with a second signal pager or Rf signal, or this second final slow stop and secure in a stationary position will be a timed deployment ideally with law enforcement present. In any event, this presents no problem for the inventions technology just responsible decisions made by the proper people in the commercialization of the invention and the use of it to set up standards and apply law rules and regulations.

FIG. 7

Cable Junction Box

Basically this figure shows two ways to interrupt the accelerator cable from activating the throttle assembly. It is understood there are many other obvious ways to achieve the deactivation of the throttle assembly by a great many mechanisms that can disengage the cables and linkages as well as different stops locks and latches that could be employed to defeat these standard mechanical physically controlled acceleration parts on a vehicle. However, presently the experimental plans and prototypes will be totally described and explained. Most likely the automotive OEMs and their supply line manufactures will try to develop their own specific cables having catches and releases and electrical actuators to achieve an interruption of the mechanical controls to the throttle for deceleration purposes. However, any such alterations to deactivate the accelerator for these same purposes would still be the same innovation and fall within the nature and scope of this invention.

101 is the throttle cable to the cable junction box 102 which major purpose is to create a cable release and reattachment system to interrupt any mechanical acceleration that accelerates the vehicle from depressing the accelerator pedal. This is achieved through the activation of solenoid 126 or 109. These two other entirely different systems that interrupt the accelerator cable to deactivate any acceleration are an alternative first step for a controlled slow down to detain like, i.e., the gas pedal stop already described in complete detail and illustrated in FIGS. 6A–B. The reason for this complete description is that this is another proven system and has been experimentally used effectively.

104 is the cable that goes to the cruise control from the throttle cam while this to could be interrupted through a mechanical means involving the cable. It will be easier to deactivate the cruise either through the continual activation of the service brake switch and/or circuit or the electrical de energizing for the whole cruise system or in some cases cut the vacuum through a solenoid for some old cruise control systems. The modality chosen will be determined by all the variables such as vintage and types with regard to all the vehicle applications. This deactivation of the cruise control for the purpose to detain and/or control a vehicle is very simplistic, but a necessary and unique way to limit this accelerating device. There are a number ways to deactivate the auto increase speed function of the cruise control. One is disrupting the power supply to the cruise control with a relay another by deactivating it through the Service Brake safety switch by representing a brake depression with simple relay that gives an appropriate signal or current when activated through the inventions automated slow down phase from the onboard computer (PFN) With this completed the throttling up of the power plant has been completely nullified. Cable interruption is another mechanical option and the deactivation of the cruise control is done in a similar manner for the pedal stop variation described for FIGS. 6A–B modality as well. There is and will be a large list of modalities and it can go on and on. However, any such augmentation to the cruise control for remote or robotics control are within the scope of these applications.

105 is the accelerator in-feed cable to the junction box. If this system is a OEM construction the many varied pictorials to the left will illustrate several cable interruption control systems, to clearly show that any cable interruption and control system, when used for these stated purposes are obviously a part of this same invention. And if any OEM and/or any supply line source and/or any after market manufacture wishes to use cable releases and linkage disengagement's for these stated purposes then FIGS. 8A–C will show the already standard conceived interruptions for these mechanisms to restrict and/or reduce a power source and/or plant's out put to propel a vehicle. These same systems can reinstate the mechanical means to increase power from the power plant in a standard application and also, if desired in automated degrees. 101 is the cable that goes from the junction box to the throttle butterfly valve 120 lever or cam in FIGS. 9A–C. And under a normal uninterrupted mode will transfer the exact one for one movement of the throttle as to the depressing on the accelerator pedal, however, in 102 a box, the lever system is released from its articulating point (a spring loaded shaft from perpendicular solenoid part 126) is energized which lifts the metal plunger shaft up inside the solenoid and the levers 118 fulcrum is removed to the second circle where there is a second solenoid to allow for some tensioning of the cables but not enough to accelerate very much. The pedal goes almost to the floor and when the second solenoid indicated by another circle is energized the lever moves with 105 cable; but has no effect on the 101 cable to the throttle to in crease acceleration. There is a return spring 107 that pulls the lever all the way back so that when the solenoids are deactivated and releases the articulating shaft the original one to one articulating position is re-instituted for normal acceleration, which, when the accelerator pedal is released one time, will allow the lever to return to this highest articulation position. So when the invention is reset the pins will drop in to reinstate cable function.

This system can completely, in one activation, merely eliminate totally all ability to accelerate a vehicle or merely reduce pedal throw by having set articulation positions which are controlled by the PFNs software commands. However, prototype experimentation has proven for the unauthorized shut down, specifically, the slow down is best accomplished with the total elimination of the suspect driver to accelerate, while under police observation and radio contact with the remote control, or totally controlled by the police on location with a report back and redundant data stored on-board as a record to insure authentic and proper authorized shutdowns. These records as stated through out the related applications are to be prepared and processed to be of evidence level quality for use in legal and judicial proceedings. This technology also, provides for remote reactivation of the acceleration capacity in real time of the suspect vehicle to avert traffic problems when a this is a wise decision, which can be accomplished either through distant remote control authorized commands or in short range (local command from the trailing police cruiser), while both vehicles are in real time movement. Many modalities for this short range remote control communication are detailed in the related patent applications; especially, for the special law enforcement (traffic control hand gun tool). All of these systems are capable to be responsive to legitimate law enforcement remote commands in real-time through this technology's PFN system of responsible and accountable remote control.

102*b* illustrates the interlocked cams system with one on top of the other fix mounted on shaft 111. 109 is a solenoid with a drop pin that passes through the top cam disc to an interlocked position in the bottom cam disc and 100 is a spring that returns both top and bottom cams to the best alignment for the solenoid pin to drop in. In 102B the discs are not interlocked as signified by the dotted circle to the right of the 109 solenoid position. This action will allow the 105 cable to pull and rotate the bottom cam without pulling the upper cam or disc thus leaving 101 not effected and keeping the throttle in the at-home position and/or idle. Of course the electrical service is on a flex wire to absorb movement or alternatively accomplished with a double semi-circle set of contact strips directly connect to the motor that is supported on the top cam. The contact strips have mating paws mounted in the top of the box with electrical energy directed from the PFN computer. Both of these variations are designed to provided current without interruption from their movement). These systems will vary greatly from these experimental designs and are presented here to establish the basic versatile technical pathways to aid all manufactures to complete these simple first steps to provide responsible remote control functions for the unauthorized vehicle in the most inexpensive manner as standard equipment functions for legal and appropriate highway safety, and insurability in aggressive remote and automated control situations. These have just been presented as experimental devices for the prototype in this modality, however, any alteration to the manual mechanical cable especially to achieve a slow down is considered a natural evolution of this innovation and a primary element of this slow down.

FIGS. 8A–C

FIGS. 8A–C display cable end anchor releases. The above FIG. 8A shows either a hinge drop plate 106 that when solenoid 117 is energized the secured cable end is allowed to fall towards the throttle cam so the inner cable has no fixed point outer casing to be pulled through. However, the actuator system could be configured in the reverse where there is not enough distance for the device to function properly. Also plate 106 could be mounted on a slide bar not using a hinge at all so that when a solenoid catch release the entire plate would slide the cable anchor plate forward not allowing the throttle to be effected, because the fix mount for the cable casing would be to close to the throttle and the slack in the cable would be to great to activate the throttle. It is held fast by a solenoid and allowed to slide forward, when de energized in slow down mode. The return to home position is accomplished with return springs either part of the solenoid or as in the case for the slide bar system in front of the sliding plate and mounted on the slide bars with a stop on the other end, or just a mounted piston with a spring around the ram and before the anchor plate that holds the fixed cable end at an actuating distance will return the anchor plate to a locked position.

These springs are never strong enough to defeat the throttle return spring only able to return the anchor plate and cable to its fixed position for normal acceleration when the pedal is released. Any obvious cable constructions to allow for any detachment or deactivation of throttle cables and linkage for any of these stated purposes fall within the nature and scope of the invention.

In FIG. 8B the accelerator pedal mount has been chosen as a good location to illustrate a linkage disengagement system. Here, 105 goes directly to the throttle cam from linkage 116 which mates with 115 the other end of the pedal linkage which in the normal state travels with each other as one bar and allows the accelerator to pull 105 cable and open the throttle 120 in FIGS. 9A–C. 114 is a out line of a box or encasement where 116 inter locks with 115. This can be accomplished in a number of ways, but for the first prototype a mini solenoid with a retractable latch pin on 116 that is electrically serviced by a small flex wire to the fire wall section of the 114 box mount and when energized will release 116 from 115 as the pedal is depressed both 115 and 116 will have return springs to return them to their natural position at an idle state so that when the automated release solenoid is de-energized the parts 116 and 115 will interlock to function in the normal state once again. The solenoid and flex wire is only minimally shown here sacrificially to show the separation of the pedal linkage once again these detailed drawings showing parts and locations will be in the formal application but the nature and scope of this device and its function are clearly explained presently so that anyone skilled in the arts can read easily construct and/or locate C.O.T.S. parts to complete this device in many different configurations, but essentially create the same device.

In FIG. 8C, Cable 105 is where the cable is interrupted and this also has a multitude of different configurations, however, the one illustrated for FIGS. 8A–C will be described presently so that any one skilled in the art could easily make these devices. 105 connects to part 16-115 which is one part in the uninterrupted standard pedal linkage and it passes into 119 which houses a flat contact disc that has the cable 105 attached to its center, also in 119 which is a cylinder there is a electromagnet plug piston that has two contact strips that are guided to make contact with brushes to energize the electromagnet when the cable is to provide the flat contact plate a firm connection thus allowing the pedal to activate the throttle through cable 101. 119 is anchored to the firewall and spring returns allow for the coupling when 112 is energized. 113 is the contact brush paws. It is important to remember that these different cable anchor releases and disconnects can be placed on either end of the cable or anywhere in between as is determined by application specific needs of an individual vehicles engineering.

FIGS. 9A–C

FIG. 9A shows a throttle body that has been modified for the same purpose to primarily disengage any acceleration capacity and/or control that capability through these automated device innovations for the purpose of controlling a vehicle though electrical service and components. 130 shows an augmented cam that has an small electric clutch attached to it and is mounted on a shaft that slides inside the throttle through shaft and when energized slaps against the throttle cam flat surface 125 and rotates the entire assembly to open the butterfly plate 120 in the throat of the throttle body. 123 is an electrical service that snakes around the throttle body with a flex loop to energize 125 electromagnetic clutch. When de-energized, the electromagnetic clutch disc 125 releases from 124 throttle cam receiving plate ever so slightly only to allow for the free rotation of 130 and flex wire 125 for as slow down function. This is more exaggerated here to best display the separation and because all these isometric drawing are from actual automotive C.O.T.S. parts on the latest of GM vehicles and have been altered to show the experimental prototypes and keep all the configurations as close to the commercial parts available today, but automate their mechanical functions for these purposes to quickly allow for their adaptation and use in commercial markets.

While many of the illustrations involve GM parts, any automobile manufacture as well as many other equipment manufacturers, who employ accelerator pedals and cables and/or internal combustion engines will have parts like these that can be easily modified and reconfigured by those skilled in the art. 121 in this drawing is the throttle position sensor and it is responsible for sending a signal to the powertrain control module shown in FIGS. 20A–E. It is being mentioned at this time as to where its physical location is because it is referred to later in the 900 series "Trickster" innovative device circuits and later drawings. While the throttle position sensor is displayed here as having a fixed mount in the housing earlier and other manufactures have them on the exterior of the throttle body housing but they all perform similar function and the 900 series description will completely describe these different electrical signal from voltage levels to digital pulses generated to supply different electrical data to the power train control module for engine performance and drive train controls. Most older ones were simple variably resisted currents to signify the throttle position from a potentiometer. This entire throttle release mechanism will also have a molded encasement that will prevent accessibility without damage when tampered with if deemed desirable as a commercial and safety enhancement to insure its use. This will also be a consideration for all these safety controls as has been previously stated.

122 is the air volume solenoid mixture valve and will be detailed as to the invention innovative activation and deactivation of this part in controlling a smooth slow down. 9B part 122 shows how the throttle body mechanism is attached to the engine. This drawing is being used to show a servo motor attached to the throttle through shaft 131 and controlled electrically from either a potentiometer speed pot mechanism or digital sensor attached to the accelerator pedal which inputs a signal to a silicon circuit relay system that will be a motor controller in direction and speed for the motor on the throttle shaft. It will change the polarity for the direction of the motor (to accelerate and de accelerate) and the amount of current to control the speed of acceleration. The speed control will be a one to one response for the throttle butterfly valve, which will require no physical linkage or cables. This is this technology's form of drive by wire either with these (SCR) circuits, which will be in the PFN or in many cases embedded as part of the solid state computer in the PFN or as a euro board 100 motor control circuit for the PC computers detailed in the related patent applications. This will become an electrically controlled motor through the invention's PFN computer or car computer to throttle the car either for a safer operation and/or road handling (through its automated onboard software program or as a device to deactivate the cars ability to accelerate to complete the first slowdown modality for the unauthorized use function.

If done to deactivate the vehicle to detain it through any drive by wire system falls with in the same nature and scope claim made for this invention. As to help drive-ability in high performance vehicles for the, i.e., the new Corvettes for inexperienced drivers of muscle type vehicles this device has already been experimented with by GM for this purpose and the invention makes no claim here. However, the invention has been in experimental stages incorporating speed pot technology and digital AC signal positions circuits some from the forklift industry to develop an electric signal as to pedal depression position and activate the 135 throttle servo motor to a specific position instead of using the above mentioned mechanical cables. Another drive by wire modality that incorporates a gear reducing C.O.T.S. product for 135–137 throttle motor drive actuator is the prototype for this application employing a 1989 Chevrolet pickup heater vent servo motor and gear drive. This motor gear drive is not required to turn 360 degrees In fact, it will only rotate 90 degrees to close the butterfly valve.

Because this technology foresees the use of other energy sources that will create an inevitable and commercial turn towards the electric vehicle development in the near future, the need for a mechanical accelerator pedal transducer to convert physical pedal position into an electrical signal will have increased value. It will be the most ideal way to send a signal through a module or circuit to control drive motors or an Electric Wheel Configuration or electric flywheel transferring final drive system etc. to control motor RPMs and/or a power-train's RPM output in vehicles and/or any other so configured piece of equipment. This technology is presently stating and making the claim here that these new electrical vehicles controls for propulsion can be accomplished through these above described systems and the PFN computers in the most ideal setting, which should be the protected, accountable, automated and remote-controls for regular acceleration, de-acceleration, the cruise control functions and all the controls needed to slow stop and secure a vehicle or piece of equipment in the most optimum manner for any reason. All of this will also be controlled through TRAC's programmable and modular software in the PFN.

The PFN technology'should be used with these new vehicles from the inception as it can be inexpensively combined and designed directly in and with these electric car systems. As detailed earlier the slowing or stopping process will be accomplished through motors, that can be generators in the braking function (in some cases) to convert the vehicles inertia into electrical energy as well. This technology has already been detailed at some length earlier and in the other related patents as well as, how to accomplish these innovations with C.O.T.S. products and many of the solid state motor controller circuit board arrangements contained either within and/or outside of the PFN. So the speed potentiometer or digital signal circuit for electric cars, e.g., regular DC motors and these new Electric Wheel systems will have the silicon circuit relay system with a field weakening capacity and/or a power engagement controller circuit for the inertia transfer systems, or for the electrically controlled transmissions, etc. that will be responsive to a pulse generated signal from the accelerator position, which will energize proportionately to this generated signal and the present speed of the vehicle (wheel sensors) the appropriate current to a electric motor, if present; or in the case of the transfer controlled drives the proper rotational force needed to rotate the wheels by either controlling the magnetic fields to engage whatever inertia force transfer system is present; or any electro-magnetic clutches or solenoids for the more traditional vehicle power-train transmissions, e.g., manual and hydraulic, etc. attached in this case to these above-detailed electric power plants.

FIGS. 10A–C

FIG. 10A shows another throttle body adaptation, where 120 a point of origin is the butterfly valve. 133 is a mini push/pull plunger type solenoid mounted in a drilling in a HUB that is fixed to the throttle through shaft 131 so that when it is extended it passes through a hole in 130 which when the cable 101 is pulled down in the de energized state rotates the shaft and opens the throttle in a normal function to increase the engine rpm's. When energized the pin is retracted into the solenoid allowing the 130 part to free wheel on shaft 131 not opening the throttle thereby deactivating any acceleration. 131 the throttle shaft that has a electro-magnetic hub or solenoid winding attached to it. 133 pin retracts into a slide bushing hole that is off center from the 131 through shaft. The hub and shaft assembly has a return spring that encircles it or is parallel to it on the shaft and the spring is attached on one end to the hub and the other end is anchored into a hole or drilling in the throttle housing. This always returns the hub and throttle shaft assembly to an idle position and/or home position or un-accelerated state. An accelerator pedal and/or cable return spring returns part 130 to an idle state stop to align its hole with the plunger pin 133 for the purpose to re-engage it to the through shaft hub and provide normal acceleration form the foot pedal and cable. This can be reversed and have the solenoid on part 130 and just a hole in the hub for some carburetors throttle body injection systems and throttle mechanisms. Also in any of the energized and de-energized functions can be reversed and/or adaptively changed in programming or control circuitry, and parts are readily available, i.e, mini solenoids Jensen Products. 10B is another view of the throttle position sensor and it shows how it sits on the other end of the though shaft 131 and is rotated on the internally housed potentiometer to send the appropriate signal to the power train control module FIGS. 20A–E.

10C part 141 is a vacuum switch which can also serve to disconnect the cranking current in the remote start function of this invention, when the engine is running. These systems are being shown here as they are refereed to different control systems and protocols throughout this technology and these devices are refereed to as to how they are augmented in function from their standard operational use.

FIGS. 11A–B

Shows the entire air horn and air cleaner assembly and 3 different air butterfly valves 136 A, B, and C locations that can be used to reduce air flow as either add-on devices for older vehicles and/or new specific devices for OEM's. 140 is the hose that connects to the already talked about throttle body, but it could be connected to a carburetor or TBI system. 142 is the MAF or mass air flow sensor and it gives an electronic sign back to the PCM power train control module to tell the system what the flow of air is into the engine. This signal in some fuel shutdown applications might require the trickster circuit to the PCM as have already been described for the earlier fuel valve shut off part 403 in FIG. 1 and detailed in earlier related filings. There also is in many cases a need for physically regulate the air to the popper level; which the trickster circuits are asking the PCM and IM ignition module to control ignition firing and injection firing in some cases through the injector module ICM part 404 in Figure one. For the physical control of the air not done through any OEM throttles and carburetors as previously described. Parts 136 A, B, and C are additional butterfly valves that can be placed any where in the air intake system and connected to a solenoid or servo motor 137 that when activated are adjusted to a pre-determined dampening positions to only support minimal acceleration and/or only enough air to sustain an idle. 136 C is shown in front of the air cleaner, as a piece before the MAF sensor 142, but could just as easily be made part of the MAF sensor assembly like 136A for easy electrical supply service with 142 and/or even part of part 140. 136 shows 136B location in a coupler in front of the MAF 142. The experimental prototype was constructed out of 3" PVC 136Cp with a ³⁄₁₆th rod through the diameter of the pipe to hold a mounted round disc to make a butterfly plate, gate or valve and mounted on the front of the air cleaner with a flex rubber plumbing coupler in a 1987 Olds 98 and also the earlier detailed fuel valve was used in some of these successful modalities and not needed in others. Only timing and air augmentation through interrupting sensor input, i.e., 904, 905, 906, 907 in FIG. 1 to the PCM, the ignition module and/or the injector module.

There are many different combinations that may alternatively be used to create an even slow down by adjusting the air, fuel and timing through these totally detailed modalities within the inventions, e.g., with the trickster circuits on the TPS throttle position sensor and MAF sensors with the fuel valve and a 136Cp air throttle, another by interrupting the crank shaft sensor with an intermittent relay (trickster) with the fuel shut down and/or air throttling (fuel and air devices) or the OEM software tricked by the inventions Coyote trickster circuits, 1,000 series, or just air throttling, or just fuel throttling. Alternatively, more universal and simplistic mechanical interruption devices for the accelerator as earlier described could be used in the first prototype and for its ease of installation and repairs for most technicians. Some more detail will be given to the fuel shutdown systems in the 400 series.

11A Cruise Control for Acceleration and Speed Control

The obvious modality to control a vehicle speed is through the present and past C.O.T.S. OEM cruise control systems. They are electrically controlled throttle systems that are particularly easy to control through the PFN interfaced with the vehicles electrical system in any number of ways. However, thus far the only augmentation to these systems needed to create the most ideal slow down scenario has been to de-activate the cruise control by using a trickster circuit to simulate the brake switch depression for the cruise control module and/or interrupt main power to the cruise control or send a disengage signal from the PCM to eliminate the drivers ability to increase acceleration of the vehicle during an authorized shutdown, while mechanically eliminating the unauthorized driver's ability to accelerate the vehicle.

During prototype experimentation the complete absence of acceleration by a suspect driver proved to be the single most important element in creating a safer way to slow down present vehicles by remote-control. It is essential to be able to completely eliminate the physical motion of the throttle body by any driver activity as the easiest way to accomplish this smooth controlled slow down. Because, all these modalities leave the power plant idling to provide power steering and braking, etc. through the slow to stop phase while they eliminate the more dangerous vehicle acceleration time the high impact inertia which is the major cause for the massive amount of death, injury and destruction presently can be significantly reduced. In this scenario the present and past OEM cruise control C.O.T.S. products were not capable of this function without having the other augmentations like those detailed in this technology to eliminate the standard throttling modalities. These are all PASSS software programs with different device modalities.

This technology has focused strongly on developing accountable remote-control for the present varied automobile industry to play a major part in universalizing all these electrically performed automated functions into a standard at least for the automotive industry; and hopefully for all remote and automated operations and equipment worldwide. Also, another goal of this technology is to provide backward engineering for all of the already existing vehicles and equipment in all the other related industries, so that they too can immediately partake in these newly emerging remote control automated functions and services in a accountable manner, socially, environmentally and commercially.

Returning to the present and past OEM cruise controls with a few minimal augmentations provided by this technology will help them function well in speed control for the remote and automated control scenarios. As a lead into the changes of these systems one last way to disengage these cruise controls during the slow down functions is provided via a trickster circuit responsive to the PFN or similar system. (In the case of the present GM solid state digital Cruise control units with a stepper motor a 4000 pulse per mile digital signal is sent to the PCM from an interrupted vehicle speed sensor PCM input). This normally OEM preprogrammed signal for inhibiting the cruise function prevents the operator from increasing the speed through the cruise control as well. It is not the most ideal system, solo for this function but does work. The reason it was not mentioned until now is that it has another purpose in more sophisticated remote and automated controls for the present automotive technologies. This same signal sent to reduce speed by the PFN along with a sustained resume current or signal sent to the Cruise control module for accelerating the vehicle will initially supply the two necessary electrically controlled pathways to accomplish variable vehicle speed controlled by the PFN and its application specific software for this purpose, or this cruise control adaptation could function in this manner with any number of comparable onboard controller systems that are accountable through TRAC software MASMP. However, in addressing the use of present C.O.T.S. cruise control systems for sophisticated remote and/or automated control of vehicle speed, e.g., interactive highways and/or smart cars the present stepper motors, and vacuum systems will be reconfigured to complete rapid acceleration tasks either with assist solenoids that are disengaged, when the desired speed and/or distance have been achieved, or by some other reconfiguration of the standard cruise control mechanics and/or firmware or software to achieve these rapid acceleration requirements for automated derivability.

Throughout this application much of the drawings and descriptions are of the prototypes and experimental units. For the most part these have been GM modified systems. However, most all the modalities detailed herein for these cruise controls can be modified by anyone skilled in the art to be easily configured for other manufactures cruise controls and the same is true for the throttle body and/or any carburetors and/or any air throttling system for (Gas, LP, and Diesel). And as was mentioned earlier for the motorized pedal and throttle system (a drive by wire system), which will be controlled by the a SCR system and software in the PFN and provided the software and firmware to handle all the commands with even greater application specific data storage. The present trouble codes stored in the power train control module, and/or if so desired, the PFN will be configured to interface with a PCM. With this technology's automated throttle system the PFN software will replace the need for a separate cruise control module and stepper motor. Because this function will be performed by the motorized throttle system, as well as the elimination of any throttle in the emergency shutdown system detailed throughout this application. And of course this will be an ideal system for the cruise control, over the regular motor controller operational control for the electric vehicles, and to complete emergency shutdown scenarios for electric vehicles.

Throughout this application much of the drawings and descriptions are of the prototypes and experimental units. And for the most part these have been GM modified systems. However, a great deal of effort has been taken to design these innovative enhancements to address basic mechanical principles and systems found on every vehicle no matter, who is the manufacturer and from any country. Also, a great deal of time has been spent to cover all the varied vehicle propulsion systems, power transfer devices, braking systems, vehicle accessories and vehicle controls to establish clearly to anyone skilled in the art that this technology can provide automation for any remote control vehicle function. And finally, this technology has been expressly developed to do it all if need be or to enhance any existing technology in any collaborative effort to provide secure and/or accountable remote control for any and/or all of these functions detailed this application, as well as all machine messaging services detailed in the related applications.

FIGS. 12A–B

Figure 12A:
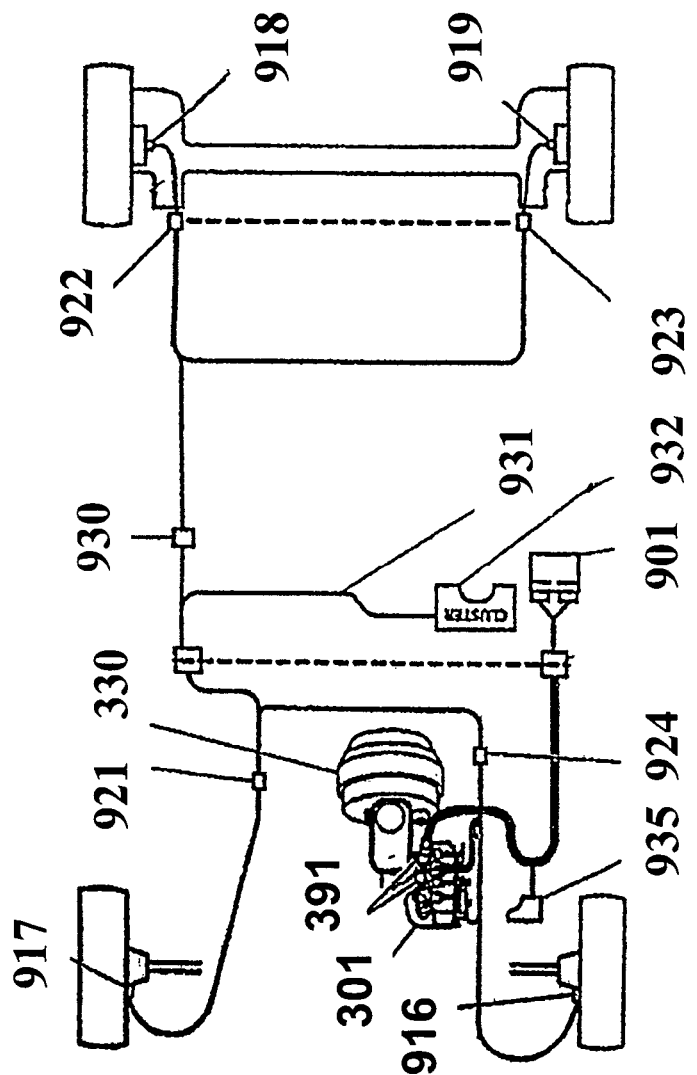
FIGS. 12A–B deal with the latest standard power brakes on Chevrolet and Oldsmobile products.
Figure 12B:
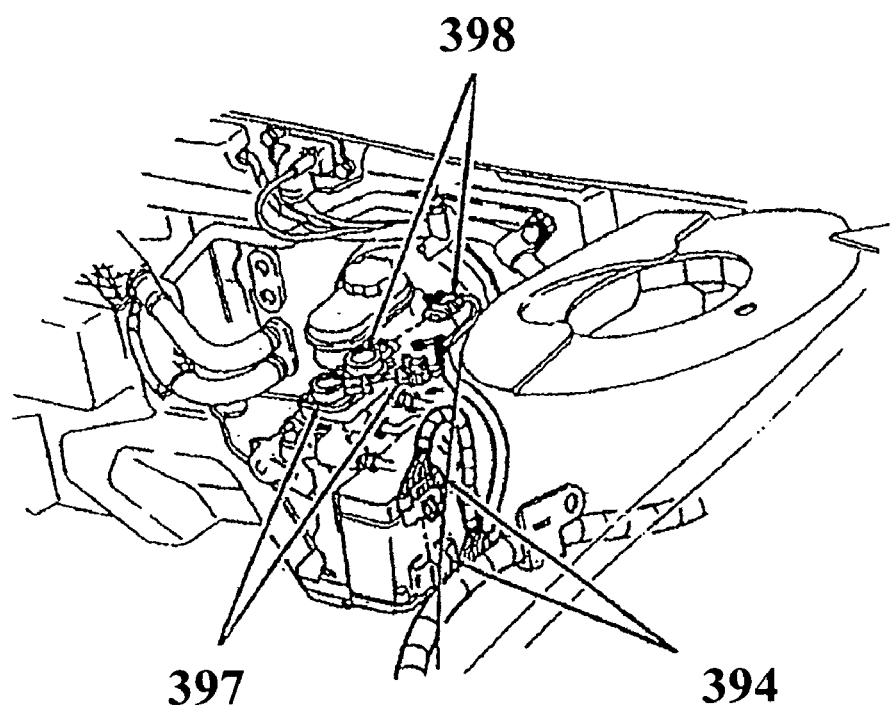

This is another simple and clear drawing that GM has put out for their electrical components on their antilock brake system and it shows a new device they are using to control brake pressure so the wheels do not lock up in a skid mode with the loss of traction. This GM ABS VI system is designed to work off the existing pressure developed through the master cylinder (pedal application); and GM itself states that the ABS VI modulator motorized ball screw piston system can not increase brake system pressure on its own and/or apply the brakes. However, this is exactly what this technology is going to detail to automate this type of braking system for PFN remote control scenarios. First FIGS. 12A–B will show more accurately, where all the GM C.O.T.S. devices are located (part location and use for similar systems by different manufactures may vary). And the subsequent drawings that will completely describe the augmentations will be detailed here in a general manner; so that anyone skilled in the art can create these same unique changes in comparable systems through the application of obvious and basic mechanical and electrical knowledge, principles and technical skill. This technology as always will continue to provide additional unique detailed descriptions for the individual manufactures, where ever possible and also maintain an open door policy for collaboration, whenever feasible.

In the drawing 916,917,918 and 919 are the wheel sensors for the antilock braking system 921, 922, 923, and 924 are the harness connections for these individual sensors. 391 is the brake solenoid valves. OEM 301 is the brake modulator. 330 is the vacuum brake booster. 901 is the EBCM the electronic brake control module. 931 is the instrument panel cluster and 930 is the body harness to the instrument panel. The reason for mentioning these electrical connections, sensors and components and using this illustration is to provide an easy means to locate these devices. They will be utilized and referred to in the many different automated service brake modalities described presently and through out these unique innovative augmentations of C.O.T.S. products and systems. 900 series numbers have been given to most of these OEM parts because they are part of C.O.T.S. electronic control systems already existing on vehicles. 397–398 shows the electrical connectors for the solenoids on the modulator valve and 394 shows the electrical connector for the motor pack that drives the pistons in the modulator valve.

FIGS. 13A–B

Figure 13A:
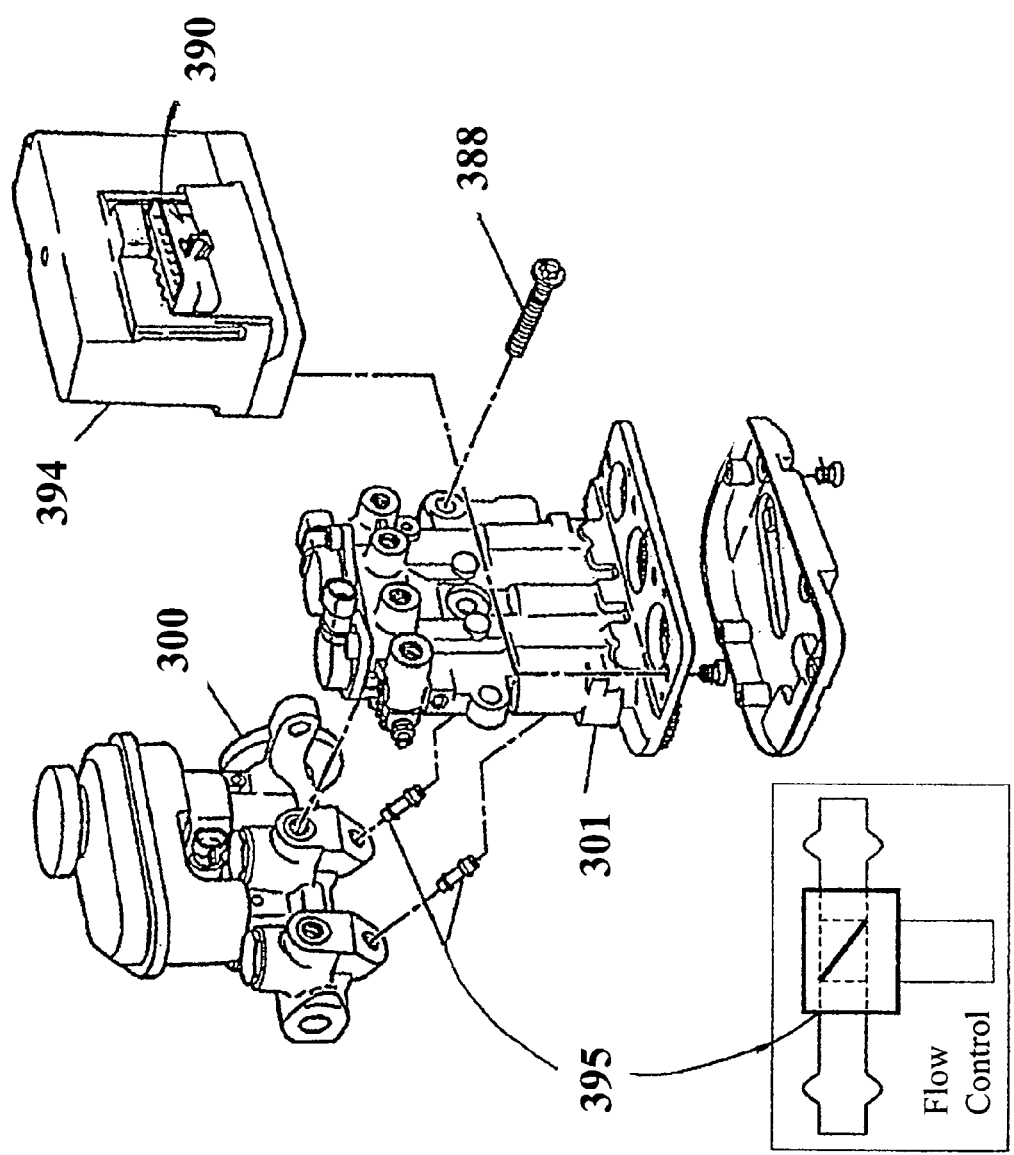
FIGS. 13A–B show how the modulator valve looks, its motor pack, its drive system, and the standard physical hook up to the master cylinder above.
Figure 13B:
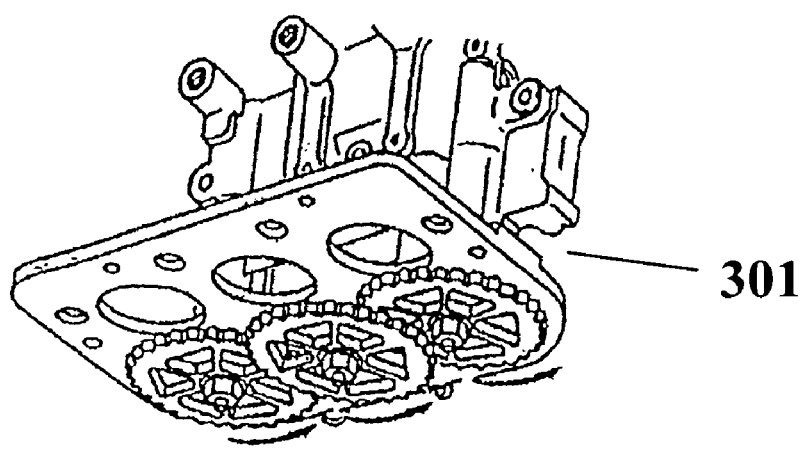

FIGS. 13A–B are additional ideal GM drawings showing the modulator valve in a 3D isometric with the master cylinder and motor pack assembly positions exploded for parts detailing. This view gives a clear look at the changes this technology provides this application to apply the regular brakes through an electrical signal. 300 is the master cylinder, 301 the ball screw piston modulator also shown on the very bottom of the picture with the bottom of the modulator valve and gear drive exposed. This is where the rotational force of part 390 the motor pack drives the three lower meshing gears and attached ball screw driven pistons in two opposite directions by changing the polarity in the motors which in turn creates the pressures of the brake fluid in the above triple cylinder block assembly. 394 is the electrical connector to energize the motors from the Electronic Brake Control Module EBCM module which is primarily energized through the electronic brake control relay and circuits. 388 are two anchor bolts that would be extended as necessary with bushing sleeves to allow for enough distance for a electric micro lock or electric solenoid valve to be outfitted with the same insert flare and seal fitting ends to replace the connecting fluid transfer tubes between the master cylinder and the modulator piston block assembly as 395 displays in FIGS. 13A–B. These tubes are the supply for hydraulic pressure to the modulator, as well as, returns to the reserve passages in the master cylinder. They supply diagonal front wheel and a rear wheel circuits, which are energized from the master cylinder's double piston shaft. A double throw master cylinder with two circuits (usually front and back circuits with an equalizing shuttle valve system) has been a fail safe since he late sixties.

At part 395 that the modulator function of the anti-lock system functions as an automated pressuring system to slow stop and detain the vehicle. And to accomplish future automated braking through electrical control if this is so desired and/or needed for any vehicle so equipped for any automated driving on any interactive highway system, or for remote control scenarios and/or robotics system needs.

FIGS. 14A–E

FIGS. 14A–E show different cross sectional views of the ball screw piston modulator valve listed as (14A) representing the figure to the top left, (14B) figure in the center of the page, and 14C upper right corner figure on the page. 14A shows one front wheel ball screw piston all the way down to hold a higher volume of brake fluid. And in 14B in the center of the page shows another front wheel piston all the way up in its home position.

These two front pistons also have solenoid valves part 391A–391B which function in the antilock system to control and create more brake fluid pressure until the cylinder pressure exceeds the master cylinder normally with the check balls 316 lifting it off its seat at a higher cylinder pressure to equalize. It would be possible for the OEM to re program their micro controller, or EPROM, to deploy these valves altering their seating and blocking the check ball galley with an inner electronic poppet device and re-machine the housing slightly to have 391 and 391B do the same as the invention's innovative implementation of C.O.T.S. add-on parts 397A and 397B. The invention has also outfitted all these cylinders with 2 micro lock offs as the drawing shows 2 transfer tube in-puts so all pistons can be pressurized in the same fashion as is done for the antilock.

However, the brake fluid would not by pass back to the master cylinder which would make the brake application from the EBCM or the electronic control relay possible; controlled from the invention (PFN and/or automated through the OEM electronics). However, accountability and cost will figure into some of this decision and that will be ultimately resolved by a standard for this automated function. The point here is, that this technology has innovated this system so that it can provide electrically controlled hydraulic braking. The software will tract and store data with date and time markers, as well as special sensed data from the system and the vehicles operation (e.g., brake systems pressures, vehicle speed, wheel sensor speeds, etc.) in its running record and will permanently store application specific data as required by any standards set for this accountable automated brake application with accountable protected memory storage managed by PFN/TRAC software M-ASMP.

The software functions of this automated braking system and any parts activated electrically through this technology's PFN will be part of this technology's electronic brake control system (EBCS), part of Mobile Application Specific Program and Pass (M-ASMP), even if an OEM's ECBM, computer or controller is desired, and ideally housed and interfaced in part or entirely with this technology's protected accountable enclosures.

Presently the complete C.O.T.S. modality description for this system will be given and all parts, plus more automated systems, for more specific manufactures will be in all the related patent applications. The first function for the (EBCS) is to provide commands to any existing EBCM 901 module which is done through the (PFN/TRAC) software to energize the 4 modulator pistons. When the EBCM receives this technology's preprogrammed instruction from the multitasking EBCS or is responding to some other on-board control system ideally housed in a (PFN). The four pistons drop off from the all the way up or raised position or whereever they are; and they will be motored down to their lowest position drawing as much brake fluid as their cylinders will accommodate. Then 901 will energize both 397 series electronic valves (i.e., micro lock there are many of these devices on the market to day in the forklift industry and racing) once all 397 valves are activated by the EBCM and/or presently planed for the invention's EBCS the master cylinder is out of the hydraulic brake circuit and the electrical activation of the 390 motor pack's three individual motors are directed by the EBCM and/or the PFNs computer/EBCS software system with data synthesized from vehicle and brake system sensors. The vehicles brakes at this point are completely controlled through the electrical activation of these motors by changing their polarity which reverses motor direction and either compresses the fluid in the cylinders to pressurize the brake system and applies the brakes or retracts the cylinders reducing brake pressure to release the brakes. Rotation of the wheels are sensed as well as the vehicle speed along with distance data, vehicle inertia, road edge, and any special command data provided by any interactive highway communication equipment as to special road conditions which are received via a common RF band/or radio station designated as a standard for the purpose of making remote control adjustments and providing driver warnings.

Figure 14D:
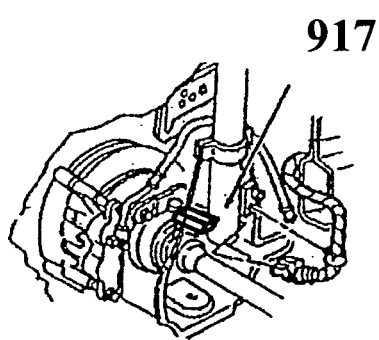
FIG. 14D shows a front wheel speed sensor.
Figure 14E:
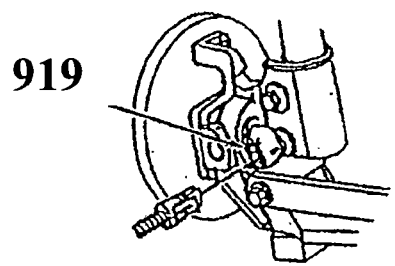
FIG. 14E shows a rear wheel speed sensor.

Ideally the EBCM 901 should call the shots here, it just needs to be reprogrammed and connected and interfaced to the control signals and a communication system like the inventions or the preprogrammed software program can be run from the invention or any other comparable control device. Here if the EBCM is to be bypassed the PFN will supply the operational current directly to the brake control relay system or strail to the motors with standard 20–30 amp VOC relays, (Siemens or Potter Brunfeld, if needed) while the invention monitors the OEM wheel sensors for speed and lock up, or the invention can also control todays EBCM and/or PCM software with its trickster circuits sending the correct electronic signal to either of the them (with the most appropriate by application specific choice) to activate the pistons in this closed hydraulic brake circuit. And once again monitoring wheel speed, vehicle speed and any other application specific data to determine the appropriate braking pressure as additionally monitored data. In the deactivated state 397 will allow all the braking systems to run normally. This lock out will still allow for master cylinder application. In this limited slow down and/or stop function, there would not be any need for more brake fluid. However, if the vehicle was operated on this system a one-way valve with a regulated bypass mechanism to the reserve would be needed to insure proper fluid pressure if there were minor leaks so as to give adequate warning to a brake problem while the system was still able to supply brake pressure. The parts still numbered and need to be named here are 317 expansion spring brake, 315 ball screw modulation piston, 311 ball screw nut, 312 ball screw spindle, 310 piston, 320 for the rear brakes yoke on ball screw drives both rear circuits. 300 is from the master cylinder and the out arrows go in 14A and 14B to the front wheels and in 14C to both rear wheels 14D shows a front wheel sensor 917 and FIG. 14E shows a rear wheel sensor 919. As has been already explained in the earlier section the use of a secondary master cylinder and/or a pedal activated system as is used for the emergency brake and even an automated plunger and/or pistons are all within the nature and scope of this invention. Some of the experimental microlocks are: "MICRO-LOC" company electro solenoid type 12 volt, "Hurst"-Roll control Jegs Cat. #530-174-5000, "TCI's" roll stop Jegs. Cat. #890-861700) and Jegs Cat. #021-LC, Line solenoid, master cylinder. Experiments are using the "Tilton 1" Cat. #454-74-1000U to plunger activate, for add-on brake pressure systems.

FIG. 14F

Figure 14F:
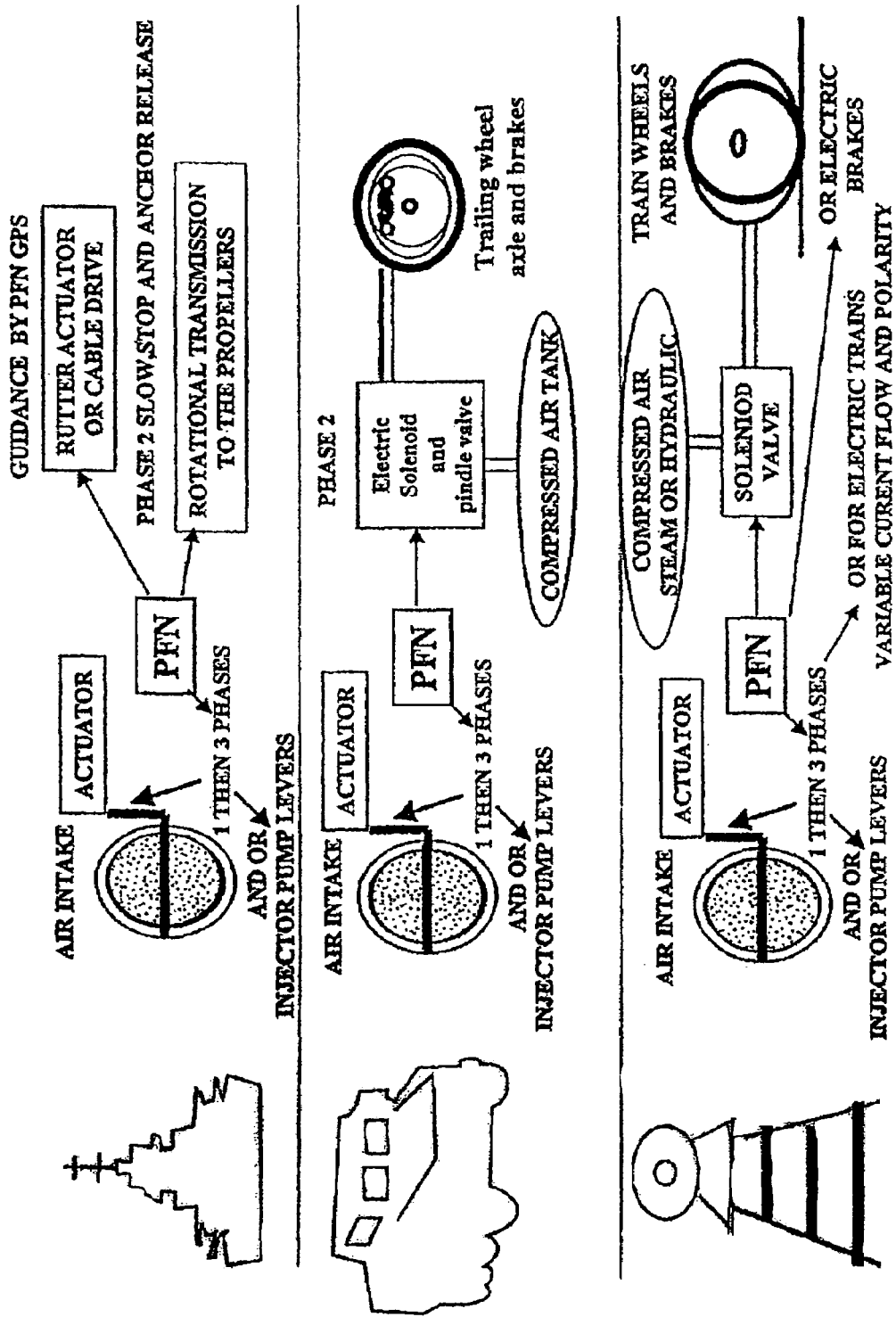
FIG. 14F shows management of PFNs for other vehicles and machinery diesels.

In FIG. 14F, for ships and boats, the final slow down and stopping for part of phase two and part of phase three is accomplished by reversing engines and/or changing the rotation of the propeller(s) through any transmission. This may already be an electrically controlled system and in this case the controls would be interfaced and coupled direct to the PFN and supported with the compatible components and connectors. Or it may be a mechanical system with linkage and/or cables and any of the already detailed devices for the automobile could also be employed for these applications and managed and/or controlled by the PFN. However, in the large truck and buses, this technology will automate the application of air to the rear brakes in the PASSS shutdown through electric solenoid valves, fuel valve with an additional pinde valve to give an nice smooth and gradual application of the service brake side. Once the vehicle is stationary, determined by wheel or transmission sensors, the PFN TRAC system will release air pressure for the maxi can and apply the maxi brakes to hold the truck in a stationary position. There are, of course, many slow down modalities already detailed by this technology to slow vehicles down including the entire power train and braking systems, however these are the prototype systems, so therefore, they are detailed a little more.

Truck guidance will be accomplished through the same modalities detailed for cars with servo motors and stepper motors, ect. and/or the direct application of hydraulic fluid in the appropriate systems. PAGSSS will provide a great service as a backup systems for compromised drivers, fatigue, ect.

For the trucking industry PFNs of varying levels will be on every vehicle section. They will be on the truck and the trailer eventually and the accountable TRAC software will provide service readiness data to the tractor pulling on its systems, and any number of trailers attached to it. These checks will be able to determine the throw in the slack adjusters to apply a brake sense wheel seal leaks, report malfunctioning lights and/or wiring through current sensing algorithms in the firmware, adjust tandem positions while sensing the load for ride and handling, report tire pressures and report on location through the PFN/TRAC system, if so desired. This will allow for the tracking of loads by trucking firm's customers through the trucking company's web page or the PFN can be sent a command to notify the customer automatically as it approaches their destination. Of course, all is maintained in a protected environment and also capable of supplying trusted accountable data.

When PASSS or PAGSSS is activated in a truck or bus, the diesel power plant has its acceleration eliminated most probably at the injection pump levers, or by solenoid valves that restrict fuel flow, either OEM or this technology's priority valve, or through the air horn and/or duct. Then the PFN applies the air to the service side of the brakes in the rear most axle as determined by the. PFNs establishing the presence of any trailers. These PFNs can be configured to communicate through their wireless systems if they are two-way but most generally they will be coupled with their light connections.

Trains and rail systems already are well set with monitoring and control systems, however, the PFN/TRAC system will ultimately couple all machinery equipment and vehicles and keep track of their movements if they are mobile. This is primarily done for managing traffic patterns and avoiding altercations in conflicting paths. Better movement of vehicles trucks and ships can be achieved on the surface of the earth through this technology's "Trip Controllers" as part of any interactive highway and/or emerging automated traffic control systems and/or interfaced with this technology's ASpider Eyes and "Green Eye" protocols. These management and control systems with their mass data and data storage automated and manned will provide many more jobs for not just managing traffic but also for giving health care, policing the community, ect. However, the Trip Controller will keep track of vehicles, trucks, trains and shipping and ultimately provide three dimensional car plane travel and air craft coordination.

And finally for the trains' solenoid valves are planned for the braking of the rail cars and the coordinated PFNs can be interfaced physically or by wireless. Most trains are built by companies like General Electric and are diesel over electric powered so the diesel motor controls are triplicated here however the PFN/TRAC system will interface with the processors and current controls for the electric drive motors and the same for the trams and trains applying brakes electrically whether they be shoes or disks.

FIGS. 15A–B

Figure 15A:
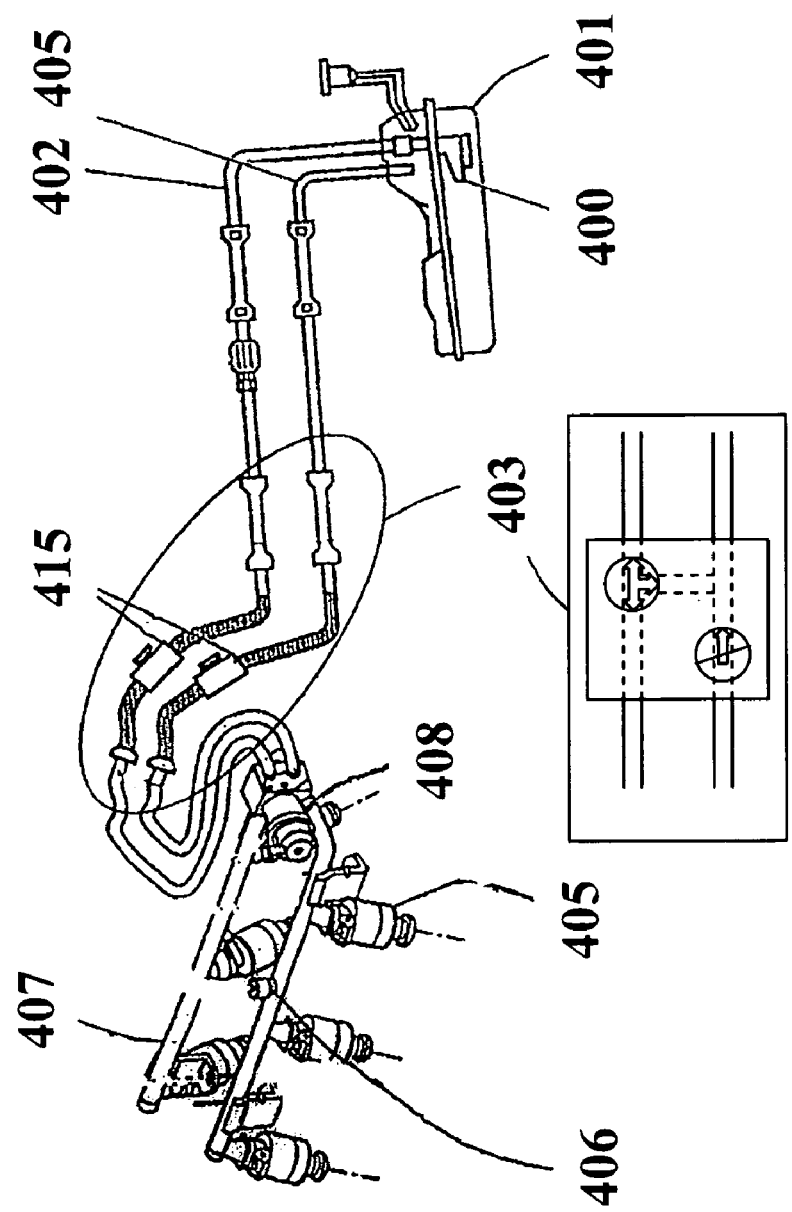
FIGS. 15A–B deal with the fuel system and most especially in these drawings the standard fuel injection systems.
Figure 15B:
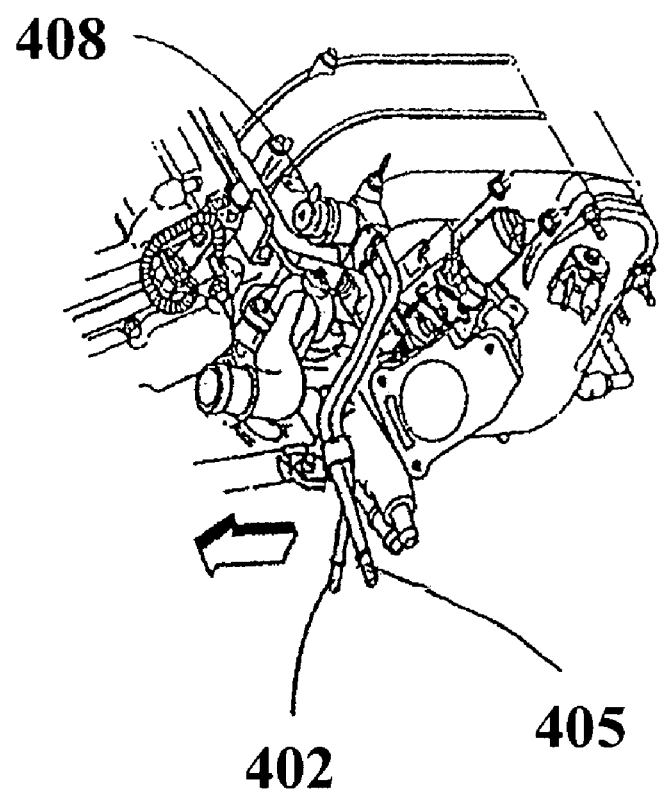

This the fuel injection system and some of the fuel system shut downs have been detailed in earlier related patent applications, but because of all the experimental work done in this area for these applications it is important to state for the record, what this invention has been employing and experimenting with in these areas. FIGS. 15A–B shows another standard GM set of parts to get fuel physically from the tank to the injectors and presently described here is where 403 the inventions fuel valve has been used on the newer GM cars. 401 is the tank. 400 the electric fuel pump and the wires to energize the pump come out of the tank with the 2 fuel lines one a supply 402 to the fuel rail 407 and the other 405 is a return of fuel from the fuel rail regulator 408. 410 is the injectors, and 406 is the test port and where 1110 emergency fuel caddie attaches (detailed later). The dotted box 403 is a unique fuel valve that has many different places, applications and other industrial uses. However, the quick disconnects on the shutoff adapters for the diagnosing of fuel problems on this vehicle were chosen as the best deployment for the prototypes of this valve system on these vehicles. The automated shutoff valve system of the invention can be configured to perform these tests and if desired and report back data from the electronic transducer to provide pressure readings, either to become part of the control circuitry PCM or to perform the test in a service environment; or also as another automated diagnostic device for remote servicing and/or control. Another reason this location was chosen is because a standard manual valve already exists on the invention's prototype and test unit for variable adjustment requirements to control fuel supply and dump functions as previously described. The bottom section on FIG. 15B is a picture showing the hard metal connections for 405 and 402 coming and going to the power plant. These are being displayed only to show where the quick connects are and have been first connected to maintain a balance with the standard fuel regulator 408 pressure as fuel is rerouted and dumped back to the tank. However, FIGS. 16A–C will show another fuel rail system presently being used and this forces the invention to supply one rail and return on another, so configurations will vary by make, model and year of manufacture.

FIGS. 16A–C

16A Fuel Rail 405 is an injector, 407 the rail, 408 regulator, down below on B is 405 injector which has its electrical connection marked 491 which receives current from the 404 which is the injector control module and can activate the injectors either directly by the crank or cam sensors input or by the PCM which determines how to augment firing of the injectors through its preprogrammed software with respect to the electrical signals sent by the cam sensor and the crank sensors as well as other sensors in FIGS. 22A–C and 23A–B. This has been explained this way to describe a number of fuel changes and modalities to control speed. As has been mentioned earlier and will be described later in the 900 series along with the first of two 1000 series trickster circuits. Either fooling the OEM electronics or interfacing with it becomes easy and apparent to anyone skilled how this technology can provide the smooth shut down for any gasoline or diesel power plant by limiting fuel and/or controlling the ignition spark all of which is detailed in numerous ways. From the beginning of the invention this automated and remote control function can be achieved with a lot of versatility to accommodate all makes and manufacturers. And it has been the intention here to show all of the innovations and automated devices and systems utilized by this technology to first control a slow down, stop, and securing of a vehicle in a stationary position, and/or to do the same for any other piece of equipment and/or machinery by providing the real products to make good commercial steps in the development of responsible and accountable remote control and robotics for these electronic fuel and spark control functions for internal combustion engines.

These are the ways presently being done to slow a car by this invention that involves the fuel system. The invention's fuel valve system has been coupled with the add on air horn valve 136Cp and 137 (various car starter solenoids) and a mini relay from Radio Shack 275-249A and resistor 279–343 that sends the right electrical current or signal by interrupting the electrical line from the throttle position sensor TPS to the power train control module PCM to signify an idle state. The mass air flow sensor MAF, controlled physically through the 136Cp air throttle did not require a trickster in the limited experimental vehicles tested but if necessary this signal can also quite easily be mimicked to deceive the PCM as can any electric signal sent to the PCM and/or any other OEM electronic module, including the anti-theft resister chip key signal.

Of course, for this to happen it is activated from the inventions PFN control box computer once the box receives its first communication. At this point the car cannot be accelerated over idle and the mass air flow is already reading the properly reduced air flow from part 136's effect on available incoming air from the air cleaner, (this was achieved by the solenoid 137 on 136 setting 136 butterfly valve to an idle position for the air intake system all by the computer sending 12 volts to the relay and solenoid on the first page or remote control signal received). The MAF sensor only reads the air flow across it and does not know where it is being restricted from, which further substantiates the electronic data and/or conditions for the idle state in any PCM and OEM electronics.

Figure 11A:
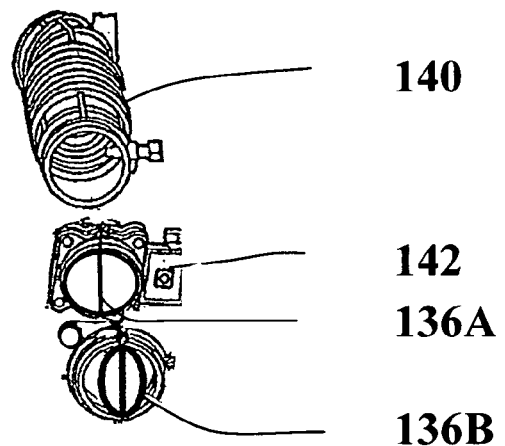
FIGS. 11A–B show three locations for an additional butterfly valve or gate to control air flow into the engine.
Figure 11B:
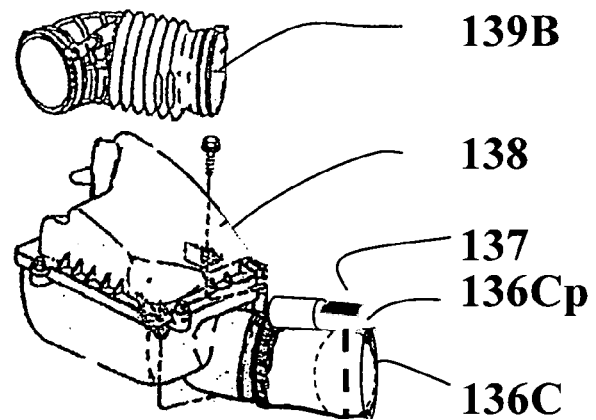

The most effective modality for a smooth slow down with partial fuel system restriction or redirection is accompanied with one small relay switch on the cam sensor pickups and/or crank sensor signal leads with just a set air horn throttle like 136Cp in FIGS. 11A–B. This combination has worked fairly well as it governs the electrical and fuel timing simultaneously by controlling the ignition control module ICM and the PCM simultaneously. The air horn can be set at two different predetermined positions however one position set from the first signal has been proven more than adequate to slow the vehicle smoothly. However, the sensor relays are controlled and closed at idle RPM as reference by the alternator signal in some vehicles and/or any other rpm sensor signal sent to the PCM. This simultaneous killing of the spark and fuel injector removes any back firing or excess fuel that may be improperly ignited and the air horn restriction has eliminated the coughing and chugging so that a smooth slow down can be achieved.

Many vehicles will not require all three of the combustion components controlled (air, spark and fuel) for a smooth deceleration of their gasoline models. And most certainly only air and probably just fuel control for diesel motors will be all that is necessary to slow and kill the motor. In fact just controlling the fuel throttle position on a diesel motor to an idle position by interrupting the mechanical linkage levers cables or driver controls or any electronic solenoid or servo motor controls, valves and/or governors either existing OEM equipped, C.O.T.S. parts or innovations of this technology. The mechanical devices will be automated as has been already detailed with electric over mechanical actuator modalities, to provide this smooth slow down. These will be the automated diesel modalities of choice to control engine RPMs and/or vehicle speed (with application specific consideration) for most all large trucks buses, heavy equipment, construction equipment, material handling equipment agricultural equipment, diesel powered rail vehicles, military equipment and government diesel equipment and/or any industrial large stationary diesel applications, or commercial diesel use of any kind, e.g., emergency power, hospitals, land line phone systems and/or for any electric generation even in the home or private use. A drawing is not provided for these simple diesel fuel injection pump control levers with idle stops because the actuator devices for the injection pump's levers, cables, and linkages will be operated by pistons solenoids, steeper motors and/or gear reduction systems with the very same modalities detailed earlier for any of the throttle body assemblies and components. The attachments and mounts will be different and the system will first be adjusted to perform a controlled slow down by returning the accelerator fuel throttle lever on the injection pump to idle position to perform the first phase slow down. For those diesels that provide a static fuel pressure and accelerate on air availability with mechanically camed injectors on a fuel rail the air throttle will be controlled in the same manner as earlier detailed for the gas throttle controls in drawings 10 and 11A–B with the control of any air horn gate valve, etc.

Figures 16A, 16B, 16C:
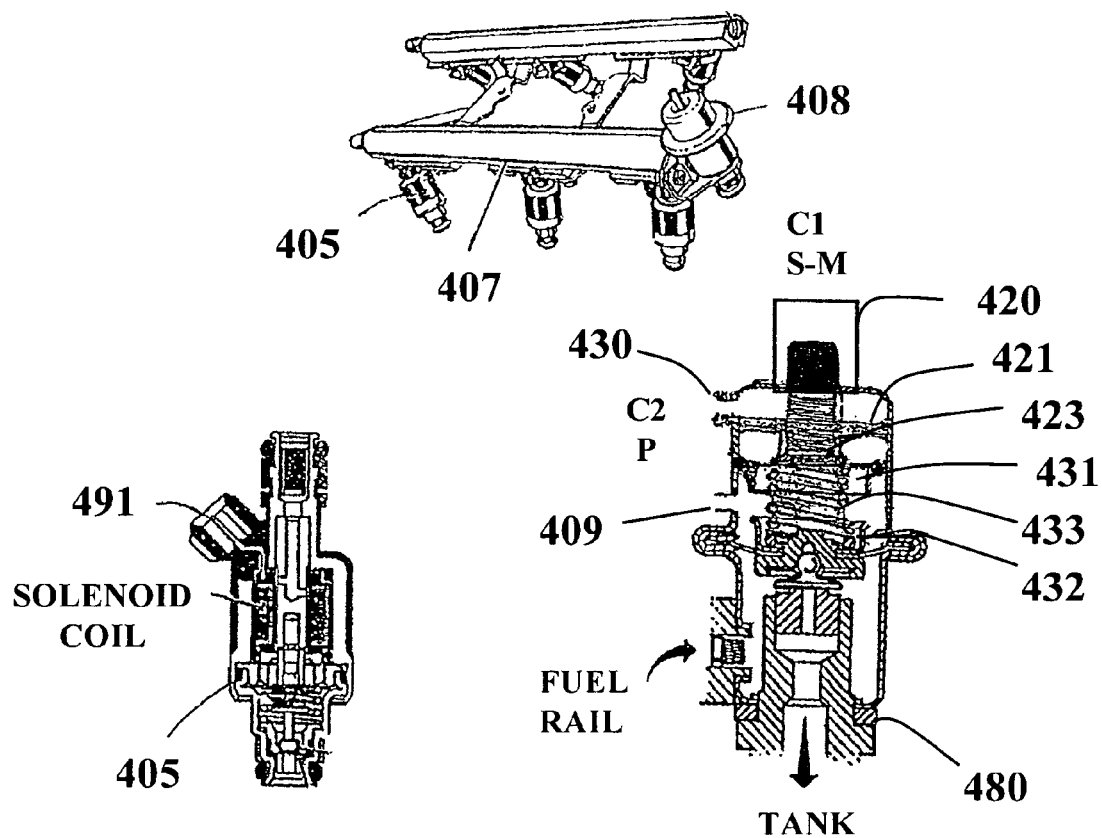
FIG. 16A shows an injector rails for one type of system.
FIG. 16B shows an injector in a cross section view.
FIG. 16C shows a regulator that has been innovated to make it a dump valve as well to starve fuel from the power plant.

Returning to gasoline automotive FIG. 16B shows a standard GM injector with connector point 491 is where the electrical connection is made for an individual injector to provide 12 volts to energize the solenoid valve with current sent by the injector control module ICM 927. Simplistically a solenoid relay switch 492 can be placed before this connection to interrupt the injector current in each injector by making the relay switch 492 open when the relay is energized by the ICM 927, or if the invention's controller or computer or any other control device is responsively connected to the relays 492 it can either totally interrupt injector current to kill the motor for another $3^{rd}$ phase modality of this technology's three phase shut down or as its first phase slow down is preferred through a preprogrammed software and/or firmware sequence that stages the injector functions either through the PCM 920 the ICM 927 or directly. And, for some already existing systems the theft detection relay can be tripped and it will signal the PCM to run a preprogrammed vehicle compromise program. Part of which can be reconfigured to retime injector firing as well as ignition or spark if necessary. The PCM coupled with other signals that the OEM software would be written for and sensing, would control a slowdown by controlling the firing of the injectors and if done through the PCM it could also adjust the electrical timing as well or it could be initiated and controlled from the inventions software which in one modality ignores the spark and adjust the air and fuel as described above in a balanced mixture or in some vehicles if necessary control the spark through interrupting the crank and/or cam and/or fly wheel sensors, as is also thoroughly described in this application but being repeated to show the combinations and modalities clearly. However, rarely does all of these sensors require trickster circuits to achieve a smooth slow down and shut down of the power plant for any one vehicle. The reason for addressing all of the OEM possible changes and all the modalities is for this technology to demonstrate a willingness to couple its automated slow down, stop guidance, control, communication and recording technologies with any and all of the OEMs pieces of equipment machinery and vehicles in every industry to provide simple but reliable and responsible automated and remote control options to be interfaced with any accountable remote control system and/or network of any size through secure protected and accountable focal nodes PFNs on every piece of equipment, and to provide the flexible TRAC software that has PASSS, PAGSSS, MASMP for total accountable vehicle control and CASMP, HASMP, CST for accountable control with all other applications.

FIG. 16C shows a modified fuel regulator 480 (a 408 replacement) which illustrates 3 different fuel control mechanisms that should prove to be a good set of modalities for OEMs to further automate and change their fuel pressures, i.e., for future needs to meet any fuel chemistry to run a power plant more universally or on more diverse fuel products. And presently to combine the regulator with the inventions fuel valve to decrease fuel in the rail and dump the decreased volume more conveniently into the return to slow and/or control and/or deactivate the vehicle (phase two and three of the shut down).

420 C1 S-M in a dotted square represents either a small servo motor or a solenoid, which are 2 of the ways that 480 has its pressure transfer disc 431 raised to lower rail pressure and lowered to raise rail pressure. The third is through pressure port 430-C2P where either hydraulic or air pressure would be increased in the top chamber to press 431 down to raise pressure in the rail or 430's pressure would be reduced which will decrease the pressure in the fuel rail. 431 has a high pressure seal with an O ring to support a pressured power system in this C2P version. In the motor or solenoid version C1, the seal could be reduced in its physical structure to be merely a wiper and guide device for the motor or solenoid applications. The pressure power could be provided by any number of systems but the sealing surfaces would naturally have to chemically and physically comply to the system chosen to perform this operation, e.g., coolant, power steering, automated brake systems, shock absorbent compressed air systems, and/or any compressed and/or accumulating system that can provide a safe regulated pressurized energy source and can be electrically controlled to deliver the power source by a specific electrical signal and incrementally in both directions, i.e., spindle and solenoid valves, motorized valves So 431—C2P will have attached to this port a electrically controlled valve (that is compatible with the pressure source), and that will deploy pressure to 480's top pressure chamber in the proper increments as prescribed by the appropriate sensor data processed by the PCM or the inventions processor circuits and electrically controlled and directed.

In FIG. 16C, 421 is a fixed plate to the outer wall with a threaded center hole that accepts a screw drive or spindle that is rotated by a motor in the C1 servomotor or stepper motor application. In 430 C2P modality the plate does not exist and this is why it is displayed with dotted lines and is slightly shaded, in these pressure systems. This chamber is vacant with no 421 part. However, in the motorized system, the internal nut drive armature rotates the threaded screw or spindle down to increase pressure in the rail and then changes its polarity to rotate the nut armature up to lower pressure in the fuel rail.

431 is placed in the standard position by the control circuitry for 433 spring to tension the 432 spring receiving hub like in the standard diaphragm device in the standard regulator 408 to maintain a within tolerance seat on the fuel return valve surface to create the proper system pressures in the fuel rail, as activated from port 409 which is the standard vacuum used to adjust fuel regulated pressure with respect to manifold and barometric pressure.

Also in FIG. 16C, the S configuration solenoid application 421 is not used and nothing is treaded but only a spring loaded shaft attached to 431 which has only 2 positions either down to allow 409 to adjust the vacuum draw on 432 diaphragm to regulate the fuel in the standard described above fashion or all the way up to remove most all the tension on the 432 part which once again allows for the fuel pressure to be dumped from the rail. Push/pull solenoids with internal springs exist for both to apply continuous current and for momentary activation in either direction may be used, such as solenoids found in Jameco catalog and many other electrical supply houses.

The fuel pump could be interrupted easily through its direct service and a relay controlled electrically through any of the four control systems constantly referred to throughout the invention or even its own fuel pump relay by tricking oil pressure switches or other engine protection devices on some equipment and vehicles and/or directly by controlling the fuel pump relay itself or de-energizing the power source directly with relay interrupt system. Alternatively, the invention could work with any and all such theft deterrent systems that have this capability already as a design by any OEM already. Also, as discussed earlier the stopping of fuel flow through interrupting the injector module which has been done experimentally by eliminating and/or controlling its timing signals and/or cutting the power supply to the ICM. There will be more detail on these modalities in the discussion of the electrical components specifically the trickster circuits to allow for retrofitting older vehicles and other equipment and the linking of some modules software without having to change it to interface these innovation to automate a smooth slow down to a stop or kill of the power plant (phases one and three of the shutdown).

Of course, much more individual manufacture detail of all the C.O.T.S. innovations will be in the individual management and security applications for these automated vehicle, equipment and machinery systems. Hopefully the present discussion is adequate enough to familiarize those skilled in the art to refer back to this section in the electrical description section and reference all the parts by numbers and the above description of their mechanical innovative functions as they are controlled electrically to achieve the many successful means accomplished here in this automated systems application. Most all experimentation was done on the readily available GM products for all these systems but the innovative devices used can be fabricated for most all OEMS because most device innovations for all the systems in this applications were taken from supply line manufacturers that basically supply all the major manufacturers. Once again C.O.T.S. devices.

FIGS. 17A–B

Figure 17A:
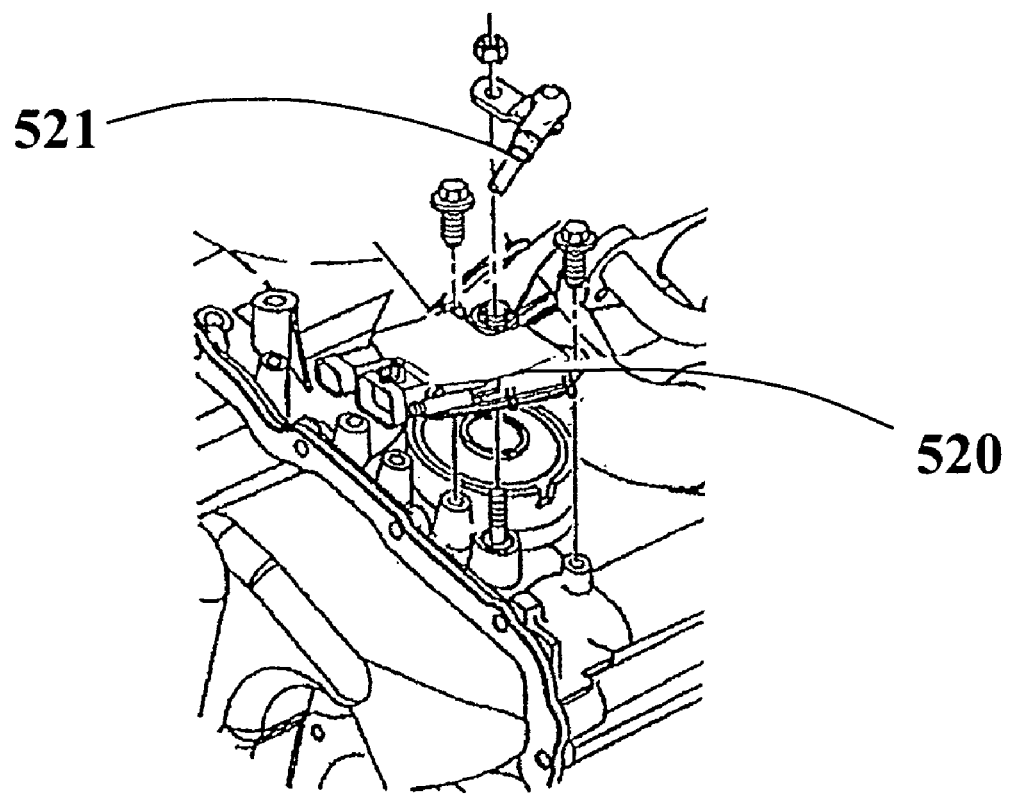
FIGS. 17A–B show the standard transmission switch with a cable link up for park function and the electrical connection for the switch.
Figure 17B:
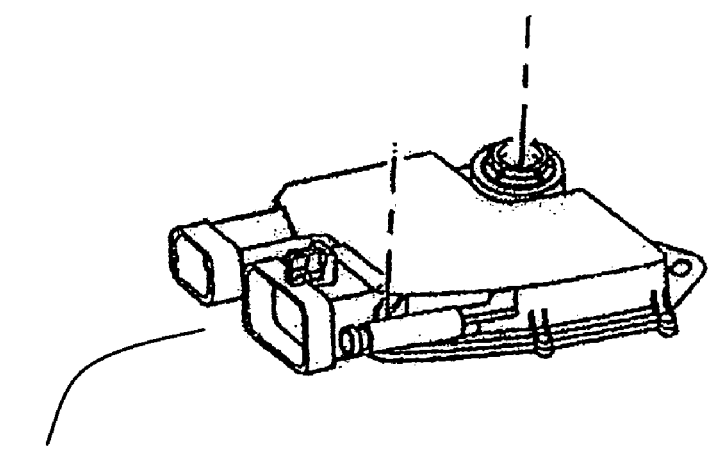
Figure 18D:
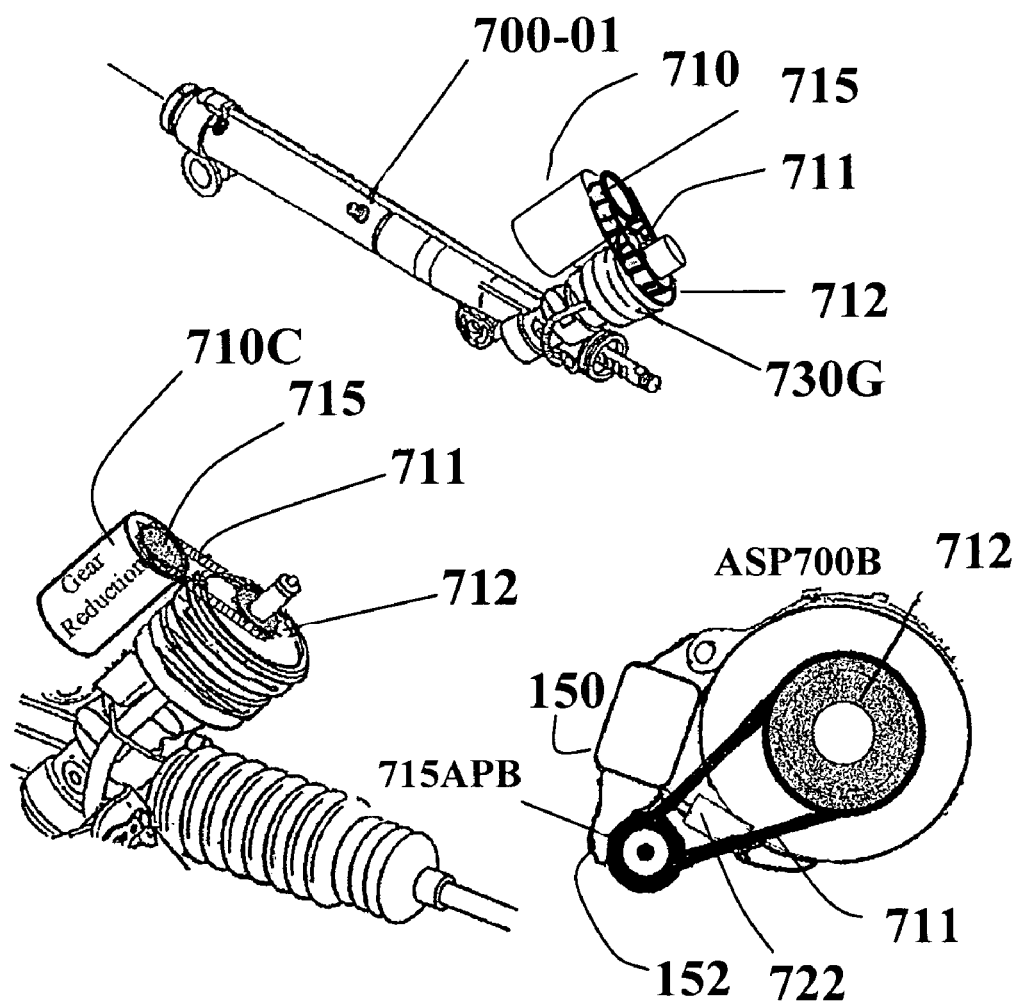
Figure 19B:
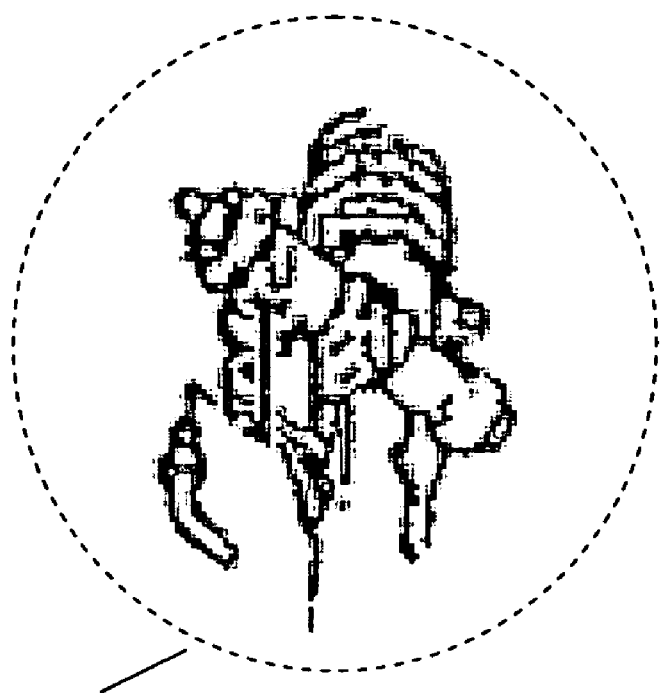
FIGS. 19A–D are more of the rack innovation and description.
Figure 19A:
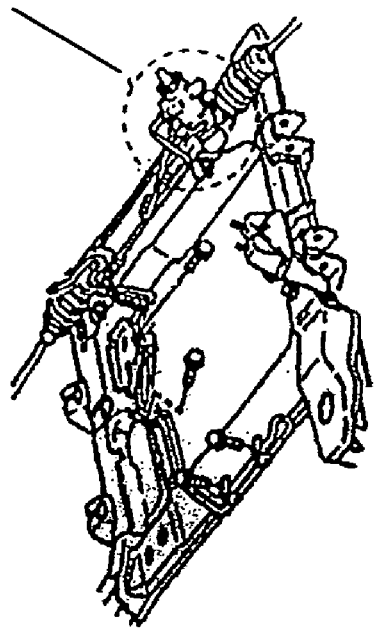
Figure 19C:
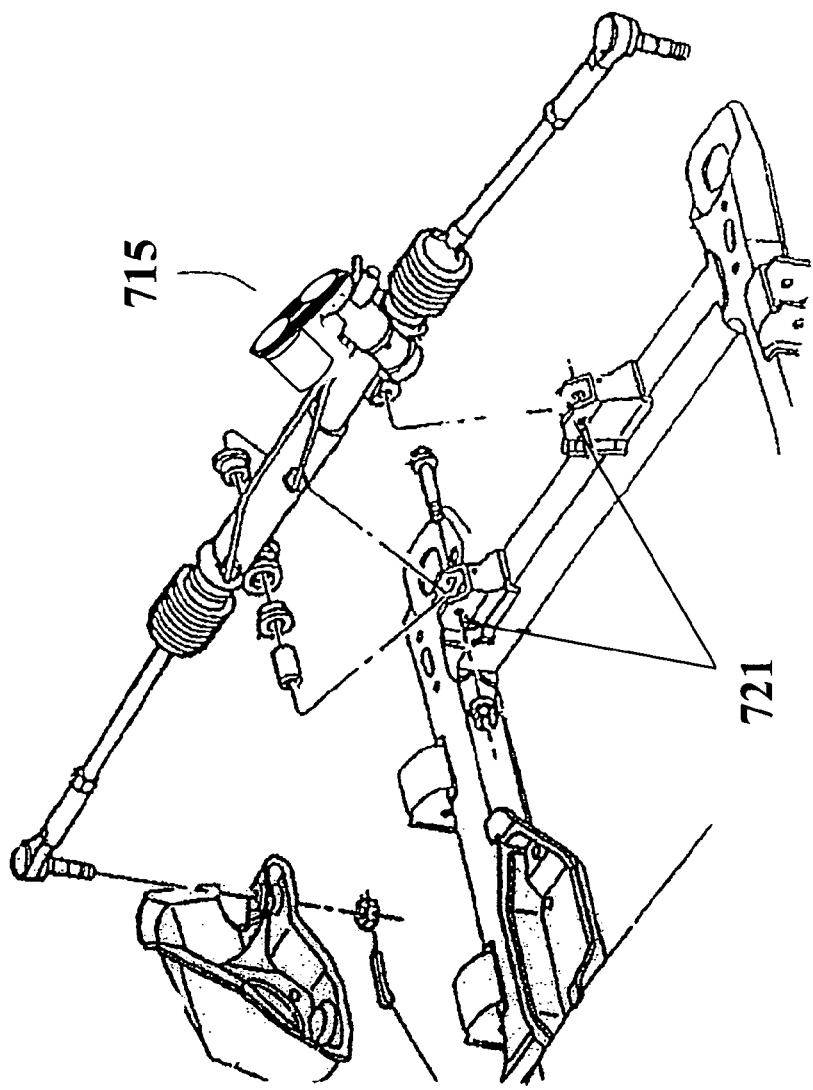
Figure 19D:
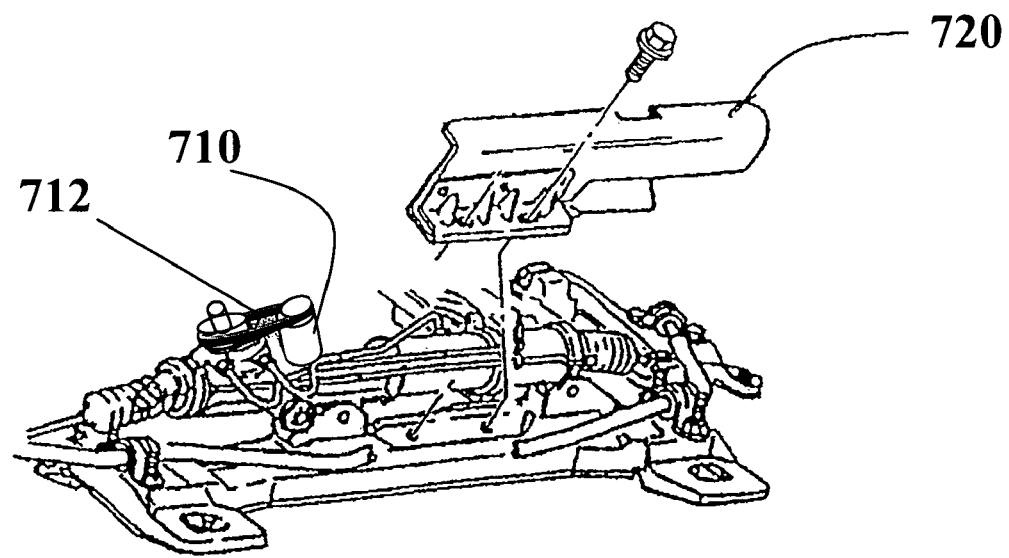
Figure 20A:
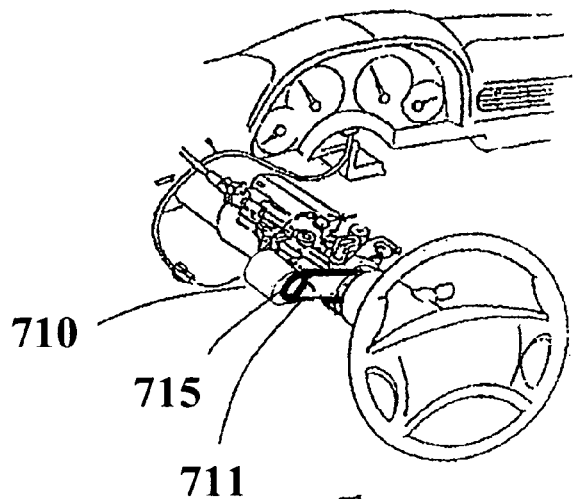
FIGS. 20A–E show how the motorized system can be attached anywhere alone the steer shaft linkage and the many possible column mounts.
Figure 20B:
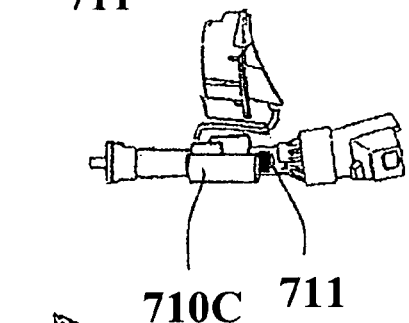
Figure 20C:
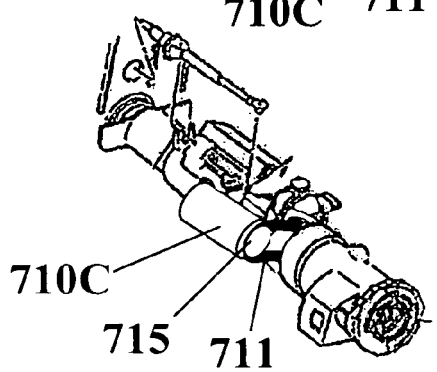
Figure 20E:
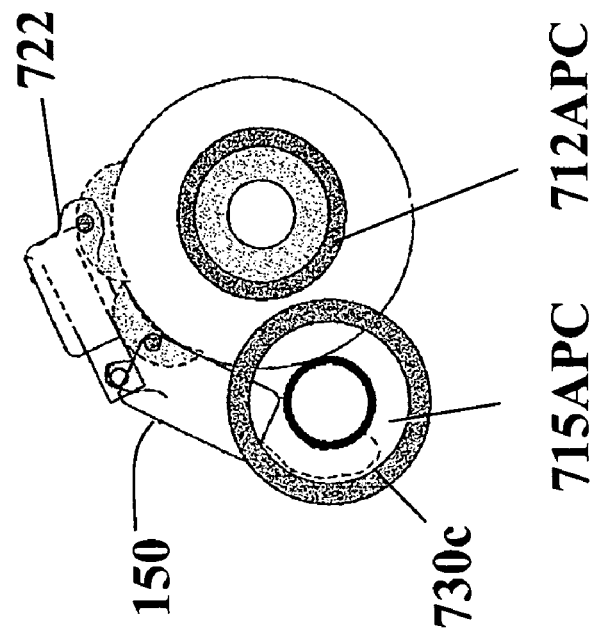
Figure 20D:
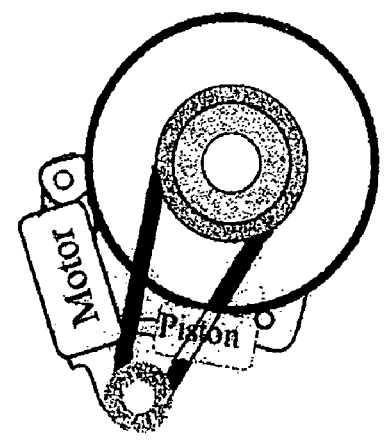

FIGS. 17A–B involve the 500 series parts and it displays the transaxle switch and the cable end. The first point to be made here is that any and most all the already cable interruption devices discussed for the throttle section can be augmented easily to control the cable action to shift the trans axle into neutral And there by eliminate vehicle acceleration but not power plant acceleration. The car would merely be sent into a coast state and would come to a rest at which time either the transmission speed sensor and/or wheel sensors would signal the slowed or stationary state and shift the transaxle into park (this would accomplish phase one slow down and phase two with the securing the vehicle in a stationary position of the shut down) This can also be accomplished with shifter solenoid like Shiftnoid Jeg's Cat. #254-SN 5000FC and/or by air by utilizing Jeg.'s Cat. #302-AS IK. This is a compressed gas bottle system, etc.

If a more controlled slow down and stop is desired through the transmission, the electric solenoids for first second and third along with the solenoid torque, the converter clutch lock can be deactivated either through software programs placed into the PCM that will shift down from any speed when the program is activated simultaneously disengaging of the torque converter clutch lock solenoid in progressive descending gear deactivation to slow down the vehicle by deactivating the above mentioned OEM shift spool solenoids in the transmission to dump their fluid flow into the reserve rather than energize their respective pressure plate packs or drums to drive the final drive and out to the axles and wheels. If the invention was to be employed to run a simple software program to count down and deactivate these solenoids it would utilize the same circuitry as described in FIG. 2A and software program in FIG. 3 with some augmentation time pauses for a smooth shift down, and it would access the electronic circuits by interrupting the contacts ABCD in the GM products for front wheel drive through connector 523 and the circuits and connectors entering the transmission from the PCM or onboard computer of any other vehicle for this purpose. To deactivate all at once the E terminal would be interrupted as this is the common side terminal for all of the above-mentioned Shift Solenoids. This last E terminal is the best modality for this transmission slow and stop sequence modality, from an experimental perspective for a smooth slow down to accomplish the phase one of the shut down.

For rear drive cars with electrically controlled shift transmissions the same interruption and electronics would be possible, however there are still a great deal of cable and linkage shift vehicles. For these vehicles the above-mentioned cable automated control innovations and linkage devices could be employed and fabricated application specific to shift the vehicle into a neutral position. All these modalities have been well covered and would vary in mounts and attachments per application, but their same push pull function would be adjusted to shift the transmission out of gear as a phase one PFN instruction to slow down a vehicle of this technology's unique shut down procedure. However, as was earlier detailed a solenoid's throw with a spring return and/or servo motor or stepper motor with appropriate attachment guides and/or gear configurations can be attached to any mechanical control linkage and levers directly to create the electrical controls to automate shifting for most all mechanical control shifter transmissions, the automatics or hydromatic systems. But also, an easy configuration for manual transmission to solely shift the transmission into a neutral position to accomplish another slow down modality for this technology's emergency shut down protocols, which always includes a secure stop in a stationary position and at least an auto record of the event.

This application's primary goal is to detail all the possible ways to deactivate a vehicle and/or pieces of equipment or machinery with improved safety.

FIGS. 18A–F

A second level to this technology's responsible and accountable three stage shut down adds automated and remote control guidance to most all land based vehicles. This is managed by TRAC program protocols (PAGSSS). Once again GM parts and systems are displayed in this application, but these components are typical generic driver controls systems and linkages for power steering in most all vehicles so that anyone skilled in the art can construct the application specific parts and/or reconfigure existing C.O.T.S. products presently being made for other uses by each of the manufacturers and/or supplied to them by their supply line manufacturers as is done in for these next four figures and their descriptions.

FIGS. 18A–F show a traditional rack and pinion power steering piston assembly for the present day GM cars. This is the 700 series automated steering parts and devices to automate the power steering of today's automobiles and for the most part the present discussion will revolve around the GM rack and pinion system and the column shaft drive system. The column shaft displayed is also a GM Chevrolet and Oldsmobile type steer column with a exploded parts view in FIG. 21 and it shows a way to automate almost any vehicle with a steering column. This means that most all vehicles irrespective of make, model, or year can be provided at least one of the configurations displayed in these sections.

Part 710 is a motor with an in-line gear reduction to provide more normal driver steering movements in speed when the motor is activated. Any number of drive systems can be utilized and affixed to the stub shaft of the steering gear. Part 712 outfitted on the stub shaft which can be either a pulley, sprocket, gear or cogged hub to accept a cogged belt or any kind of belt, i.e., V and/or chain or even a direct gear mesh so long as these mechanism can be configured to slip when engaged to allow the driver to defeat there control if he so desires and there has been no legal enforcement reason for the automated steering to be activated. This is also true for the FIG. 21 where a gear is shown as part 713 on the steer shaft just after the swivel joint for the tilt steering as it passes through the steer column. On the outside of the column is shown a motor assembly which will be a gear reduced motor assembly part 710 again and/or some form of a stepper motor assembly. These functions can be performed by the cable drive system for the seat controls with various reconfigurations. This technology provides one such innovative modality with a jack shaft and belt tensing solenoid system to be described presently. In fact, these following drawings show a motor assembly which would be designed with a automated sliding adjustment, to disengage and reengage the automated steering by an electrical signal sent from the PFN to, i.e., a Solenoid or worm gear with some spring tension as part of a defeatable steering consideration, held directly against to the steering system parts in one modality.

The ASP700A diagram in FIGS. 18A–F shows the motor placed away from the work area and provides more room to deploy a defeatable steering drive device that will steer the vehicle unless the operator overpowers the automated steering control system.

Three drawings are from the prototypes and designs being experimented with and are labeled ASP7000A, ASP700B on FIGS. 18A–F and again ASP700B and ASP700C on FIGS. 20A–E. All three of these prototypes could be mounted any where that it is convenient on the steering linkage and drive shaft section, either on the column or on the steering gear box stub shaft. The following drawings will illustrate and describe how the system works. (ASP stands for automated steering prototype).

On drawing 18A–F, in ASP700A, 151 is the seat control cable drive 257, which is the horizontal seat shifter gear. 724 is a pivot pin or bolt or clevis pin. 723 is an anchor strap that can go around either a section of the steering column tube or be attached to the pinion gear input shaft housing 730 or any other gear box for that matter. (There will be different anchor brackets and straps to be fabricated to make this configuration as universal as possible which will enable this modality to be custom fitted to the many different vehicles.) 730 illustrates the center of the pinion gear housing or the steering column as viewed from the top end. 712 and 713 are meshing gear as shown in diagram ASP700A and also shown again in FIG. 21 on the steering shaft. However another variation of has 712 and 713 as pulleys and part of a belt drive system, but no matter which variations 722 a tensing or meshing solenoid would be present to control engagement of the automated steering form the PFN.

Still on FIGS. 18A–F, and again shown for reference on FIGS. 20A–E a pulley modality and belt system is displayed as ASP700B. This time the cable drive is not employed but the same 150 right angle geared seat motor assembly is used and the output drive is outfitted with a pulley 715APB in a direct hook up and motor mount system that holds the gear reduction bushings and support to furnish a rotation point for pulley 715APB which is driven by a square key drive as the male cable drive ends that normally are inserted in this motor transfer drive gear assembly. 723 is the anchor and mounting strap and the 722 part is a tensing solenoid used to apply the belt that can be defeated by the driver. 711 is the belt.

This is a right angle motor mount system, however the rest of its belt system will work the same as any belt system set up for a parallel motor mount or cable driven parallel jack shaft with belts and pulleys.

The rack and pinion illustrations 710 A and 710 B and the middle figure depict an inline stepper motor parallel mount on the pinion gear housing. This whole inline motor and gear reduction assembly would be mounted parallel to the piston input shaft on two equally spaced eccentric pivot points along the length of the motor that are held in place by adjustable constricting band(s) that have an actuating solenoid mounted perpendicular to the pivot points on a parallel pivot point attached to the band to provide tensing and the engaged position to apply the automated steering forces when the appropriate signal is sent by the PFN, instead of solenoid a piston or motorized worm or screw drive can perform the same tensing function with different mounts. The application of the automated steering is part of the second level of this technology's accountable shut down. The first steering and guidance functions are performed by an automated preprogram software protocol that determines the road surface only and just guides the car enough to stay on the road surface as the shut down stops and secures the vehicle in a secured position. Audio warnings and hazard lights are all going as well as all recording equipment and data storage. This automated guidance as part of the shut down function will function with police and with out the police in the event of an unconscious or incapacitated driver. Even the first level automated shut down procedure will activate without this guidance feature if a driver is sensed to be unconscious or not in command of the driver controls with the warnings, hazard lights, and recording devices storing all data at the time of the event. This automated deployment of the shut down system can be reversed or abated by an alert authorized driver unless it is initiated and controlled by law enforcement. Even though the automated shut down is less than ideal without guidance, it is an improvement on a bad situation regarding the incapacitated driver. And as a general rule this procedure will lessen the time and distance that the vehicle will have to produce fatalities and damage in the out of control state while still moving. This is the first level above PASSS and the software for this TRAC program (PAGSSS).

FIGS. 19A–D

FIGS. 19A–D illustrate the different planned locations for the prototypes and it shows them in a parallel gear reduced in line motor configuration. These positions however are going to be done with the right angle seat control motors as have been detailed through out this application. So just the locations and part makings for a better understanding of the entire system are relevant to see the versatility. These will be updated and illustrated with the entire prototype configurations.

FIGS. 20A–E

FIGS. 20A–E show another belt or chain drive configuration being used on the steering column inside the cabin. This system is showing the same inline gear reduction or stepper motor configurations, with the exception of the two latest prototype configurations being experimented with presently. They are shown as ASP700B a right angle motor mount on the column with a belt drive the illustration left of center; and ASP700C right of center which is a rubberized friction wheel drive used on the column. Once again, these modalities can be configured to attach with mating surfaces (splines, key ways, set screws and roll pins, etc.) their rotating interface component (gears pulleys sprockets and wheels) can be placed any where along the steering linkage tilt wheel shafts parts 731 and 732 in FIG. 21, where permissible. From right under the steering wheel all the way down and including the input shaft of any connectable steer gear box.

All of these prototypes might be best served if mounted in the interior of the cabin to best protect them from the elements, and to reduce cost for extra shielding to protect them against harsh service environments. But, because, these devices are used in aggressive remote control scenarios for the unauthorized use of a vehicle; this technology claims for any protected coverings that are designed strong enough to double as harsh environmental and tamper resistant shields for theft deterrents protocols. Because this all falls within the nature and scope of this technology's protection of peripheral devices, all the modalities described and detailed here in are being experimented with presently, both in the cabin locations and in the exterior locations with whatever protective measures they will require to insure their safe reliable and accountable operation.

ASP700C is another end view showing the rubberized friction wheel modality. This time the rubberized wheels, part 715APC, mounted on a tube with bearings to raise the wheel up so it can spin freely without striking the motor gear reduction housing. This might have to be done for the pulley 715APB in ASP700B in FIGS. 18A–F. In this case the square drive would run up in side the tube and drive the friction wheel or pulley. However, a ⅜ drive shaft has been outfitter with $5/32^{nd}$ squared extensions and made the appropriate length raise the wheel or pulley and drive it. 712APC is mounted on the steer shaft linkage inside the column (or on the gearbox mount). This system is best on a thin diameter column application with a FIG. 8(A–C) design covering shielding or cowling with one circle area encasing the column and the other circle area encasing the motorized friction wheel motor drive assembly as viewed from the end looking down the column. The rubberized wheels are used in paper converting operations and printing as pick up or gripper wheels to deliver the paper to the machine to be processed. These are neoprene wheels that are being experimented with in the first prototypes for this modality. 150 is the seat drive motor and the parts are named and numbered in drawings 5A–F. The changing of the motor polarity changes the steer direction from left to right as the motor rotates 712APC off of 715APC. 722 is a continual run push solenoid with an internal spring. This could be done in the reverse as well and experimentation with this part of the device is still in process, a small piston is another consideration as well a nut drive or worm gear or motorized screw device. However, the pressure applied to pivot motor and wheel assembly must be adjustable to allow for the driver to defeat its drive force if this is a desired condition.

The on-board driver will have priority in these earlier systems, but in the future coupled with law enforcement aggressive remote control will advance and help to use these innovations forcefully to guide a suspect vehicle to a safe location where it can be stopped and detained. However, this technology's PFN software will recognize, any attempt to guide even these earlier versions and will record the drivers attempt to control the vehicle over the PFN control. This happens when the vehicle is guided away from the computer controlled program which recognizes this by the sustained motor drives and steering wheel position sensor that are giving contrary data to the desired program through these sensor results. Trouble codes will be set in the cabin the PCM and on the public information bar (see PCT/US99/00919) another innovative device as well as give any preprogrammed messages inside and/or outside of the vehicle as to the state of the compromised vehicle program.

FIG. 21

Figure 21:
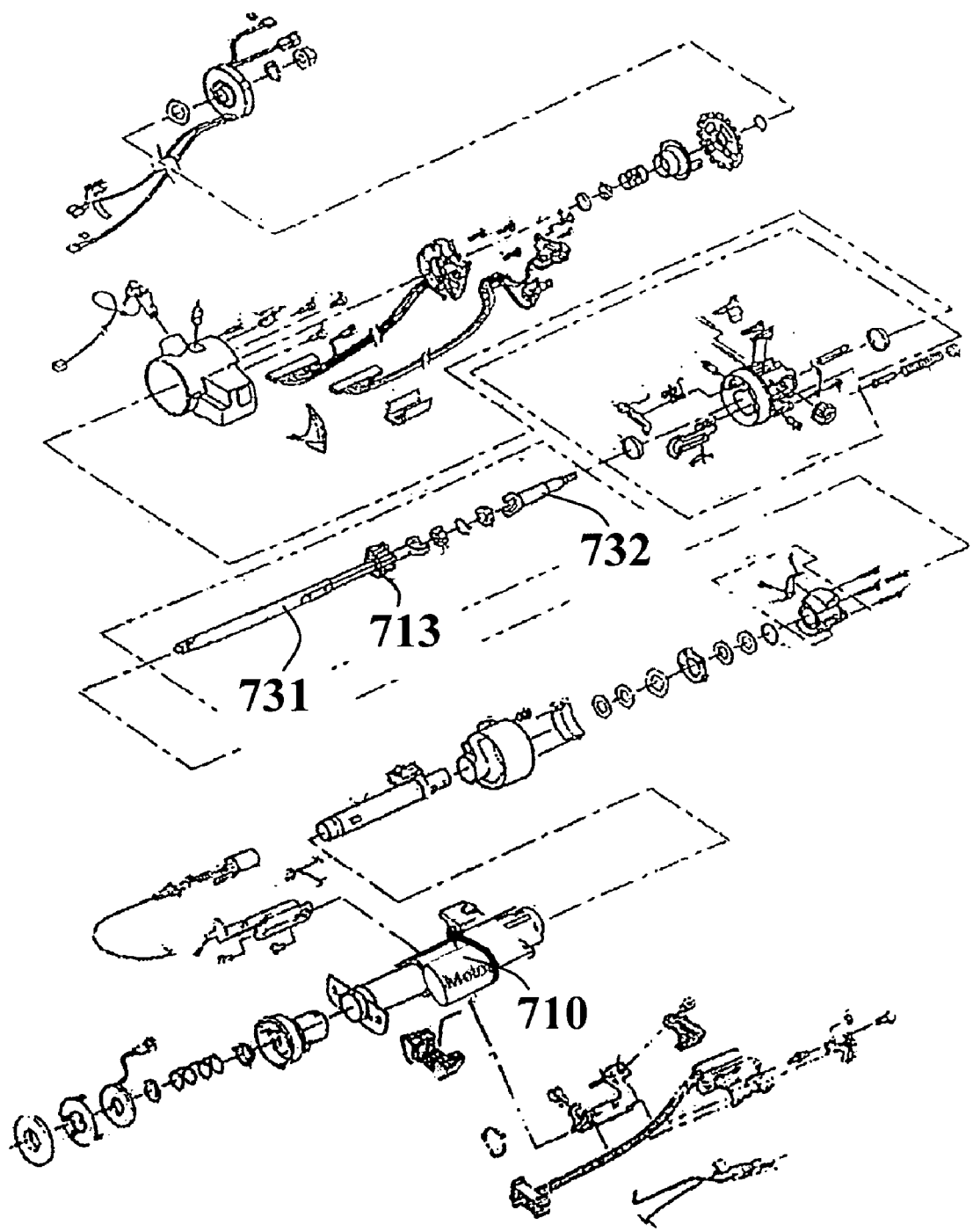
FIG. 21 is an exploded view of the steering column out of a GM car to show the drive pulley on the steer shaft linkage and the column mount for the first prototypes.
Figure 22A:
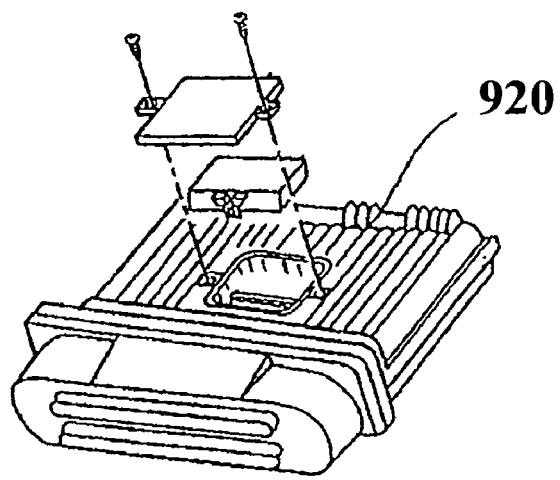
FIG. 22A–C detail the three major components to controlling engine timing for the spark and fuel in the GM cars.
Figure 22B:
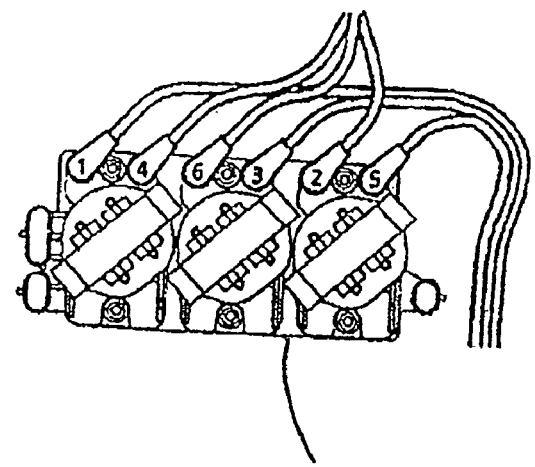
Figure 22C:
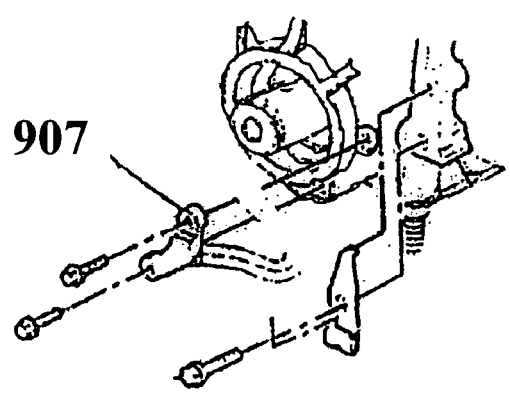

FIG. 21 shows an exploded view of a GM tilt steering column for a Lumina and the internal parts. It also shows where the prototype is going to be first tried in the cabin. This drawing will be either the same with the final prototype installation or it will change to show the exact location and best prototype combination of parts to complete this automated steering along with any other detailed system drawings if necessary.

In some of the other experimental prototypes with a remote cable drive, the cable 151 will couple to the motor on one end 150,152 from the earlier figures and on the other end to a thin jack shaft drive, part 716. This coupling has already been extensively described in FIGS. 5A–F. The jack shaft's other end will have part 715 which is a pulley that has a ¼ inch V belt which also goes around 713 area, but is a pulley like 712. Depending on both the jack shaft mount and the steer shaft mount, they could be could be a sprockets and chain or some cogged belt system with a slip center hub or the gear 713 with a mating gear on the jack shaft.

If a belt system is used either on the column or down on the steer gear box the belt is held in a guided but normally loose and disengaged state around these two pulleys by the shield or shrouding either as part of the column or attached as an assembly like the rack and pinion steering gear in FIGS. 18A–F. The belt might work better if it is a composite. This is done through the same brackets on the steering gear that clasp either the entire motor assembly or any thin jack shaft and tensing solenoid modality. Of course the tension control solenoid engages the belt drive, either with any of the motor gear reduction systems to turn the steer linkage shaft directly or the stub shaft on the steer gear box or drive either one rotating shafts with the jack shaft drive, which is similar to the direct motor mount system described as part 710 in FIGS. 18A–F in how it functions. The amount of steering control given to the automated system will rely on the presence of a conscious driver and law enforcement considerations. It will be possible to take complete control over the steering, but this will not be done until the correct safety equipment is onboard along with the appropriate software, all of which will be sanctioned by DOT, NTSB, ANY INDUSTRY STANDARDS LAW ENFORCEMENT AND THE INSURANCE INDUSTRY, so that the calculated risk to utilize automated steering to increase safety is weighed against the unavoidable dangers for any compromised driver scenario. These systems will be evaluated by the above organizations, government agencies and commercial industry to set guidelines and standards rules regulations and laws for the use of these aggressive automated remote controls to slow, guide, stop and secure a vehicle in order to create standards, and to achieve this goal it will be very necessary to use this technology's protected accountable box to interface the automated remote controls and memory storage to assess liability and accountability as well as to evaluate and improve the systems performance.

There is a set progressive order that this technology has foreseen as responsible commercial developments for aggressive remote control of a vehicle:

1. First; all automated and remote control deployments must be accountable and made through protected memory storage. (onboard optionally off-board)
2. All automated and remote control functions should be done and/or coordinated with law enforcement whenever possible.
3. First Level of this technology's vehicle shut is:

| I | II | III | TRAC Software |
|---|---|---|---|
| Level One | | | |
| Warn\Record\Slow, | Stop\Secure in a Stationary Position | Disable Power Plant | PASSS |
| Level Two | | | |
| Warn\Record\Guide\ Slow, | Stop\Secure in a Stationary Position, | Disable Power Plant | PAGSSS |

The level one protocol without any guidance will still be utilized without law enforcement in cases, where no driver is determined to be in control of the vehicle by on-board responsive TRAC software to specific sensor data from the operator and the vehicle (e.g., unconscious or ill or a driver panic button has been). The legitimate in control driver can abort the automated shut down with his/her pin code or retain control signal. Even this unmonitored accountable automated shut down is considered a better option to the out of control vehicle with no warnings or no controlled end in sight, as the first commercial step to improve this hazardous condition. This first modality granted is no panacea, but at least it will be slowing and reducing the most harmful impact of a head-on collisions, as well as, the amount of time and space the vehicle will have to do damage. In this sense this first shut down modality can provide measurable improvements to an already inherently dangerous situation.

As this technology's more sophisticated, monitoring equipment and programs are deployed with these automated and remote control devices in more vehicles, much more driver identification and driver capability protocols will be employed. These level two commercial enhancements with accountable automated remote control will encompass simple dexterity checks or exams, breath evaluation through atomospheric sensors, for the eye, iris and pupillary response, measured for identification and the size and response time to compare this data to the automatically collected healthy normal state ones stored in the software compare files for the same person and for variable environmental light conditions. This preprogrammed function will be performed through the inside cabin cameras and atmospheric sensors and/or fingerprint and pulse sensors in a steering wheel assembly and cabin mount for cameras and sensors (this way data will be continually updated for current authorized and the capability of the drivers). Many of these vehicle and operator monitoring systems have been discussed in the related applications and will be further detailed in this application. They are being described here in the automated steering section to better detail this technology's automated shut downs in their commercial deployment levels One and Two for smarter car development, and level Three, which will be full robotics driving and interactive highways (TRAC's MASMP and RPV programs for Remotely Piloted Vehicle). When these levels are married with this technology's secure protected accountability functions in its PFN societies requirements for legal liability can be addressed for any shared control of a vehicle during automated remote control and/or robotics driving. This technology recognizes this necessity for the insurance industry needs and for the public's laws. These are the responsible remote control commercial devices, system developments and deployments considered by this technology as appropriate steps to develop standards, laws and law enforcement protocols to improve public safety presently and into the near future, as well as, distant future for the technically evolved use of the personal automobile.

For the level Two automated steering protocols the first priority will be to massively reduce and/or eliminate unconscious head-on accidents by maintaining motion in the same traffic flow direction and not leaving the road surface. Head light sensors and distant sensors will provide reference data continually in which software algorithms will be able to detect a normal mean state, also any magnetic or road edge sender data will be utilized by the software program wherever available. Otherwise, the onboard distance sensors will be reporting side front and back relative to movement data which will also be processed through the onboard software algorithm(s), and the onboard cameras will have their image transposed to a digital data signal or specific signature that can be identified more specifically as objects, like the different surfaces of the road, lane and line markings, barriers, other vehicles and/or persons, or animals, etc. So all of these data streams are processed through specific algorithms in the PFN/TRAC software to synergistically guide the vehicle in the most optimum path initially for an improved level two shut down protocol (PAGSSS) and ultimately for robotics driving and a level three accountable automated and remote control. In the level three remote control and robotics guidance system the PFN software will also be synthesizing phone and/or communication systems, GPS or location equipment, and RF signal data input from long and short range transmitters and/or transceivers from warning highway transponders or radio beacons, or receiving instructions from special law enforcement traffic control guns and/or devices, all of which is detailed in the 1100 and 1200 series, detailed as the Green Eyes or Watch and Spider Eyes program, from the TRAC system.

However, in a level One to level Two intermediate control modality this technology's shut down provides another enhancement for limited automated guidance. The driver will be allowed to over power any of the automated steering controls, but the activation of the automated steering if unattended will result in the immediate shut down protocol warning all surrounding vehicles of the compromised vehicle and announce that the vehicle will be moving and shutting down to the right side of the paved surface sending out a distant sensor signal angled down out in the front and right side till it locates a space large enough to accommodate the car 2 times and the vehicle at a creep speed will remove itself from the traffic lanes and stop and secure the vehicle all the while sending out a distress signal to the proper authorities. Many such inexpensive distance sensors exist on the market as C.O.T.S. products. And a set of their electronic signals would flag the proper condition for the vehicle to nose off the highway, and stop.

Returning to the locations of the automated steering actuator components the above mentioned mounting locations are not the only ones that this motorized system could be used in. Along with mounts anywhere along the steer shaft, linkage including steer gear box configuration different steering modalities like an orbital valve type system used in heavy equipment and industrial trucks might require this same automation of the input shaft to control the directional vein pump. Alternatively, it may prove easier just to interrupt and connect with electric water man and pindle valves any hydraulic lines to redirect and control the fluid control for any double throw center piston system depicted in FIG. 1 as part number 701, and/or to change direction and RPM for a hydraulic motor part 700 and rotating gear on a flat or strip gear in FIG. 1. 704 in FIG. 1 is the electric control over hydraulic flow control valve.

Special considerations would include any standard junctions like rag joints universals or collapsible sections for a impact or crumple zone along any steering linkage. The many modalities detailed within would be placed so as not to impair and/or defeat the normal use and purpose of these standard safety parts.

Presently the cars have a steering wheel speed sensor for their effortless steering. The prototypes will innovate this sensor that sends its signal to the EBCM. Presently this is utilized for effortless steering through the EBCM software program that adjusts electronically a pindle valve in the power steering pump to change the power assist for better road handling at higher speeds and increases pressure to ease the steering at slow creeping speeds. This resisted sensor system is first to be converted to give steering rotation and degree to correlate to an exact wheel position or wheel angle through electronic signals, i.e., digital or analog current (ideally digital). This data will be compared in a compare list software function (an algorithm) formulated from the degree of movement detected by the sensor array 904, in FIG. 1, which also sends its data as electronic signals to the onboard computer and/or controllers, thereby allowing the software in the computer/controller to compare and compute the effects of steering and/or stepper motor activation's on the true guidance of the vehicle.

The steering data recovered is compared to the distance and camera signals recovered through the movement compare list as to the real time progress and results in guiding the vehicle in its fully automated state. Distance sensors would sense objects front back and side and slow the vehicle or speed it up for front and back and swerve left or right for side to side closeness, as well as, guide the vehicle to an unobstructed path and stop it unless it was being controlled in the fully automated state or level Three (Mobile Application Specific Management Program (MASMP) and/or RPV). At any time that any automated steering has to be done the car horn and all warning notices would be activated if it is a level one or two shut down. The cameras will first be used to recognize lane markers, road edge and surface (there are some experimental interactive highways planned with magnetic lane makers. If this system was chosen and used the invention would employ magnetic sensors to interface with this highway system along with the proper accompanying MASMP and RPV software) or as visual recognition systems hardware and software become more sophisticated and reliable it will be used to perform more discriminatory functions and be responsible for more automated vehicle guidance control, managed by the PFN/TRAC software. However as was stated earlier these systems will first see their use in remote control under the direct visual control of trained people like law enforcement as a evolution of the [warn\slow\(guide)\stop and detain\and kill the power plant, shut down function] for the unlawful and immediately unsafe use of automobile scenarios, or to control equipment operated in a hostile environments to humans, these cold even involve more comprehensive robotics applications and are extensively detailed in U.S. Provisional application No. 60/122,108. However, even though the fully automated guidance controls will be forthcoming with the interactive highways and smart cars development in U.S. Provisional application No. 60/122,108, the PFN invention will develop a short preprogrammed guidance system using the distance sensors headlight detectors and the advent of driver monitoring devices as the second commercialization of the automated guidance system the level two protocol. This second level will warn slow with guidance, while preprogrammed software monitors the environment all the way to a creep speed (determined from wheel rotation sensors, hall effect, ect.) and nose the vehicle off the highway, then stop and secure the vehicle, when a driver is detected unfit to handle the vehicle or is unconscious. The TRAC software will provide accountability with the redundant memories for remote and automated activities as it authorizes activities and authenticates them.

While it will be possible for this system to still be involved in accidents it will be relatively easy to keep the vehicle on the road surface going the right direction and not be involved in any head-on collisions, generally, which is the most fatal drunken driver accident. Hopefully by keeping an out of control vehicle slowing down in the same direction as the surrounding traffic it will minimize injury and damage. Of course all the warning and advisories would be going off from the time any automated shutdown or emergency automated guidance went in to effect. Optimally the alert drivers would brake and move clear of the automated vehicle and allow it to make its way to the right side of the road, find and determine a vacant road edge and stop. The public will need training here as to the proper use of equipment no matter how sophisticated and/or simplistic. This will require people to have knowledge of how to interact with automated systems and the people that are in a compromised state, i.e., heart attack, illness or intoxication. The invention and other systems will be able to alert the proper authorities automatically as already described, however public education will always be a necessity, and equally important this technology's PFN/TRAC system will provide secure AV and telemetry data records for society to analyse, appraise, and legally address any altercations or incident.

These detailed electronic communication systems and controls are in all of the related applications referenced above and the completed prototype components along with all control network systems including the interfacing with 911 systems and other commercial systems like OnStar, and law enforcement and emergency response personnel, etc., as well as Internet and web interfacing.

FIGS. 22A–C–23A–B

These figures have been used to display the three major components to controlling engine timing for the spark and fuel in the GM cars. The top picture is the power train control module or PCM. The second is the ignition coil pack and the third harmonic or a crank shaft sensor. These standard parts are used to time fuel and provide spark for internal combustion gasoline engines and are the sensors that will be interrupted and electrical components most effected by this technology's 1000 series trickster circuits to augment injector timing and spark plug firing in the controlled phase one slow downs and phase three power plant deactivations for TRAC software PASSS and PAGSSS.

900 series

This set of drawings shows the cam shaft sensor location and the lower figure shows another type of crankshaft sensor. These are also engine timing controls that are interrupted by the 1000 trickster circuits which send a pretuned voltage level or a generated digital pulse to fool the PCM or any control circuits that they are interfaced with. There is not much more needed to be stated presently for FIGS. 22A–C and 23A–B because these drawings are being used to show the electrical senor locations, however, the system effects that the trickster circuits do will be detailed more. This electrical process has been described numerous times already, however in the specific applications there may be additional information that may alter and these illustration and descriptions are only used to show the technology not to limit its versatility.

Most of the description has focused on the inventions automation of the OEM standard vehicle, equipment and machine systems. Therefore, it is important in this discussion of the 900 series devices to clearly describe the electrical OEM devices that will be a part of performing these unique functions, while still doing their OEM job.

Other 900 Series Vehicle Electrical Parts Under PFN Control

In FIG. 1 915 is the door switch. 914A is a seat switch that can tell if it is occupied. 914 is the seat belt switch that will indicate electrically the belt is home in the secured coupled position. All of these devices and/or any of them will be incorporated to create a 900 series deadman seat switch system. First, simply only to tell if a driver is present in the car or the seat or behind the wheel (e.g., because the carjacker is trying to leave an unmanned running vehicle to make an escape). This unmanned state will initiate the inventions auto shut down sequence either level one, two or three, determined by TRIAGE, a TRAC program that surveys onboard devices and capabilities and employs the correct program to deploy the appropriate devices. This is also being used to set the emergency brake when a driver leaves the car or when any door opens and kill the cars ability to crank or run in a number of ways after the wheel sensor detects a stopped and stationary condition. This can also help stop children from releasing a brake and/or shifting a gear lever when the vehicle is in an idle state. This is the invention's secured state for a no driver situation. Of course the legitimate driver can override the engine shut off. But the vehicle cannot be put into gear without a driver nor can the vehicle have any of its automated braking released unless override commands are given by the appropriate authorized personnel to the PFN and TRAC software that authorizes commands and authenticates and records them. Ultimately, this system will be combined with diagnostic driver sensors and software to determine driver capability prior and during any operation.

This technology believes that the privilege to operate anything is not violated along with the individuals rights when unbiased standardized performance protocols can determine a public danger in the operation of a piece of machinery, whether it be a vehicle a piece of equipment and/or a machine of any kind, This technology also recognizes a greater aging population that will require assistance in operating personal vehicular transports and is designing versatile assistance protocols that can insure the greatest individual freedom at the same time it improves public safety. This technology's PFN/TRAC system is the ideal accountable automated and remote control setting to accomplish primary private operator performance assessments and give auto-tutor advisement's to compromised drivers of their errors while respectfully performing any graduated automated and/or remote control necessary, where safe proper control is absent or improper for any moving vehicle and/or operating piece of equipment. These accountable management and control systems allow insurance to rate operators with real time data, help improve operator performance and resolve legal disputes.

The PFN's Billing Box function designed to bill for any equipment use, adjust insurance rates for proper and improper driver and equipment use, assess fuel utilization, provide a commercial work station to conduct secure financial transactions from, as well as, do most all kinds of automated transactions and data transfers and to evaluate the environmental impact is well detailed throughout all of the related patent applications. Here, however, in talking about the peripheral devices in the 900 series the environmental protection agency EPA systems on the vehicle devices include application specific environmental sensors at the end of any exhaust system as well as a monitor on all OEM sensors, already in existence, like $O_2$, hydrocarbons, H. C., Evap systems, Nitrous Oxide ($NO_x$) on-board devices, fluid level monitors for leak detection, battery compartment monitors for leaks and gassing. Basically, the system for environmental project will have levels of acceptability. First, when any power plant does not have a stoichiometric condition, which will be recorded from time to time as the vehicle is operated and monitored by application specific software (MASMP) in the PFN a trouble code flag is recognized and stored in the PCM and PFN/TRAC system. If deemed necessary, the trouble is reported immediately to an off-board monitoring phone node for a local or regional computer gateway either EPA\DOT\ monitoring state or federal hazmat program, etc. If the vehicle is emitting toxins at a severe enough level to concern public safety, immediate operator/owner notification compliance and enforcement measures are possible in real time. And the invention software, TRAC, will first notify operator/owner and determine when the vehicle receives the proper service for any bad fuel mixture operation or emissions and make sure it is reported if left unattended. The standards for the Stoichometric condition will be set by the Federal Government as per geographic location, population and environment. However, the TC will be triggered at the California Air Resources Board levels for the invention's initial "Green Eyes" Mobile Application Specific Management Program (MASMP) software settings in the prototypes.

Application specific standards will be set for the varied type of fueling and energy systems by all the involved government agencies, industry groups and involved public organizations and concerned individual citizens, provided in this technology's related patent applications PCT/US99/00919 and U.S. Provisional application No. 60/122,108. All the computer networking, including the use of the world wide web, is detailed. These patent applications detail how to use the existing government agency's gateways and computer networks with accountable TRAC software, for the PFN operation and the mass data management and storage systems (TRAC's interface) for these large agencies. This technology foresees the need to monitor at this individual equipment level to meet the needs of society, the economy, and the worlds environment; and also, sees the opportunity that these combining and merging technologies present to accomplish and create this PFN/TRAC device and system to meet these needs for humanity; i.e., to have a protected accountable remote control interface and memory systems for automated and remote control, which this technology terms a the PFN. A protected primary focal node for all control, communication, tracking circuits and devices and (most especially if only to solely protect the memory storage circuits) to which standards, and law can be written and applied in every industry application and for every electrical component used, including their hard wiring, connections, interfaces, software programs, maintenance and operational use. The PFN in the automobile and trucking industry has been designed in the related patents to double as a protective interface and/or dash mount compartment for electrical necessities, expensive accessories, and an area of secure and secluded placement for personal items (a safe and fire box) as an improvement and replacement to the standard glove box. This multi-function protective capability or quality for the PFN is also claimed for any other types of equipment or applications, if so desired or deemed necessary by any standard.

Figure 24A:
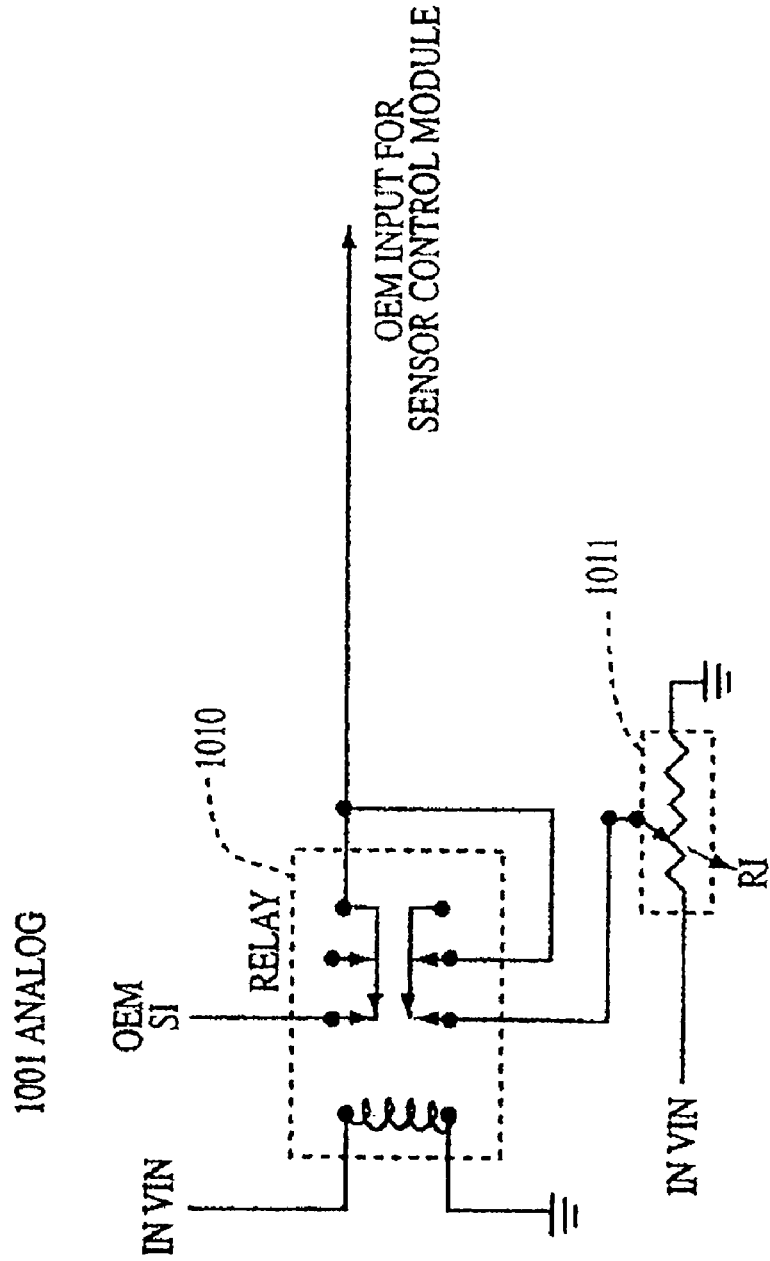
FIGS. 24A–B and 25 illustrate trickster circuits.
Figure 24B:
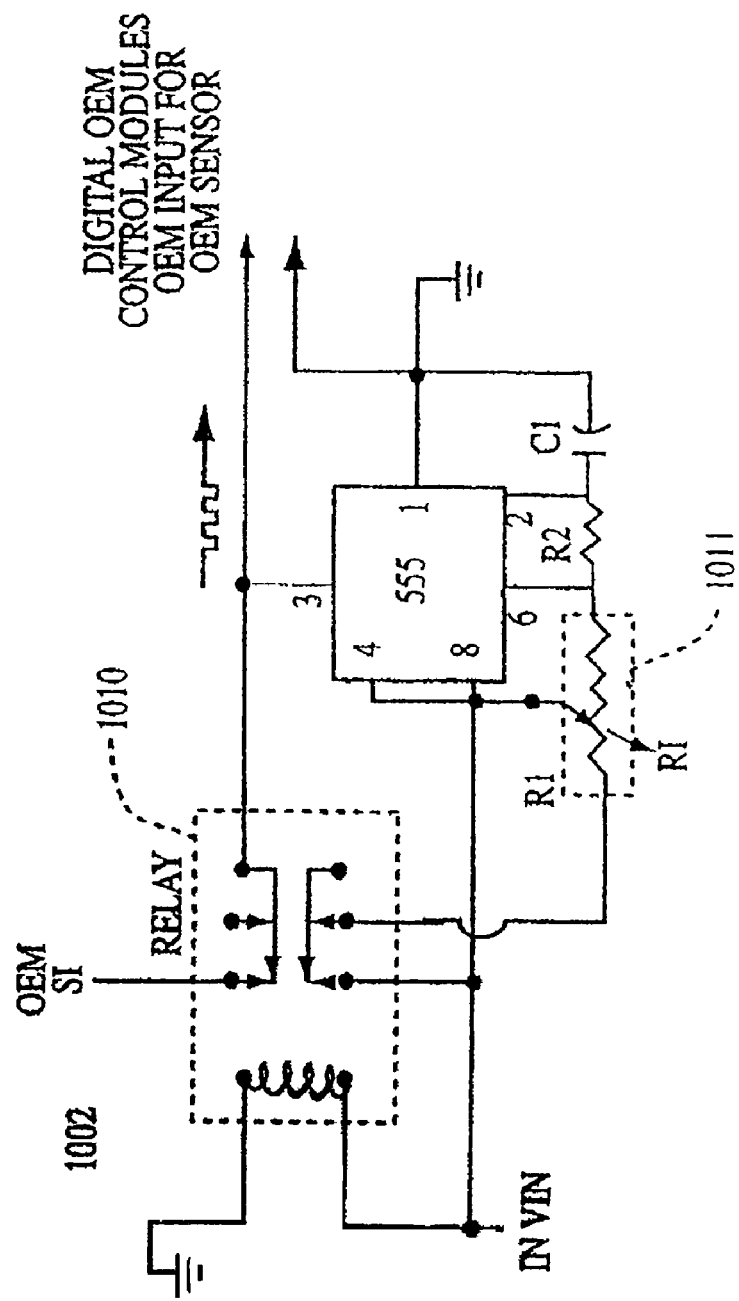

FIGS. 24A–B 1000 series

These mechanical and electrical protection components along with all the other sensors and reporting devices to the power train control module, ignition control module, injection control module, brake control module and any or all of the OEM 900 parts are the focus areas of these 1000 series coyote devices. They are also referred to as the trickster circuits. They are intended to interrupt and interface with C.O.T.S. and OEM control and processor products to augment normal operating data streams and provide specific electrical signals as a automated and/or remote control PFN response to initiate a desired OEM function without changing the OEM's software and/or system in general. This is an interface system of this technology and the PFN protocol to easily combine electrical processing components and their peripheral sensors and devices.

The next drawing is of 2 trickster circuits being used experimentally at the present time, but the whole concept of having an inexpensive electronic device designed to fool a controller or control module or computer and their software is unique to this technology, especially, when it is done to help interface other electronic system without reprogramming their software or re-burning firmware. There are many more of these circuits and devices that can be specifically set up to provide these false or pseudo signals for any number of standard performed functions by the OEM processors and their peripheral components, so the mere fact that they are not specifically detailed at this point should not make them unique from this technology. These innovative devices will have a lot of use in the present changing automobile industry and especially for older vehicle retrofitting, as well as find great use in a lot of other industrial and heavy equipment areas where diverse software or changing it for limited use applications can be very expensive. These necessary coyote circuits will provide a great value in rerouting signals from C.O.T.S. devices for interfacing other processors controllers and/or computers to OEM peripherals and/or any onboard accessories.

FIGS. 24A–B depict 2 inexpensive trickster circuits. The top left circuit, marked A, is the 1001 coyote and it is for changing analog current signals. It involves only 2 parts a relay and a resistor (fixed or variable). These parts will change for the different current demands of any particular piece of machinery or application but, because they are only working with lower control currents and signals from processors and computer circuitry to send and receive a particular data signal the parts will be in most cases the same and in expensive. However, if coyote circuits are supplying service power to an accessory or a peripheral function as is the case with some of the add on or OEM actuators then these relays (solid state or mechanical) parts would be composed of the suitable components to handle any current requirements, as well as, be compliant with any applicable electrical standards. These circuits are going to be changed and varied greatly to meet the application specific needs of other industries, as well as, the current demands in different parts of the world. This technology has always maintained a strong commitment to forward and backward, as well as, providing as much diverse engineering as possible to meet basic accountable automated and remote control requirements at a worldwide scale for all machinery to help provide organization and technology to universalize access to this vast MMN. These trickster circuits can help to complete those diverse controls needed inexpensively and rather rapidly for all industries to automate machine controls.

The parts used in the 1001 prototype are 12VDC PC relay DPDT Radio Shack 275-249A and the variable resistor is 15-turn Cermet Potentiometer 10 k Radio Shack 271-343. And in the drawing 24A they are parts 1010 for the relay and 1011 for the variable resister. This circuit is designed to send an adjusted but specific voltage level to simulate an analog OEMS senders signal. The purpose in this applications is to have the electronic engine controls adjust the timing for fuel injection and ignition to a specific desired engine RPM level without having to interfere with the normal OEM Software, when the invention changes the physical air and/or fuel supply. This allows for one previously detailed modality to coordinate a smooth slow down with no improper cylinder detonations for improper mixtures, or to trick the security module to believe the ignition key is in the switch to allow for a remote start if the key has a resister chip in it like the >96 Lumina and most all GM cars. The reason that both these trickster circuits have a double pole and double throw relay is so that the OEM sending device signal can supply the normal running signal on one set of poles to the OEM control modules and when the invention PFN energizes the relay the signal is interrupted, and the pre adjusted potentiometers or fixed resistors in one of the trickster circuits send the appropriate signal or slow down signal to the OEM's PCM or control module or security module or any desired control circuit for that mater. The automobile is the focus of this discussion but the same procedure can be performed in any application or equipment with the specific requirements met to perform any automated or remote control deception of any processor circuit by meeting the on-board software and firmware requirements or criterion to perform responsively connectable tasks.

Drawing 24B 1002 digital coyote tricksters for digital signals also uses the same relay 12 VDC PC DPDT Radio Shack 275-249A and same resistor 15-turn Cermet potentiometer 10 k Radio Shack 271-343 along with the I C 555 timer Radio shack 276-1723 to create an automated switch pulse generator for a digital signal. For digital signal replacement to be sent in place of the OEM sending devices like, some e.g. MAF sensors, RPM signals, etc. When it is necessary to have different pulse widths another 555 in series is used to divide the frequency differently and further adjusted by another potentiometer. This is 10002a trickster circuit.

In both drawings 24A and 24B INVIN is the inventions volts in signal that energizes 12 volts+ to the Relays part 1010. On part 1010 the OEM SI terminal is the OEM sensor signal coming into one set of poles on the relay and on to the OEM control module in the normal state. When the signal is sent for slow down by the PFN invention the relay 1010 in both has its coil energized along with the circuit that goes to the resistor in 24A and in illustration 24B which goes not only to the variable resistor, but also to the 555 timer in the illustration 24B. In illustration 24A it just continues on to the OEM controls with the adjusted voltage, from the resistor, i.e., the analog current systems. However, when the invention sends 12 volts in the 24B drawing (the digital application) it also energizes the 555 timer on pin 8 +Vcc and pin 4 reset as well as the potentiometer. The drawing is standard for a pulse generator and the pulse from terminal 3 goes to the control module with a ground lead. If this signal is sent to another 555 timer and input pin 2 with another potentiometer and just 2 capacitors the frequency coming out of #3 pin on the second 555 will be divided to the preadjusted desired signal. This is accomplished with an oscilloscope and RPM tacho, meter or scanner for a signal reference for the slow or idle state, or a known signal desired can be adjusted with the scope. These circuits have many other uses in all kids of industries to link and net work, as well as, interface with software of a particular manufacture by providing any signal by varying the pulse width and frequency, etc., or employing other circuit components to mimic any desired signal. With a good study or reverse engineering of any functions, while observing the desired result to determine the proper signal that initiates a function is all that is required for anyone skilled in the art can create a false input signal to trigger the desired function and construct one of these coyote circuits to interface software systems. Many times where ever possible these same functions will be performed by integrated circuits and preprogrammed as limited software and/or firmware signals sent from either the PFN computers used by this technology and extensively detailed through out the related patents or any other mini controller computers and/or processors (e.g., Parallax Stamp I II computers). However, if these signals are sent to deceive another pre existing processor as a deliberate attempt to create a preprogrammed response from its pre existing software or firmware it falls with in the nature and scope claim for this technology's coyote and trickster circuitry.

Figure 25:
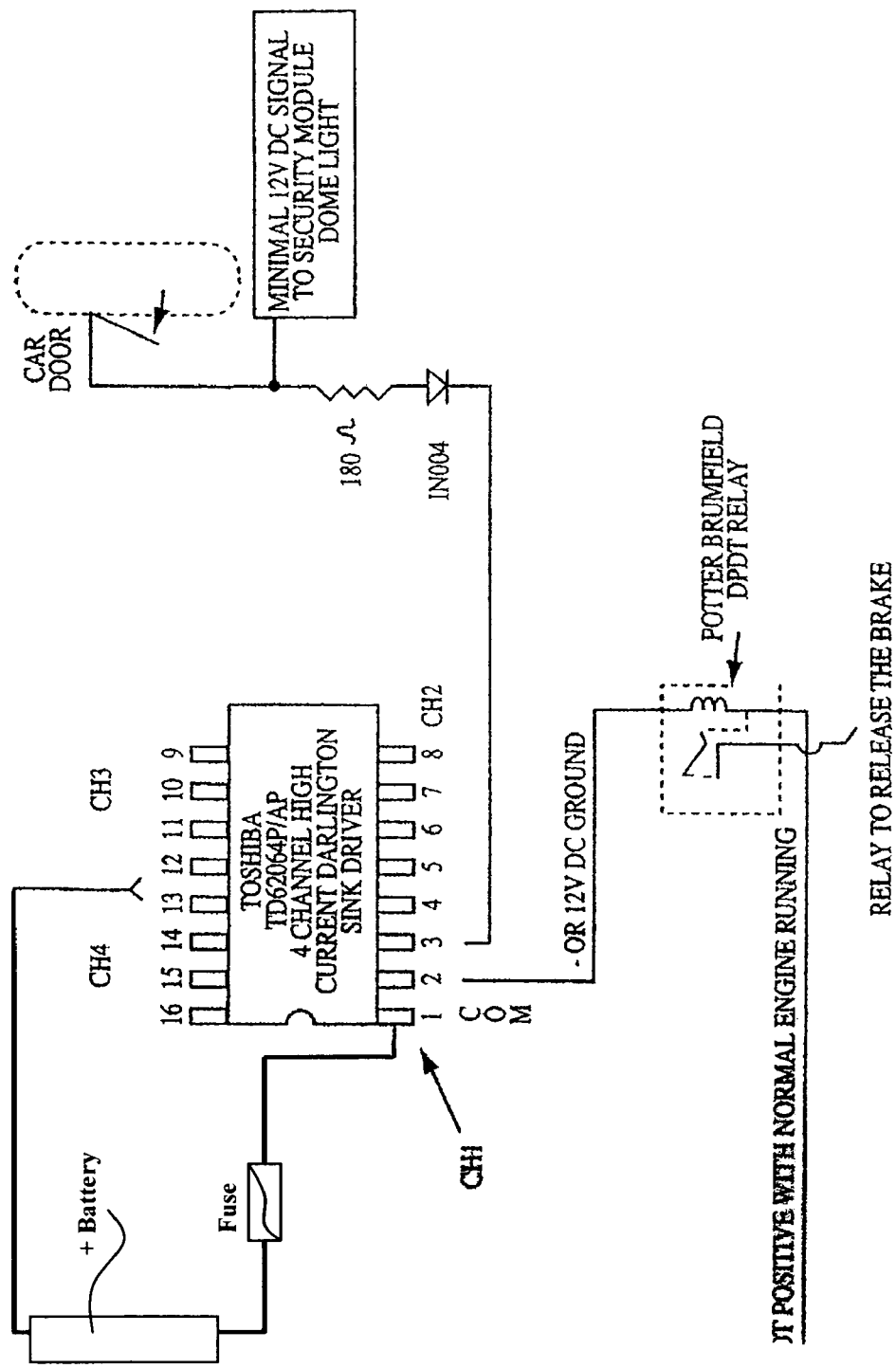
Figure 26:
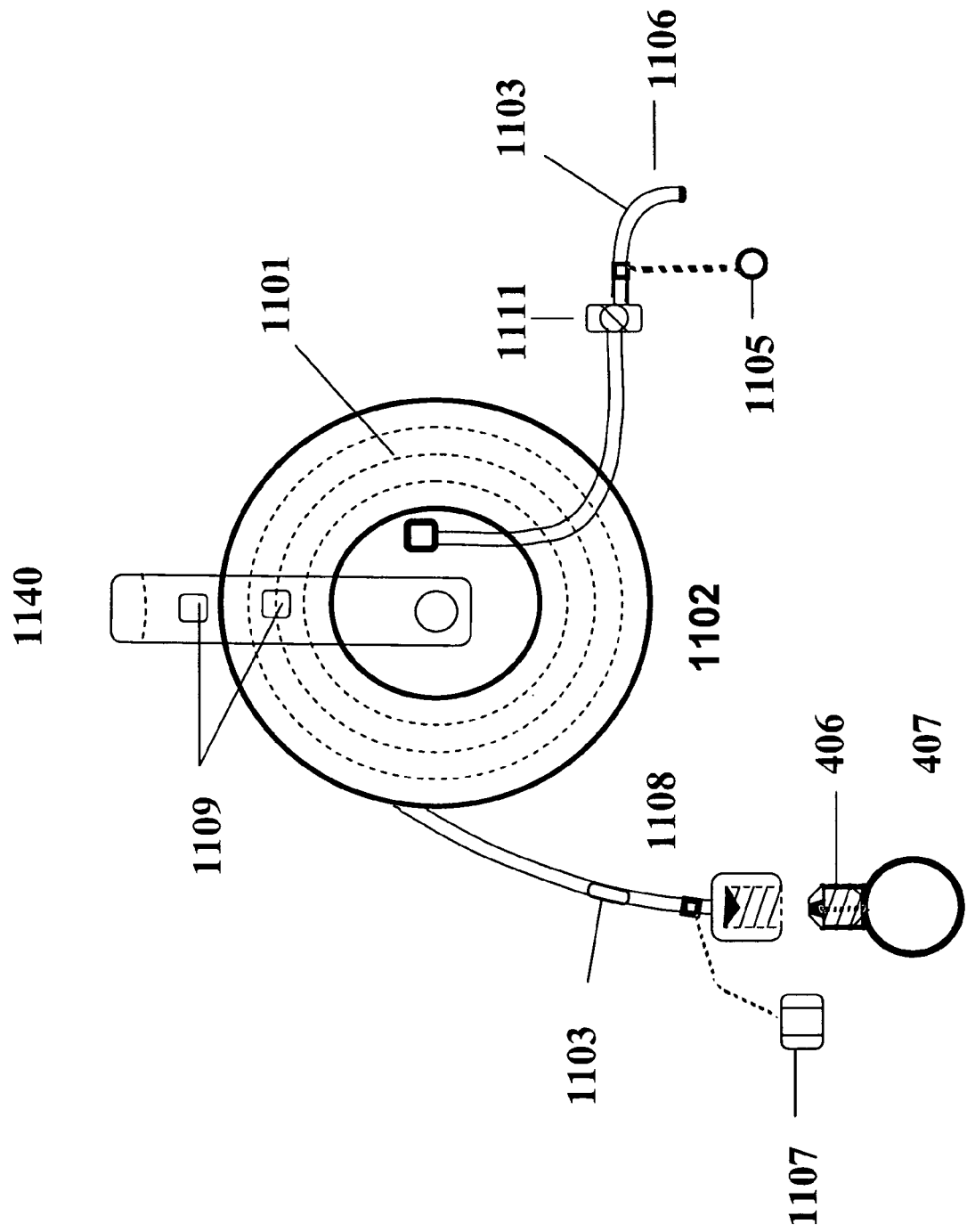
FIG. 26 illustrates a device for motorist who run out of fuel.

FIG. 25 10003 circuit

This is a circuit that replaces the striker switch for the modern cars that have auto dim to off circuits for the over head dome light when the car door is opened and closed. For the older vehicles and any piece of equipment employing striker switches the striker switch circuit would be monitored on a processor's in put pin to detect the door open and closed position. This is done because, this technology foresees in many case a real necessity to know when the doors are in a closed or open position to apply the brakes in responsible remote or automated control scenarios. This is another function to its emergency shutdowns for brake deployment protocols when compartment doors are opened, as well as, sounding driver and surrounding car warnings. Standards and procedures will have to be set and written to by the same government agencies, industry groups and related insurance and public organizations as referred to earlier for the (e.g., a bail out done by the carjacker, etc., or on and off loading of slow passengers from rear doors).

This simple, easy to install circuit was designed to sense current draw in the dome light circuit and not to interfere with any OEM programming. However, for this automated brake and/or steering function OEM's could reprogram their processors to directly apply any automated onboard brakes, when the correct data warranted this activation of the automated braking or steering system (e.g., open doors with a running power plant, in gear out off gear with wheel sensor data, etc.). Of course this current sensing circuit can be configured to accomplish this same function for any other circuits as well. If an OEM vehicle manufacture reconfigures their processors to perform these automated and/or remote controls of any braking, steering or speed control it falls within the nature and scope of this technology's shutdown protocols PASSS and PAGSSS, as well as MASMP and TRAC (RPV). The deactivation of the accelerator function of a vehicle can be eliminated by this technology for this purpose simultaneously if so desired and mandated by any standard protocols.

Early experimentation of this has proven that given the proper early warning with loud enough sirens, bright enough lights and the information bar all three of these functions can be performed with reasonable safety. However, further testing refinement and education will all play a role in the use and acceptance of these protocols and for any aggressive automated and remote control. And this is another reason that onboard accountability is so important to these developments. This technology plans to work closely with all the automobile manufactures, government agencies, and the insurance industry to develop the proper standards and protocols needed for government to write and approve specifications, standards and law.

Once again, this is another 1000 series coyote trickster circuit and is numbered 10003. Its function is to take any electrical signal minimal voltage, TTL, or digital and received it on its input pin and energize a ground side power up of a high current relay to effect any high current function. Like in the 1001 and 1002 tricksters, they can be switched on by a relay, as well as, activate one. And these circuits can energize other devices as well, i.e., motors, solenoids, lights, etc. These present circuits will incorporate the Toshiba TD62064/ap 4 channel high current Darlinton sink driver, however, there are other drivers on the market and application specific requirement might change any parts used. One uniqueness here is that with the OEMs all going to digital and solid state electronics with very low voltage so the automotive electrical accessory after market will find it hard to find the right control circuitry to activate their devices with these low current small wires to handle a load and/or off time digital signals. With the Darlington coupled to a relay or in the case of this 4 channel driver connected to 4 different relays to energized 4 different circuits if need be. This becomes another inexpensive way to interface digital and analog systems without a massive amount of combining software programs for add on devices to any particular circuit if this is all that is desired. These designs are also to help put the do-it-yourselfers and mechanics back into the repair business in the high tech world.

This technology is determined to provide more user friendly circuitry and plug and play modalities for all electrical accessories and peripheral devices to help in any standardization effort and/or provide more versatile options for interfacing electrical components for all industries, but especially for the automotive industry. So the first focus will be to provide help and support for any industry standards, for automotive electrical systems, combining their processing circuits with telecommunication systems, and other RF devices and electronics devices for GPS or locating modalities, data storage, and/or other computer, and processors, and to universalize interfaces and connections for multi component use installed by the skilled and average skilled individual. This invention will develop many of these types of circuits for this purpose in the 1000 series electrical innovation and many will be a major part of interfacing automated and remote controls in all the various vehicles, machines and equipment throughout all of the varied equipment applications around the globe.

The drawing 25 is very simple to understand and all the components are well marked and labeled. Only one channel is being used to recognize the door is open in the new GM cars. It is the first channel on pin 3 of the four channel Darlinton driver in the center of the page for FIG. 25. These new cars do not employ the traditional door strike switch as mentioned earlier to turn on the dome light. They have a security module that turns on the light with the door opening sensed through the lock mechanism and monitored through the module. When the door latches it sends a low current 12 vdc signal to the security module to start the dimming process in the dome and the courtesy light system. Most of these coyote circuits can access a circuit on a piece of equipment easily by standard connectors (e.g., crimp-ons, etc.) however, this technology holds as these interface circuits to also be constructed in application specific connectors for industries and specific manufactures as products to interface peripherals, accessories and processors to help standardize and universalize electrical components.

In this current sensing instance for FIG. 25 the technology's objective was to apply the emergency brake, whenever a cabin door was opened so that the car could not be moved when people were entering or exiting the vehicle. This is all part of this technology's shut down and safety feature. This is one safety feature of the automatic emergency brake application, and provisions are provided for it to be defeated by an authorized driver override through the application of a panic button, or pin sequence, or finger print random light contact pad, in the event a driver feels compromised, which releases the brake and allows for fast free acceleration.

For the door switch open and close position the basic circuit in the GM vehicles (>96 Lumina) is the dark blue small wire to the door harness on the driver side as all doors are in series in this circuit. So the dark blue small wire is energized when any door was opened. This was the line used to made the trigger for the emergency brake deployment by energizing the 1003 trickster circuit. This signal on the dark blue line was only a control signal and not of a current sufficient to support any normal relay switching. This is the exact reasons these circuits were designed. To help provide adaptive alternatives for the major manufacturer's loyal customers and their favorite after market suppliers of products. The invention can perform this function through its PFN communication hardware and control box or CHAT box control systems of the first embodiment, however, it was decided to also have a simple control system for the automated brake so that this safety system could be put on any vehicle by itself and be coupled to any electronic system.

The circuit operates by supplying a high current ground to the 12 vdc Potter Brumfeld relay at the bottom of the picture 25. The hot side of the relay is a fused battery positive that is deactivated by the limit switches in FIG. 4 when the brake is applied. The emergency brake circuit is always energized to be put on. So only the inventions control system (not used here) or the limit switch or the ground interruption through the 1003 circuit can release it. The battery positive is connected to the number 1 pin a common on the driver. Pins 4, 5, 12 and 13 are heat sinks or the ground. Output Pin 2 is connected to the ground side of Emergency brake relay. And pin 3 the input pin is connected to the dark blue 12 vdc low current signal from the door latch. Before the line is connected to the number 3 pin the current is resisted by a 180 ohm resistor and passed through a one-way diode 1N 004. This is done to fool the security module so it does not sense the draw of the activated ground in the Darlinton or received any back feed or sense an open circuit. If the security module senses this circuit it will not perform its auto dimming function.

The 1000 series trickster or Coyote circuits will continually create these possible commercial and technical merging and interfacing possibilities, as well as, increase the speed of new developments by individuals with the versatile linking of devices and circuits through relatively simple means. While 1000 series parts have been spawned for the interfacing of these C.O.T.S. devices to automate vehicles, machines and equipment they are a unique and a new innovation. And there are many different onboard parts, devices and software in the 1000 series; however, the only ones discussed presently pertain to these automated controls on a vehicle and in all the formal fillings for the first three applications of devices and control systems. There will be more circuits completely detailed for the application specific management systems and their respective pieces of equipment. The application specific management areas are for mobile, commercial, home, management (MASMP, CASMP, HASMP, and CST, Control Security Technology).

FIG. 26

1100 through 1200 is being reserved for devices that can be highway devices or gadgets that can help a troubled motorist on the highway, along with and as part of the "Green Eyes" and "Spider Eyes" programs of PFN/TRAC and its monitoring and control network software TRAC. However, this figure is of a device that has home and commercial value as well. The fuel link has been done as a useful little tool to accompany the fuel injection cars of today. Its purposes is to make available gasoline or fuel through the easy to connect fittings used for the test port on the fuel rail with a hose and valve long enough to fuel up a disabled car due to it running out of gas on the highway. It also has a home use, in that now there is no need to store flammable gas in the house garage or shed where its volatile dangers are obvious and the poisoning of pets and kids is an on going problem. Of course the connection for this innovation on the hot engine is also an obvious hazard. However, the invention will seek to get manufactures to reroute a connection fitting away from the engine and any electrical components under the hood, out by the fender with caution instructions and warnings for fire hazards and road side assist safety procedure placards and labels.

It is also possible to have better quick connect fittings with protective cover caps made to better achieve this connection. In this drawing the device is being illustrated as a fuel caddy reel.

1101 is the reel that holds a 2–5 foot length of ⅜ reinforced fuel line that has heat protective covering the first 4.5 feet to protect it from engine heat. 1102 is a swivel fitting standard for the test port on the fuel rail. However there may be different ones for different manufactures and if so the caddy would have these assorted fitting adapters snapped on to the carrying and hanging handle. 1108 is a self sealing valve that closes when the hose is removed in the same manner as does the needle valve stem on 407 the fuel rail. 1103 is a site glass to see if fuel is passing through the hose, this will be made of plastic capable of handling petroleum products and capable of handling the fuel pressure as must the fuel line be, as well as, heat. 1107 is an end cap that will seal the hose when out of use and protect the fitting and the valve from contamination and damage. 1105 serves the same purpose on the tank insertion tube end part 1106. This shows an external thread, however it will most probably be internal to allow the tank filler tube to slide by the unleaded flapper in the neck of the tank. 1111 is a shut off valve (ball cock type). 1109 is a snap in clasp for the filler tube section for consolidated transport. The 1102 end is knocked up in a jig fitting in the reel.

Figure 27:
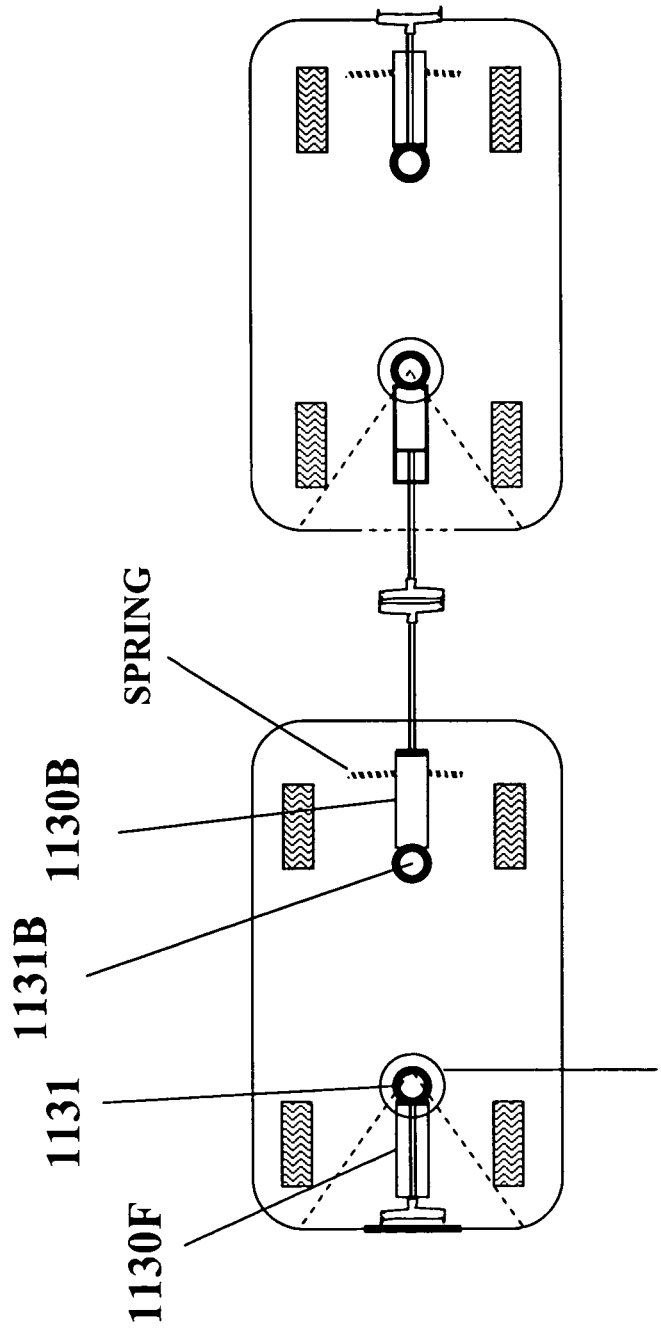
FIG. 27 is a drawing of how the helping hand tow and train coupler will be placed on vehicles.

FIGS. 27–28 1100 series

The device is similar to part 201 the hydraulic cable tension piston in FIG. 1, and has been chosen for the first modality to hook vehicles up on the road in a fast, efficient and safe manner to improve traffic patterns from the present and to be a part of the evolution of the robotic and computer interactive highways to come. The first purpose for linking automobiles is to give all motorist the capability to rapidly hook their vehicles with no real skill necessary on the part of the driver. And then to remove another disabled vehicle and its occupants from a travel lane without having to get out of the vehicle. This auto link also provides for the continual approval of both vehicle operators or there will be an immediate disengagement as a option (rules for moving and/or travel lane disengagement for public safety will be set by DOT and NTSB and standards and law will be written). The targeting of the helping hand piston for coupling is done through a magnetic sensor that will complete a coupled docking without any other out side guidance. And the electromagnetic surface plates with electric catches will find themselves and hook up directed by a electric servo motor that has a tracking disc on its final gear drive that only allows the piston a total of 14 degrees pivot for the front mounted piston. The rear is held almost completely stationary with the exception of very strong centering springs that are designed to absorb some side to side force to reduce damaging the piston rams. The front piston can pivot 7 degrees to the left and 7 degrees to the right. This front sensing plate sends turn angle data in the disabled car to its ESCM to set the wheel angle (in the same manner as for the cameras by an electric signal) and the battery in the disable car will activate the automated steering motors in the disable car to turn the wheels to keep the tow piston and cars in a popper line for trailing or towing. The key is turned on to free the steer wheel lock, but the engine need not operate if the disable car has a low battery when the coupling is made the electrical service from the good towing vehicle can charge the disable car and/or supply power to the dedicated steering circuit and/or any that display no trouble codes through the helping hand accompanying electrical coupler, and if there is a severe electrical problem in the hook up; current sensing circuits and heat breakers in both vehicles will detect this condition protect both vehicle and give warnings in the instrument panel of both vehicles.

The second cylinder on the back in most cases will not turn to offer a fixed position for articulating the 2 cars to accommodate turning and trailing. This coupling with the pistons extended will reduce the need for a driver to get out of the car if they get as closely as they can to a direct alignment with the car they are going to be coupling to. The helping hand will have a hard wired comport on a flex cable which will allow the linking of all the electronic modules and the control of all the brakes and any automated systems functioning. The standard for years for the bumper height was 17 inches. It might be necessary to standardize vehicle classes by height and/or have a variable universal piston tongue mount and coupling surfaces And just because, the most ideal modality for this first prototypes is a hydraulic piston with magnetic interlock this technology considers any and all coupling designed to first expedite disabled vehicles in a simplified way for any and/or all of the above stated purpose to be within the nature and scope of this innovation.

Presently this first generation hook up for the universal coupling of vehicles to help stranded motorists and ease disrupted traffic patterns is a simplistic electromechanical device, called the "helping hand". This name will be used for a number of innovations that help the individual be a service to other individuals. This name is also listed in the 1200 series as there it will pertain to automated communication devices that will also help the individual and vehicle to be more of a part of the public's safety. There will be much more detail on this system and all that it will be able to do.

GM has a system to tram vehicles on an automated seven mile highway stretch in California in which they have experimented with a system that has no physical link ups and is done by distance sensing, however, at this point in the development of tram systems for vehicles on interactive highways this technology'sees a double service performed by physical links. One to quickly remove disabled vehicles and also to provide a more economical use of energy with combined power plants cycled for driving the train, and also improved communication and coordinated braking with all the PFNs interfaced through direct connections and all able to monitor off-board transmissions and accountable record all interface actions. However this technology is set up to work with any effort to automate personal transportation in a responsible and accountable manner. This direct connection or corn and power port is important to point out at this point as a standard for automobile electrical systems is long overdue and any such standard cold easily provide for universal exterior connectors for this purpose and for the earlier detailed law enforcement connections, etc.

FIG. 27

1130F is the front piston. 1131F is the piston pivot servo motor drive and position disc assembly. 1130B is the back the sensor disk will be using the same technology as is used for the camera location, cylinder and 1131B is the centering spring assembly. This system can be configured to provide more of a radius in turning, but it is believed that this is all that is necessary with the trailing cars steering activated by the sensed turn on the position dick1 130B along with its limit points to give warnings as well as automated programs to help control the inexperienced driver in these scenarios.

FIG. 28

2 cylinders and the hydraulic circuit along with the valve body and hydraulic sensors transduce pressure fluctuations into electrical signals when the cylinders have been extended for travel. This data will be used to apply brakes in unison for multiple link ups and trains. 1132 has the ram extended, 1133 is a pilot pin and when coupled to the other piston it creates a universal joint. These pistons will rotate naturally to create the piviton for side to side and up and down. 1134 is electro-mechanical catches energized by and with the energized fields in the contact and/or coupler plates. 1135 is the electromagnetic coupler 1136 is the hydraulic pressure transducers. The transducers are responsible for proving data back to any control circuits as to the acceleration inertia for each vehicle and automated the power plants and braked according to the desired rate of travel or circumstance as determined by the PFN software running for the tram hook up either solely automated or remotely controlled. 1137 is the solenoids on the valve body 1138 is the valve body. The electric coupler, servo motor sensing plate and spring loaded alignment assembly.

FIGS. 27–28 Uses for the Car Tram and Tow Systems

One whole section of the 1100 series will be devoted to the car tram system, where the vehicles communication and transmission center will be in contact with other vehicles and the interactive highway system and notify each vehicle that has logged into the interstate trip programmer a travel plan destination (like a flight plan). The Travel or trip controller will search out all other logged in destination coordinates per travel time periods each day and locate others with similar time and destination coefficients and match their present GPS coordinates retrieved periodically for the purpose of a link up.

The Travel or trip controller system searches for the presence of other vehicles in close proximity that are traveling the same roads for similar or close time frame specific destinations. It then notifies them of the economic long distance train approaching them and gives them a choice to hook-up. The system communication for the coordinated long distance trains are described in PCT/US99/00919 and in part more detailed in this application. However, presently this application is focusing on the specific devices on individual vehicles and their controls and communication systems. There will, however, be considerable description on the interaction of vehicle corn links to the basic communication nodes of the interactive highways with TRAC software for MASMP and RPV.

In summary, if a driver decides they would rather rest and at the same time travel in a more economical less frustrating environment, they can notify the travel controller system that they will be linking up and they will receive directions as to speed to maintain and lanes to be in till the train passes them and they attach or are connected to from the rear or they increase speed as directed to attach from the rear all through radio or cell phone communications to finally physically link up though the "helping hand" link. This is an innovative physical device for the vehicle that will be marketed as a road service tool to aid disabled motorists and remove their disabled vehicle from the traffic lanes so that there is no waiting for tow trucks.

Later this same device of the invention will be used as earlier mentioned to make long distant car trains that will all interface with each other and energize their power plants to most economically run these car trains on the innermost left lane in right hand drive countries. They will be linked together with 2 communication systems. One, a direct hard wiring through a comport directly part of a hydraulic cylinder that is in the center mounted to the frame in the front and a second in the rear. It will swivel to allow on its frame anchor mount the most optimal angle for the ultimate automatic guidance through the on-board 905 sensor array and the first device magnetic sensor along with a servo motor to initially guide it out for hook up. Prior to the hook up the short range transmitter that will be responsible for interactive vehicle contact, as well as, local highway nodes will do a diagnostic on the vehicles to hook up to the train to see if there is any trouble codes. If so, the coupling is denied to the defective vehicle. (Single tows should optionally handle disabled vehicles with this invention running all the hazard lights and the unique info bar stating the car is in tow and any audio announcements that might prove useful and informative).

It is through the short range transceiver systems that the vehicles will time their in transit coupling either by radio, light and/or sound signals for distance data from the respective distance sensor modalities for separation and to provide another modality to coordinated team braking and turning as one of the cars in the train has decided to leave or break off and/or conversely join the train. Speed will be set by the interstate programmer or designated by the interfaced PFN's or vehicle computers that can in route be able to read the amount of fuel used through the individual vehicle as reports given with their specific electronic serial number which will aid to maintain uninterrupted travel and reduce the amount of radio separation transit for one vehicles. If a low fuel level is identified in a vehicle or is sending a trouble code or warning, the interfaced computers will recognize it and warn the whole train of a possible troubled vehicle. If it does not interfere with the ability of the vehicle to train it will be carried on with all its other functions maintained from the corn link till the end of the destination day. As the corn link will still be able to supply electrical power a support electric functions from the other vehicles, the troubled car could be carried on to a destination allowing the occupants to be on time to their appointments as their car received its necessary repairs at the destination point. As the train travels some vehicles fuel will drop individually.

The interfaced PFN vehicle computers will be able to either idle or increase an individual vehicles engine rpm that will most economically and efficiently power the whole train with the best stability and traction in foul weather all the while tabulating road credits that are paid for at the end of travel days either by the highway system or fuel credit card transfers and paid for right in the vehicle by credit card and the swipe system that's part of the invention (the billing box function). The on-board computers will be capable of determining which vehicles power plant and brake activation will best control the trains stability and ride. The interstate programmer will constantly be informing the train of upcoming traffic situations and controlling it automatically through congested traffic patterns with the drivers able to relax as the system picks and decides the most efficient way for their entire destination for the total group to be achieved. While the train will interact with the highway system as much as possible, the parallel development of the invention's on board vehicle and communication systems and environmental sensing systems, e.g., cameras and distance should be developed to run the trails on the vacant back roads as well. All the GPS systems and mapping programs and individual travel plans will become interactive and interfaced with the interstate programmer and readily available to the vehicle occupants computer displays and in the cabin displays all of which will be detailed from C.O.T.S. to the highly specialized state of the art OEM devices that will be fueled by the robotic capability of training as it will allow for a lot more time to do other things in the vehicle. The train through all the interfaced communication systems will inform the individual vehicle of a separation and car leaving or adding on and when massive destinations are reached in certain classic locations the train will pull over to a dispatch lane and the cars will dissipate on their own to their private destinations. There will also be a greater need for refrigeration and porta-potties alone with privacy sections that will alter some vehicle configurations. Trains will be comprised of similar height vehicles and sizes and types and improper weight and sizes will automatically describe a vehicle to train.

For this reason the first innovation is a device that can physically link vehicles in an automated fashion and is going to be commercialized to the car manufacturer first to couple same make cars. However, the universalizing of the connecting heights with standards will be a priority to fulfill the real scope and nature of the invention and the helping hand innovation. This innovation has real value presently because of the new ride on flat tires. The only other leading disablement of vehicles other than true vehicle altercations is mechanical malfunctions. And in most cases the cars can still roll and need only to be pulled to a safe location rather than being left as a road block in a busy travel lane. Also, in very hot weather cars overheat because they are running slow and in this case can be hooked to the one in front that is running cool and/or teamed for slow travel and rested; this will be good for the atmospheric environment, good for the ambient heat, and most definitely good for the car. And if necessary because the vehicle has already been over taxed and is in need of repair the vehicle can be carted off for that repair with the flow of traffic uninterrupted keeping people from being out of their vehicles in travel lanes and harms way to remove a disabled vehicle. The tow situation or scenario should immediately have the first available access to HOV lanes and if the vehicles are rolling safely should be allowed to tow the vehicle to their own choice of service facility if agreed upon by the drivers of the vehicles being operated.

There will also be a simple telecom port hookup to allow for voice communications but could support video as well. This could be a very useful long distance conference feature for the trains either for entertainment and/or for business. The 1100 series helping hand coupling piston system will allow a communication link of the vehicles when in operation as well as diagnose the towed vehicles system. This will allow for any number of direct communication systems to serve from one car cabin and control systems to the others if agreed upon in the towing process. This will share system data and perform any pre-calling process to a service facility that has the appropriate parts and personnel to complete the repair at the commercial cost agreed upon. Both the automobile owner and server system gives service cost parameters high low and the real conditional factors, i.e., parts cost and/or in-house or out of shop labor intended cost. The phone call cost or any charge for the look-see on arrival together with business ID for referral for the troubled motorist on their towed return home or decision to change service repair servers not stuck on the road the motorists availed to his own personal and social resources to pick his vehicle up and review his first offer and cost of repair. This freedom for the motorist is easily achieved, with all other equipped vehicles for tow with the same ability to couple and report on any mechanical and/or physical changes upon their hook up and record. The diagnostic software of the new tow contact before you drive away through a comparative review of the personal recording taken when the car was delivered for service and with any mechanic a service facility notes for their actions on the reconnect for tow or transport ready for review.

FIG. 29

Along with many other secure sealing mechanisms, this technology provides an additional security feature for the PFN secure on board memory as well as, any other necessary electronic parts. The electronic seal system (the technology will seek certification as a standard in the protected area of the PFN): FIGS. 15A–B is utilizing one thousand series numbers on this drawing because it uses the trickster circuits relay systems to activate the heater wire to release the seal to physically enter the safe box memory containment section of any PFN TRAC system (that will be certified for record keeping of any kind for accountability. 1025 is the security relay switch and can be a silicon relay with a gate lead 1033 or a standard mechanical relay where 1033 would be one of the leads to a primary coil the other terminal would be connected to the opposite pole in this circuit. 1026 is a wire or thin piece of conductible metal covered in a substance that will melt when heated to 3001 F or something less (application specific) the prototypes will use a product call polysulphone which is a heat resistant plastic. The inside of a PFN should never reach this temperature as it is insulated. 1027 is the plastic well anchors for the seal with galleys to accept the liquid plastic during an authorized installation of clean memory and the removal of a untampered memory component. They are positioned structurally around the access door and are stamped with an registered ID number for legitimate access to this compartment. 1034 is the negative terminal and can be provided a contact terminal or wire to ground in the automotive applications. 1035 is the positive lead and it too can be provided a terminal or wired to a fused positive lead with the appropriate hard wiring and fuse amperage protection. 1030 is the negative power lead and 1029 is the positive power lead. 1031 is the processor and can send the appropriate signal to the gate circuit outfitted with a 1002s trickster circuit that is resisted to a set signal, or the processor can energize the other side of a mechanical relay 1025 and thereby turn on the current and melt the plastic seal. Or 1032 can be used to send the correct electrical signal to switch the security relay 1025 and its resisted trickster circuit also energizing the seal system separate of the processor in the event the processor has been compromised. The circuit can be completely activated through the PFN\TRAC system with no outside contact and this can be achieved from a remote signal or through the keypad.

FIG. 30

Is a physical view of the PFN secure area for memory storage. This drawing does not depict any specific guarded area it is used to show the physical locking of the access door and the seal going around through the anchor seal wells 1028 SA. 1036 is the physical lock throws through the side wall of the PFN. These can be operated physically and or electrically as well. And one design provides for the at least secured memory storage area to be spring loaded so when the proper signal is sent to the PFN to open the sealed area the mechanical lock is released and the seal is melted with the door opening an the memory tray sliding half way out. 1037 is the key slot cylinder and this cylinder can be constructed like the new ignition cylinders and outfitted to read a resister chip in the key to activate the SR part 1025 in FIGS. 15A–B and melt the seal the seal is 1036 which goes around the entire access door. And 1038 is the secure box itself.

Figure 30:
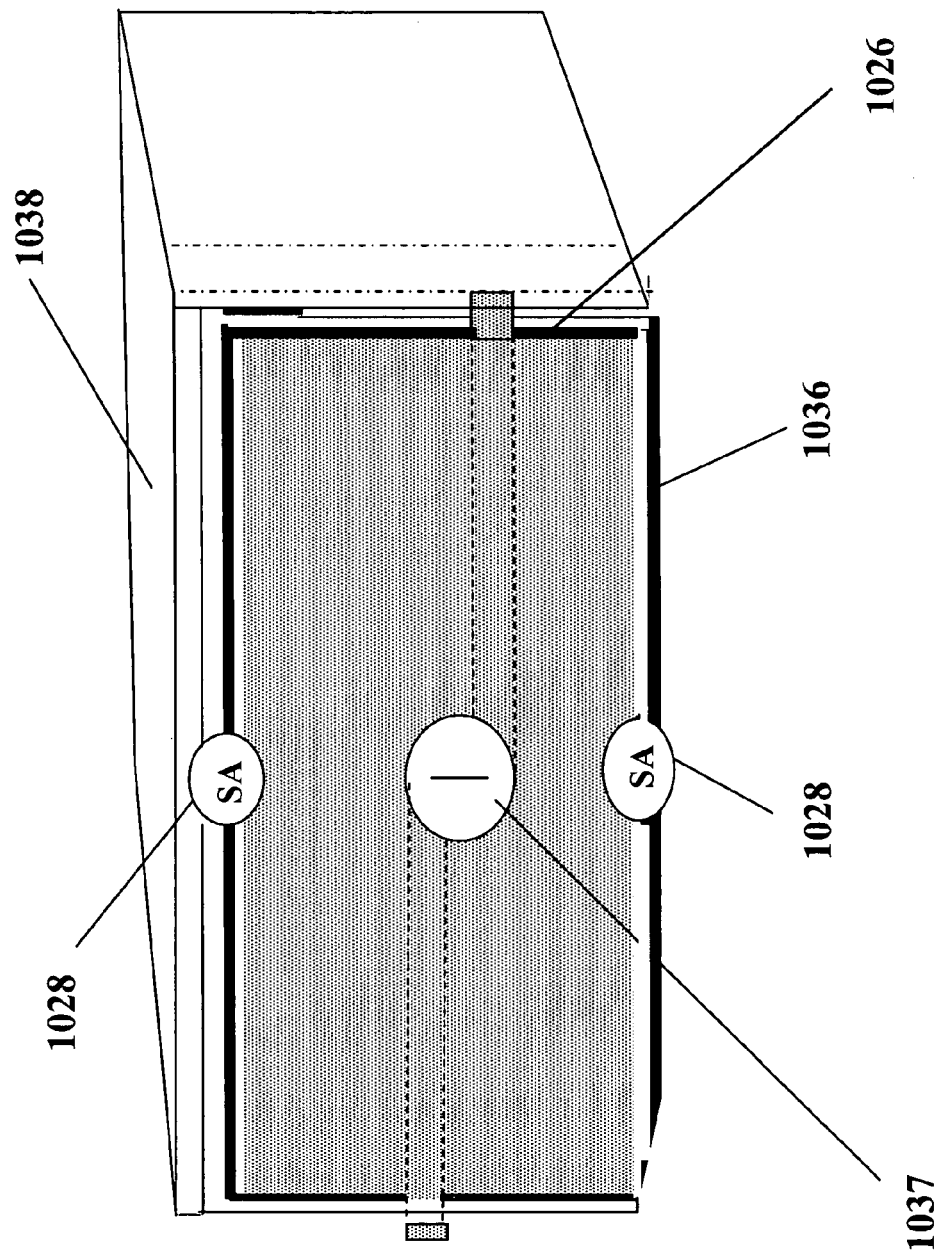
FIG. 30 is a drawing of the security sealed area for the PFN.

FIGS. 30A–30C are a more in depth depiction of the invention. Its purpose is to advance understanding of the invention in FIG. 30, which depicts a hard metal or composite secure box employed to protect sensitive electronic RF and or processing and or memory storage equipment or electronic components and or devices. One of the most important attributes of the invention is to provide a security seal that physically denotes a legitimate entry vs. an unauthorized entry and is electronically controlled. This remains the main purpose of this invention. To be opened and resealed in the field by legitimate accesses so that the secure integrity of the unit can be determined for any resulting analysis (i.e. Government, court and or legal applications and or scientific analysis and or commercial use)

The PFN is taught in this specification as a protected Primary Focal Node (a remote control electronics interface package), responsible for processing and recording local event functions from robotics, preprogramming and remote control commands (to include confirmation of those command functions memory. Therefore, it is necessary for public safety, national security and a civil society to have pristine accountable records of such activities (i.e. joint control scenarios). This makes it necessary to insure that unauthorized activities/access to these processing centers dose not occur, and if it dose it can be recognizable physically as well as, electronically.

FIG. 30A is the top view looking down on the containment. The dark black line is a strip of metal or wire 1026 presently imbedded in the access door and box frame groove or track. Shown here; it is surrounded by an appropriate application specific plastic or wax hardened into place and into the seal anchors SA, 1028, and stamped with an authorized party. The improper physical removal of this seal will be easily detectable to the eye, and the unauthorized electronic activation of the seal is prevented by the need for a coded signal to the special Silicon Relay Control Switch circuit SR CS. If the proper code is used the command terminal ID and authorized personal ID is recorded in the PFN memory. Seal stamp and access signal must agree in control center records and in local memory records along with time date and GPS or fixed address data if applicable.

FIG. 30B Depicts the access door of the secure box. The black enlarged line 1026 is the metal strip or wire encased in plastic and encircling the access door to complete a heating circuit when SRCS is activated. Once again SA is the Seal anchor wells and when the process is an installation or authorized resealing process the seal wells will be stamped with a predetermined authorized artisans/technicians ID stamp or mark. In addition the process can require the code for this activation of the SRCS and the technicians ESN ID electronic serial number, to be recorded in the local memory.

1037 is a mechanical lock and key arrangement with locking throw bars to the outside walls of the protective encasement. One modality provides the physical unlocking of the access door though the key and lock mechanism with a lock switch sensor/contact point to return analog resisted signal or digital signal to a processor capable of recognizing electronically the appropriate mechanical key simultaneously (similar to present resistor chip in some vehicle ignition systems and discussed further in this specification for the coyote circuits. The use of the key would both return the lock bolts to a home or open position and send the appropriate signal to the SRCS directly or to the PFN/any internal processor that would process the open request signal for a legitimate authorization (either preprogrammed/stored or verify from legitimate files an or provided by remote command and control). An approved access would result in the appropriate signal be delivered to the SRCS and sufficient current to liquefy the seal and release the access port in a specific manner from either the standard current supply or the emergency power supply stored with in the containment and detailed further in this specification.

1038 is the containment. In this depiction it is a box however, it is to be application specific in materials, shape, size, properties and characteristics. The most proper and optimal configuration is per use, and is the guide for any specific configuration, all of which fall within the nature and scope of the invention to provide a secure access and detection system, to include any trade offs for economic, space and or concealment reasons. This is to include all the NEMA standard enclosure requirements FAA and any industry specific black box applications/specific designs and or standards, right down to general electronic packaging requiring secure or tamperproof sealing.

FIG. 30C is a side and top cross sectional view of an electronics package secure containment wall structure. It provides a more complete three-dimensional perspective of this exemplary application of a reusable security seal, in this example a current to heat activated system. The circle in the corner of the security containment on the 1026 black metal heat seal is to indicate the cross section to the right and is an enlarged and internal view of the encasement perimeter groove, which is depicted as a V groove. But, could be milled or molded to be in any desired shape in the metal, plastic and or composite case or any material that is desired or developed in the future. Once again, the containment can be in any shape configuration or consistency to include a flexible form if this is desirable for the specific application. In the flexible or semi-flexible or even exemplary rigid form the seal might be melded into the contain structure and security stamped while in a malleable state, either during original construction or later or on a recurrent basis. The SRCS can and should be embedded wherever it can best be protected from being compromised by unauthorized access, either through jumping out the circuit or accessed to trip any circuit components or gate leads. In this exemplary modality and many others designs and applications; internal access and operational service leads would be directed internally, a consideration to take advantage of the protected electronics and maintain a secure signal activation capacity via the electronics inside the containment.

FIG. 30D depicts further representation of either the flat metal strip or wire/rod versions of a conductive heating element surrounded by a liquefiable plastic or wax, any heat activation and or malleable seal substance or material, etc (i.e. to include any future products that can be affected via similar current application are considered inherited and to fall within the nature and scope of this invention when used for such security applications and or to provide tamper detection and reusable sealing (e.g. memory metals has been contemplated and discussed in this divisional application earlier)). In the round or flat or square configuration FIGS. 30D & E, manufacturing of the sealing circuit may be achieved by a die and extruding process where the metal and SRCS components are inserted into the center of the desired plastic or sealant material feed in a preheated condition and pre shaped during one phase of production. The view in 30D would be an end view of the result and 30E would be a flat or front view of the result. Other coating techniques of the heating element and control circuit SRCS during manufacturing have been contemplated such covering the components with the plastic or heat malleable sealant in place and then activate the circuit to form the original factory access seal. This final process would be the same for the extruded version as well however many other methods are contemplated and any industry practice for such operations is considered to fall with in the nature and scope of the invention.

FIG. 30E is a front view of the embedded metal heating element and SRCS 1025 signal identifying current &ntrol switch. These chipset silicon relay switches are proprietary "Coyote circuits patented in the original application before this divisional and are described in this divisional application and other related applications and proprietary patents as well.

FIGS. 30F and 30G depict the metal strip or heating element as part of the package wall verses a malleable and or adherent component sealing up other material surfaces that make up the wall structure and access door of an electronic package. In these Figures F the end or side view and Figure G the front or face view of an integrated package provide the electronic reusable seal as a molded part of the original construction to be activated later by an authorized user with the appropriate code and electronic serial number identification ESN ID. This may or may not be visible to the outside, however it probably shouldn't be, as the proper signal may well be delivered by radio frequency and triggered from the processor inside the package to deliver the appropriate current to the heat circuit from a emergency power source inside the package as well. Another modality may provide for a local port to directly connect power and or correct security signal to the heat seal circuit from outside the package locally. In any case any applications to activate the sealing process from simple to complex for the varied uses and applications of this secure package system to access are contemplated and considered to fall within the nature and scope of the invention when utilized for said purpose. The most obvious manufacturing technique would be to mold the seal and current control products SRCS as part of the encasement at the time of manufacturing with the service leads directed to the internal electronics components for those electronic devices that need to have this type of electronic controlled security access. Other security access applications would provide for an external service port on the package to deliver coded signal and current (standard industry multipin connections have been taught in this application and related applications and prior patents).

Let it be understood this invention of heat sealing modalities is not intended as a secure seal per say; it is intended as a detectable security seal to make difficult to access the package first and second, disclose or make obvious physically any access to the internal components or package integrity. This heat seal invention is meant as a bonded seal system for legal and scientific analysis standards for local and critical communication routing remote control and automated processing and memory storage units for shared controls.

So there will not be any miss understanding the PFN box can provide interfacing protection and security to a lot of electrical components and personal property items, however, the the memory storage and any circuits responsible for TRAC routing will be electrically secured and physically secured in the certified or sanctioned area with lock and seal to protect the memory at a legal level for evidence and/or any legal proceeding.

An initial claim is made from all related applications for this technology's secure controller, or processor or computer system(s) with any application specific hardware, firmware, and software to processes accountable automated and remote control commands as a primary focal node housed in a protected encasement(s) termed a PFN. (Specific components, configurations and physical structure for the PFN will be application specific and/or compliant, as well as, be constructed to provide any industry Standard(s) government Standard(s) insurance Standard(s) and/or codes, rules, regulations, and/or laws written to insure any certification, accreditation and maintain it for the PFNs to be accountable systems for all types of automated and remote control and/or robotics.) This claim is to include the firmware and software certified, approved and standardized by industry, government, insurance industry, and the public as Trust for Remote Activity Controls, because it authorizes and authenticates commands and their activities and provides the appropriate memory record for society to function legally.

Other responsively connectable PFN control circuits, components and/or devices are at least one of: at least one current memory device with either an application specific backup device or the same device with a redundant memory function in the same containment or securely linked to an equivalent protected and secure encasement, for the purpose of recording, pristine accountable application specific automated and remote control command strings to on-board peripheral devices that perform automated and remote control functions; electrical signal sensory device and audio/visual monitoring devices to report on the command function results of the onboard peripheral devices and equipment for the application specific commands in the same plurality of memory storage and protocols with synchronized time date and (with optional application specific geographic coordinates) all matched to the application specific command functions; at least a one-way communication device capable of receiving an application specific signal and responsively connectable to the at least one processor, either stored jointly in the same protected encasement or securely linked to a separate same protected encasement; and/or at least one two-way communication device capable of transmitting and receiving an application specific signal responsively connectable to the at least one processor either stored jointly in the same encasement or securely linked in a separate same protected encasement; a report back system capable to report back to at least one remote location of any or all of the application specific data that has been permanently stored in any PFN; a global positioning system, multi tasking cellular phone tracking or RF signal locating device responsively connectable to the at least one processor providing time and geographic data for application specific control functions and memory records either stored in the same secure protected containment or securely linked in an equivalent protected encasement.

A claim of responsive connectable interface is made for this patent application's automated innovations, sensors and monitoring equipment to any other control technology's modules, and/or controllers, or processors and/or entire computer systems with any application specific, hardware, firmware, and software either secured, secluded, protected, in a responsible and/or accountable manner at any level, but capable to perform any automated and remote control and/or robotics functions. Also, any other responsively connectable desired and/or required circuits, components and/or devices including at least one of: at least one memory device capable of storing any operational equipment data and any operator performance data on-board; at least a one-way communication device capable of receiving any specific signal and responsively connectable to at least one processor'stored in any fashion on-board; at least one two-way communication device capable of transmitting and receiving any specific signal responsively connectable to at least one processor'stored in any fashion onboard, with off-board control options, data transfer options and memory storage for any purpose to at least at one remote location; any global positioning system, multi-tasking cellular phone with tracking or RF signal locating device responsively connectable to at least one processor capable of providing time, date and geographic data for any monitoring; and/or automated and remote control functions and/or robotics as well as to transfer this data to at least one remote location.

A further claim is made for any responsively connectable electrical sensing accessories and/or peripheral devices that performs and/or controls any accountable automated and/or remote control functions and/or applications, when it utilizes, electricity, compressed air or gasses, vacuums, hydraulic and/or fluid pressure, to energize any such devices like electro magnets solenoids, motors, mechanical or silicon relays, pistons, cylinders, pumps, valves, adjustable valves pindle valves cables, linkages levers, shifter forks, paws, ratchets, catches, couplers, spring returns, gearing or power transfer mechanisms cases, brake pads disk assemblies, or drums, clutches and/or interlocking drive mechanisms, spined hub collars and shafts.

A further claim is made for any responsively connectable electrical actuating accessory and/or peripheral devices that reports back on any responsively connectable electrical actuating accessory and/or peripheral device with any type of data signal created by any camera, transducer sensors that provide an electrical signal, for any system pressures and vacuums, surrounding environmental time and distance measurements, onboard device position sensing of devices from limited switches to rotational positions.

A further claim is made for any responsively connectable electrical actuating accessory and/or peripheral devices to control a vehicle speed, by controlling the physical position of the throttle though shaft on any air fuel mixture system or device responsible for providing this necessary fuel combination component to energize a power plant for internal combustion engines.

A further claim is made for any vehicle monitoring and remote control claim for any speed control modality for any circuitry, module, processor, device, component and/or its firmware, and/or onboard board software, like TRAC, that functions to control any electric stepper motors and/or solenoids or any throttle through shaft to control any type of drive by wire modalities (either on any internal combustion engine or any type of alternative power plant), and/or for any electric vehicles to directly control electric drive motors or electric drive flywheel inertia power plants (electric wheel, etc.) and/or their drive trains to control vehicle speed, and/or by controlling any real time electrical energy production or generation from any on-board chemical conversion systems either by decomposing and/or composing molecular bonds (e.g. fuel cells, and other devices etc.); and/or to control and monitor the onboard real time production of alternative fuels and their waste products and/or heat production and/or by products for any type of power plants for any vehicles, including the real time monitoring and control of present standard fossil fuels and their waste products heat production and/or byproducts for any type of power plant for vehicles.

A further claim is made to electrically control any onboard cruise control mechanisms through at least one of various detailed modalities: to initially eliminate any acceleration capability; and/or to control speed for automated and/or remote control; and/or robotics driving.

A further claim is made for larger vehicles (Trucks and Buses) which provide any responsively connectable electrical actuating accessory and/or peripheral devices to: control a vehicle speed (similarly constructed); control the physical position of any throttle though shaft, operator control mechanisms (pedals, hand levers, cables and/or mechanical linkage); limit air flow, and/or to similarly effect fuel flow in any internal combustion engine so equipped to create a controlled deceleration as part of any phase one slow down for these vehicles; and/or control vehicle speed for any automated and/or aggressive remote control purpose.

Another claim is made for any fuel throttling device designed to eliminate, limit, and/or control the injection pump, which can function to restrict the injection pump (if diesel) to its idle position thereby only providing the necessary fuel combination component to energize the power plant for the diesel internal combustion engines, and/or any use of electrically controlled solenoids valves, stepper motors, and/or pindle valves to control fuel flow as has been detailed for air and fluid electrical flow control application.

A further claim is made for the automation of either driver controls and/or solenoid(s) to activate the cylinder releases, commonly referred to as a jake brake to participate in any slow down where applicable.

A claim is made for the automation of any clutch either through the operators controls or though any linkage by any system that can be utilized to energize the function to disengage and reengage the clutch, however the clutch will be disengaged during the second stage controlled slow down.

A further automated and remote control claim is made for the first phase of a two phase slow down and stop procedure, which is part of a three phase vehicle shut down protocol, that is inclusive of any and all possible modalities; that has been designed to initially take aggressive responsible and accountable control as a significant increase to public safety for automotive vehicular travel.

The first phase slowdown is to eliminate, and/or control an operator's ability to accelerate and/or increase the speed of a vehicle; while preserving an energized power steering function and power braking function on the vehicle with protocol determined operator control (ultimately as a standardized procedure). However, also claimed, as it was determined in this technology's initial experimentation, the simple elimination of all acceleration capability from the unauthorized driver is the best single simple improvement to increase public safety in this first stage slow down. But, any and/or all of these three functions can be optionally operator controlled at various application specific protocol levels either preprogrammed or remotely augmented in real time by the appropriate commands as a means to affect a safer controlled phase one slow down for this shut down designed as the initial step in aggressive automated and/or in any remote control scenario.

A further claim is made for the complete and total automation and remote control of any emergency and/or mechanical braking system as found on any and all onboard applicable vehicles, or equipment, when used in any fashion to slow or stop and retain a vehicle in a stationary position by any preprogrammed protocol response either remotely originated or as part of some onboard software or firmware programming, like TRAC's PASSS and PAGSSS programs and MASMP and RPV, to increase public safety.

A further claim is made for the second phase slowdown, stop and secure function performed by a remote command and/or a preprogram timed deployment of a automated emergency or mechanical brake system to slow and stop a vehicle in a stationary position, like all TRAC programs.

A further claim is made for the complete and total automation and remote control of any service and/or hydraulic braking system as found on any and/or all onboard applicable vehicles, or equipment, for any and/or all automated and remote control braking, and especially when used in any fashion to slow or stop and/or retain a vehicle in a stationary position by any preprogrammed protocol response either remotely originated or as part of some onboard software or firmware preprogramming.

A claim is made for the automation and remote control of any air service bake system and emergency brake system utilized on large trucks and busses to assist in this technology's second phase of a vehicle shutdown to slow, stop and secure the vehicle in a stationary position, by first slowly applying the brakes to any rear most tandem axles and wheels (ideally on any trailer first if applicable and attached). This is in a graduated manner until the truck is sensed to have no movement and without locking up the wheels (controlled by wheel sensors and/or rear end drive train sensor), and then to secure the vehicle electrical solenoid(s) dump the maxi can pressure to hold the truck and/or bus in a stationary position. TRAC software would control solenoid air valves (bellows), etc. and the ones in the appendix through programmable modular software, firmware and hardware.

A claim is made for heavy equipment and revolving track equipment for agriculture, construction, commercial applications and military equipment) to control through TRAC's CASMP and FACT programs, the braking of the left and right side track(s) independently and/or jointly to effectively control steering and braking through either automation of the operator controls, responsively connectable and/or automated braking in the final drives and/or in the transmission clutches and/or any electrically controlled hydraulic clutch packs located anywhere in the powertrain. Electrical control devices constructed to either push, pull or rotate physically and/or made connectible electrically to interface with the PFN/TRAC system.

The power plants RPMs are controlled in accordance with the same modalities covered for gasoline and diesel engines and/or for any electrical drives. All remote control device modalities would be determined by the particular equipment parts and design. However, the protocol for a controlled slow down and stop in a stationary position would incorporate the de-energizing of the track drives as well as the reversing of their direction and braking deployment if necessary for stop and guidance. Often times, the drives are so resistant to inertia movement when the are not energized either through mechanical gearing and/or hydraulic or electrical energy that in the de-energized state they will stop moving and remain in the stationary position at most any incline.

All track and/or rail transportation vehicles (trains, trams, subways, and their individual cars) outfitted with application specific PFNs will provide backup and/or augmentation to any preexisting automated and/or remote control system in existence and/or enhance any of these systems by providing real time tracking monitoring and remote control through computer and automated network links to better coordinate intersecting traffic between road, rail, and waterway shipping and boating by being able to control it through TRAC trip computers, controlling the speed of the trains through them. Diesel motors, diesel over electric motors, electric motor controllers and/or stepper motor control systems, and/or any operator mechanical controls, their cables, linkages, hydraulic lines, air lines, electrical control service lines and circuits in a similar manner as has been detailed for the automated and remote control peripheral actuating devices for the road vehicles. And any and all such other necessary automated and remote control application specific devices are configured by the electrical specifications and functional requirements from all the detailed mechanisms and are placed to control any electrical services, compressed air or gasses (steam) or hydraulic fluids utilized to energize any and all of the control components and/or devices to control speed and braking of any trains, trams, subways and/or rail transportation. A special PFN claim is made for individual rail car tracking to provide information to rail system customers and users as to the location of a particular load, and/or audio and/or video surveillance for increased security as well as specially provided sensing devices, application specific is an option for sensitive, and/or valuable loads and/or security scenarios.

A further claim is made for the remote control of all boating and shipping vessels by also outfitting them with application specific PFNs for tracking, monitoring and management world wide with the same types of devices as detailed for the different type of power plants in any and all of the land based vehicles for throttling and/or increasing their RPMs as a general rule, transmissions and rudder controls will be electrically controlled from the PFN for automated and remote control guidance and forward and reverse functions. These vessels use the same automations detailed for operator controls, as well as employing electric control over air, steam, hydraulic, mechanical and other additional electrical devices and components to control and power actuate boat controls, where and when applicable and needed. The systems will be application specific to the size of the craft and the amount of preprogrammed and/or automated system already present in any vessel for PFN/TRAC to interface with.

A further claim is made for agriculture and farming equipment to be automated for remote control with much of the same detailed automated control mechanisms, and with tracking and monitoring to control equipment from computer operating monitoring systems and networks for cultivating and harvesting protocols as well as monitor and controlling ecological impact and resource management through application specific PFN systems and special application specific equipment programming and functions managed by Commercial Application Specific Mangement Programs, which is operated through TRAC in the PFNs.

A claim is made for all other commercial, factory, and industrial equipment either minimally mobile and/or stationary to all be outfitted with application specific PFN and TRAC systems and peripheral actuating devices to remotely control them and shut them down by the same detailed modalities for all of the above reasons detailed throughout the related patents. But once again, application specific electrical and mechanical actuators and management programming will be responsible for performing these specific automated and remote control functions and providing accountability. These PFNs in multi-equipment setting locations or installations may be monitored by one local central system, which has one land line phone node or satellite hook up with a protected gateway for the PFNs to communicate with their application specific data. These could, in many cases, use short range communications so that any monitoring can be done at a local level with application specific data and then re-transmitted and stored in a redundant manner for analysis in any computer network for any reason and of any size. And if any so equipped machinery could not find a receiving local node for its short range data signal, it would go into its application specific shut down sequence and cease to operate until the proper signal was provided or the equipment was re-programmed. Battery power would be utilized to repeat transmission by any communication devices as a down and lost equipment location function and continued by the PFN power systems. In solo operation the PFNs will be monitored and remotely controlled by commercial servers with (tele communication systems and long range RF equipment) primarily that can provide local service as well as internet gateway hookups for inexpensive diverse location commercial monitoring—(this will also be used in the agriculture applications).

A further claim is made for all home and private applications of PFNs that will be used in conjunction with any existing security system, home computer controller systems and/or this technology's home equipment and utilities management system to organize, store, complete phone node contact and transmit data for utility and/or equipment use for any billing, personal records and/or taxing for same, as well as, provide services for repair and maintenance purposes, and also to provide and support home healthcare and nursing telemetry and automated functions. All equipment can be outfitted with application specific PFNs so that they will only operate for the rightful owner and can not be transferred to another location without the proper authorization, or they will send out a recognizable identification signal to all multi band PFN system receivers to report their location of the displaced equipment to the registered owner by phone node connections to the internet, E-mail managed by the PFN/TRAC program HASMP.

A further claim is made for the control of any and all ignition components and modules to control engine RPMs and/or maintain a run position through electronic signals, either, by direct interfacing with OEM components and/or indirectly providing a specific signal especially generated to create a preprogrammed OEM response from the standard OEM's firmware and/or software through this technology's trickster circuits for any desired response (application specific). These circuits can employ electro/mechanical relays or switches and/or be constructed of solid state circuits. Also the complete engine kill or shut down of the power plant is the $3^{rd}$ phase of the three phase shut down for vehicles either done as a preprogrammed time activated function or as the result of a remote control signal received and a predetermined response to this signal.

A PFN claim is made for any responsively connectable interface with actuating devices for all machines that utilize any type of electrical current and/or signal to control peripheral devices and/or accessories for any vehicle, machine or equipment application.

A further claim is made for the "coyote or trickster" circuits and/or any circuits responsibly connectable to a PFN TRAC system or any other processor or any type of relay control system designed to provide an electrical signal in order to deceive any other processor's software and/or firmware so that it will perform one of its preprogrammed tasks as an additional automated function, and/or as a remote control function and/or as any part of any interface functions for synergistic machine controls A second claim is made for the "coyote sensing" circuits or any other circuit that is designed to intercept and determine if a specific electrical signal is sent to a or OEM processor or automated relay system and utilize that signal in any manner to trigger or perform other automated functions via any control relays, a PFN and/or any other processor and/or interrupt that signal to the OEM processor if so desired, and/or perform any remote control or communications functions or memory functions as a result of detecting the electrical signal.

A further claim is made for special responsive connections for all the "Coyote circuits" or any other circuits that are designed to create any type of plug and play connectors as a universal modality to interface and/or integrate; electrical parts, components, devices, C.O.T.S. personal products or different manufactures products by design to create a more inclusive product; and/or to seek a standard for any universal connections physically and/or electrically.

A PFN claim is made for any responsive connectable report back sensing devices and components that provide monitoring data on machine remote control, area surveillance and environmental sensing, operator activities and equipment operational data, which can also make all of these transactions accountable, like through TRAC software.

A further claim is made for any type of physical protection; for any reason, that is deemed necessary and/or made mandatory by any standards codes rules regulations or laws by any appropriate governing bodies, for any electrical components and their hardware connections, control circuits locating equipment communications devices, circuits, peripheral control devices and sensory equipment including audio and video systems.

A claim is made for any protected signal from a PFN or any other machine messaging system for accountable software tracking string and file access log, as well as any special conditioning of any remote signal (encrypted).

A claim is made for an unsecured signal from a PFN as part of any remote signaling for machine messaging that does not require any special signal conditioning.

A further claim is made for web access, to monitor remote control function in real time and to mass store data off-board as transmitted by the PFN and/or other machine messaging systems and to access the web for personal use from the PFN for E-mail messaging and/or remote tracking either personally, as commercial service and/or for legal and/or governmental reasons.

A further claim is made to be the sole provider of PFN data and any use of that data and/or any other machine messaging system's data utilized on the web when it is a part of monitoring, tracking and/or remote control and/or accounting for machine use and its impact on the environment, societies infrastructure, equipment's safe use, any security functions, any data analysis and/or any remote control function of any kind in any time frame.

A claim is made for responsive connectable actuating devices to remotely control equipment.

A claim is made for responsive connectable actuating devices to remotely control machines.

A claim is made for responsive connectable actuating devices to remotely control vehicles.

A claim is made for report back data from any responsive connectable on-board sensing devices and/or audio video components processed by the PFN and/or any comparable machine messaging system for any piece of equipment, machine and/or vehicle either to a local remote location or worldwide.

A claim is made for the Spider Eyes program and Green Eyes or watch 1100 and 1200 community and environmental watch programs carried on the web as web pages for the local, state or regional, national and world web pages providing data collected from PFNs and/or processed through TRAC, by service providers to government standards and protocols or directly provided by the government agencies, and/or other participating organizations and educational institutions.

A further claim is made for the 1100 spider eyes program to be part of any interactive highway system and law enforcement protocols that are approved by law to perform traffic control functions and surveillance functions and crowd control functions through remote control of any and all peripheral devices on any piece of equipment through any and/or all PFNs as so deemed appropriate and necessary by law, with any violations and misuse fully accountable through TRAC programs or any similar products.

A claim is made for the 1100 Helping Hand connectable car link system that physically connects two or more vehicles to tram, tow or train together either for towing purpose or as part of any mass transit for individual cars, using its automated coupling and communication links, and its automated flow control valve, that is detailed here as basic flow control technology for fluid, air and gases to be applied to other functions in steering, braking and other automated and remote control application for the operation of many other functions, including operating military ordinance as per any vehicle's control power for peripheral devices.

A claim is made for a highway device for fuel injected cars or systems as a fuel caddy that provides for the quick connect to the fuel line pressure system on a vehicle and the bleeding off of enough fuel to refuel another vehicle through a length of hose which is sealed when disconnected. Also this device can be used to fuel small engine devices like lawn mowers etc. foregoing the need to store flammable fuel in separate containers.

The following claims relate to the specific equipment disclosed in the present application:

Heat Seal System

A claim is made for a sealing and unsealing system and/or bond mechanism that uses a conductive metal wire or thin strip coated with a substance that liquefies when the wire is heated by shorting out the opposite poles of the same power source on either end of the of the thin metal strip or wire. This system is to be used in the automotive industry and the electronics industry to seal and unseal electrical components with different plastics, waxes and adhesives at varied thermal ranges for application specific purposes to seal, unseal and reseal unions or joints between materials.

A further claim is made for the system to be configured with a security switch mechanism that permits the shorted condition of the power source through the metal strip when the appropriate electrical signal and or mechanical switch is closed to complete a circuit through the thin wire. There is a large amount of applications for unsealing bonds in containment systems, or between any two surfaces to be sealed.

NOTE: on the trickster circuits, the PFN computers or processors or any associated computers interfaced in the PFN will be capable of performing trickster functions by, for example, sensing and/or sending a specific signal to a OEM controller or another computer to elicit a preprogrammed response from these other processors. In this case only physical connections are generally needed and the appropriate software or firmware in the master computer in this master\slave relationship between the interfaced processors.

Gear Driven Actuators

Strip Gears:

The present invention includes the control, via the PFN and/or remotely, of strip gear mechanisms with gear reduction system driven by a matching motor gear dive, with guide channels or mechanisms to perform any application specific movement as determined to be a basic push pull function accomplished with, for example, guides, tracks shafts linkages, cables, belts, sheaves, chains, mating gears and/or sprockets with, for example, the appropriate attachments mounts, anchors, adhesives, melding, welding, screwing, riveting, bolting and/or any linking of connecting surfaces by any connecting hardware to achieve the push pull arcing and or a minimal rotation function.

The present invention includes the control and/or automation of the present emergency brake pedal, via the PFN and/or remotely, for example, as disclosed in FIGS. 5A–F and 5A, including a strip gear with channel guides to anchor to the floor boards and to apply the foot pedal for the emergency brake. This mechanism can push-pull, for example, any pedal, cables, levers, linkages, switches, valves, foot pedal assembly, rotational actuator, arched strip gear, inline gear reduction servo motor system and/or any device that requires linear movement.

FIG. 5A is a drawing of a motorized arched gear drive emergency brake pedal assembly that replaces the standard manual emergency brake pedal. It has a gear reduction motor and drive and is reversible and can also have a quick release. These can be used in the shut down of the vehicle and be activated when a door is opened for safer boarding and off boarding of mobile vehicles and equipment, as described herein. Also, a seat sensor or belt switch can activate any electrically controlled braking system if more appropriate to the application (fork lifts, bulldozers etc), using, for example, dead man switches (electrically activated not just a mechanical).

Sensing Switch:

The present invention includes advantageously a Coyote circuit for current sensing with a driver circuit to detect a signal either digital, TTL, AC, and/or low voltage DC signals, and then performs switching functions, operational and/or control current to perform electrical tasks that the primary unprocessed low current signal could not perform on its own.

The Coyote circuit of the present invention is a circuit access switching device designed for the replacement of the manual and/or physical striker switches for the doors, hoods and trunks in the new vehicles. This device can be used in many industries for many reasons and applications. The standard 1003 circuit sensor switch basically can help interface additional activities from the first or primary signal if so desired in a very inexpensive manner.

An automatable cable tension device for emergency brake cables to be used, for example, as a center point cable pull for the automation of the emergency brake system.

The present invention further includes as modality A, a gear motor drive and strip gear configuration for the emergency brake cables under the car as detailed in FIGS. 5A–F top isometric drawing for the part 200 location for the brake cable tensing systems in FIG. 1.

A piston system with the same attachment and anchor points powered by air, gasses, hydraulic or fluids mediums and controlled by relay(s) and solenoid(s) and valve(s) is claimed as modality B.

The present invention includes, as Modality C, a ball and or nut screw or worm gear system with the same attachment and anchor points powered by an appropriate motor gear drive and relays to apply the emergency brake by tensing the cables in the same manner (the mechanism works like the nut screw device FIGS. 6A–B).

A solenoid or electric cylinder configuration with the same attachments, and anchor points powered by the appropriate push pull solenoid as detailed in the appendices is considered Modality D. Modality E includes any COTS product linear actuator with the same attachment and anchor points to perform the push pull function to tension and relax the cable to apply the emergency brake.

The Emergency brake pedal assembly (in its present COTS configuration) or as an OEM installed improvement to this present system, by making the appropriate modality choice, attachments and anchors for the application specific vehicle.

The present invention includes the attaching of these A–E modalities to perform push pull tasks and/or to tense any cables or relax them to increase and decrease speed and/or RPMS, and to automate and/or remotely control of any piece of equipment, machinery and/or vehicle.

The present invention further includes the attaching of any of these A–E modalities to perform push pull tasks, with any linkage and/or lever assemblies to increase and/or decrease speed, RPMS and or workout by automating and/or remotely controlling, for example, any master cylinders, injection pumps, throttle controls, and/or the carburetor.

Accelerator Pedal Stop Device

The present invention employs the ball nut modality which is electrified to restrict a driver from depressing the gas pedal. However, the other modalities A–E could be employed to achieve this goal to eliminate acceleration of a vehicle and this device can be employed to block any normal function of a control part handles A separate hand pull emergency applicator device is claimed for the same ball nut modality to apply the hand brake in many vehicles, and here again, A–E modalities can be employed to perform this same task for automated and remote control.

a separate Automated Cable interruption device invention is claimed for any cable device that releases any anchored end of a cable or can interrupt the normal action of a cable through electrical controls for any automated or remote control purpose to control throttles for acceleration.

A separate invention for electrically activated solenoid air and or gasses valve is claimed. A separate invention claim is made for a automated brake modulator valve for the automation of a motorized modulator hydraulic brake valve system, and the flow of brake fluid controlled by solenoid valves to be capable of applying the brakes though electrical controls for automated and remote control purposes.

A separate invention claim is made for automated steering devices that employs rotational actuators and or any A–E modality on the steer gear, shafts, orbital valves rack and pinion stub shafts, steel linkage shaft and powers the actuators with servo or stepper motors and are driven by sheaves, pulleys belts sprockets chains resistance wheels, or gears to perform automated and or remote control functions.

A separate invention claim is made for electrically controlled hydraulic valve to direct flow speed and pressure to any double piston steer pistons to automate steering and or for remote control.

A separate claim is made for remote guidance and activating any of the automated steering invention which have a rotational, sensor disk to confirm wheel angle sensed distance data and speed data as well as location data.

A surveillance claim of invention is made for the unattended use of any camera system for surveillance which is a part of any remote control technology for this technology's "green eyes and spider eyes" programs and protocols, as part of any machine messaging network.

The PFN software is programmable and modular software in hardware with embedded software, firmware, and software that can perform remote activities through the PFN controllers. The system is also capable of authorizing and authenticating remote and automated activities for private interactions and commercial use, insurance and legal actions, and for all types of financial transactions and to be approved for these official settings as apart of any standard or certification for automated and/or remote control scenarios for vehicles, machines, equipment and environments.

A special inventive claim is made for the PFN as a Repeater communication device for varied communication equipment, long and short range, and/or with multi-band capability and processor systems. Many PFNs will take a weaker local signal and/or a special signal, and retransmit the signal and/or data over its long range communication equipment to be used on the Internet or isolated remote monitoring applications for tracking. This is used for tracking persons, for example, pets by all local PFNs reporting coordinates to specified e-mail address special gateway providers and or commercial servers for telemetry.

A special inventive telemetry claim is made for the PFN. The varied communication equipment and processors can be connected to present COTS physical monitoring and nursing care equipment, and used to monitor, report back and/or administer medication from a remote location allowing more freedom to the patient and reducing health care cost and attention. Also with new short-range telemetry RF equipment, the PFN can support these capabilities by wireless with the patient just being in the proximity of a PFN.

Another claim of the present invention is made to a shut down system for vehicles that first slows a vehicle by eliminating acceleration by any of the above modalities, and stops a vehicle by any of the above modalities, and secures the vehicle in a stationary position, with the power plant, engine or other energy source deactivated.

Another claim is made for the PFN for varied communication equipment and processors that can be connected to present COTS physical monitoring and nursing care equipment and be used to monitor report back and administer medication from a remote location allowing more freedom to the patient and reducing health care cost and attention. Also with new short-range telemetry RF equipment the PFN can support this by wireless with the patient just being in the proximity of a PFN.

A special claim is made for PASSS protocol and program to a shut down system for vehicles, that first slows a vehicle by eliminating acceleration by any of the above modalities, stops a vehicle by any of the above modalities, and the secures the vehicle in a stationary position with the power plant deactivated. PASSS stands for Proprietary Automated Slow Stop And Secure in a Stationary Position. PAGSSS stands for Proprietary Automated Guidance Slow Stop and Secure in a Stationary position and is the next step in this technology's commercial development of this program protocol.

A special claim is made for Throttle actuators, including those that use a magnetic clutch to engage and disengage a throttle through shaft to limit or control acceleration.

An additional claim is made for any such magnetic clutch attached to a shaft and can be activated or deactivated as part of any remote control or automated application A special throttle actuator claim is made for any solenoid locking pin mechanism that engages and or disengages the throttle through shaft to stop acceleration, and to permit acceleration.

An additional claim is made for any such locking pin solenoid that can link two parts to perform an action or function, and disengage the same parts by activating and deactivating the solenoid for any automated and remote control activity.

A special throttle actuator claim is made for any servo motor or stepper motor that controls the position of the throttle valve through the rotation of the throttle through shaft union with these gear reduction motors for remote control by automation.

An additional claim is made for any servo motor or stepper motor valve or motorized function perform by degrees of activation in opposite directions, including any task automated for remote control especially when it is done with authorization and authentication in memory.

A special accelerator linkage separation claim is made for a solenoid linkage separation system to be activated and deactivated to eliminate acceleration and to resume it for automate and remote control systems.

An additional claim is made for the solenoid linkage locking system for any and all other controls linkage controls in any other applications.

A special solenoid accelerator cable release system for the pedal is made, where the solenoid when activated releases a piston plunger that rides in a fixed position in a guide cylinder that is attached to one end of the accelerator cable, and the other end of the cable is attached to the internal piston plunger. In the fixed position the two piece of cable work as one, and when deactivated the pedal will move the piston plunger in the cylinder but not pull the other cable for automated and remote control applications.

Another additional claim for this invention is made for any cable system in any application for remote control by automation.

A special solenoid, motorized and or piston driven air duct valve claim is made for any additional air throttle valves placed any where along the air intake system of an internal combustion engine gas, diesel turbine or jet to limit air intake to throttle engine RPM or starve and kill a motor by automated and remote control means.

A special information bar claim is made for an automated scroll bar announcement system to display visual messages to surrounding cars during an emergency shut down scenario like PASSS and PAGSSS and or just any emergency stop. A second possible use is to provide a visual communication device for drivers to coordinate intentions where wireless communication are not available for any audio communication. In this case, the scroll bar would be reversed printed and visible to the rear view mirror of the car and between the brake lights and written for normal viewing. Also it would be in different languages, and its messages will be stock preprogrammed messages with corgol statements, and/or programmed through voice recognition technology. The placement and laws governing use will be determined by the appropriate governing bodies and industry standards.

A PFN protective containment and interface claim is made for a multi current supply including 120 volts for lighting home and camping use to operate many 120 volt devices in an emergency situation. Connection outlets are available through the PFN inverter system with weather resistant and lockable covers in the interior, and on the exterior of a vehicle or piece of equipment.

An additional protective PFN interface and containment claim is made for any and all electrical accessories desired to be stored and or operated in, on or off of a host piece of equipment electrical system and to be connectable and responsive with at least one function, even if that is to be energized by the host piece of equipment.

A PFN legal privilege instruction claim is made for the courts, insurance companies to provide their limits on a specific operator licensing by defining the terms, conditions of any individuals protocol to operate a particular vehicle and or piece of equipment at any given time and provide these software instructions to the Trusted Remote activity Controller TRAC in the PFN to track a drivers performance and deploy the PASSS or PAGSSS program, if necessary, to insure public safety or the agreed upon compliance of the conditions to drive. These instructions can be down loaded physically into any single vehicle PFN as the designated vehicle an operator must use and or provided through PFN Communication system with DMV, law enforcement and court phone nodes to any vehicle so equipped with ID systems required for continual driving in the future.

A PFN Steering wheel Identification and driver protocol registration product claim is made. For example, finger print identification, and other means of identification as well as telemetry for the physical condition of the operator have been well detailed. The steering wheel monitors telemetry functions of the operator, along with the PFN hardware and TRAC software to check driver ID and complete a search for any conditions placed on an operators privilege to drive a vehicle or operate a piece of equipment.

A PFN stock compromised driver protocol software programs products claim is made for the sensed alcohol impaired driver employing breathalysers, or using the nose and driver performance algorithms and assisted guidance and warnings as well as interdiction means like PASSS and PAGSS with law enforcement. The consciously aware driver check program for ill (Heart attack etc.) or sleepy drivers, monitors eyelid and pupil changes and driver performance and assistance devices programs activated and recorded along with audio interrogatories that require specific pre-programmed and pre-trained responses in the normal state, including optional speech recognition patterns, and the like.

The aggravated driver program takes blood pressure and monitors verbal tones and expletives physical behavior and temperature. This program optionally includes contact thermometers in the steer wheel, and infrared camera data of the operator, as well as erratic and/or excessive speed, and compares it to a normal driving state as developed over time The habitual speeder program will have trail markers set in the GPS program (like Delome Street Atlas) for known highway speeds so when a vehicle is traveling a road at the higher speed, the program tells the operator of the violation and monitors the drivers response and reports it back to the authorities for the intolerable level of access speed.

Also the pensive or timid driver program detects and determines if an individual is a nuisance on the highway and must either drive at an increased speed or perform maneuvers with greater speed an proficiency. A running program of driver or operator data will be available for the driver to review and/or receive alert notices when a potentially deficient characteristic is detected in their driver performance. Obviously all healthy individuals living long enough will be licensed for decreasing levels of self driving, and will be using and relying more on automated guidance and remote control systems. This will be true of the impaired as well physically emotionally and mentally.

A PFN to provide data back to the Internet claim is made for video equipment employed and deployed on the privately owned vehicles to capture events in real time and through the accountable software provide real time video to news media for pay.

A further claim is made for all other telemetry data to be provided for commercial purposes from a PFN as a fee for access with the expectation of any and all data deemed by government as essential and apart of necessary safety equipment and public safety systems and or national security. However the technology provides for a reimbursement of the citizen for the publics use of their equipment in the form of data recorded and reported for tax rebates, for example, in the ownership and operational costs of the host vehicle and the PFN systems. This technology accomplishes this through its Trusted Remote Activity Controller and the Trusted Remote Activity controller system embedded in the varied computer networks the Internet and the World Wide Web. Telemetry data is gathered and/or processed through a PFN and TRAC software system, analog, digital audio, visual and/or any application specific data processed through the system.

A further claim is made for the PFN TRAC device and systems to be in the form of COTS and proprietary products interfaced either as separate devices and/or integrated hardware parts and components (circuits, circuit boards, processors, receivers, transmitters, locating circuits, memory devices, wires, chips and connectors etc.) and COTS software and firmware products supported by the appropriate hardware and managed by this technology's trusted remote activity controller and accompanying system that authorizes, authenticates and then stores, for example, in a protected accountable memory, redundantly in two places locally and in many cases in at least one remote location.

A further black box claim is made for the physical removal of data from the PFN, and an additional claim is made for the remote removal of data from the black box by wireless protected signal, land line protected signal, and or light transmission of data to be used as court and or legal evidence, to access or analyze use, abuse and or assign a monetary value for any and all of the above.

A PFN service product asseses the mechanical system of the host piece of equipment through application specific programs provided by the OEMs of the host machinery and or provided by this technology. A large software menu list of service providers with E-mail addresses that the PFN will call up and send the data to, and receive prices back for, the consumer to evaluate as an automated function, all different technical appraisals will be structured into a uniform estimate appraisal sheet and be printed out off the PFN or connected to a computer or provide a memory disk or transfer component for a computer, or just email the results to the computer terminal through the PFN communication equipment to where ever the owner.·.operator desires.

An invention for a motor\generator brake device is claimed for utilizing an electric drive motor as a generator by appropriately energizing the proper fields to slow the vehicle down as a braking device, and allowing the inertia energy to be converted into electrical energy for any on board storage batteries, and/or to augment any electrical energy or power source to increase the travel distance of any electrically powered equipment machinery and or vehicles.

An invention for a separate processor Electronic Steering Control Module (ESCM) with, for example, the stamp computer or the 188 euroboard controller or comparable microprocessor with the same firmware and or software programming used for the PFN to manage real time video and/or digital signals with other telemetry data and connectable interfaces to perform guidance activities for automated and or remote control scenarios with proprietary PFNs and any other processor's or as a stand alone device.

The present invention also includes a police hand held traffic control device and cruiser system. This device incorporates the COTS radar systems and special radio frequencies and FACT (federal authorization control code) which is encrypted at the factory in the base PFN security section to allow law enforcement to deactivate a specific vehicle by communication with it and trading the necessary integrity data to justify an aggressive shut down like PASSS and PAGSSS, or other uses.

This is part of the spider EYEs program and will have security checks on and off the vehicles for review in any forced shutdown. This program will run a video record, audio record and telemetry record synchronized in time and geographic location and will be monitored in real time by law enforcement as well as the suspect drivers vehicle and any remote E-mail storage he chooses to send a record.

In a mobile scenario for the cruiser, a hologram target image and laser light guided modulated narrow beam RF signal will guide the FACT access codes to the appropriate reception sensor for the signal to begin a dialog with the suspect vehicle. During the process the officer's badge or s.n. number will be registered with both vehicle and any interactive community communication equipment or the interactive high way will authenticate a legitimate official shut down of the suspect vehicle and all is performed though the PFN and described in this and the related application. TRAC software will authorize authenticate and document to the local memories and at least one remote location.

As described above, the present invention includes an automated emergency or manual foot brake deployment systems including emergency foot brake applications by linear actuators (ball or nut screw systems or worm gear configurations). Any magnetic lock leverage and load transfer device and or walking ratchet mechanism. Alternatively, an emergency foot brake applications by arched strip gear actuators, for example, like the one displayed in FIGS. 5A–F. In addition, an emergency foot brake applications by piston actuators with pressure mediums is included. Emergency foot brake applications by piston or diaphragm actuators operated by vacuum, and the like.

The present invention also includes an automated and remote control device for the service brake performed through electromagnetic devices, Automated and remote control of any service brake operated through any PFN system due for is also described.

Alternatively, an automated and remote control device for the emergency hand pulled center pulled brake systems is also provided.

LIST OF ITEMS

Emergency brake cable controls for the pedal, emergency brake cable for the center hand pull mechanism, rotational steering controls for the steering column, the steer gear boxes orbital valves any rotational shaft linkage speed controls electrically operate throttle, close off valves ignition module eliminator or standard ignition shutdown system, air, spark, fuel, power plant controls, power train controls vehicle telemetry, environmental telemetry, operation and operator activity telemetry.

What is claimed is:

1. A security seal system for a tamper detection and sealing, unsealing and/or bonding, comprising:
    a security switch mechanism activated via a shorted condition of a power source to exist through a conductive metal wire or thin metal strip when the appropriate electrical signal and/or mechanical lock switch is closed to complete a circuit through the conductive metal wire or thin metal strip; and
    a security trigger circuit activating the shortened condition when the circuit is activated, optionally via entry of a coded security signal, wherein the security trigger circuit and conductive metal wire or thin metal strip coated with or imbedded in a substance that liquefies when the wire is heated by the system shorting out opposite poles of an identical power source connected to on either end of the thin metal strip or wire, to perform sealing, resealing and/or unsealing of electrical components packaged with different plastics, waxes and adhesives at varied thermal ranges, and for sealing, unsealing and resealing unions or joints between other materials, with a metal strip coated with plastic that melts into at least two metal locking security stamp wells and a receiving seal groove around any access port or panel.

2. a security seal system according to claim 1, wherein the security trigger circuit activates a heating process, optionally via entry of the coded security signal.

3. A security seal system according to claim 1, wherein said trigger circuit is embedded with the conductive metal wire or thin metal strip coated with or embedded in the substance in a finished product housing said security trigger circuit.

4. An activation system for secure sealing, unsealing and/or bonding, comprising:
    a security trigger circuit activating a heating process for triggering a security application; and
    means, responsive to said security trigger circuit and the heating process, comprising at least one of a conductive metal wire and thin metal strip coated with a substance that liquefies when the wire is heated by the system responsive to the heating process triggered by said security trigger circuit, for shorting out opposite poles of an identical power source connected to on either end of the at least one of the thin metal strip and the conductive metal wire, and said means for at least one of sealing, resealing and unsealing electrical components with at least one of different plastics, waxes and adhesives at varied thermal ranges, and for at least one of sealing, unsealing and resealing unions or joints between materials, and the at least one of the conductive metal wire and the thin metal strip coated with the substance preformed by a coated covering of plastic that melts into at least two metal locking seal wells and a receiving groove around an access panel.

5. A system according to claim 4, wherein the activation system is used as a security switch mechanism that permits the shorted condition of the power source through the metal strip when the appropriate electrical signal and/or mechanical switch is closed to complete a circuit through the thin wire.

6. A system according to claim 4, wherein said security trigger circuit activates the heating process via entry of a coded security signal.

7. A system according to claim 4, wherein said security trigger circuit is embedded with the conductive metal wire or thin metal strip coated with or imbedded in the substance in a finished product housing said security trigger circuit.

* * * * *